(12) United States Patent
Akhbari et al.

(10) Patent No.: US 11,500,494 B2
(45) Date of Patent: Nov. 15, 2022

(54) ULTRASONIC TOUCH DETECTION AND DECISION

(71) Applicant: UltraSense Systems, Inc., San Jose, CA (US)

(72) Inventors: Sina Akhbari, San Jose, CA (US); Hao-Yen Tang, San Jose, CA (US); Mo Maghsoudnia, San Jose, CA (US); Man-Chia Chen, Palo Alto, CA (US)

(73) Assignee: UltraSense Systems, Inc., San Jose, CA (US)

( * ) Notice: Subject to any disclaimer, the term of this patent is extended or adjusted under 35 U.S.C. 154(b) by 0 days.

(21) Appl. No.: 17/165,878

(22) Filed: Feb. 2, 2021

(65) Prior Publication Data

US 2021/0278926 A1 Sep. 9, 2021

Related U.S. Application Data

(63) Continuation of application No. 16/418,410, filed on May 21, 2019, now abandoned, which is a continuation-in-part of application No. 16/418,180, filed on May 21, 2019, now Pat. No. 10,719,175, which is a continuation-in-part of application No. 16/417,184, filed on May 20, 2019, now Pat. No. 10,585,534, which is a continuation-in-part of
(Continued)

(51) Int. Cl.
*G06F 3/043* (2006.01)
*G06F 3/041* (2006.01)
*G06N 3/04* (2006.01)
*G06N 3/08* (2006.01)

(52) U.S. Cl.
CPC .......... *G06F 3/0436* (2013.01); *G06F 3/0416* (2013.01); *G06N 3/0445* (2013.01); *G06N 3/0454* (2013.01); *G06N 3/08* (2013.01)

(58) Field of Classification Search
CPC .................. G06F 3/043–0436; G06V 40/1306
See application file for complete search history.

(56) References Cited

U.S. PATENT DOCUMENTS

| 4,412,544 A | 11/1983 | Beretsky et al. |
| 8,676,540 B1 | 3/2014 | Welch et al. |

(Continued)

FOREIGN PATENT DOCUMENTS

WO WO2018077761 5/2018

*Primary Examiner* — Roberto W Flores
(74) *Attorney, Agent, or Firm* — Perkins Coie LLP

(57) ABSTRACT

A method includes receiving energy data associated with an ultrasound input device coupled to a material layer. The energy data comprises a current energy value and past energy values associated with reflected ultrasound signals received at the ultrasound input device in response to the ultrasound input device transmitting emitted signals through the material layer towards an external surface of the material layer. The method can then include comparing the energy data with threshold data to generate a current trigger value for trigger data. The trigger data is indicative of an occurrence of a touch event when the current energy value exceeds a current threshold value of the threshold data. Then the method can include updating the threshold data based on the energy data, the trigger data, and the threshold data. Updating the threshold data comprises generating a subsequent threshold value.

11 Claims, 72 Drawing Sheets

Related U.S. Application Data application No. 16/396,597, filed on Apr. 26, 2019, now Pat. No. 10,466,844.

(60) Provisional application No. 62/810,786, filed on Feb. 26, 2019, provisional application No. 62/784,615, filed on Dec. 24, 2018, provisional application No. 62/751,053, filed on Oct. 26, 2018, provisional application No. 62/725,697, filed on Aug. 31, 2018, provisional application No. 62/674,317, filed on May 21, 2018.

(56) References Cited

U.S. PATENT DOCUMENTS

| | | |
|---|---|---|
| 10,466,844 B1 | 10/2019 | Tang et al. |
| 10,585,534 B2 | 3/2020 | Tang et al. |
| 10,719,175 B2 | 7/2020 | Akhbari et al. |
| 10,775,938 B2 | 9/2020 | Tang et al. |
| 2001/0000666 A1 | 5/2001 | Wood et al. |
| 2002/0005108 A1 | 1/2002 | Ludwig |
| 2003/0144814 A1 | 7/2003 | Hama et al. |
| 2003/0217873 A1 | 11/2003 | Paradiso et al. |
| 2003/0233233 A1 | 12/2003 | Hong |
| 2007/0260425 A1 | 11/2007 | Kim |
| 2008/0316184 A1 | 12/2008 | D'Souza |
| 2009/0157206 A1 | 6/2009 | Weinberg et al. |
| 2009/0224161 A1 | 9/2009 | Fritsch et al. |
| 2010/0117993 A1 | 5/2010 | Kent |
| 2010/0139991 A1 | 6/2010 | Phillip et al. |
| 2010/0258361 A1 | 10/2010 | Yamauchi et al. |
| 2011/0061464 A1 | 3/2011 | Yi-min |
| 2012/0274609 A1 | 11/2012 | Sheng et al. |
| 2013/0345864 A1 | 12/2013 | Park et al. |
| 2014/0022189 A1 | 1/2014 | Sheng et al. |
| 2014/0071095 A1 | 3/2014 | Godsill |
| 2015/0148674 A1 | 5/2015 | Park et al. |
| 2015/0169136 A1 | 6/2015 | Ganti et al. |
| 2016/0107194 A1* | 4/2016 | Panchawagh ......... H01L 41/047 310/317 |
| 2016/0216794 A1 | 7/2016 | Yoon et al. |
| 2016/0246449 A1 | 8/2016 | Jarske |
| 2016/0350573 A1* | 12/2016 | Kitchens, II ....... G06V 40/1306 |
| 2017/0110504 A1 | 4/2017 | Panchawagh et al. |
| 2017/0255338 A1 | 9/2017 | Medina |
| 2017/0322290 A1 | 11/2017 | Ng et al. |
| 2017/0323133 A1* | 11/2017 | Tsai ........................ B06B 1/06 |
| 2017/0326594 A1* | 11/2017 | Berger .................. G10K 9/122 |
| 2017/0330553 A1* | 11/2017 | Garlepp ............... G10K 11/345 |
| 2017/0336903 A1 | 11/2017 | Rivaud et al. |
| 2017/0336926 A1 | 11/2017 | Chaudhri et al. |
| 2018/0032161 A1 | 2/2018 | Shi et al. |
| 2018/0032211 A1 | 2/2018 | King |
| 2018/0039392 A1 | 2/2018 | Kim et al. |
| 2018/0164937 A1 | 6/2018 | Lynn |
| 2018/0246612 A1 | 8/2018 | Lynn et al. |
| 2018/0276439 A1 | 9/2018 | Strohmann et al. |
| 2018/0276440 A1 | 9/2018 | Strohmann et al. |
| 2018/0284892 A1 | 10/2018 | Kwon et al. |
| 2018/0323783 A1 | 11/2018 | Bang et al. |
| 2019/0050618 A1 | 2/2019 | Khuri-Yakub |
| 2019/0074833 A1 | 3/2019 | Sheng |
| 2019/0354209 A1 | 11/2019 | Tang et al. |
| 2019/0354210 A1 | 11/2019 | Akhbari et al. |
| 2019/0354237 A1 | 11/2019 | Tang et al. |
| 2019/0354238 A1 | 11/2019 | Akhbari et al. |
| 2021/0181041 A1 | 6/2021 | Tang |
| 2021/0239553 A1 | 8/2021 | Akhbari et al. |
| 2021/0242393 A1 | 8/2021 | Tang |
| 2021/0293641 A1 | 9/2021 | Tu et al. |
| 2021/0293648 A1 | 9/2021 | Tu et al. |

\* cited by examiner

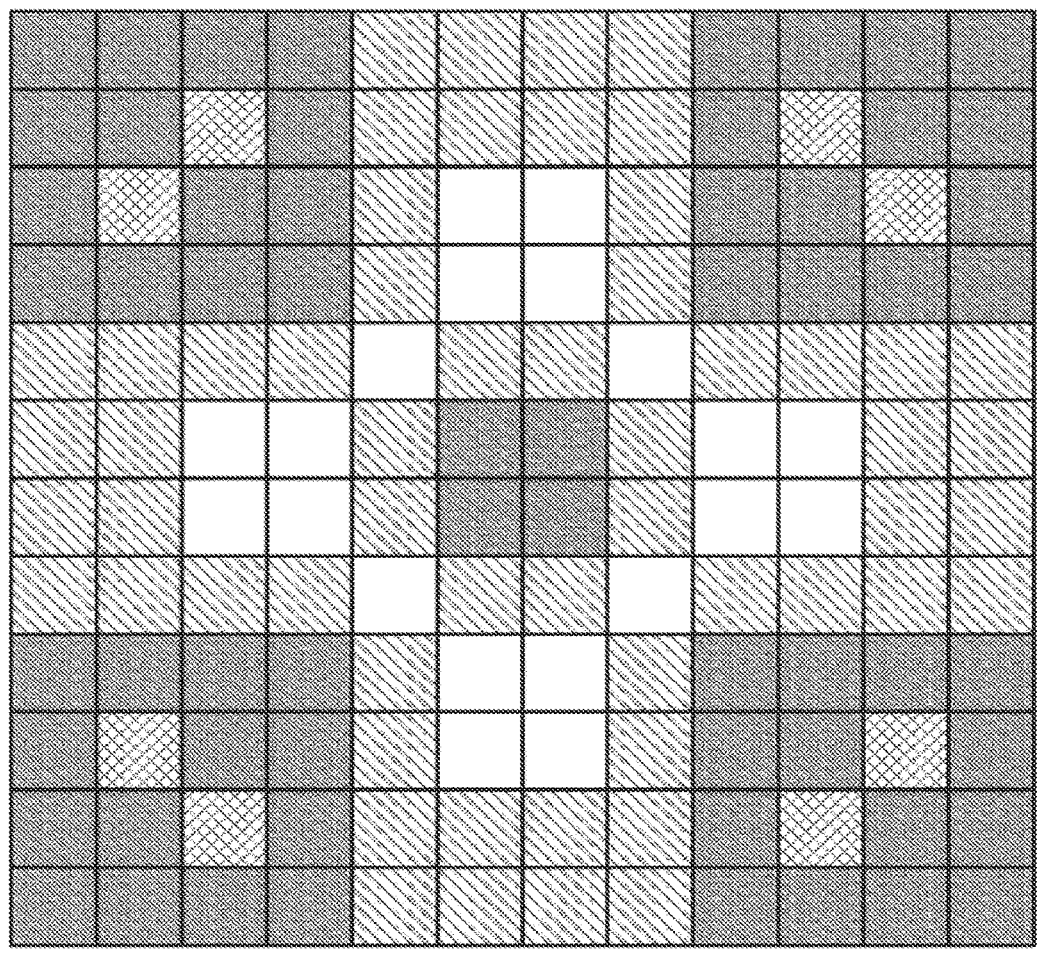
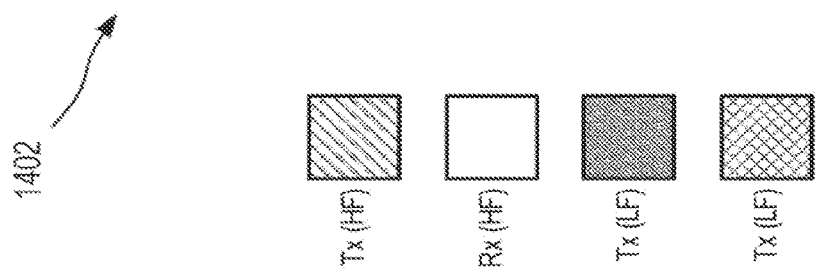
FIG. 14A

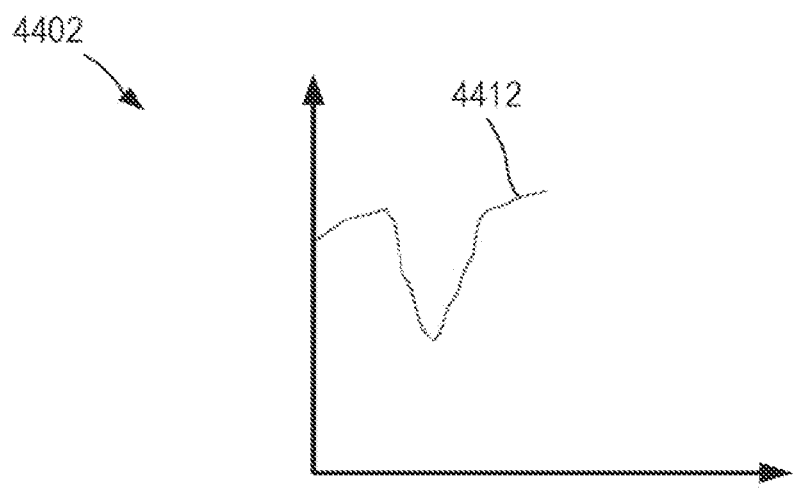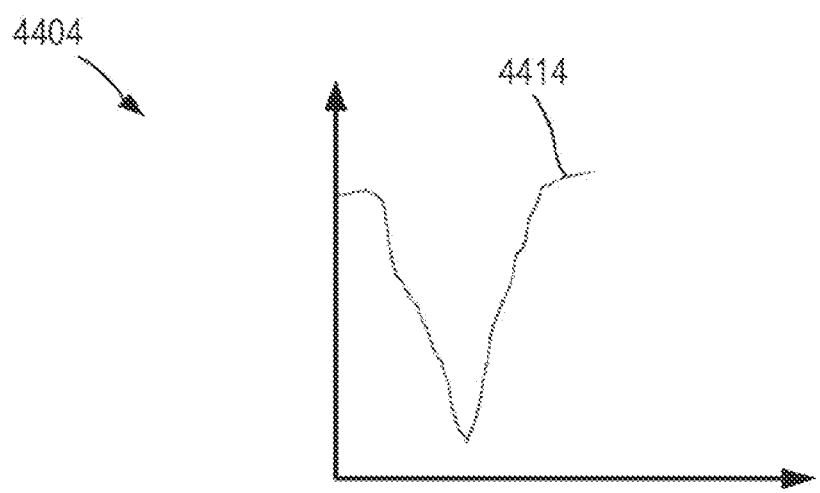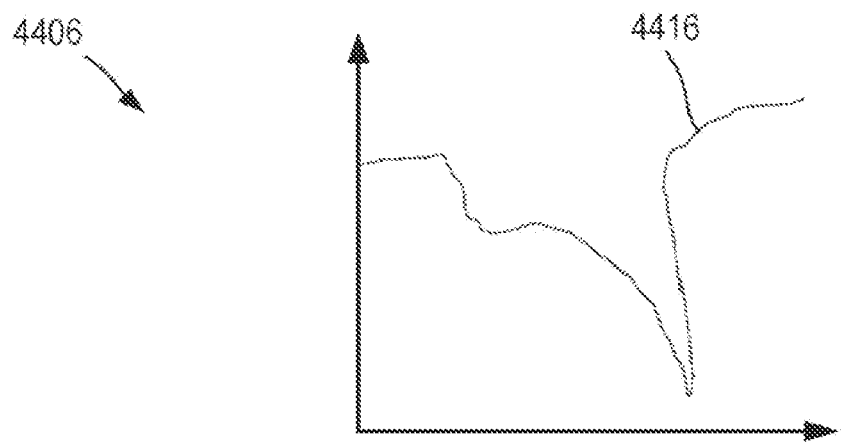
FIG. 44

Material Detection
Normal finger
Plastic glove (sticky)
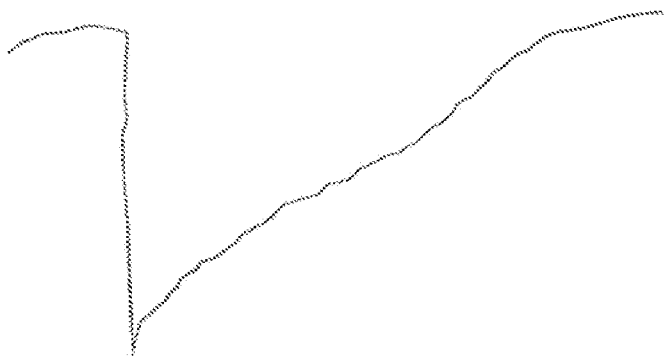
FIG. 63

ULTRASONIC TOUCH DETECTION AND DECISION

CROSS-REFERENCES TO RELATED APPLICATIONS

The present application is a non-provisional of and claims the benefit of U.S. Provisional Application No. 62/674,317 filed May 21, 2018 and entitled "ULTRASONIC TOUCH AND FORCE INPUT DETECTION," U.S. Provisional Application No. 62/725,697 filed Aug. 31, 2018 and entitled "ULTRASONIC TOUCH AND FORCE INPUT DETECTION," U.S. Provisional Application No. 62/751,053 filed Oct. 26, 2018 and entitled "ULTRASONIC TOUCH FEATURE EXTRACTION," U.S. Provisional Application No. 62/784,615 filed Dec. 24, 2018 and entitled "ULTRASONIC TOUCH SENSOR AND SYSTEM," U.S. Provisional Application No. 62/810,786 filed Feb. 26, 2019 and entitled "ULTRASONIC TOUCH DETECTION AND DECISION," is a continuation-in-part of U.S. patent application Ser. No. 16/396,597 filed Apr. 26, 2019 and entitled "ULTRASONIC TOUCH AND FORCE INPUT DETECTION," is a continuation-in-part of U.S. patent application Ser. No. 16/417,184 filed on May 20, 2019 and entitled "ULTRASONIC TOUCH FEATURE EXTRACTION," is a continuation-in-part of U.S. patent application Ser. No. 16/418,180 filed on May 21, 2019 and entitled "ULTRASONIC TOUCH SENSOR AND SYSTEM," and is a continuation of U.S. patent application Ser. No. 16/418,410 filed on May 21, 2019 and entitled "ULTRASONIC TOUCH SENSOR AND SYSTEM," which are all hereby incorporated by reference in their entirety.

BACKGROUND

Capacitive, resistive and inductive sensing are used in industrial, automotive, medical, and consumer applications to detect touch inputs. The use of capacitive technology to detect a touch input has grown rapidly in human interface devices (HID), such as track-pads and touch-screens. Consumer and industrial applications are beginning to adopt touch-buttons and sliders using capacitive technology in devices such as mobile phones, TV controls, automotive dashboards, remote controls, or industrial controls. Capacitive sensing has proven to be much more appealing than mechanical switches and rotary encoders, both in terms of looks and reliability.

However, the use of capacitive, resistive, or inductive sensing limits creative industrial designs due to challenges in touch input layout and system stack up. Conflicting priorities between design and robustness further complicates the design. It is also to be noted that present input touch sensing methodologies cannot be implemented on metal surfaces. In addition, current sensing technologies has inherent properties that limit water-proof applications. Pressure sensing technologies using strain gauges have emerged as alternative sensing technologies for metal surface touch input. However, the measurement of deflection and strain is often unreliable, specifically in metals. Such sensors are highly susceptible to unwanted disturbances resulting in deflection of the surface, and their sensitivity and performance are very dependent on the overall boundary conditions of the surface they are attached to. In addition, the surface the sensor is attached to has to be conformal enough that it deflects adequately upon human touching in order for the sensor to be able to detect it. Additional sensing layers (e.g., capacitive) are required to detect an x-y position of an input touch detected using a strain gauge. Increased complexity in touch input interface materials, the implications of complex interfaces on industrial designs, water-proofing, and cost have been key challenges limiting the use of touch-inputs in any environment and in with any material. There is a need for improved systems and methods of detecting touch inputs to human machine interfaces (HMI).

Embodiments of the invention address these and other problems, individually and collectively.

BRIEF SUMMARY

Embodiments of the present disclosure are directed to systems, methods, and apparatuses relating to ultrasonic touch detection and decision.

According to some embodiments, a method that can be performed by a touch sensor device, or other suitable device, is provided. The method includes receiving energy data associated with an ultrasound input device coupled to a material layer. The energy data can comprise a current energy value and past energy values associated with reflected ultrasound signals received at the ultrasound input device in response to the ultrasound input device transmitting emitted signals through the material layer towards an external surface of the material layer. The energy data can then be compared with threshold data to generate a current trigger value for trigger data. The trigger data can be indicative of an occurrence of a touch event when the current energy value exceeds a current threshold value of the threshold data. The threshold data can then be updated based on the energy data, the trigger data, and the threshold data. Updating the threshold data can comprise generating a subsequent threshold value.

According to some embodiments, an additional method that can be performed by a touch sensor device, or other suitable device, is provided. The method includes receiving energy data associated with an ultrasound input device coupled to a material layer. The energy data can comprise a current energy value and past energy values associated with reflected ultrasound signals received at the ultrasound input device in response to the ultrasound input device transmitting emitted signals through the material layer towards an external surface of the material layer. The energy data can then be provided to a recurrent neural network to generate output data indicative of an occurrence of a touch event at the external surface of the material layer.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION

Figure 13A:
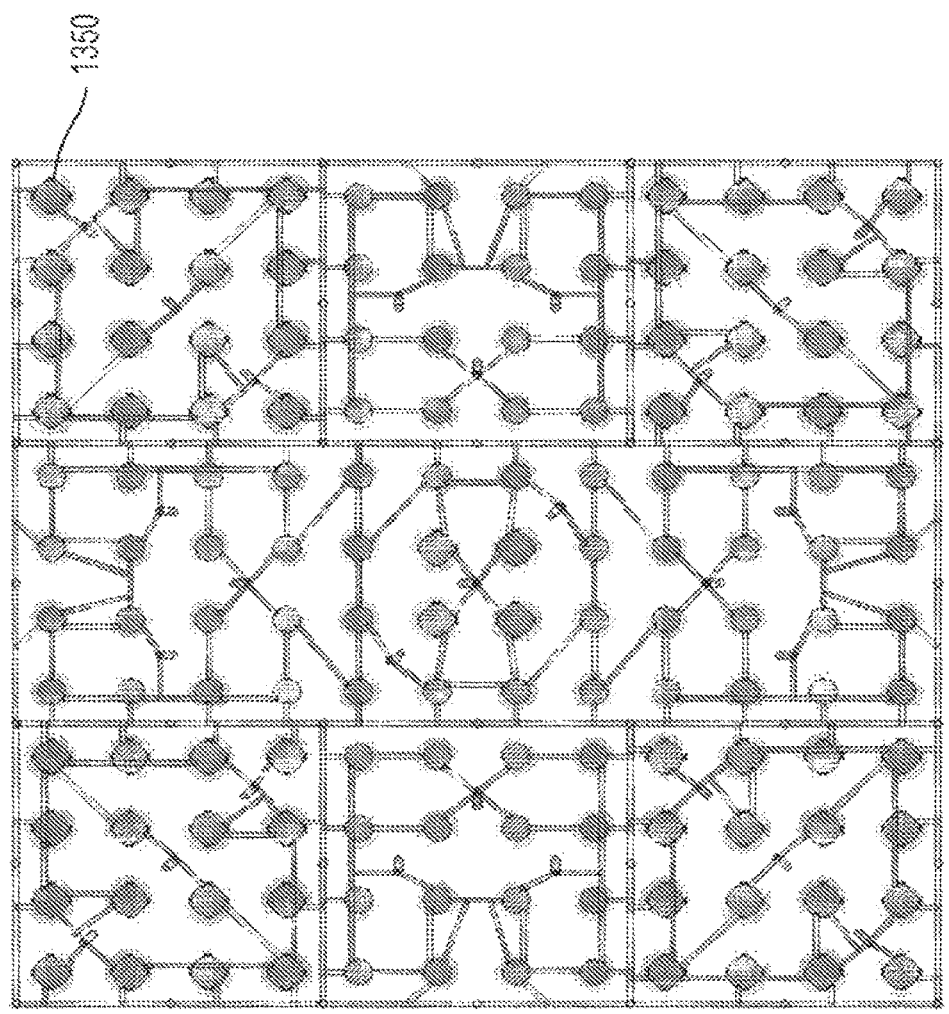
FIG. 13A is a top view of a sensor array of an ultrasound input device according to certain aspects of the present disclosure.
Figure 14B:
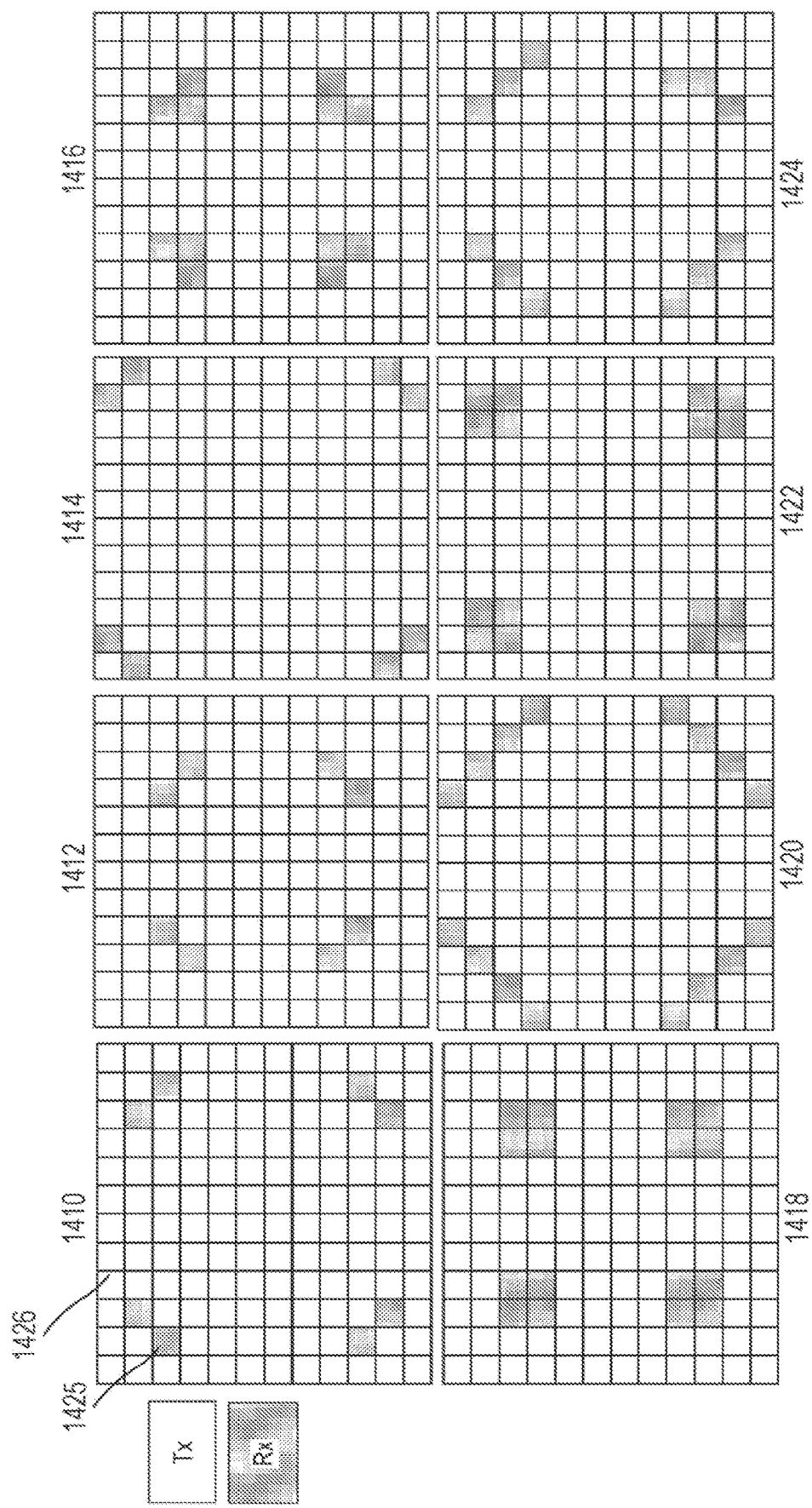
Figure 14C:
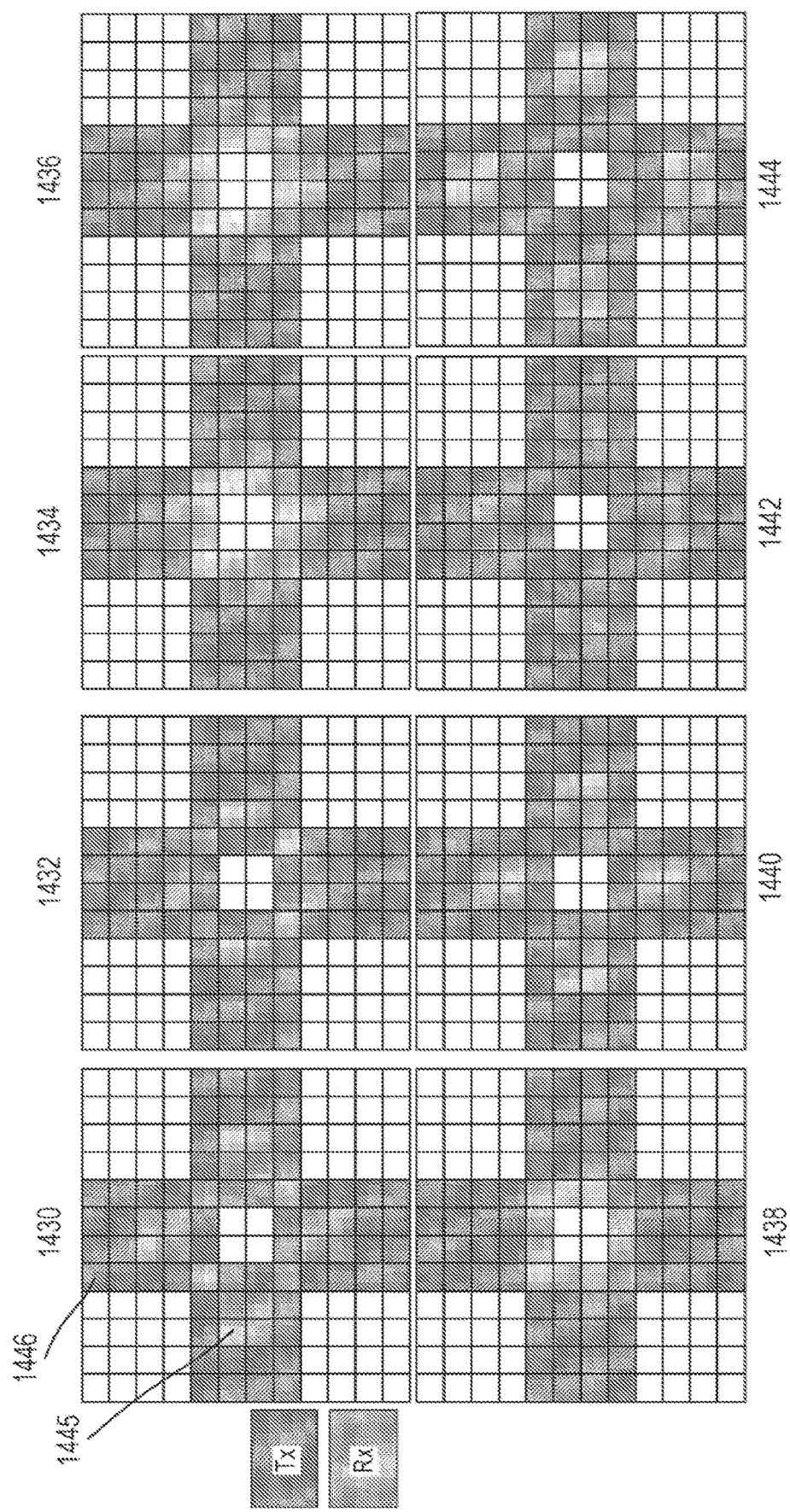
Figure 14D:
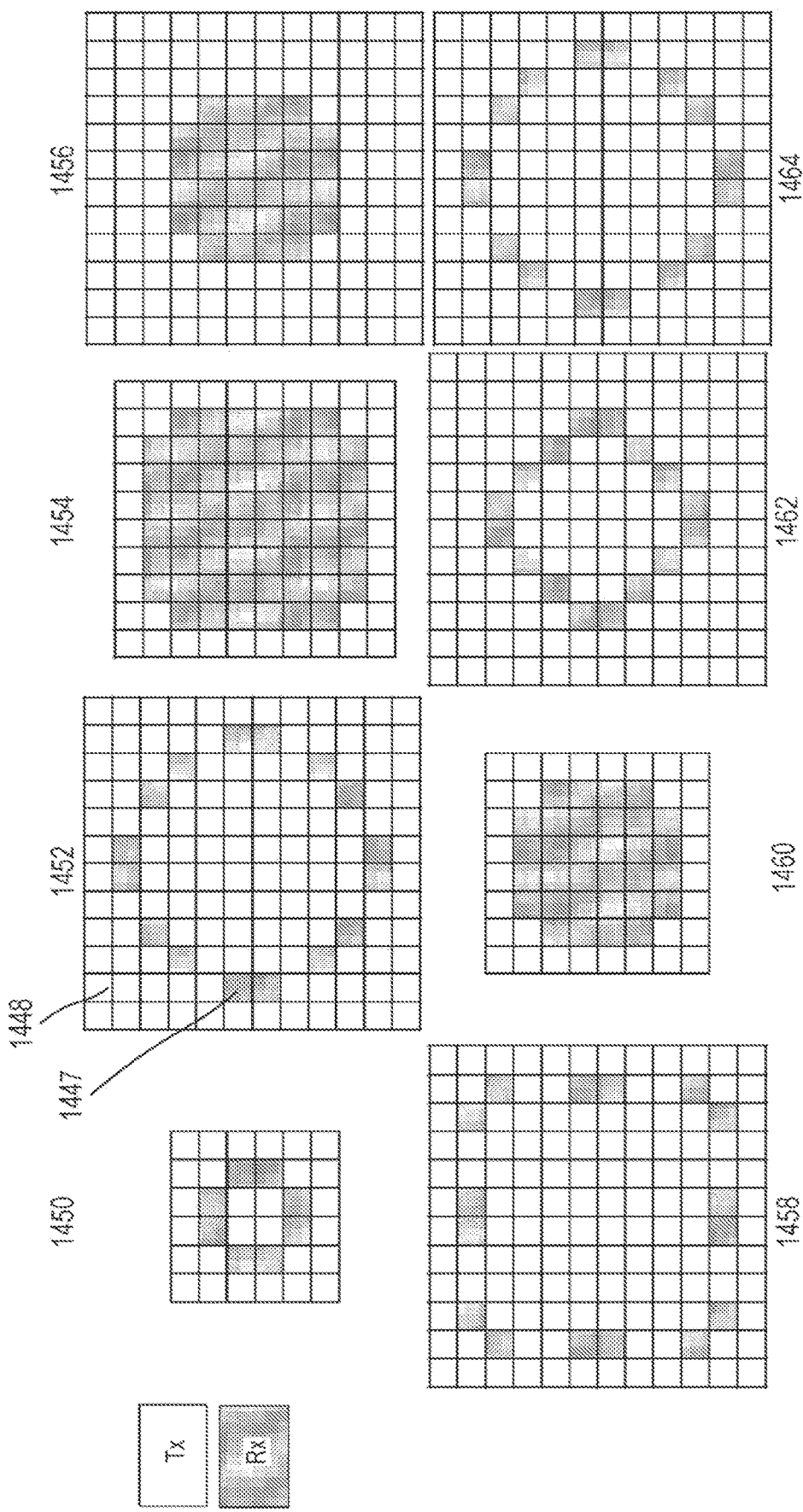
Figure 14E:
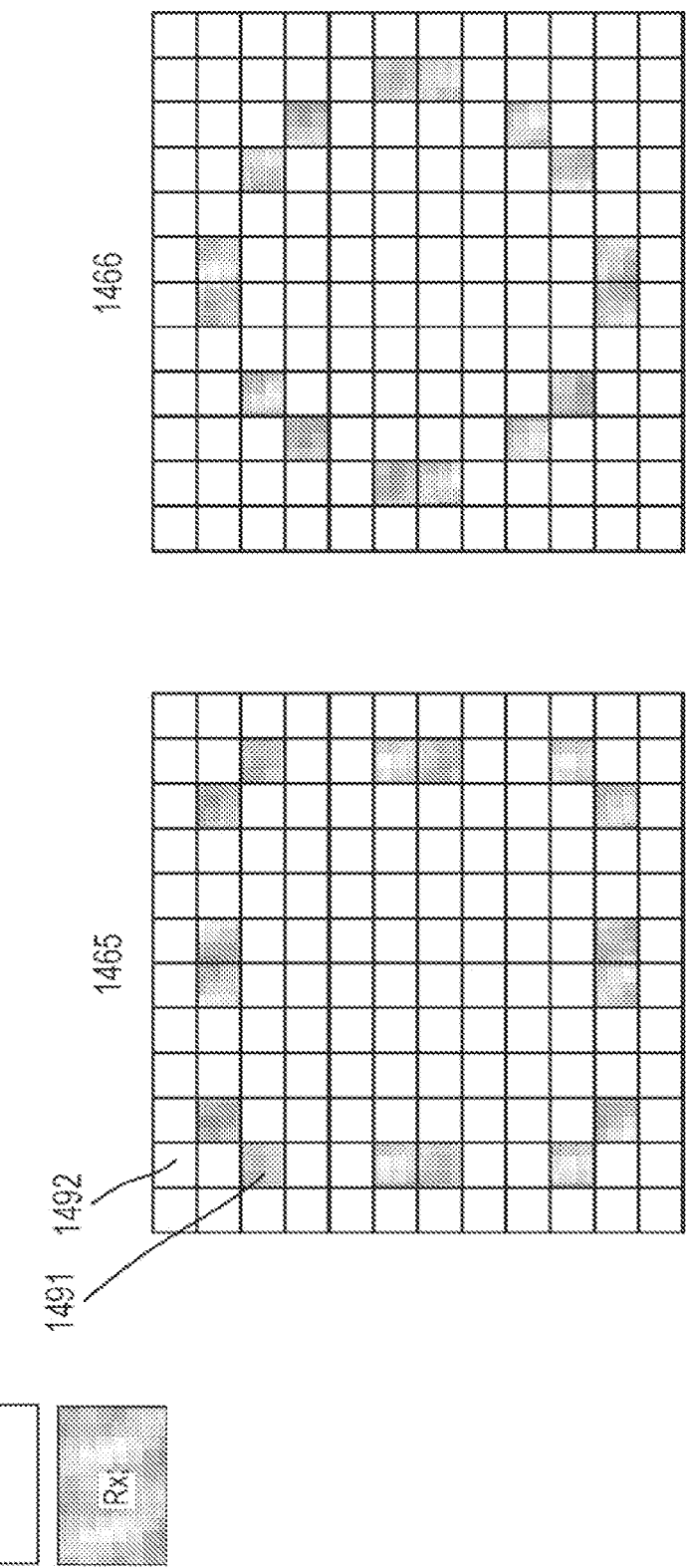
Figure 14F:
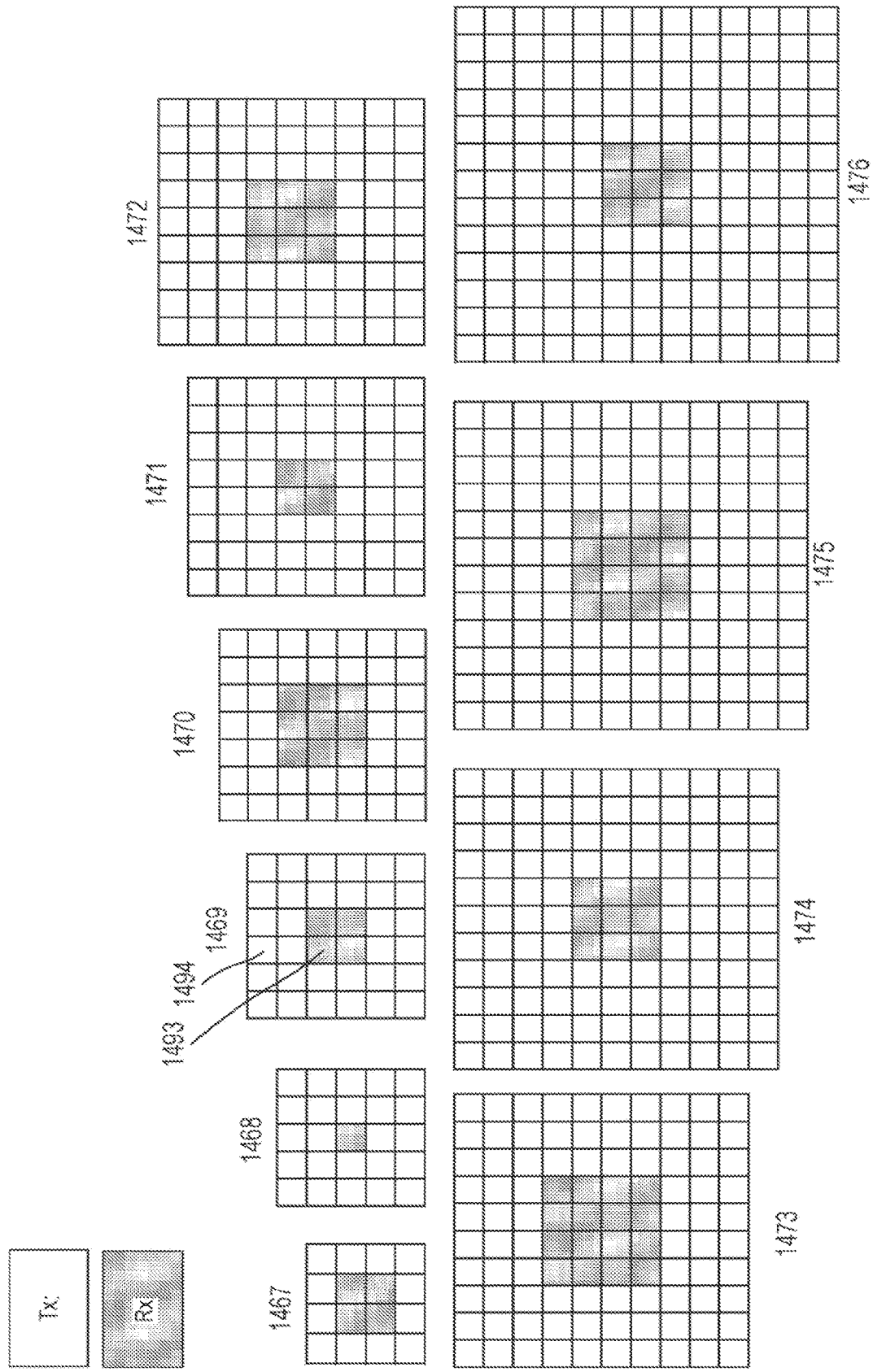
Figure 14G:
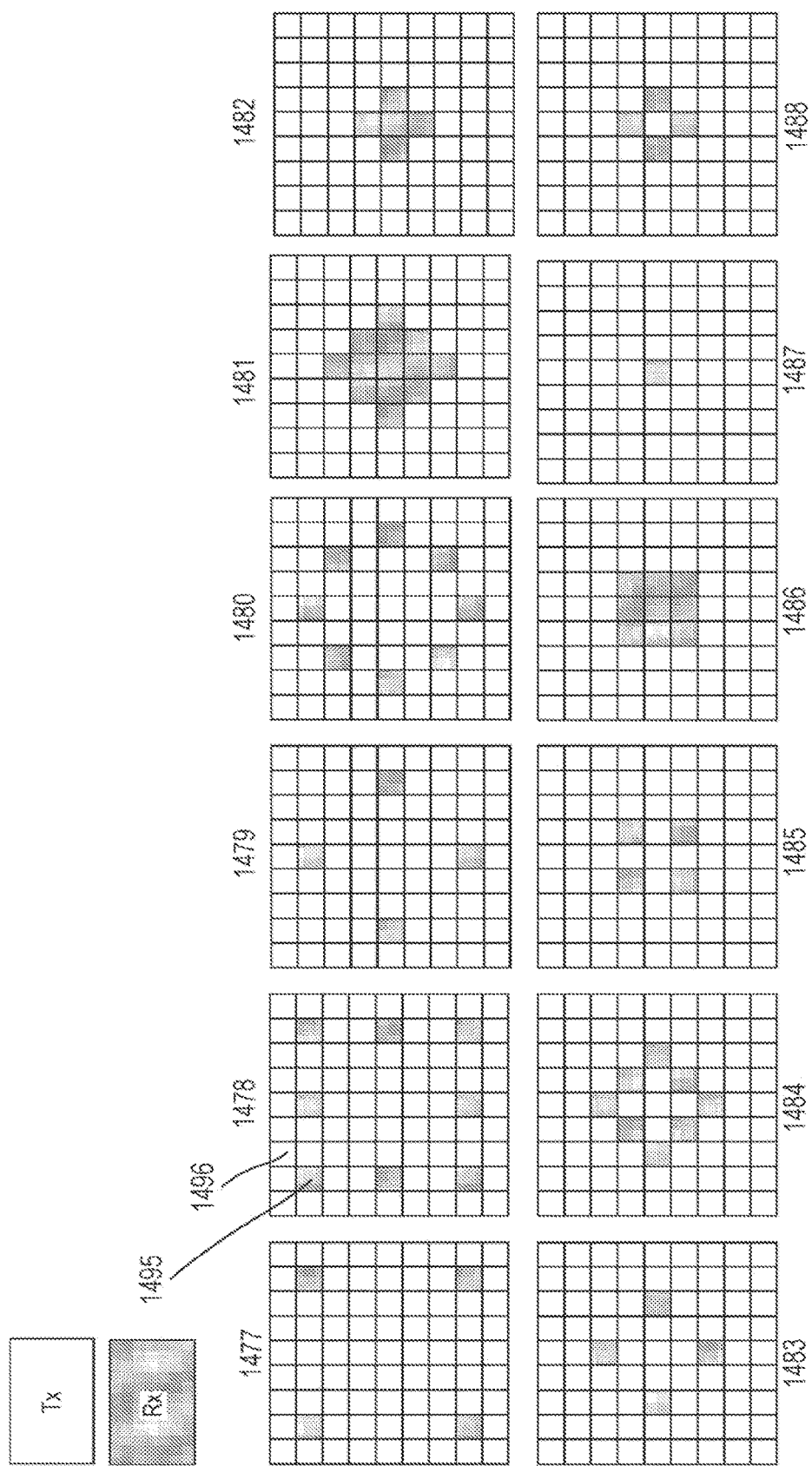

FIG. 14A is a schematic diagram of the sensor array of FIG. 13A depicting functions of the various transducers of the array according to certain aspects of the present disclosure. FIG. 14B is a schematic diagram of a sensor array depicting eight example configurations of the various transducers of a corner region of the sensor array according to certain aspects of the present disclosure. FIG. 14C is a schematic diagram of a sensor array depicting eight example configurations of the various transducers of the sensor array according to certain aspects of the present disclosure. FIG. 14D is a schematic diagram of a sensor array depicting eight example configurations of the various transducers of the sensor array according to certain aspects of the present disclosure. FIG. 14E is a schematic diagram of a sensor array depicting two example configurations of the various transducers of the sensor array according to certain aspects of the present disclosure. FIG. 14F is a schematic diagram of a sensor array depicting example configurations of the various transducers of the sensor array of various sizes according to certain aspects of the present disclosure. FIG. 14G is a schematic diagram of a sensor array depicting twelve example configurations of the various transducers of the sensor array of a size of 8×8 transducers according to certain aspects of the present disclosure.

Figure 15:
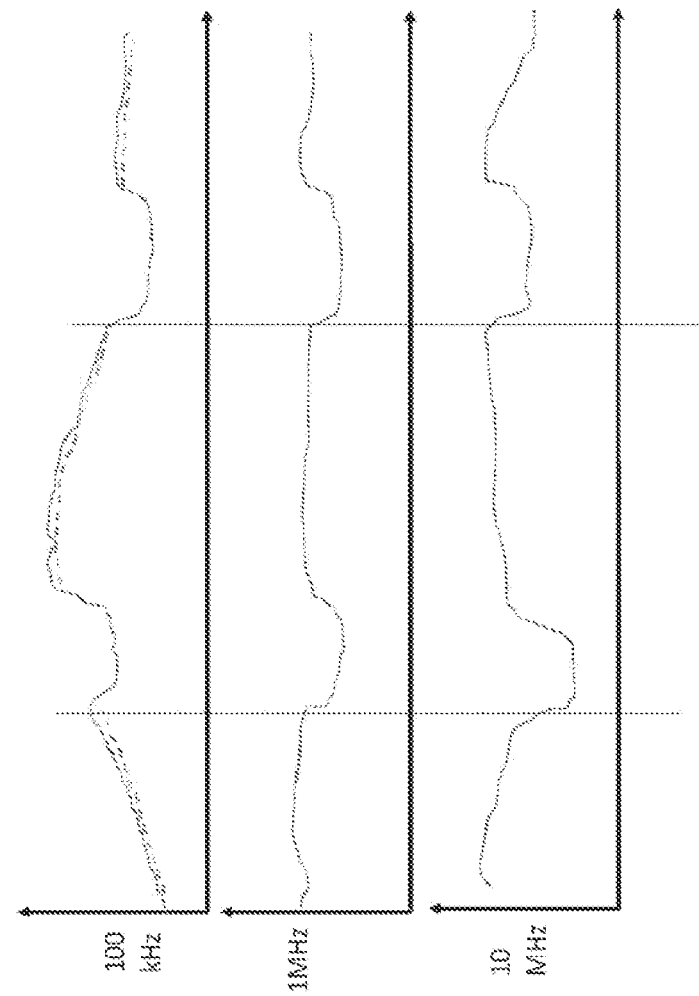

FIG. 15 is a set of charts depicting energy measurements from transducers of a single sensor array operating in different frequencies according to certain aspects of the present disclosure.

Figure 16:
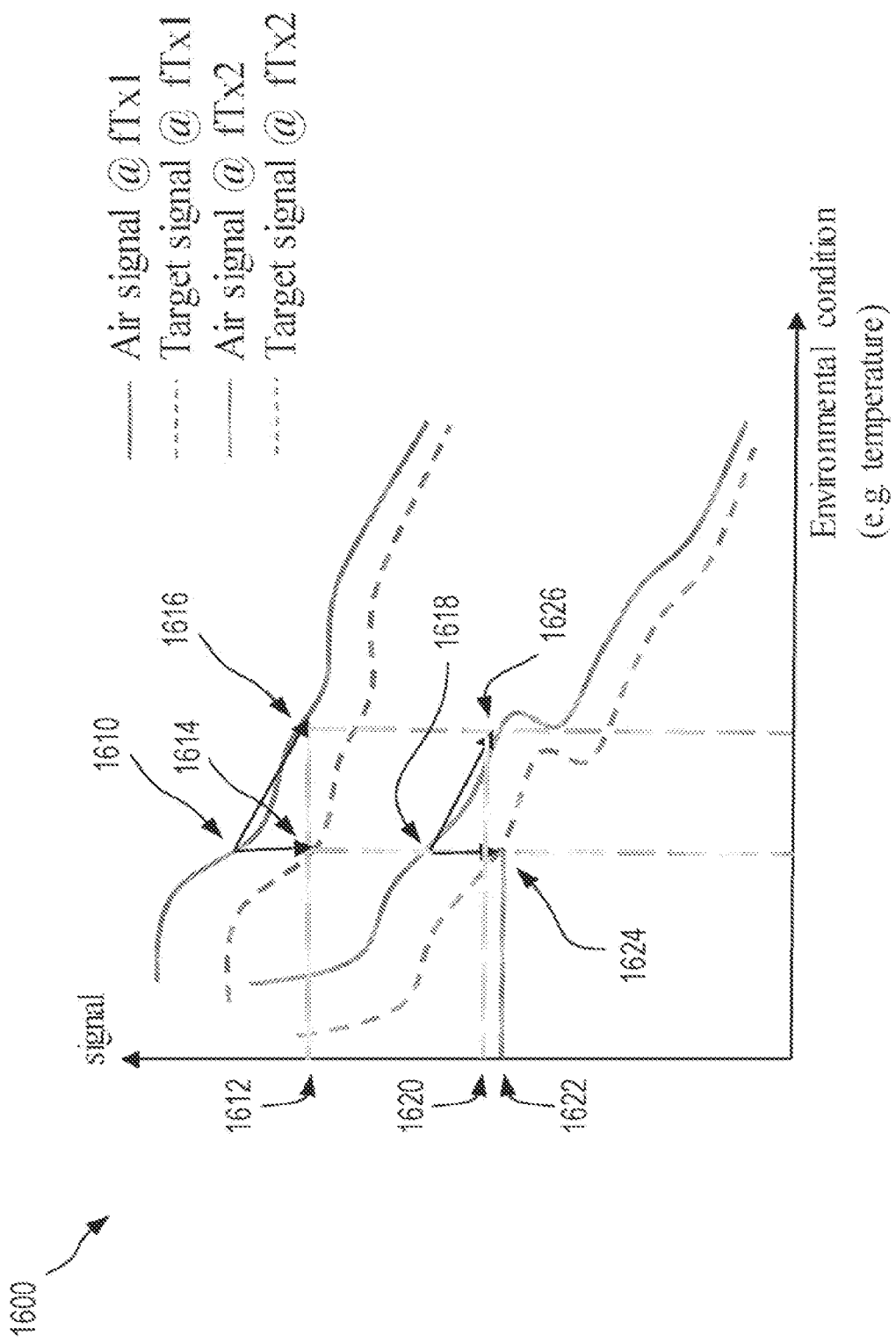

FIG. 16 is a chart depicting temperature behavior of an ultrasonic transducer with respect to operating frequency according to certain aspects of the present disclosure.

Figure 17:
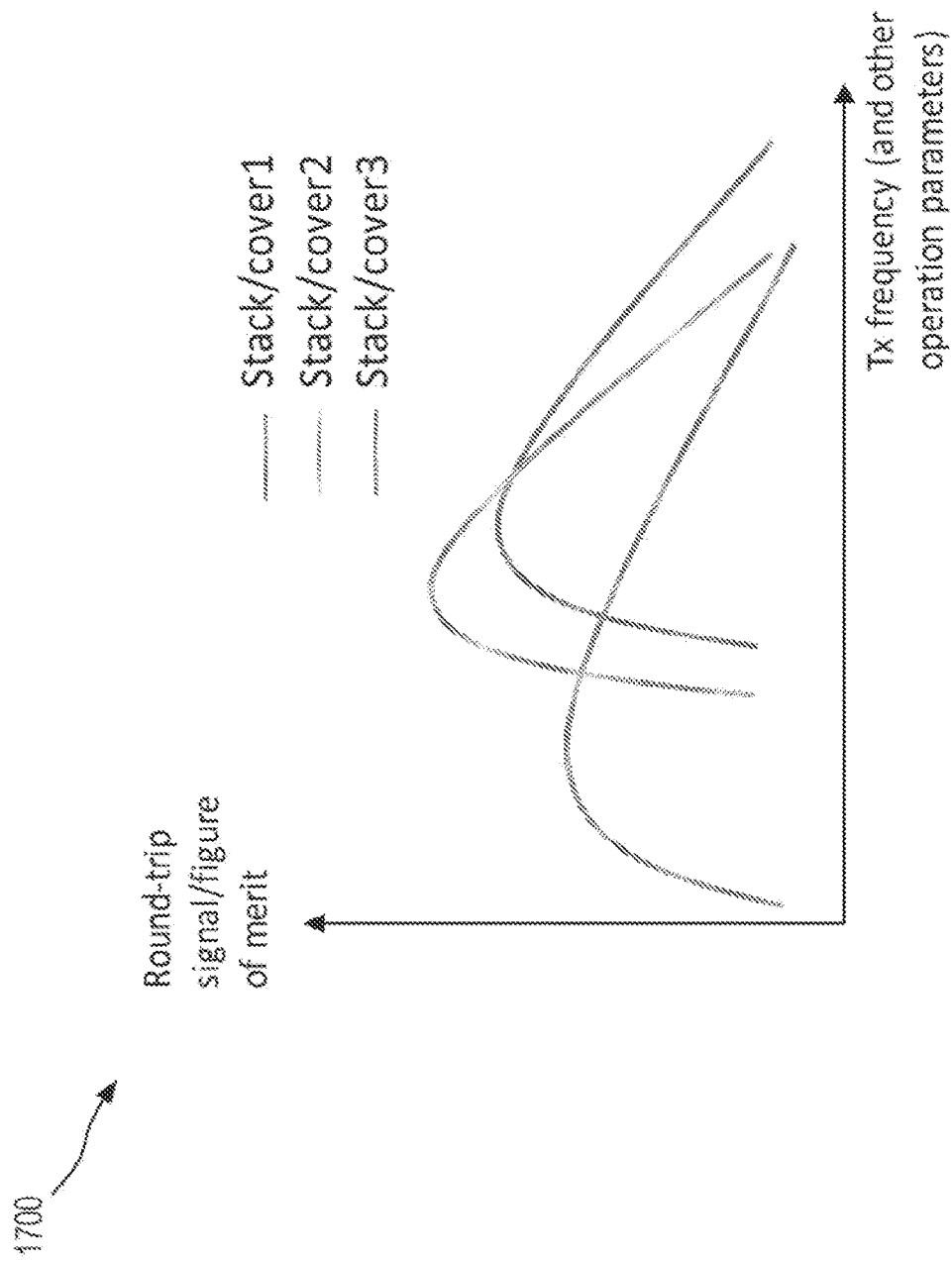

FIG. 17 is a chart depicting frequency response with respect to stack makeup according to certain aspects of the present disclosure.

Figure 18:
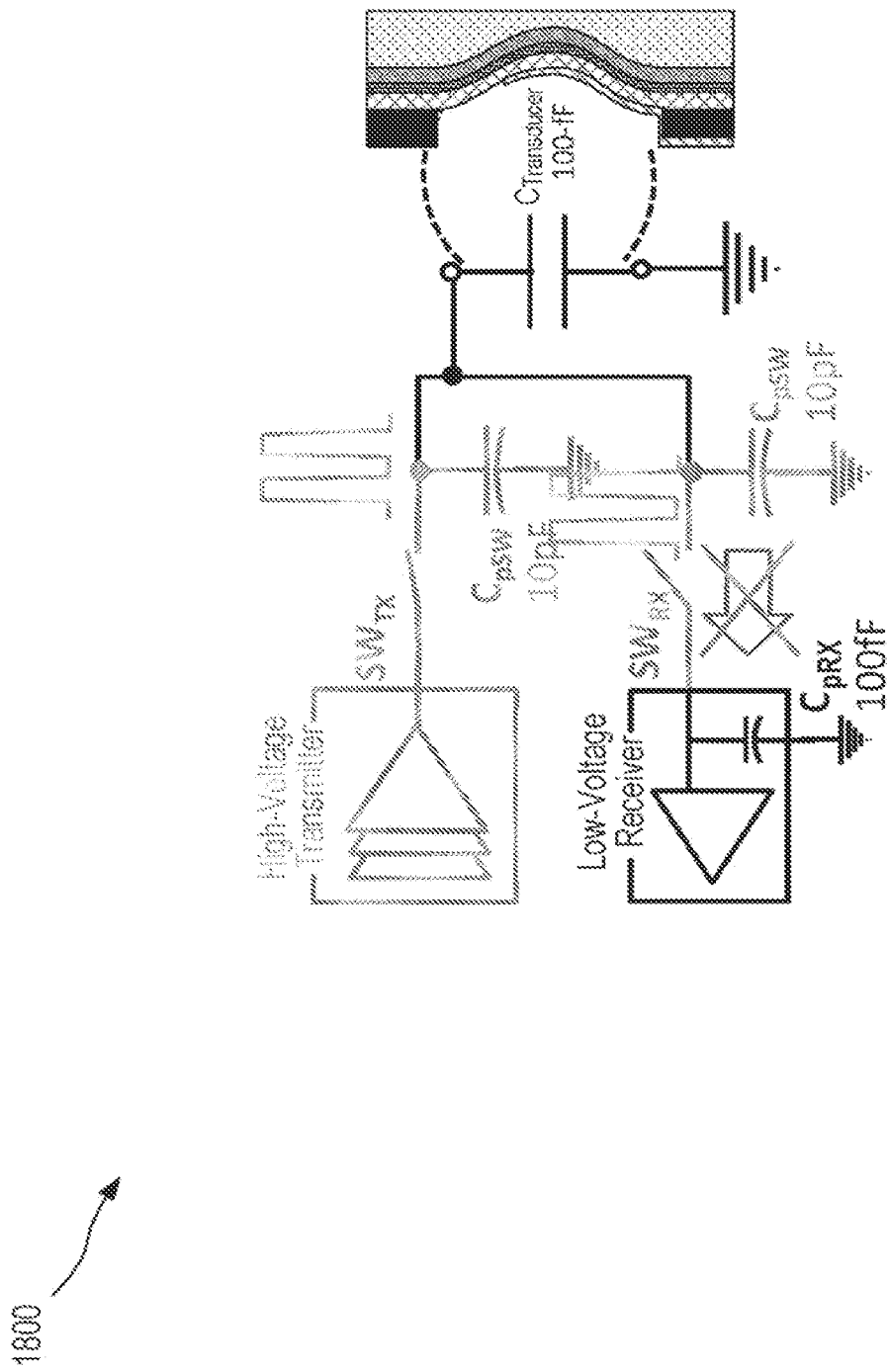

FIG. 18 is a schematic diagram depicting a circuit for receiving and transmitting a signal through an ultrasonic transducer, with the circuit in a transmitting state, according to certain aspects of the present disclosure.

Figure 19:
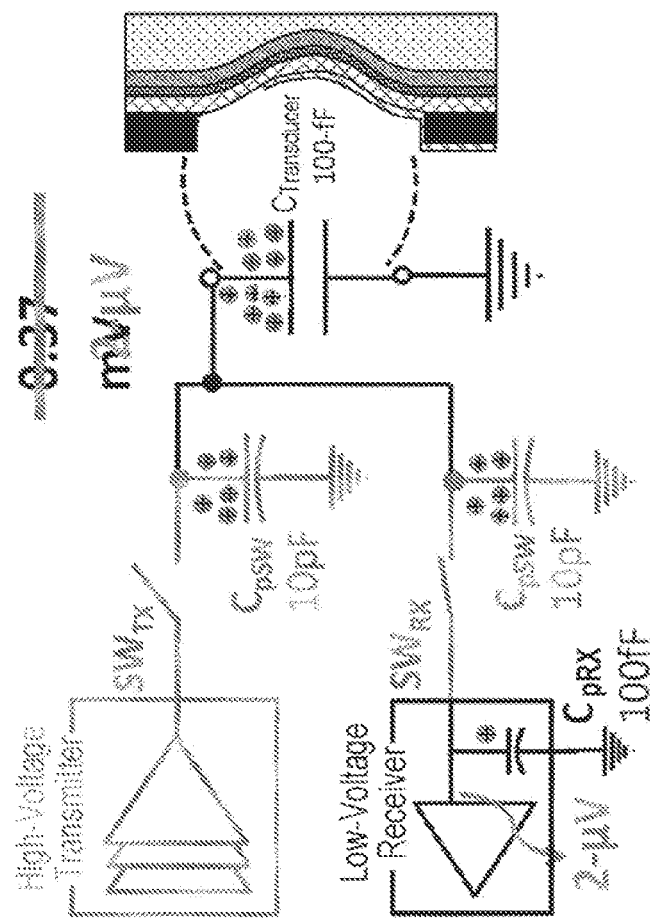

FIG. 19 is a schematic diagram depicting a circuit for receiving and transmitting a signal through an ultrasonic transducer, with the circuit in a receiving state, according to certain aspects of the present disclosure.

Figure 20:
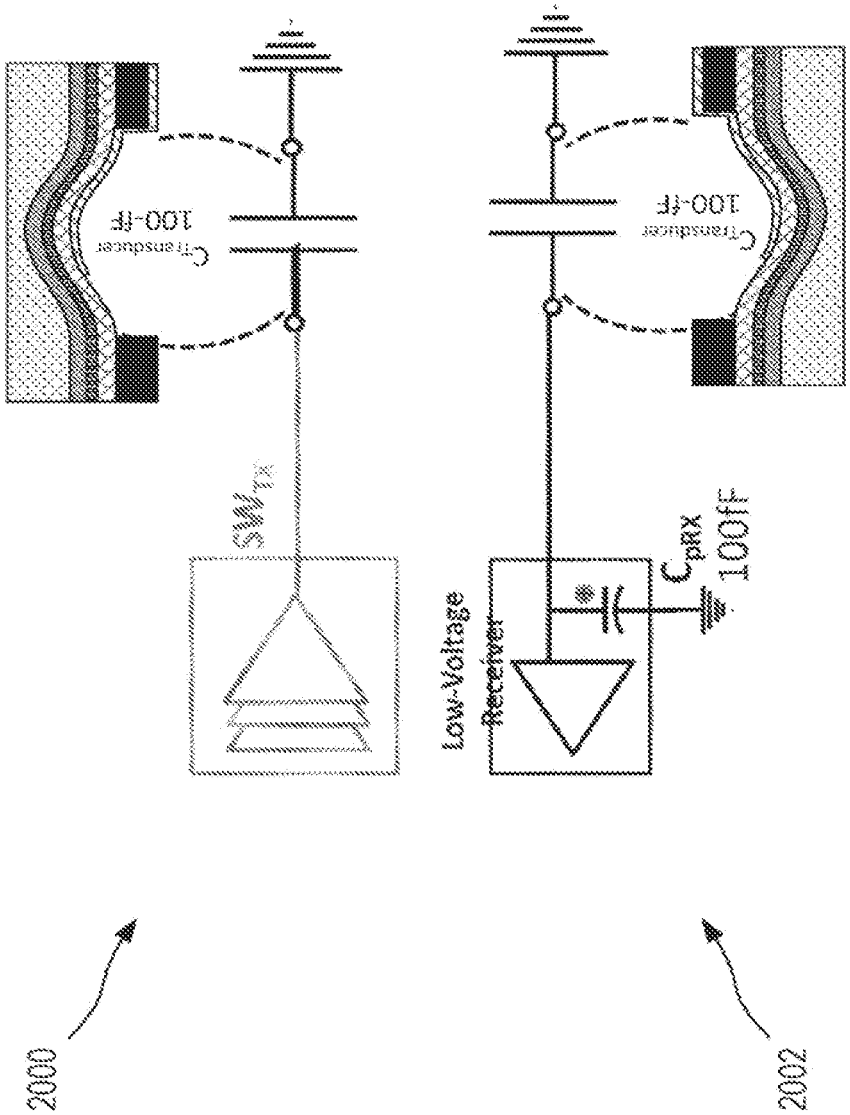

FIG. 20 is a schematic diagram depicting segregated circuits for receiving and transmitting signals through ultrasonic transducers according to certain aspects of the present disclosure.

Figure 21:
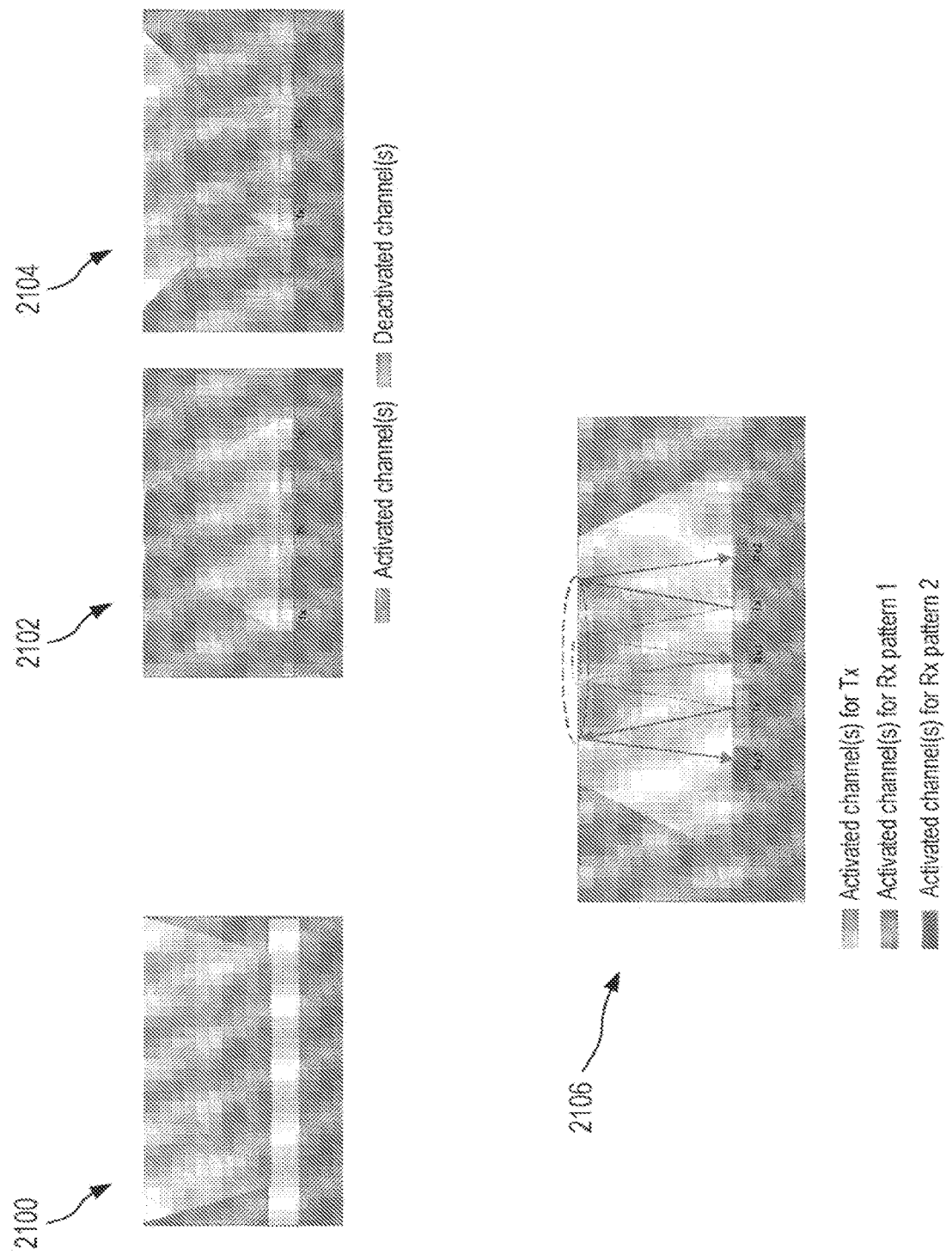

FIG. 21 is a set of side view schematic diagrams depicting beamforming achieved through the use of ultrasonic transducers according to certain aspects of the present disclosure.

Figure 22:
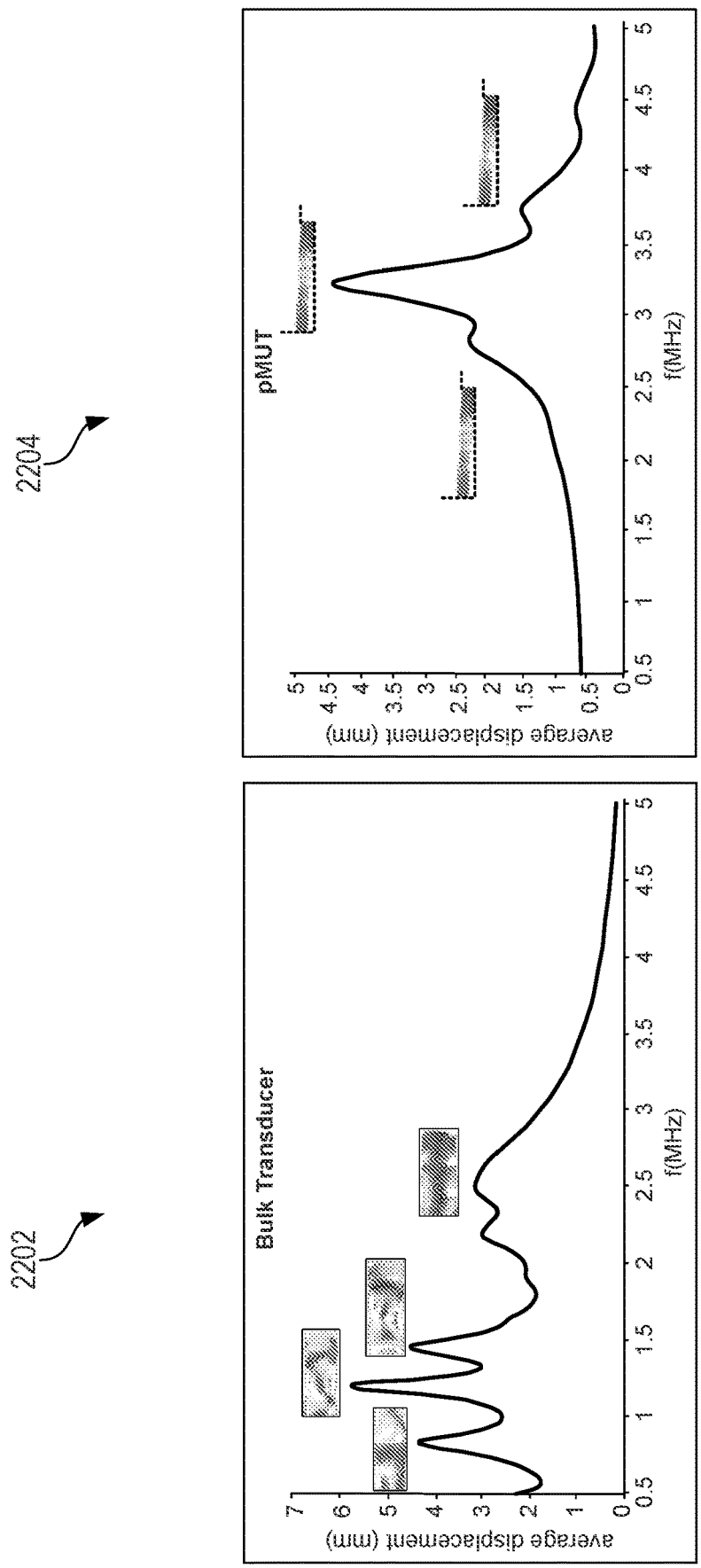

FIG. 22 is a set of charts depicting modes of operation of micromachined ultrasonic transducers according to certain aspects of the present disclosure as compared to standard bulk transducers, depicted as average displacement for different frequencies.

Figure 23:
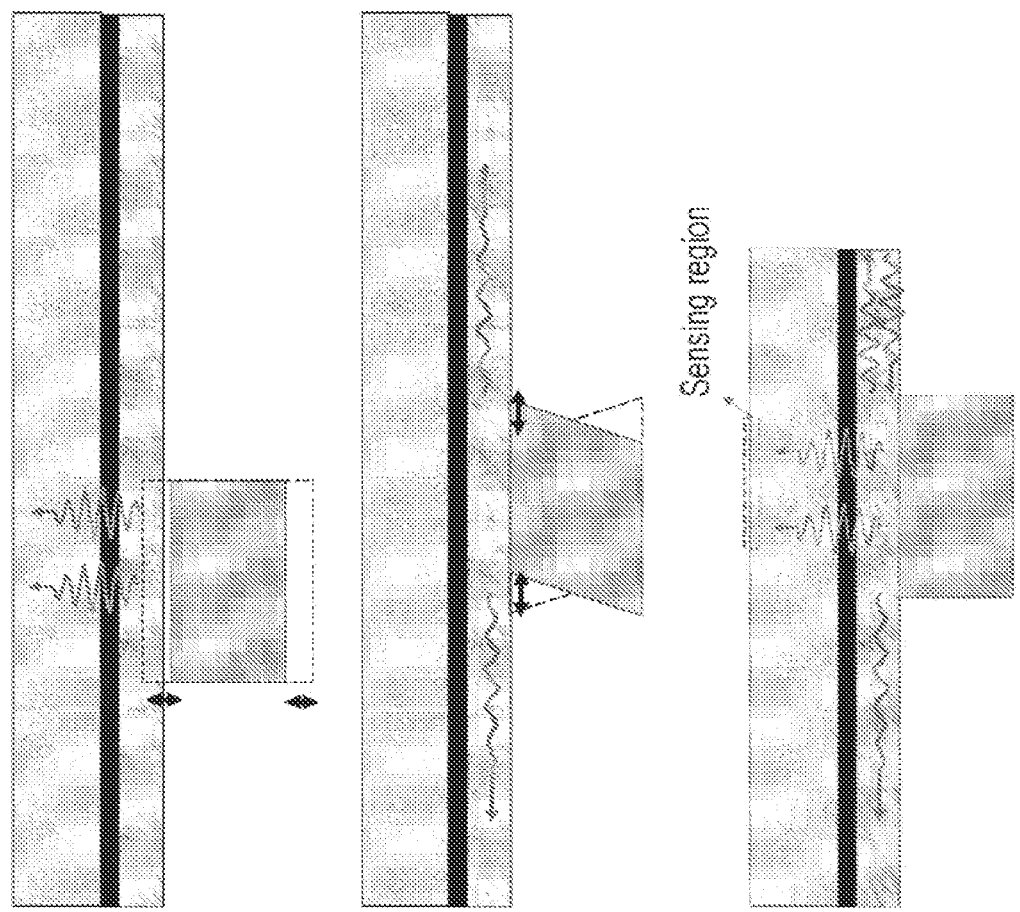

FIG. 23 is a set of side view schematic diagrams depicting lateral signal rejection of micromachined ultrasonic transducers according to certain aspects of the present disclosure as compared to standard bulk transducers.

Figure 24:
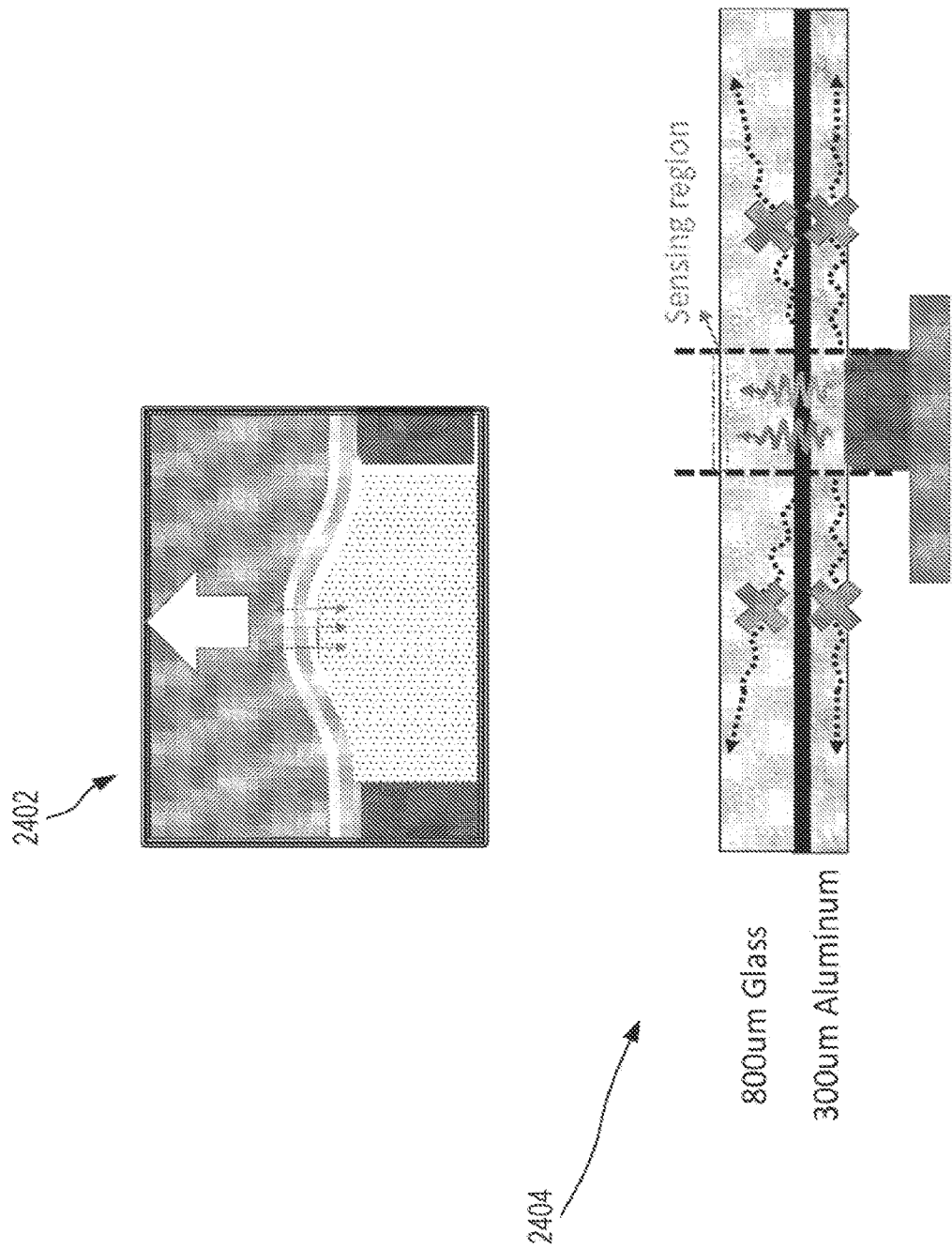

FIG. 24 is a set of side view schematic diagrams depicting lateral signal rejection of micromachined ultrasonic transducers according to certain aspects of the present disclosure.

Figure 25:
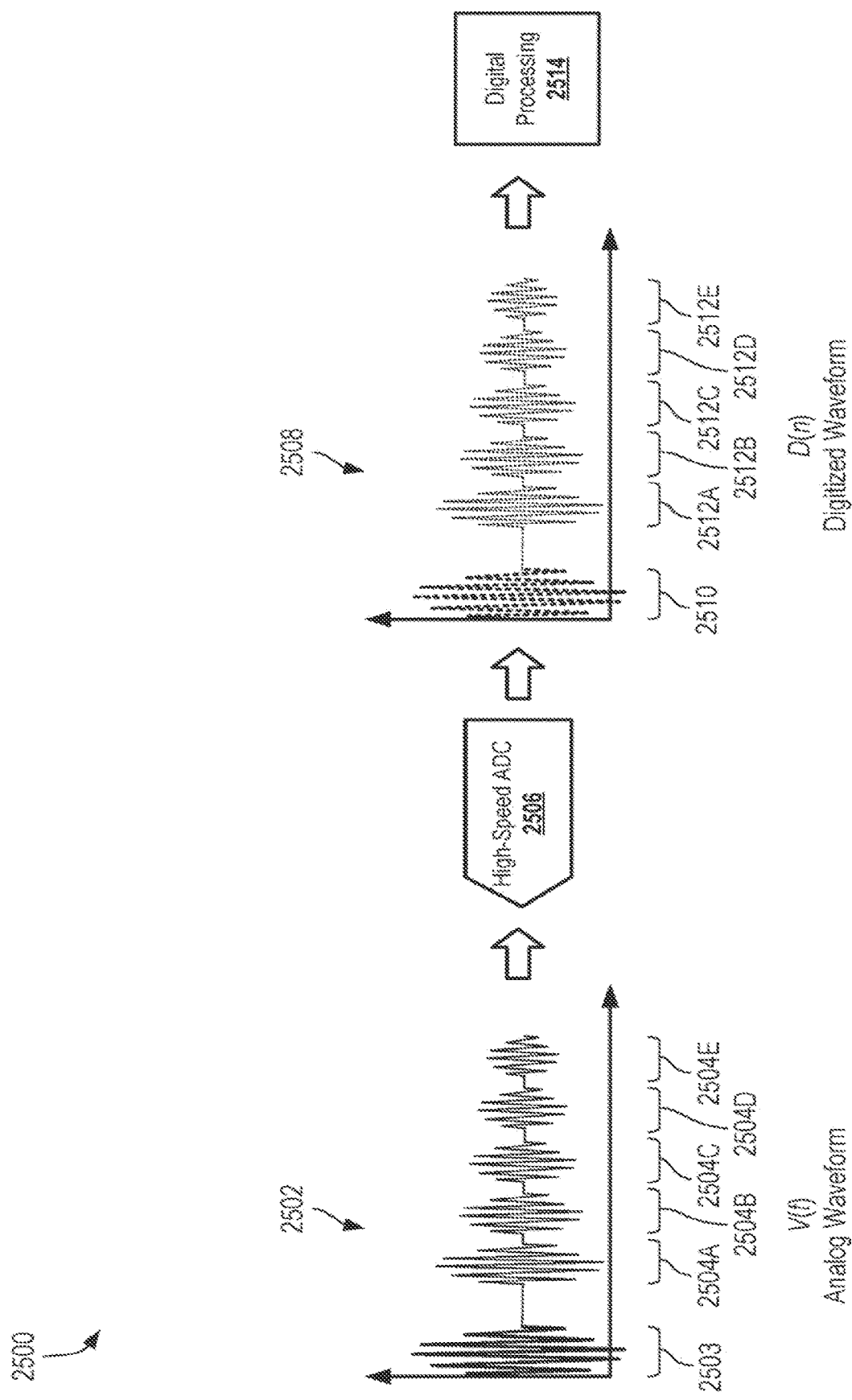

FIG. 25 is a schematic diagram of a flow for digitally processing ultrasound signals emitted and received by an ultrasound input device according to certain aspects of the present disclosure.

Figure 26:
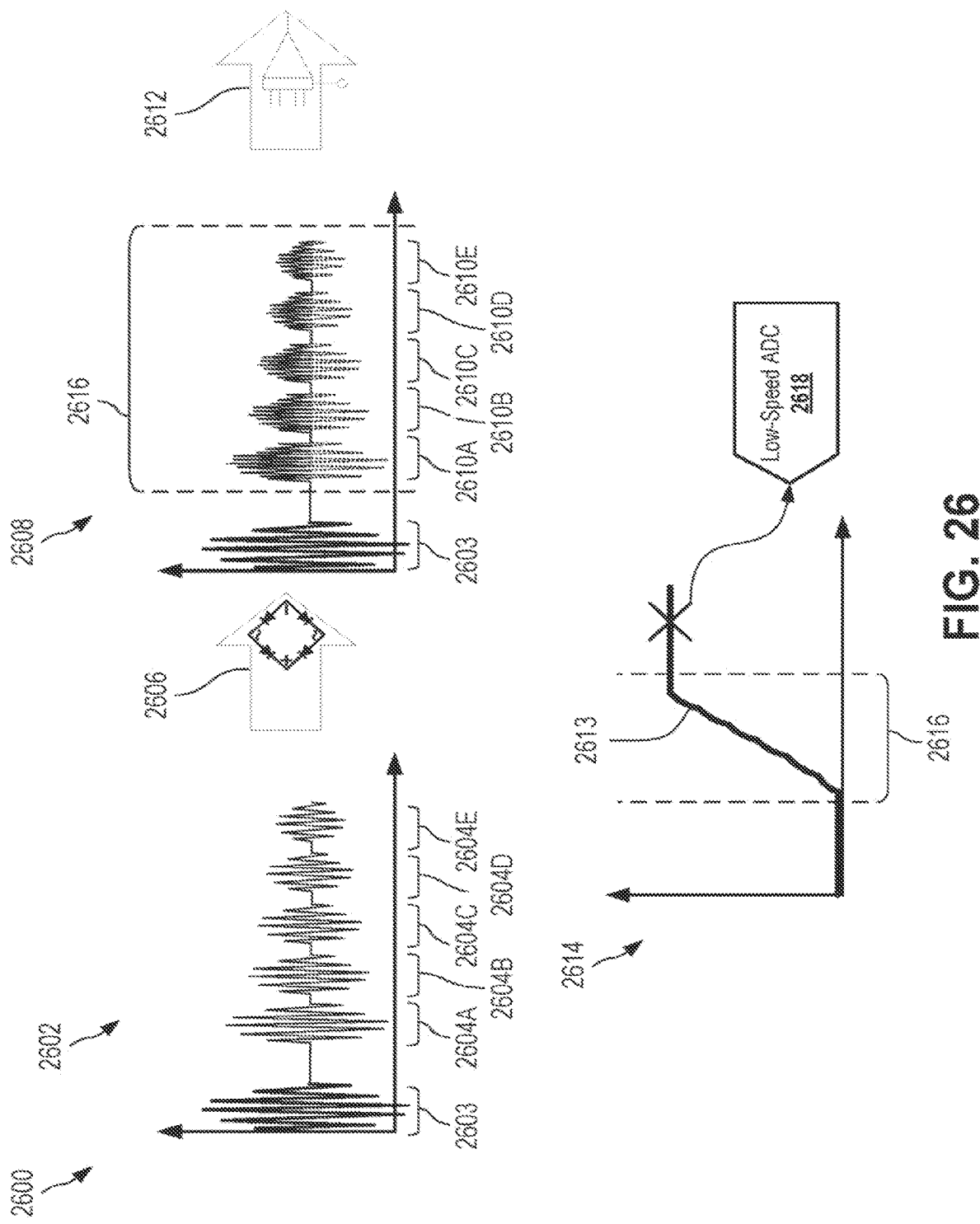

FIG. 26 is a schematic diagram of a flow for processing ultrasound signals emitted and received by an ultrasound input device using energy integration according to certain aspects of the present disclosure.

Figure 27:
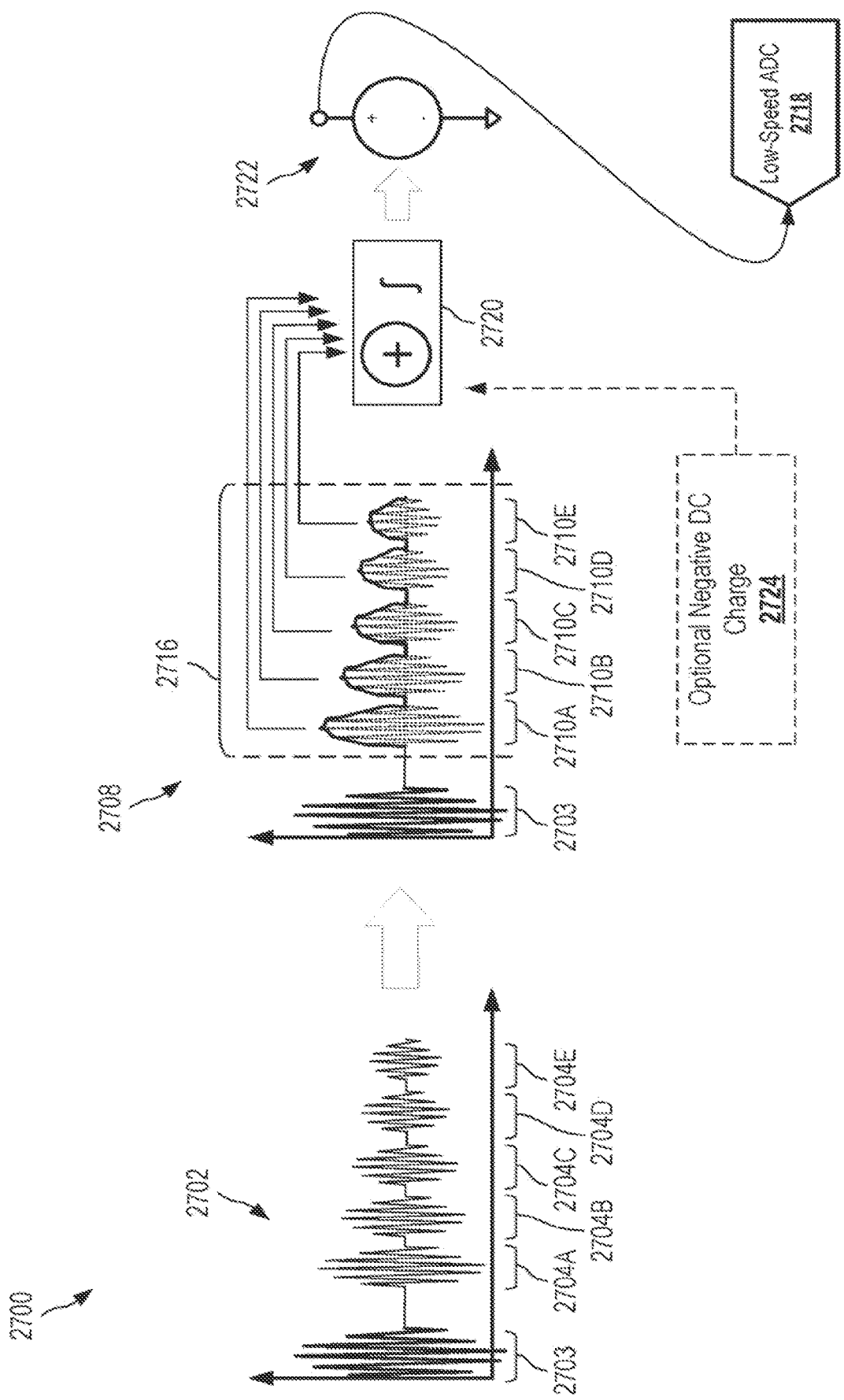

FIG. 27 is a schematic diagram of an example of a flow for processing ultrasound signals emitted and received by an ultrasound input device using energy integration according to certain aspects of the present disclosure.

Figure 28:
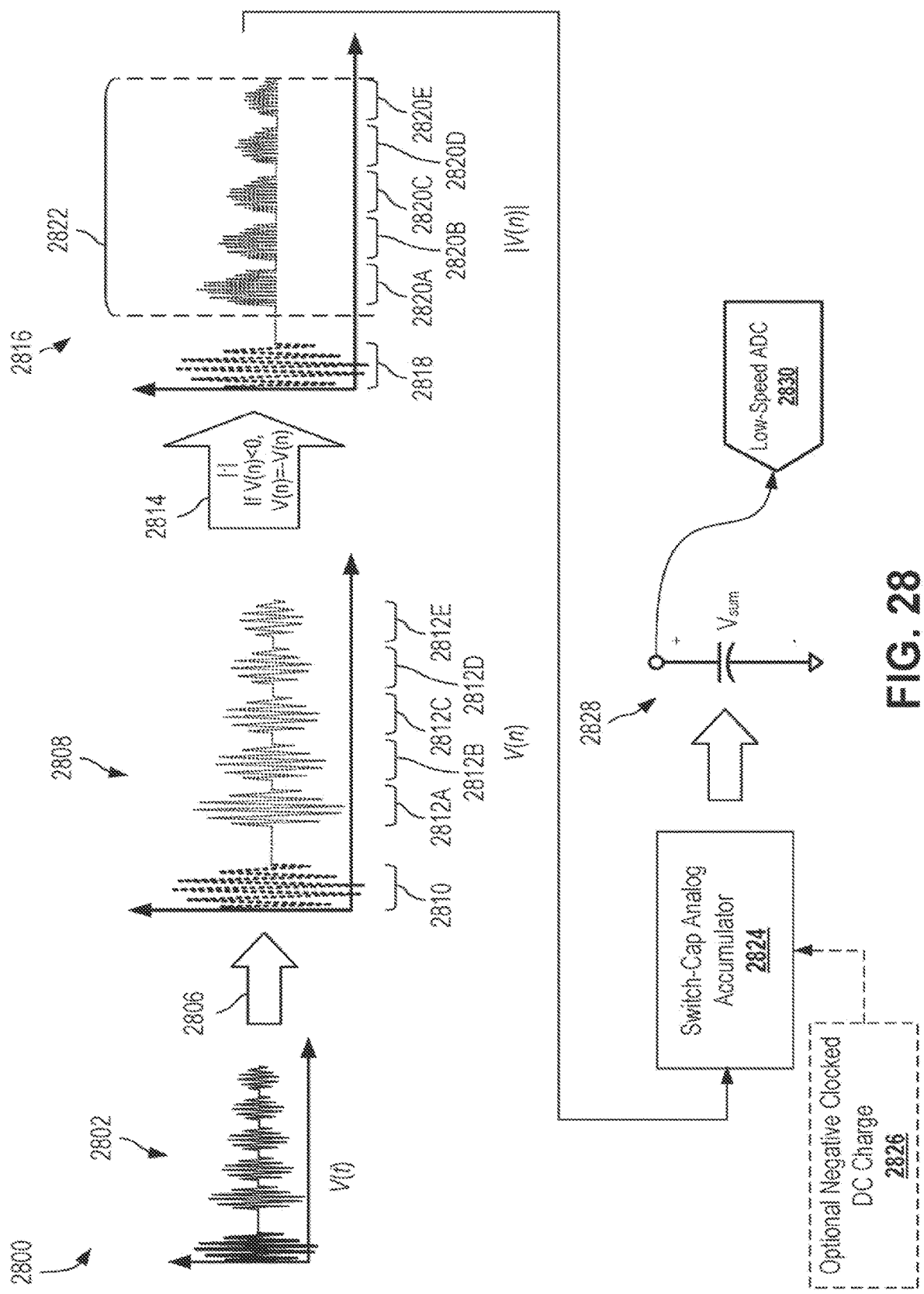

FIG. 28 is a schematic diagram of a flow for processing ultrasound signals emitted and received by an ultrasound input device using energy integration via absolute value accumulation according to certain aspects of the present disclosure.

Figure 29:
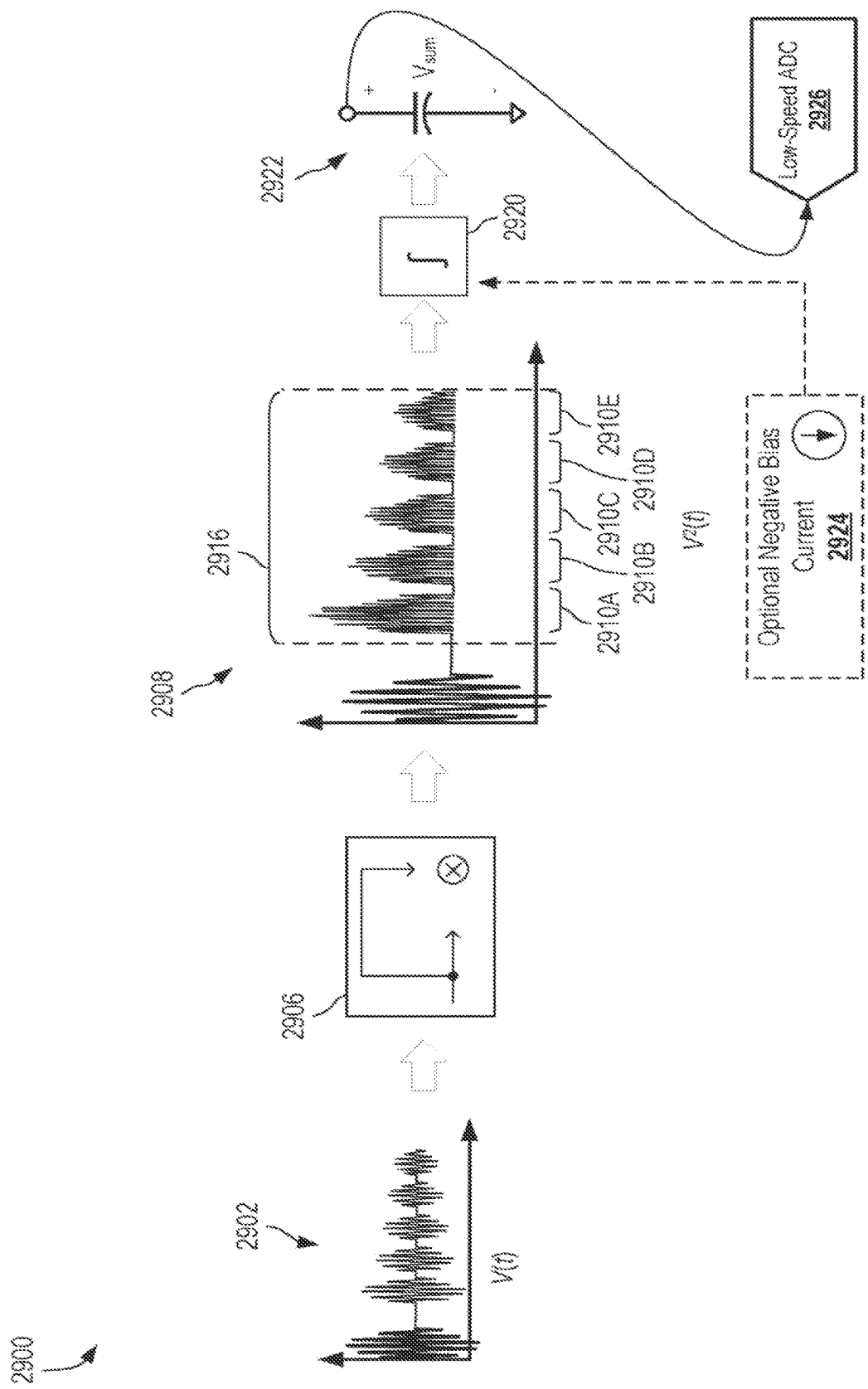

FIG. 29 is a schematic diagram of a flow for processing ultrasound signals emitted and received by an ultrasound input device using energy integration via self-mixing and integration according to certain aspects of the present disclosure.

Figure 30:
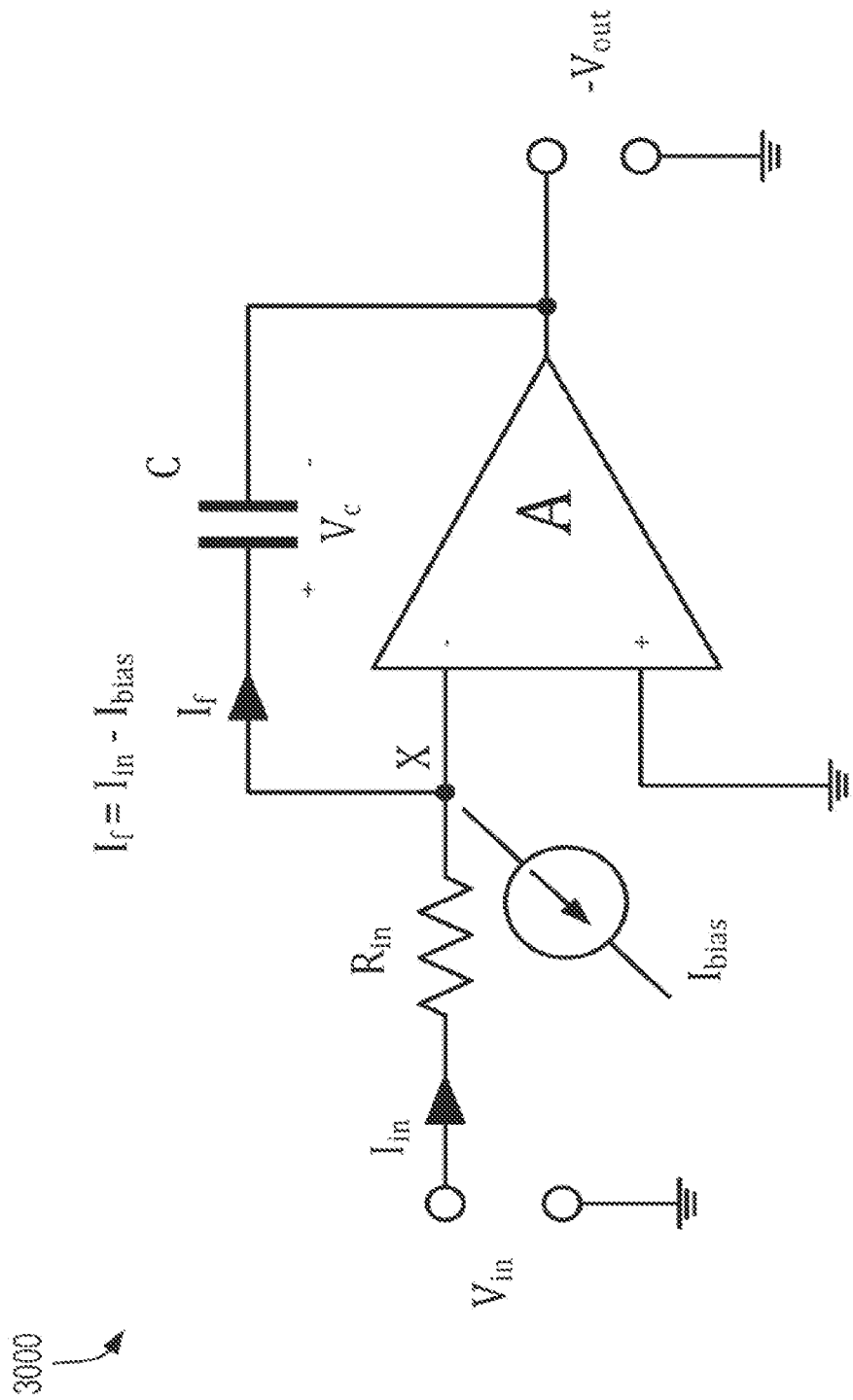

FIG. 30 is a schematic circuit diagram depicting an analog integrator with a negative bias current circuit according to certain aspects of the present disclosure.

Figure 31:
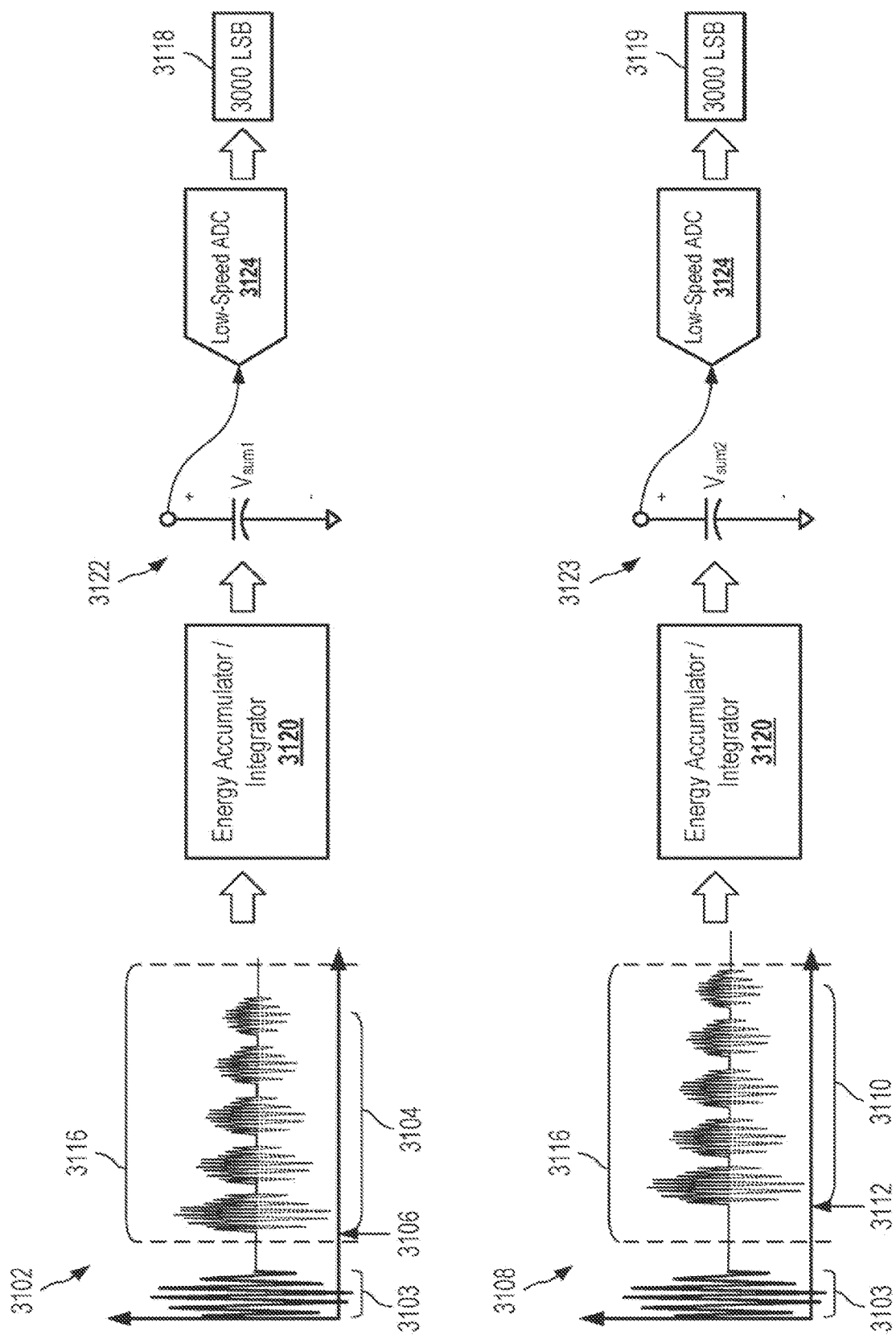

FIG. 31 is a schematic diagram of a flow for processing ultrasound signals depicting the reduced effects of reflected ultrasonic signal time-of-flight changes on touch input detection within an energy measurement window according to certain aspects of the present disclosure.

Figure 32:
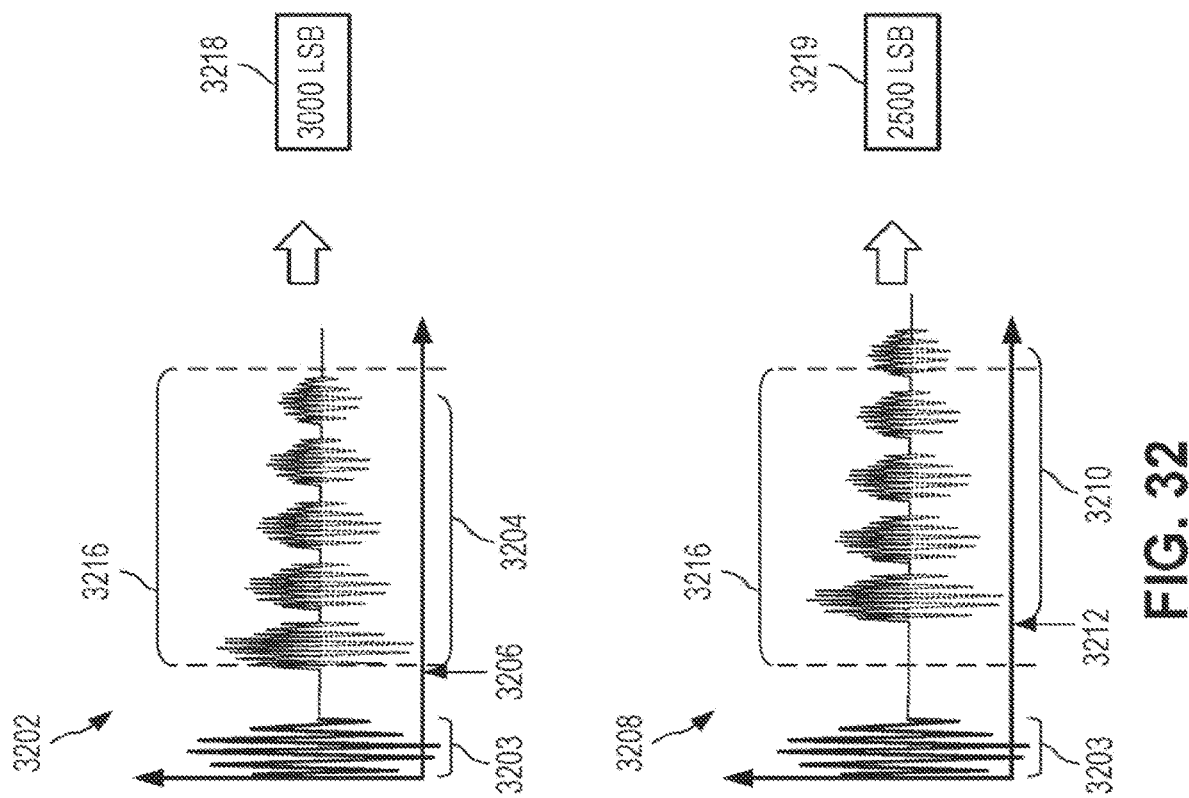

FIG. 32 is a schematic diagram of an abbreviated flow for processing ultrasound signals depicting the heightened effects of reflected ultrasonic signal time-of-flight changes on touch input detection outside of an energy measurement window.

Figure 33:
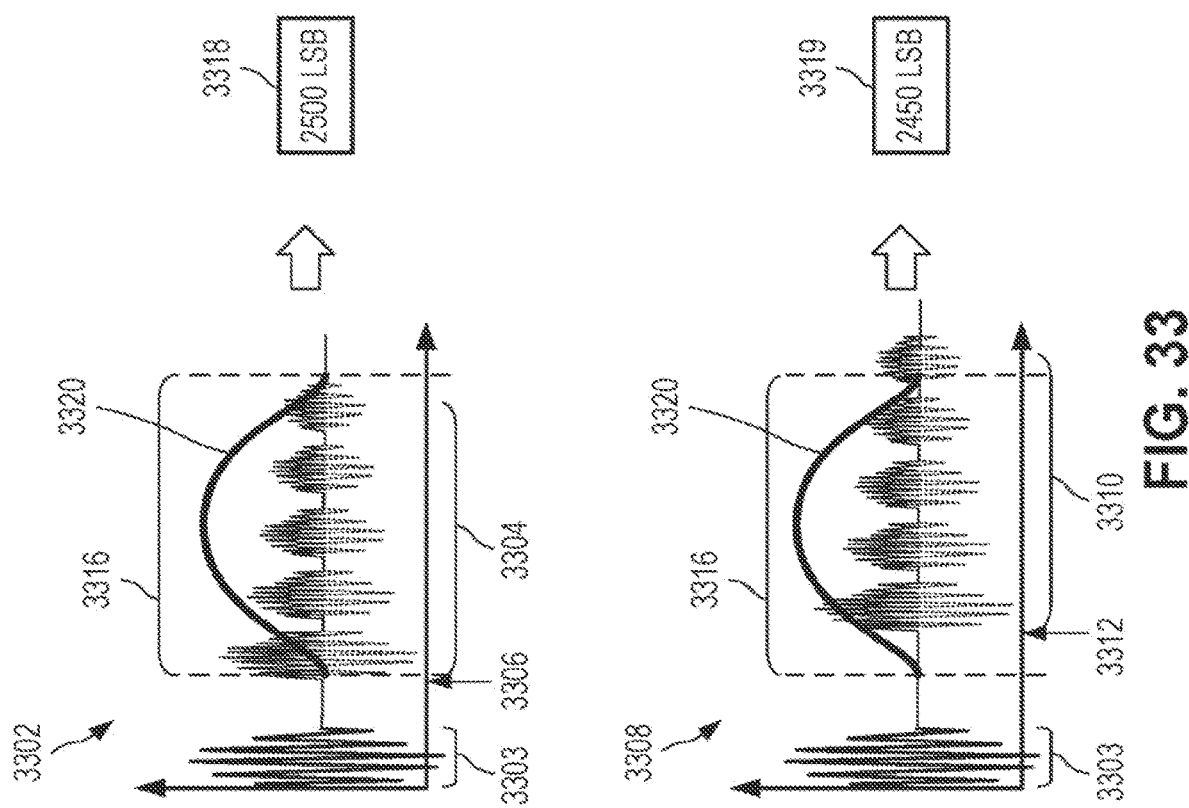

FIG. 33 is a schematic diagram of a flow for processing ultrasound signals depicting the minimal effects of reflected ultrasonic signal time-of-flight changes on touch input detection outside of an energy measurement window when window shaping is used according to certain aspects of the present disclosure.

Figure 34:
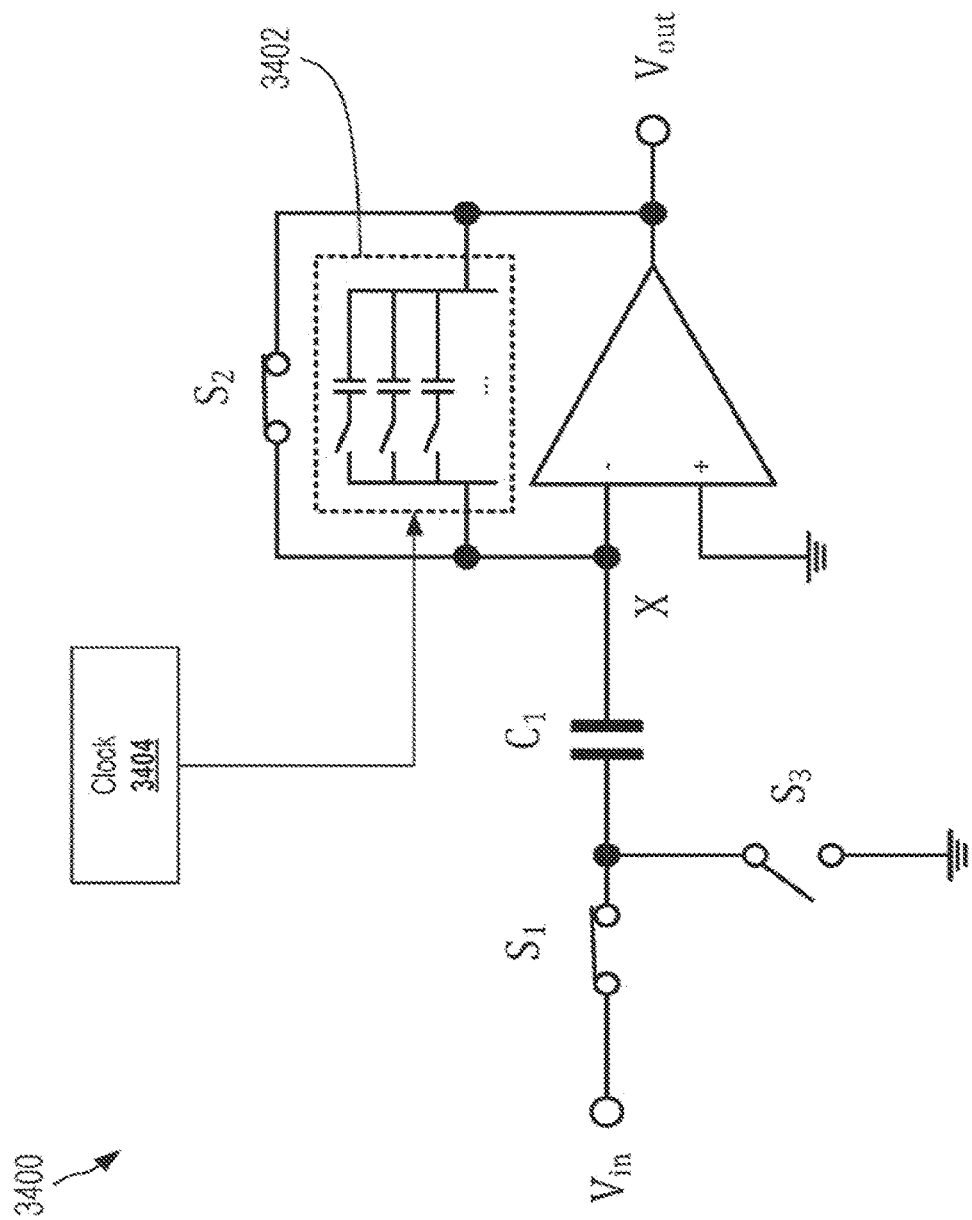

FIG. 34 is a schematic circuit diagram depicting a window shaping circuit according to certain aspects of the present disclosure.

Figure 35:
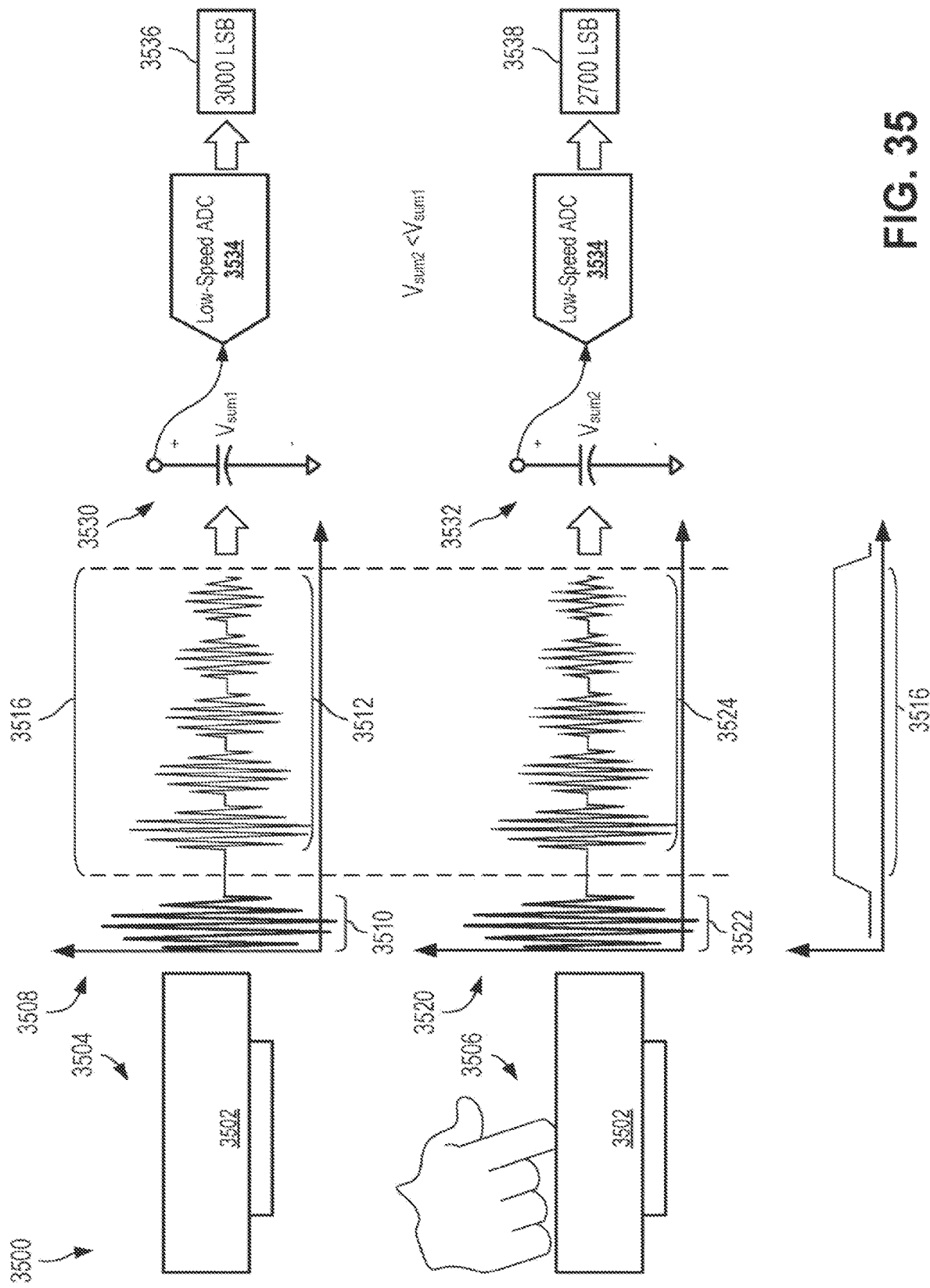

FIG. 35 is a schematic diagram depicting a flow for processing ultrasound signals to detect a touch input using the amplitude of reflected ultrasonic signals according to certain aspects of the present disclosure.

Figure 36:
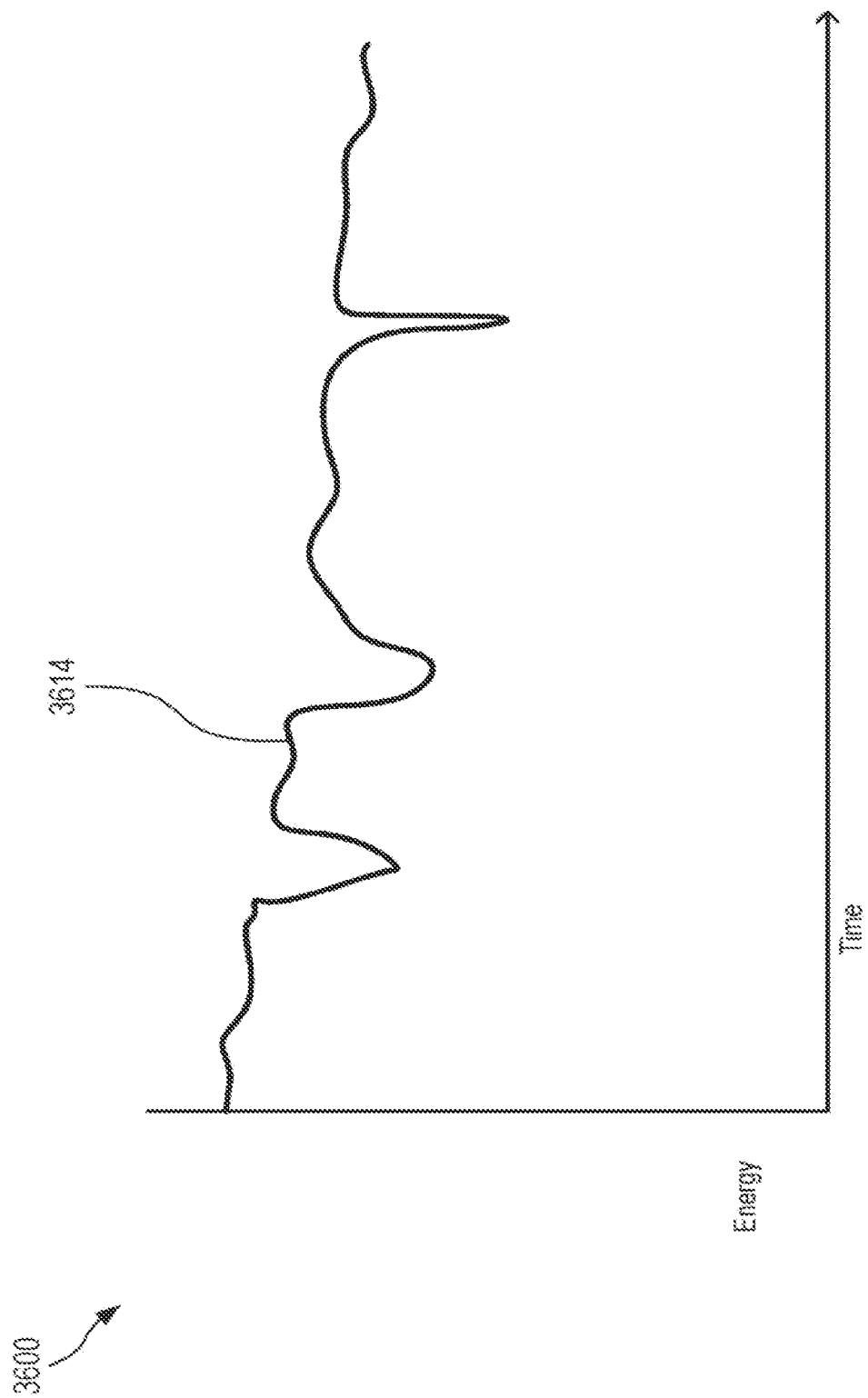

FIG. 36 is a plot depicting a simplified example energy signal according to certain aspects of the present disclosure.

Figure 37:
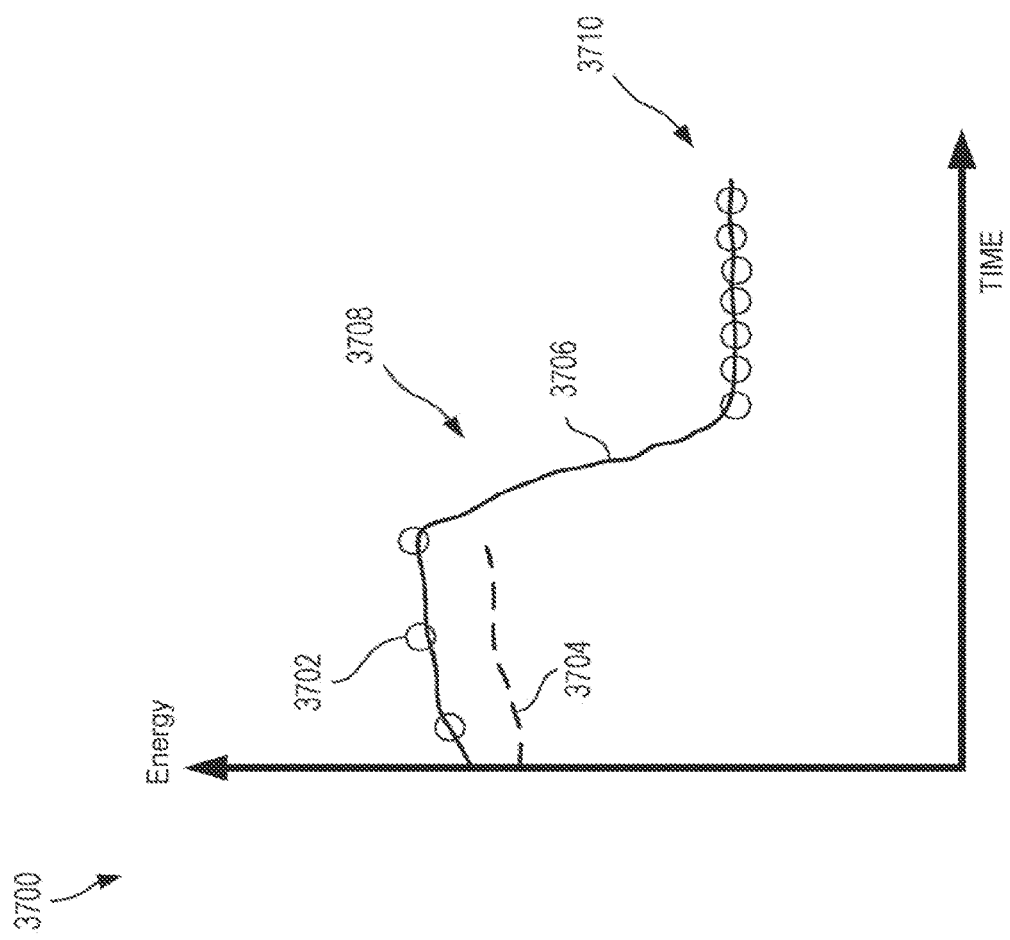

FIG. 37 is a chart depicting reflected ultrasonic signal measurements made using an ultrasound input device and illustrating techniques to improve touch input detection according to certain aspects of the present disclosure.

Figure 38:
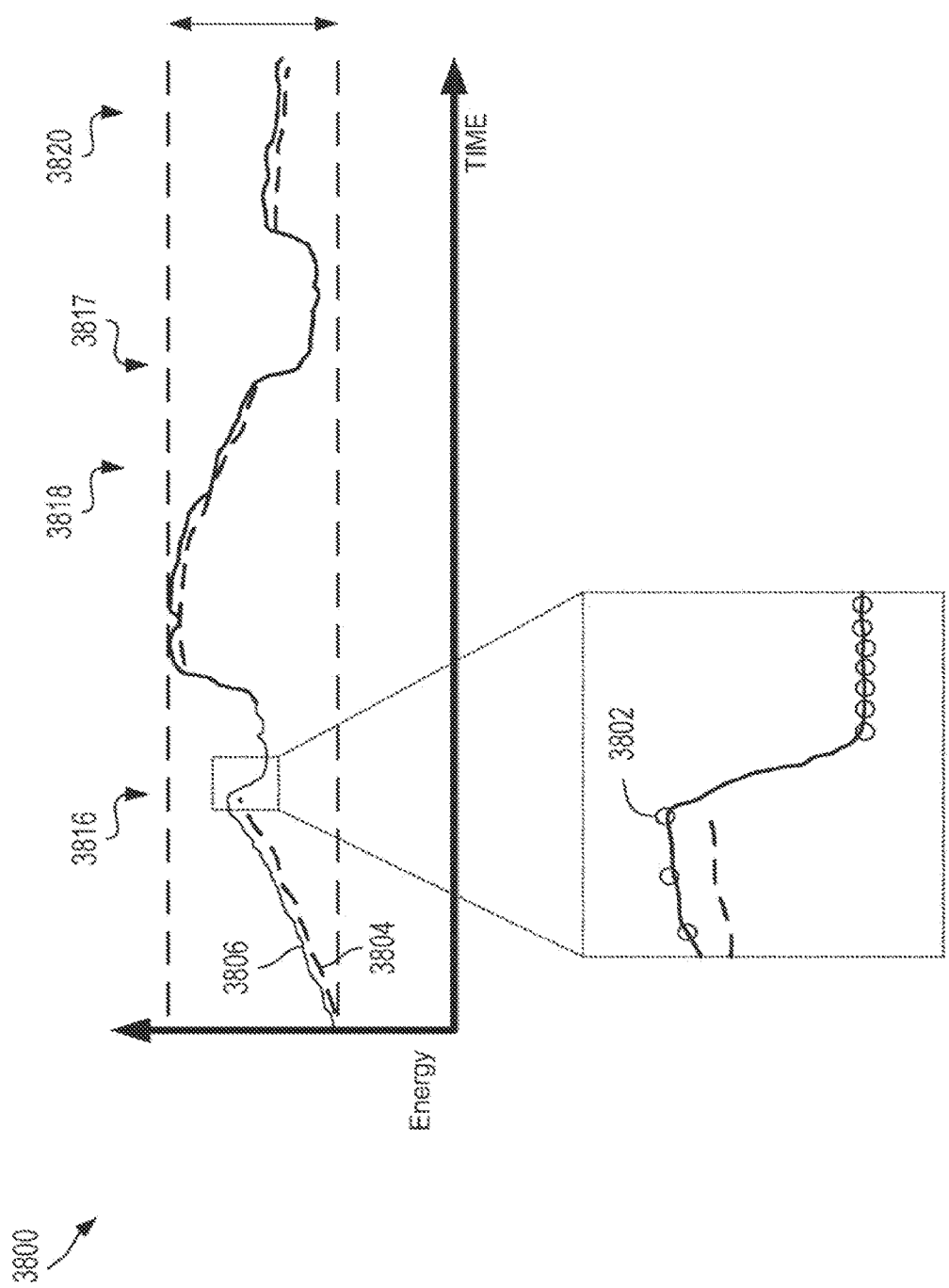

FIG. 38 is a chart depicting reflected ultrasonic signal measurements made using an ultrasound input device and illustrating additional techniques to improve touch input detection according to certain aspects of the present disclosure.

Figure 39:
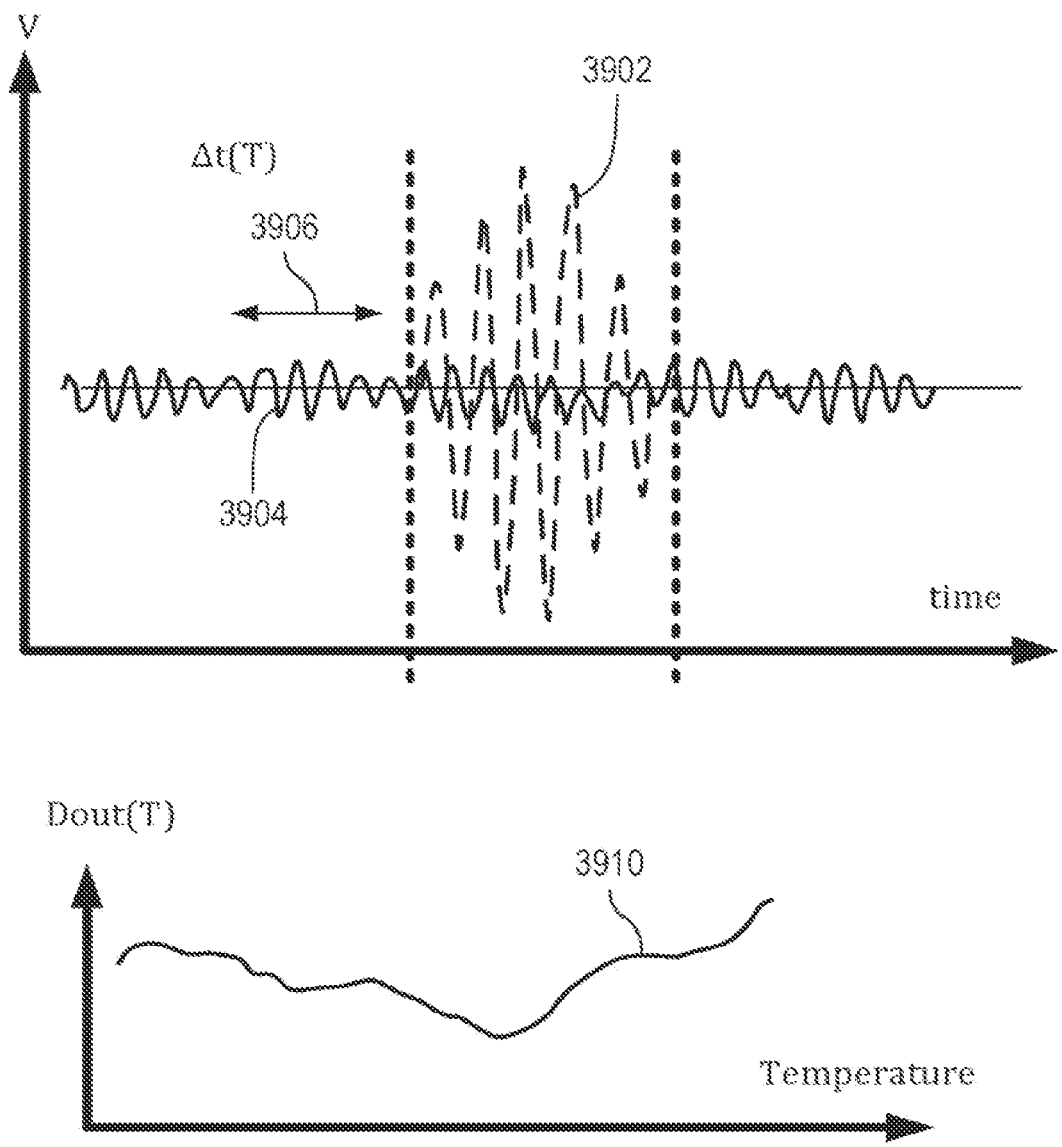

FIG. 39 is a set of charts depicting temperature dependence of reflected ultrasonic signals according to certain aspects of the present disclosure.

Figure 40:
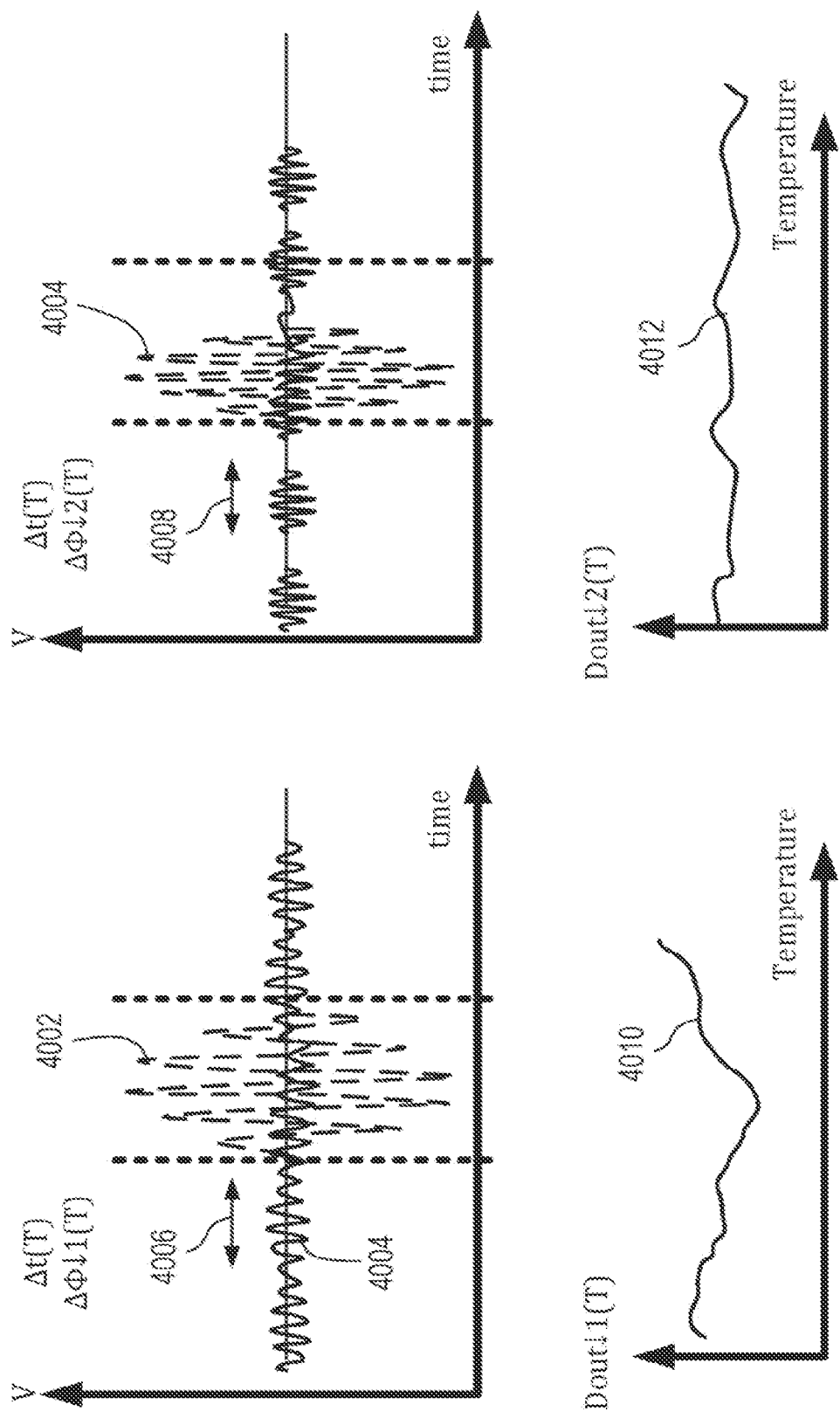

FIG. 40 is a set of charts depicting time-of-flight temperature dependence of a two frequency method of detecting a touch input according to certain aspects of the present disclosure.

Figure 41:
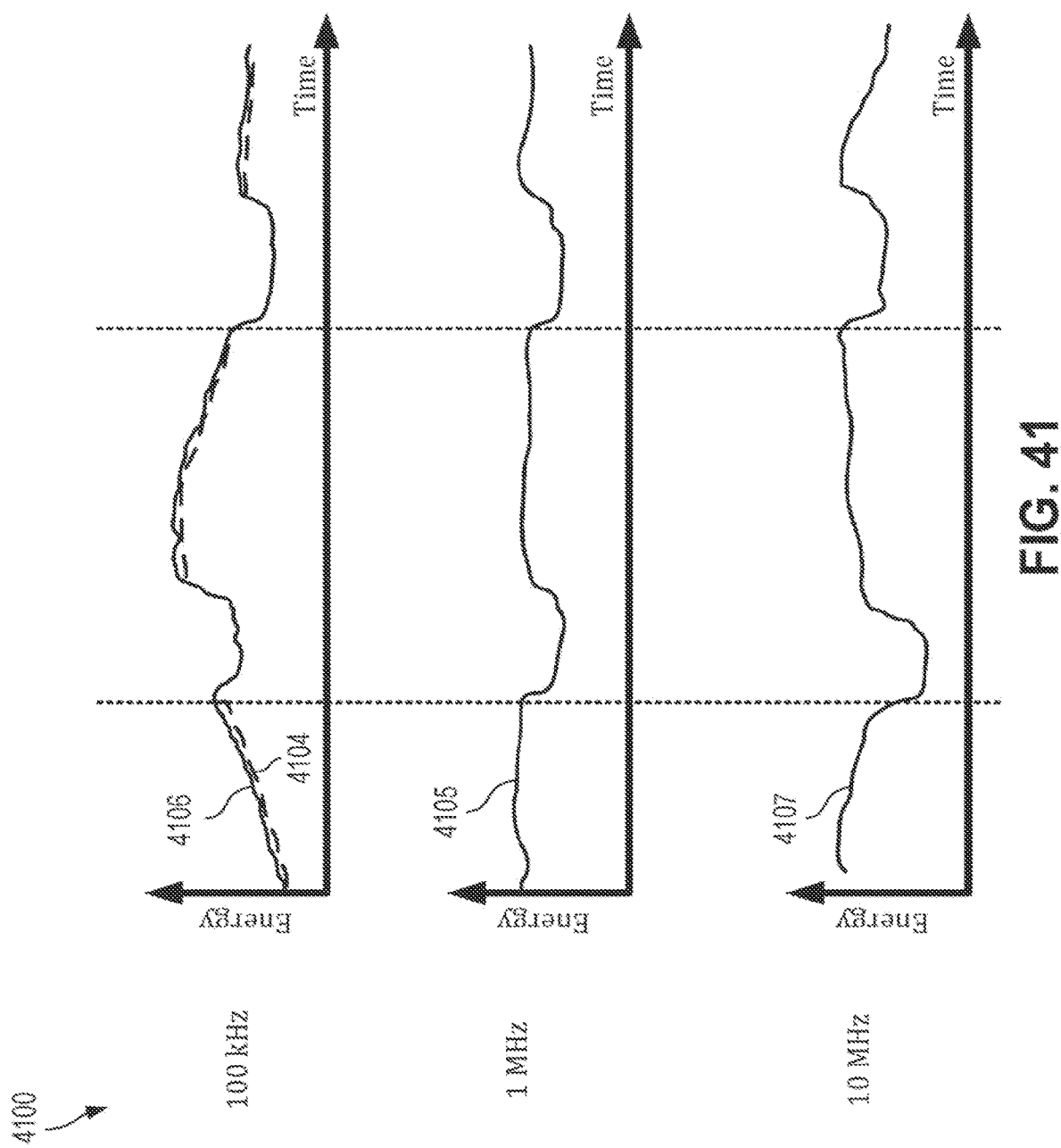

FIG. 41 is a chart depicting reflected ultrasonic signal measurements made across several frequencies using an ultrasound input device and illustrating techniques to improve touch input detection according to certain aspects of the present disclosure.

Figure 42:
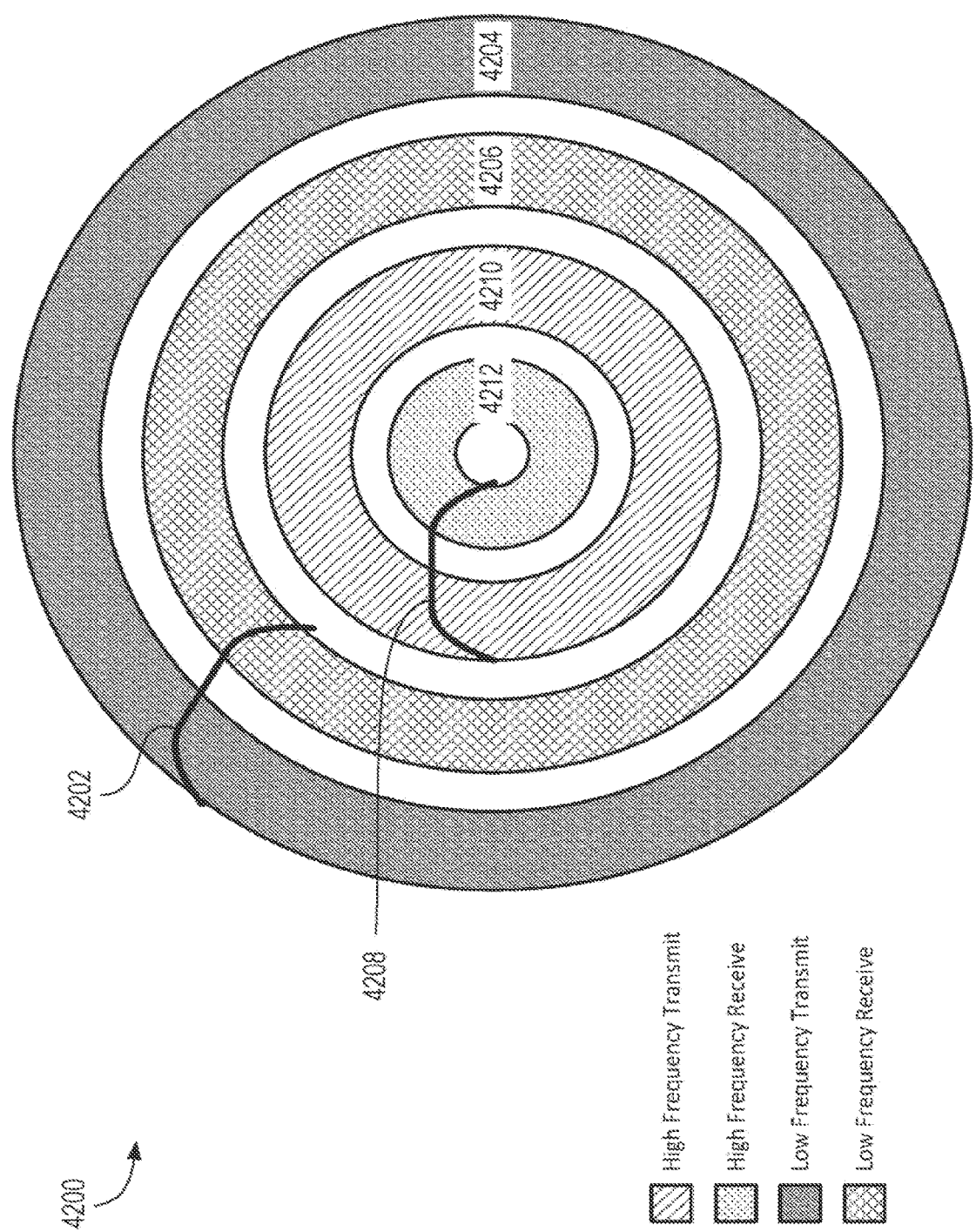

FIG. 42 is a schematic plan view depicting a two-frequency PMUT with a concentric-circular design according to certain aspects of the present disclosure.

Figure 43:
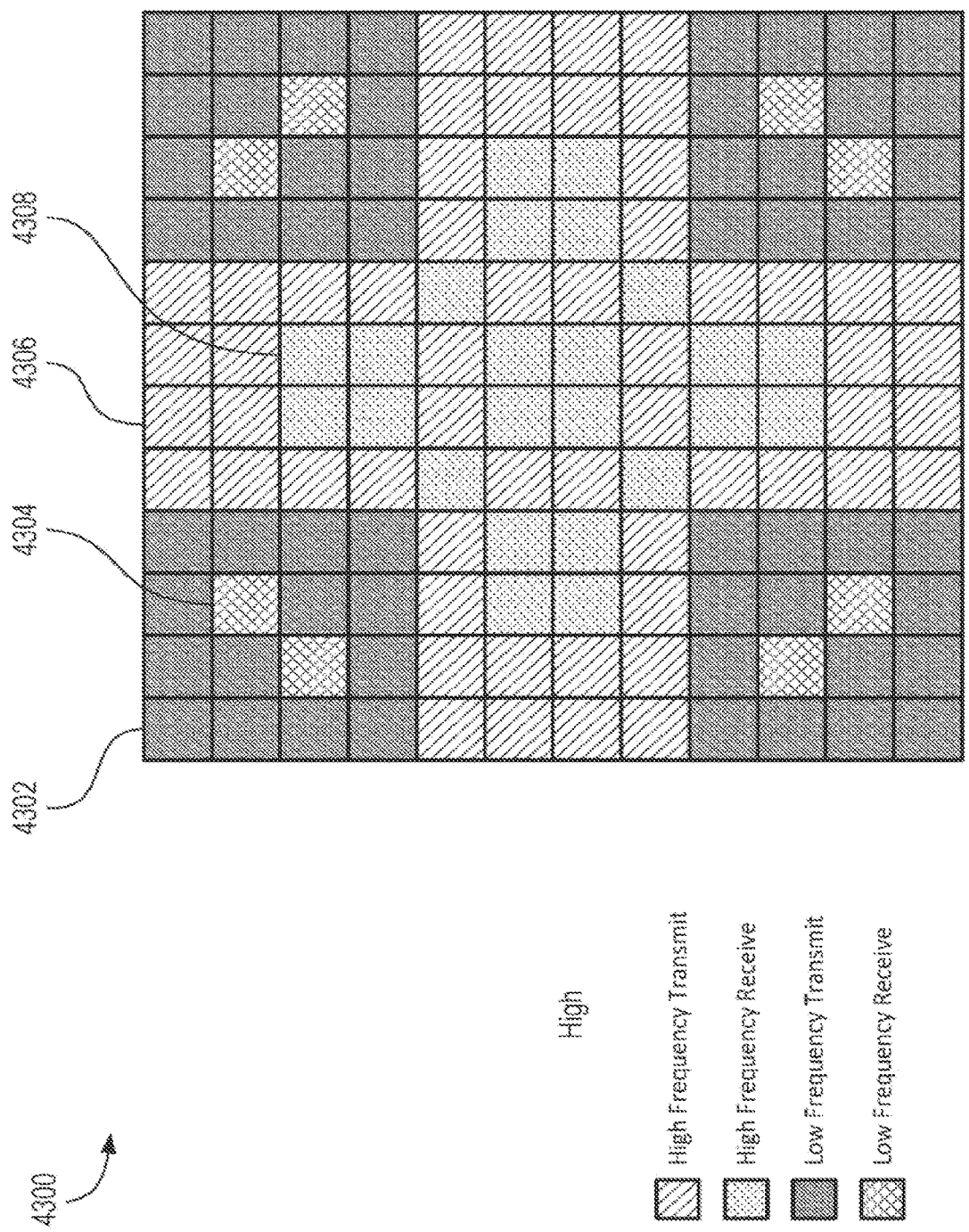

FIG. 43 is a schematic plan view depicting a multi-frequency ultrasound input device with a square design according to certain aspects of the present disclosure.

FIG. 44 is a set of three charts depicting example signals received by an ultrasound input system attributable to three different users according to certain aspects of the present disclosure.

Figure 45:
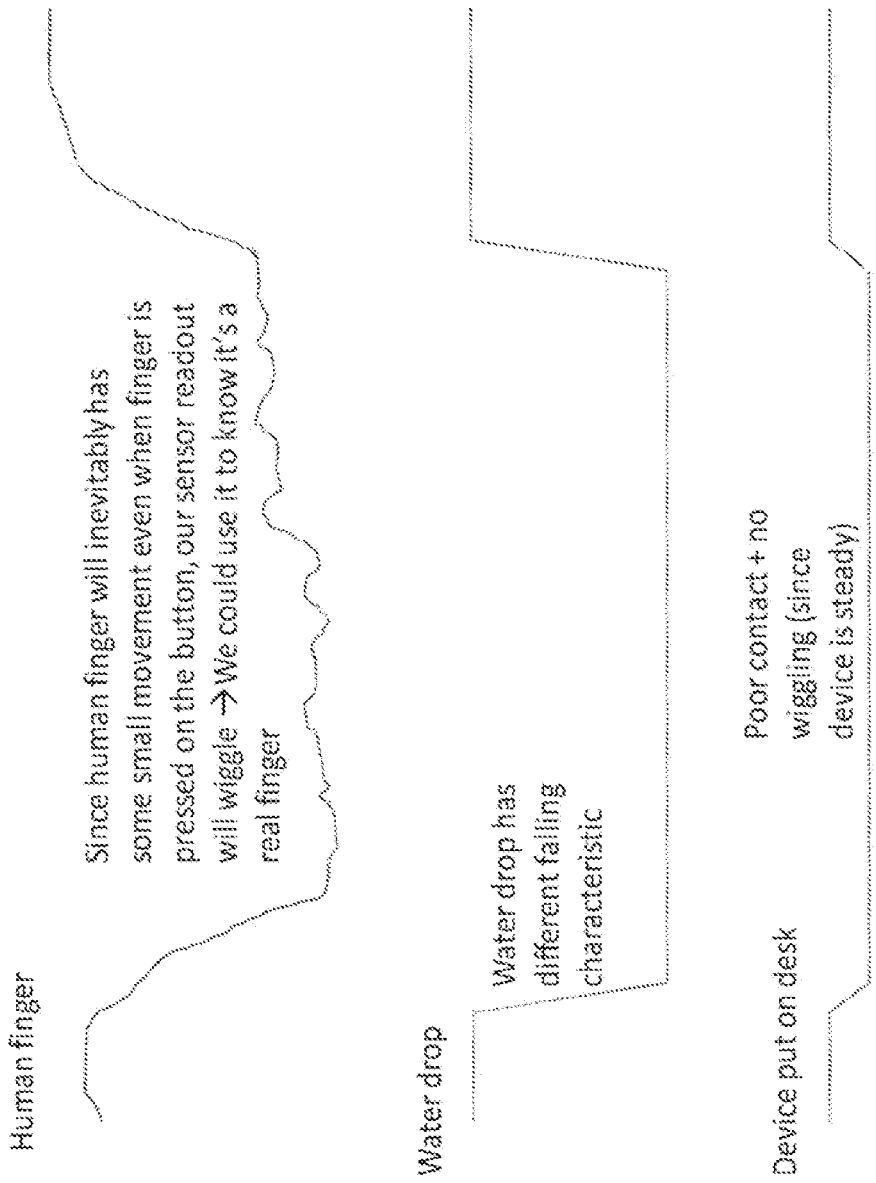

FIG. 45 is a set of charts depicting energy measurement signals associated with a human finger, a water drop, and placing a device on a desk (e.g., placing an object over a sensor).

Figure 46:
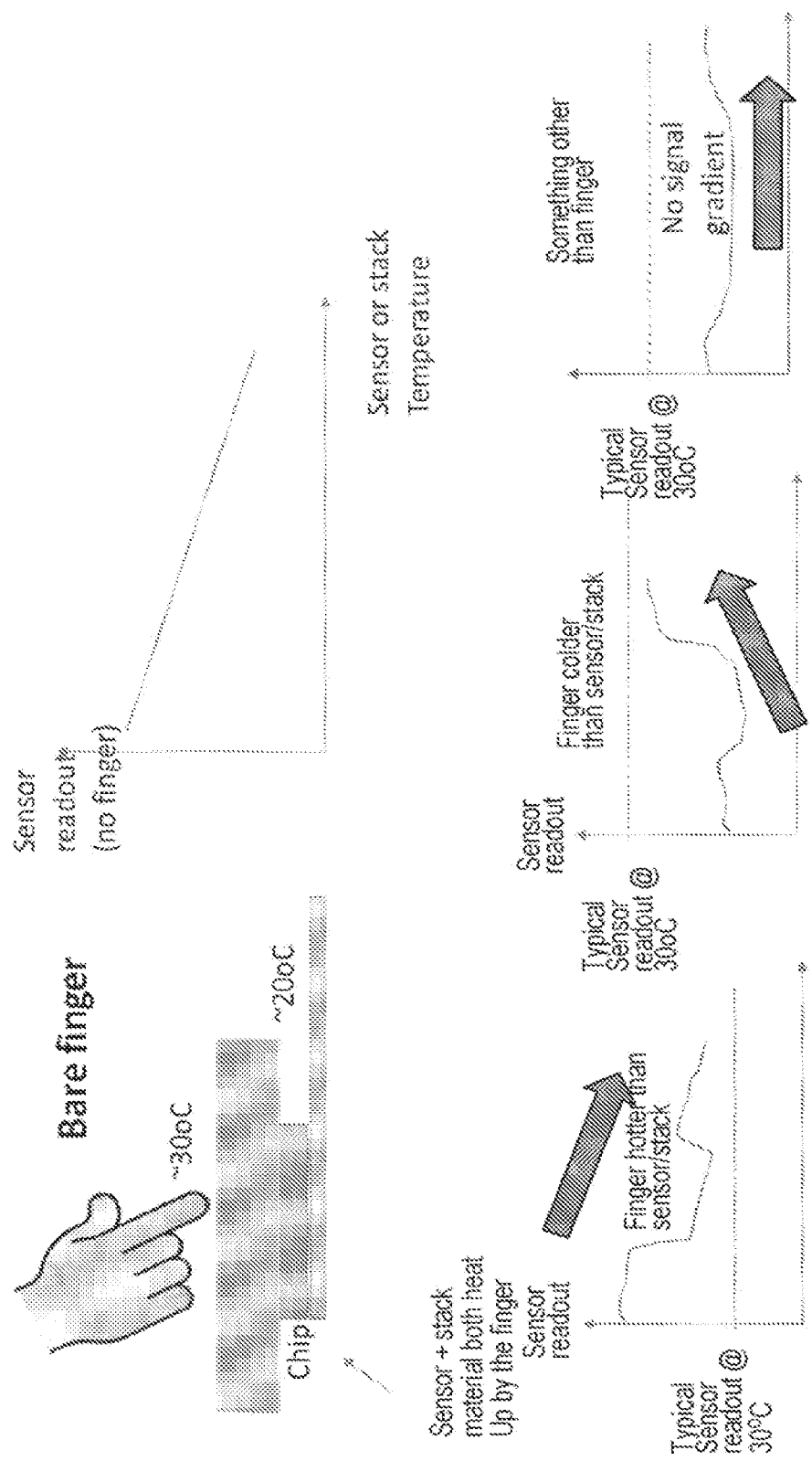

FIG. 46 is a combination schematic diagram and set of charts depicting how temperature can be leveraged to further identify whether a human finger is initiating a touch event.

Figure 47:
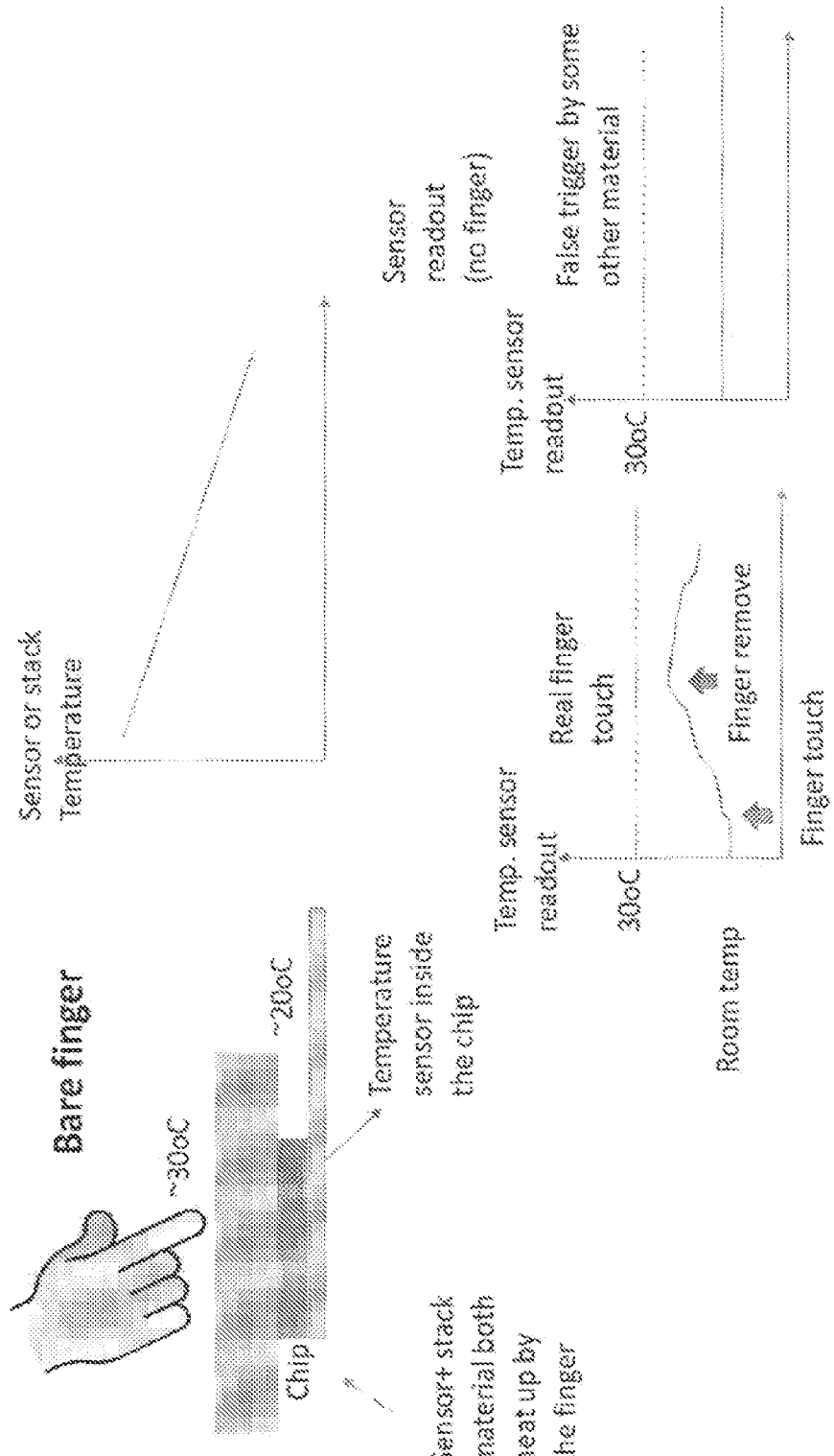

FIG. 47 is a combination schematic diagram and charts depicting a finger touch and associated temperature information according to certain aspects of the present disclosure.

Figure 48:
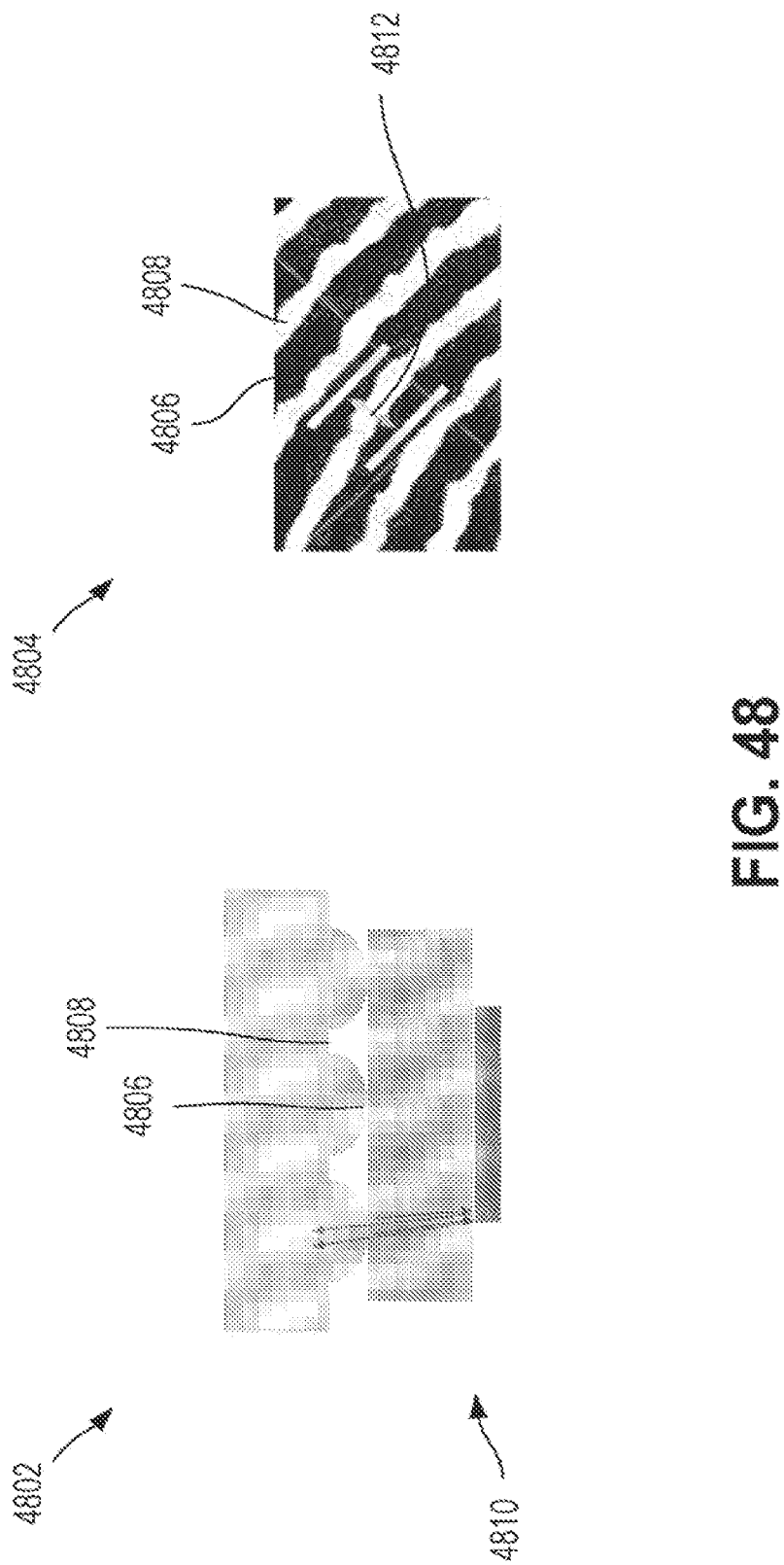

FIG. 48 is a combination schematic side view and signal map depicting ridges and valleys of a fingerprint initiating a touch event on an ultrasound input system according to certain aspects of the present disclosure.

Figure 49:
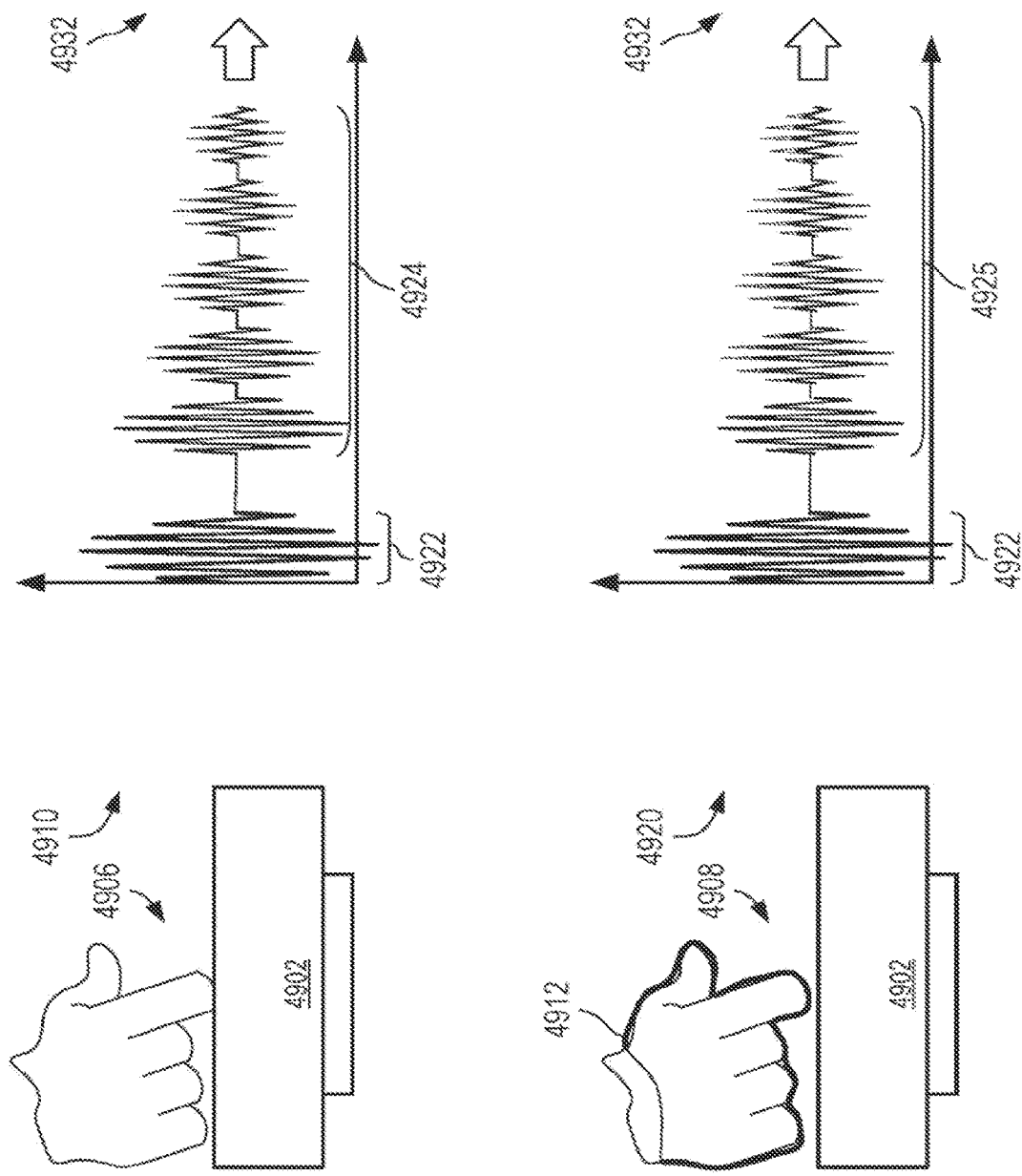

FIG. 49 is a schematic diagram depicting example signals received by an ultrasound input system attributable to the same user initiating touch events with and without a glove according to certain aspects of the present disclosure.

Figure 50:
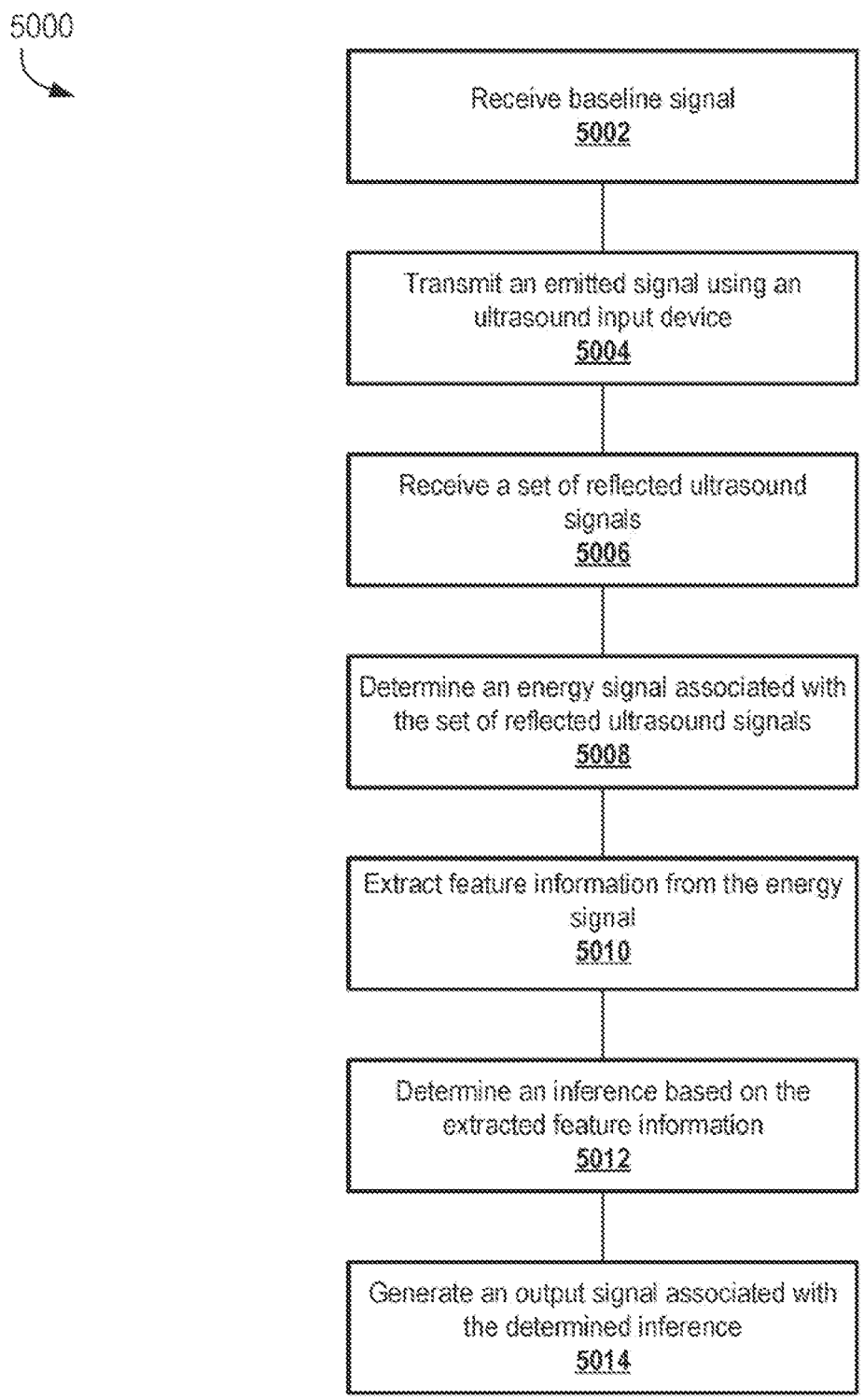

FIG. 50 is a flowchart depicting a process for extracting features from a signal of an ultrasound input system according to certain aspects of the present disclosure.

Figure 51:
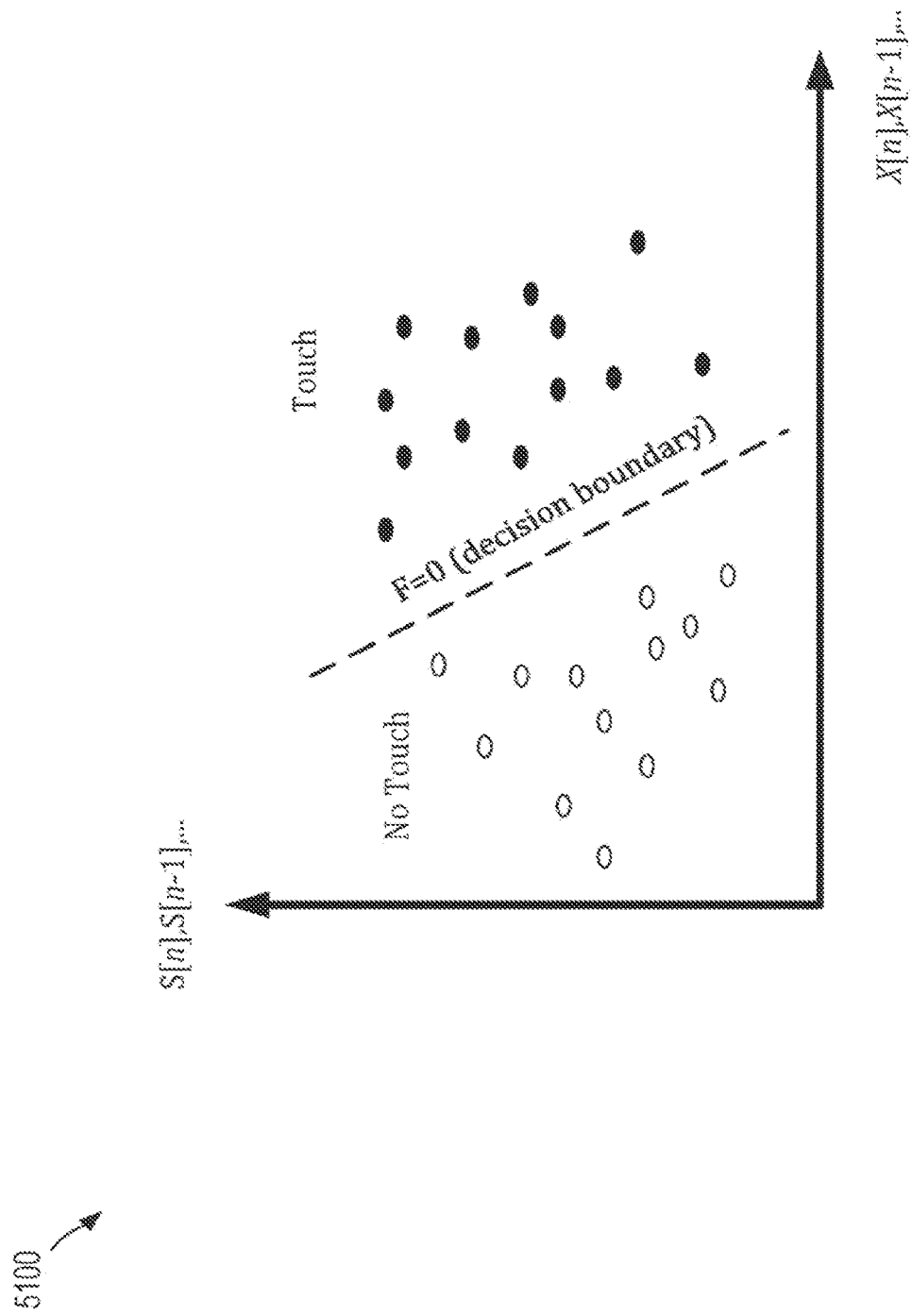

FIG. 51 is a chart depicting a machine learning decision algorithm used to improve touch detection according to certain aspects of the present disclosure.

Figure 52:
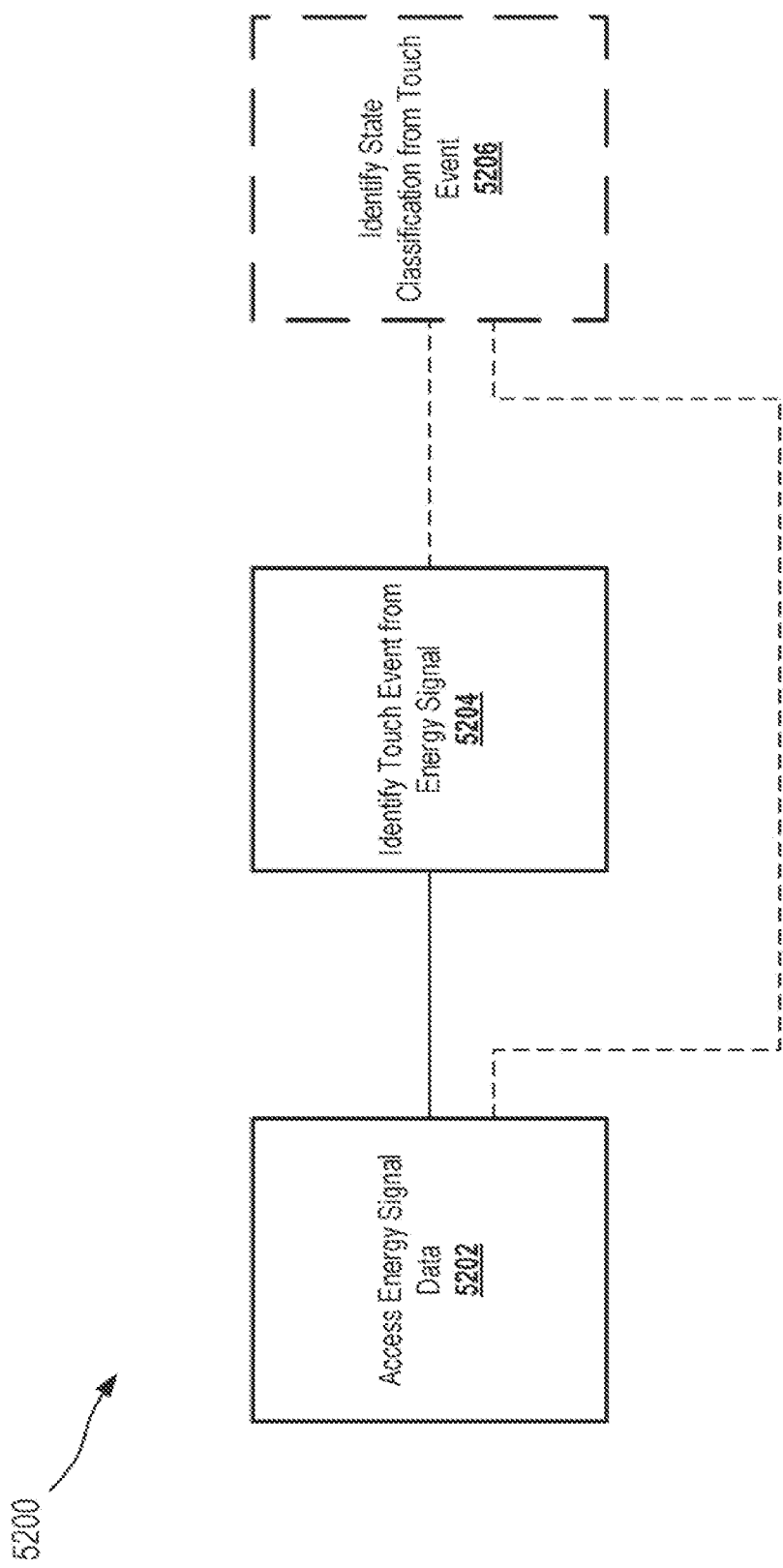

FIG. 52 is a flowchart depicting a process for detecting touch events according to certain aspects of the present disclosure.

Figure 53:
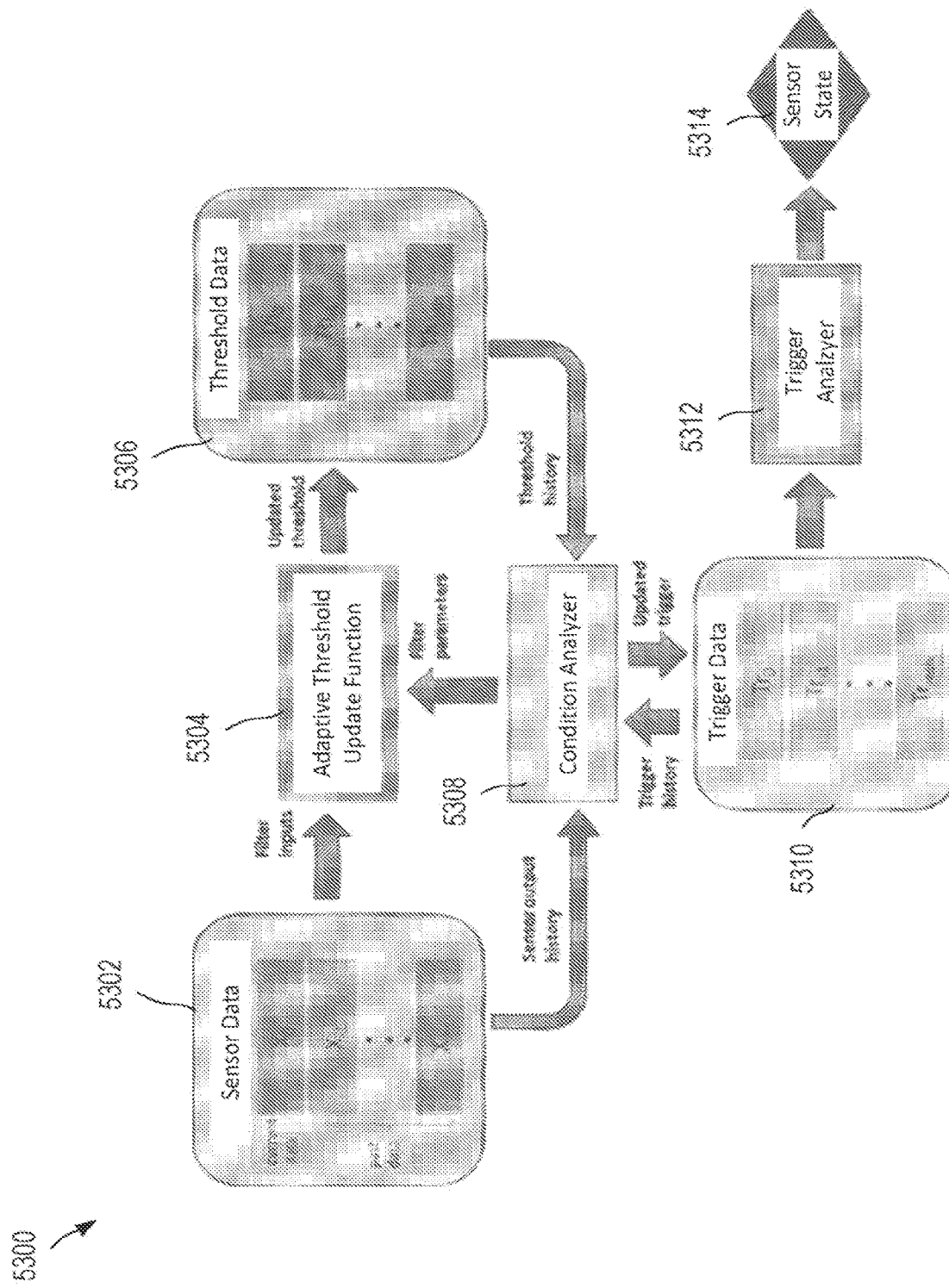

FIG. 53 is a schematic diagram depicting an adaptive threshold scheme for identifying touch events according to certain aspects of the present disclosure.

Figure 54:
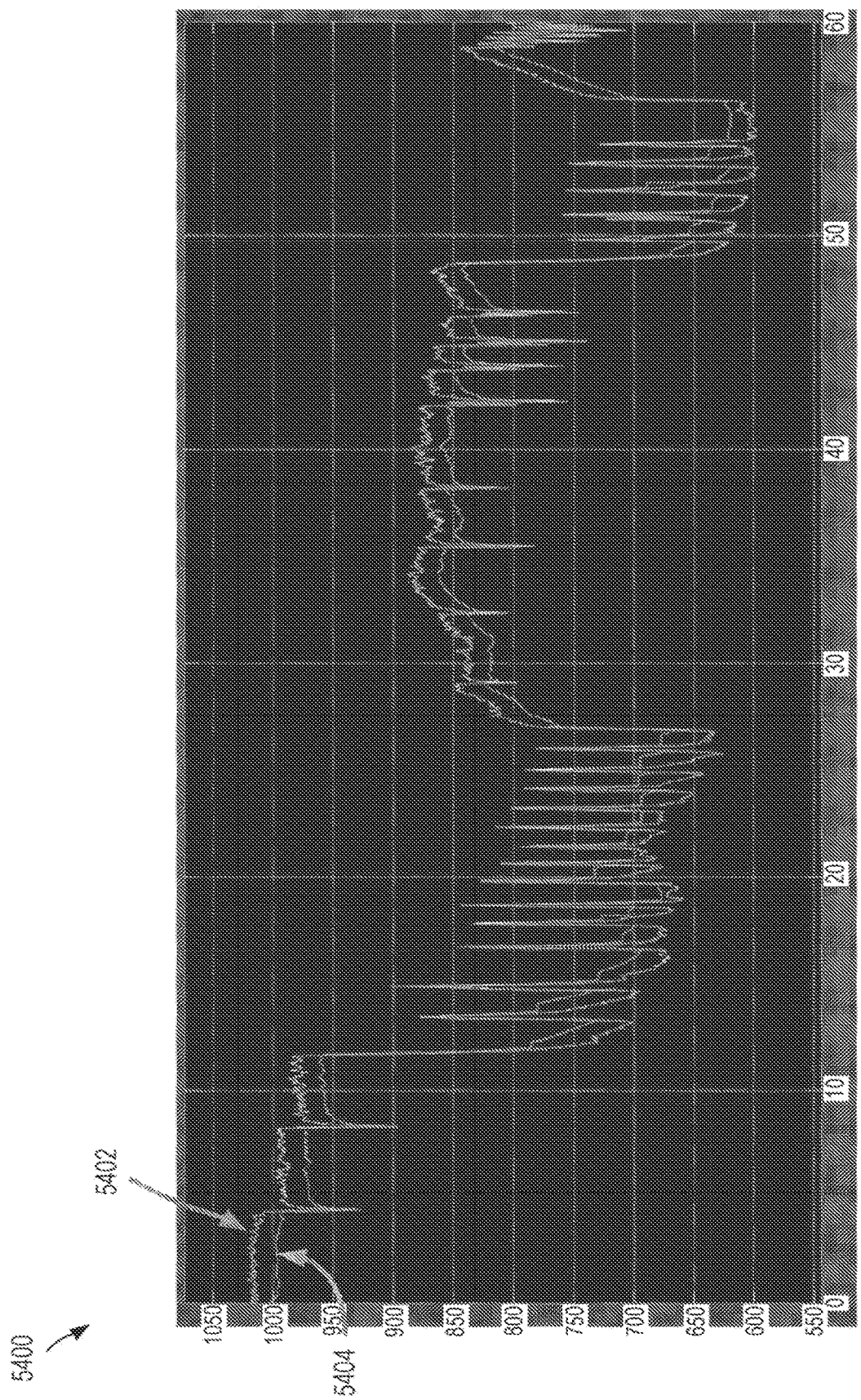

FIG. 54 is an example plot depicting an energy signal and adaptive threshold associated with identifying touch events according to certain aspects of the present disclosure.

Figure 55:
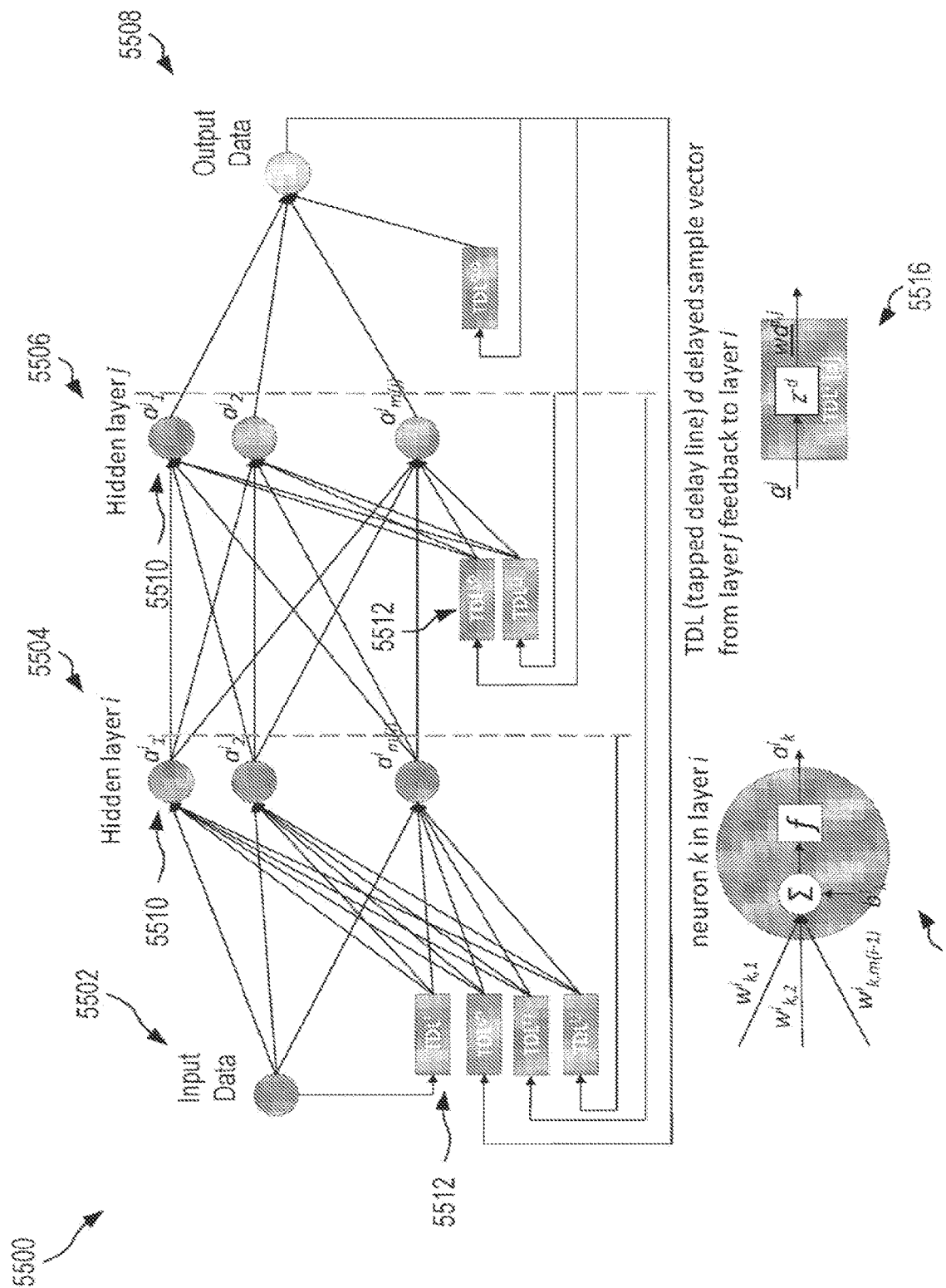

FIG. 55 is a schematic diagram depicting a general recurrent neural network according to certain aspects of the present disclosure.

Figure 56:
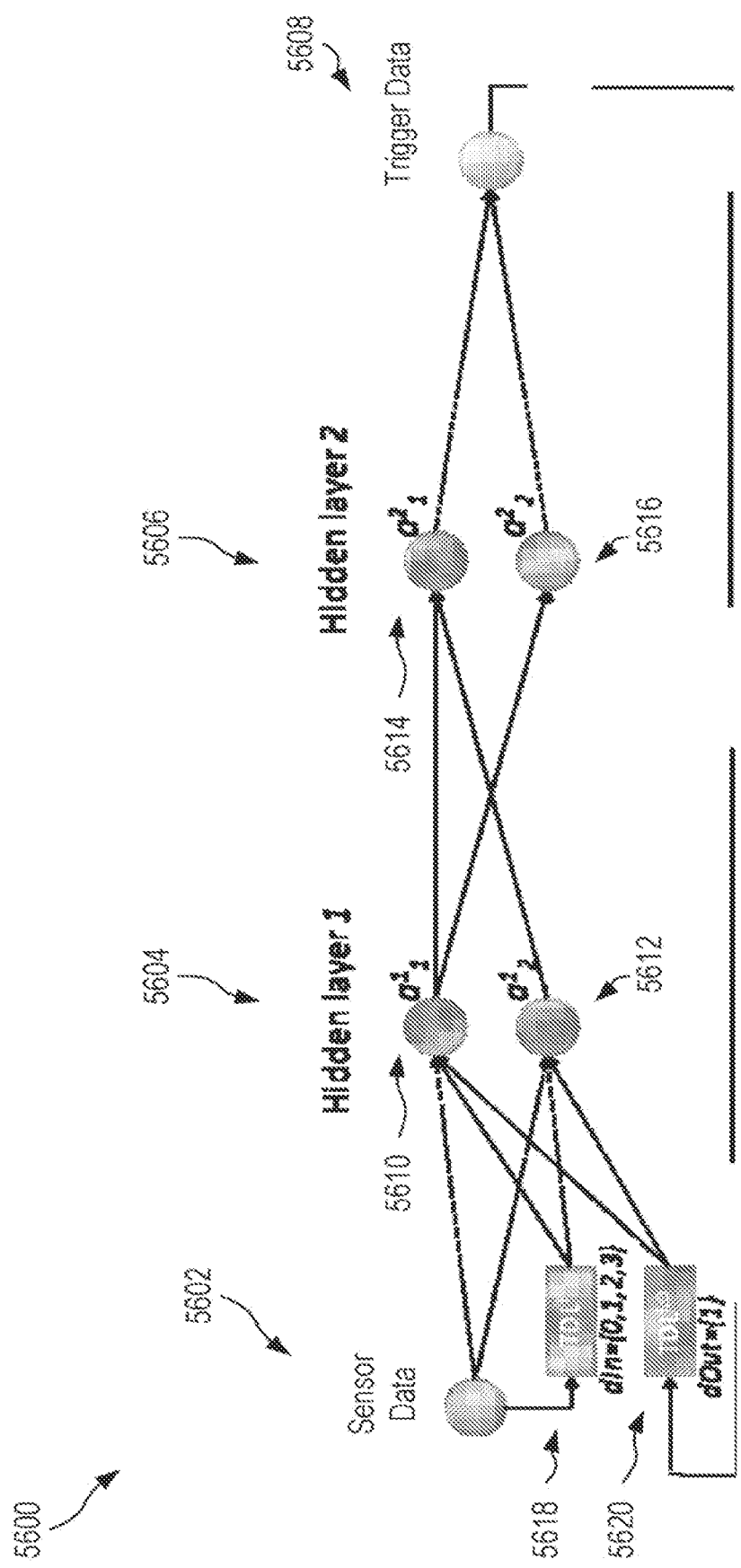

FIG. 56 is a schematic diagram depicting an example recurrent neural network for identifying trigger events according to certain aspects of the present disclosure.

Figure 57:
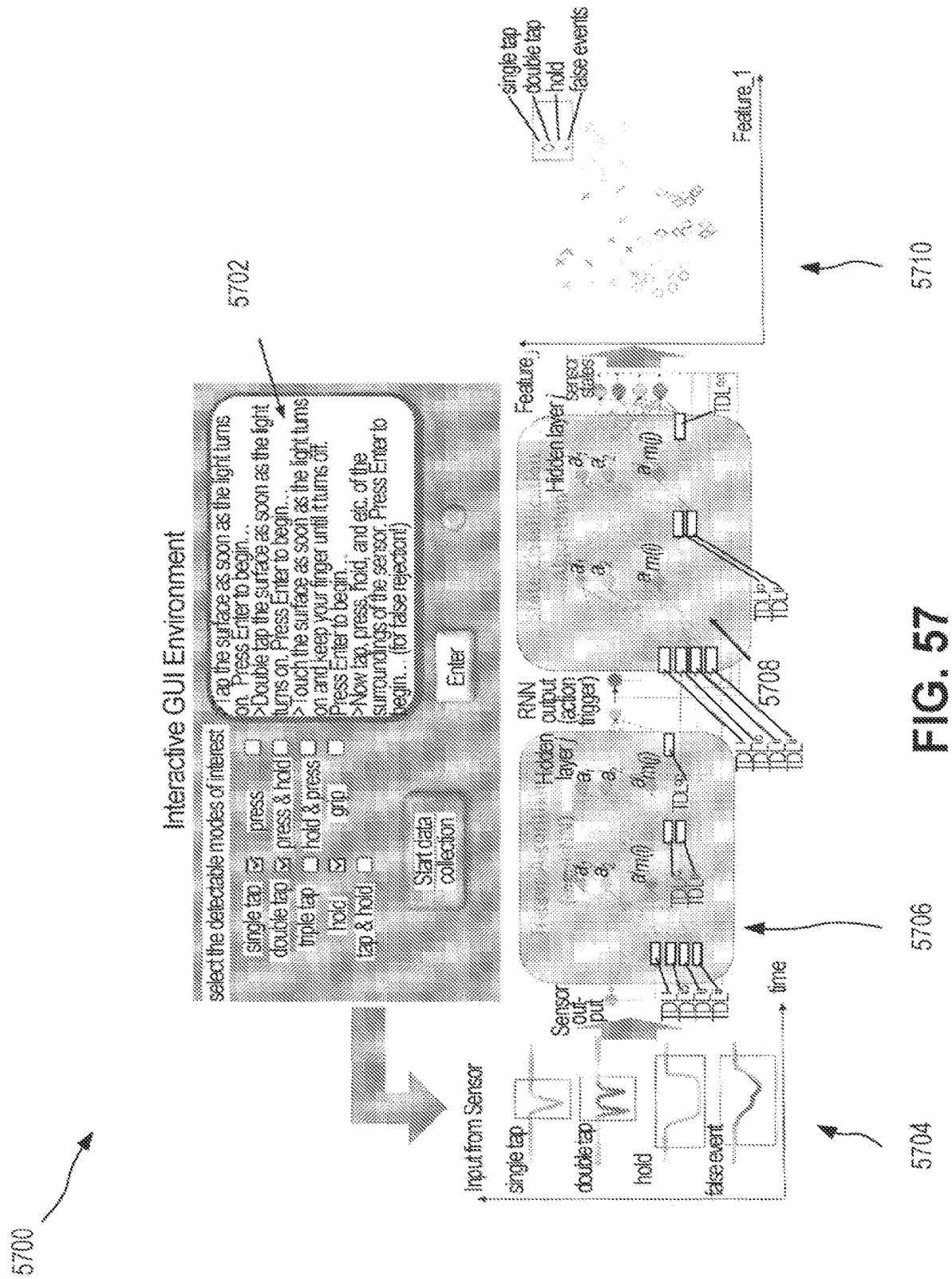

FIG. 57 is a schematic diagram depicting an example environment using a set of recurrent neural networks for touch detection and state classification according to certain aspects of the present disclosure.

Figure 58:
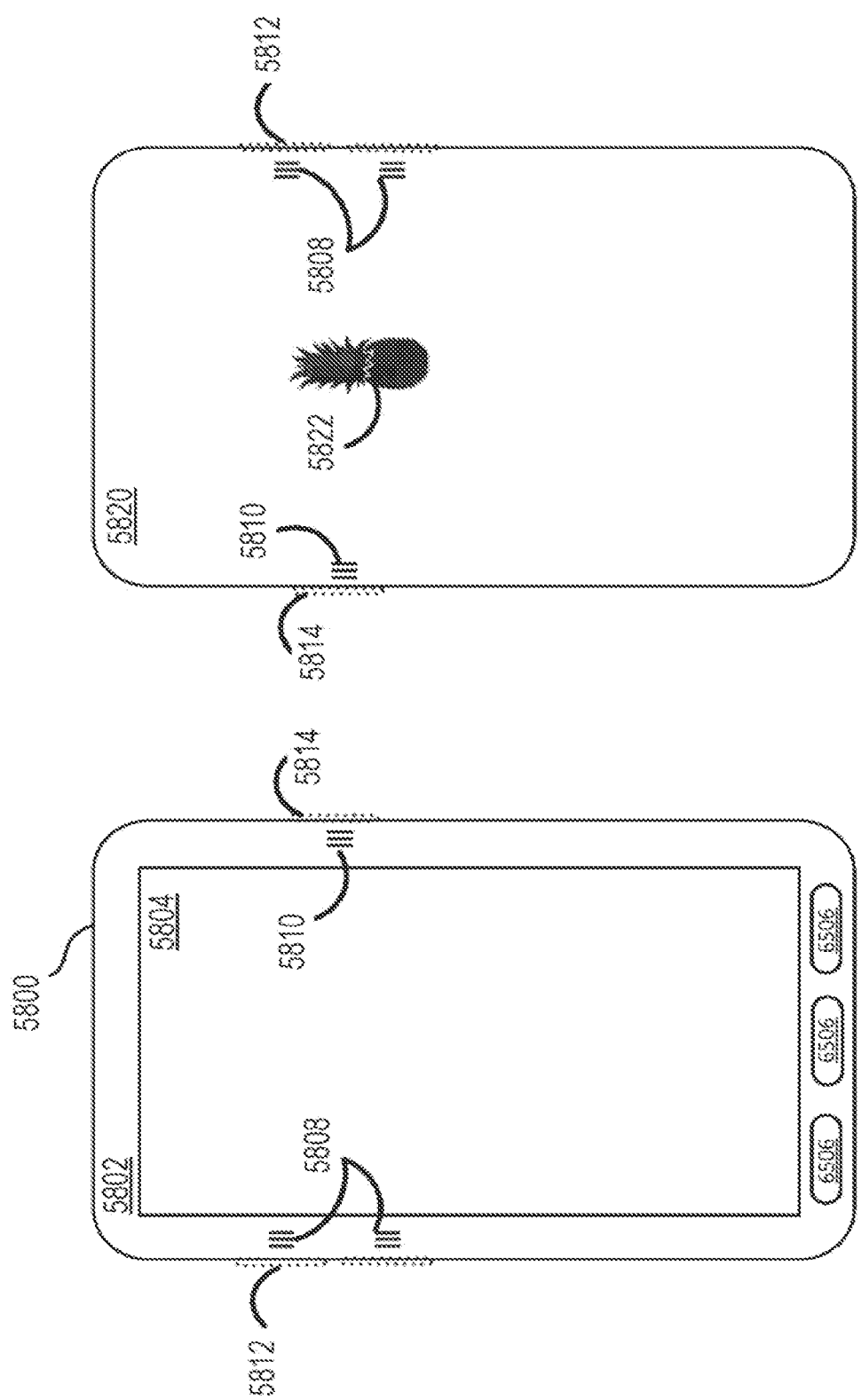

FIG. 58 is a schematic diagram depicting an electronic device with an ultrasound input device according to certain aspects of the present disclosure.

Figure 59:
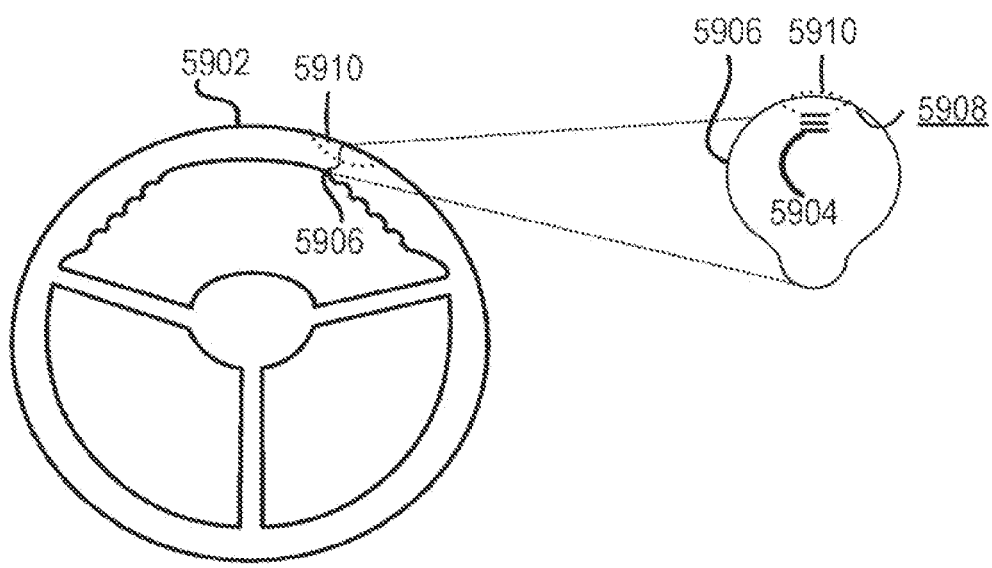

FIG. 59 is a schematic diagram depicting an automotive component with an ultrasound input device according to certain aspects of the present disclosure.

Figure 60:
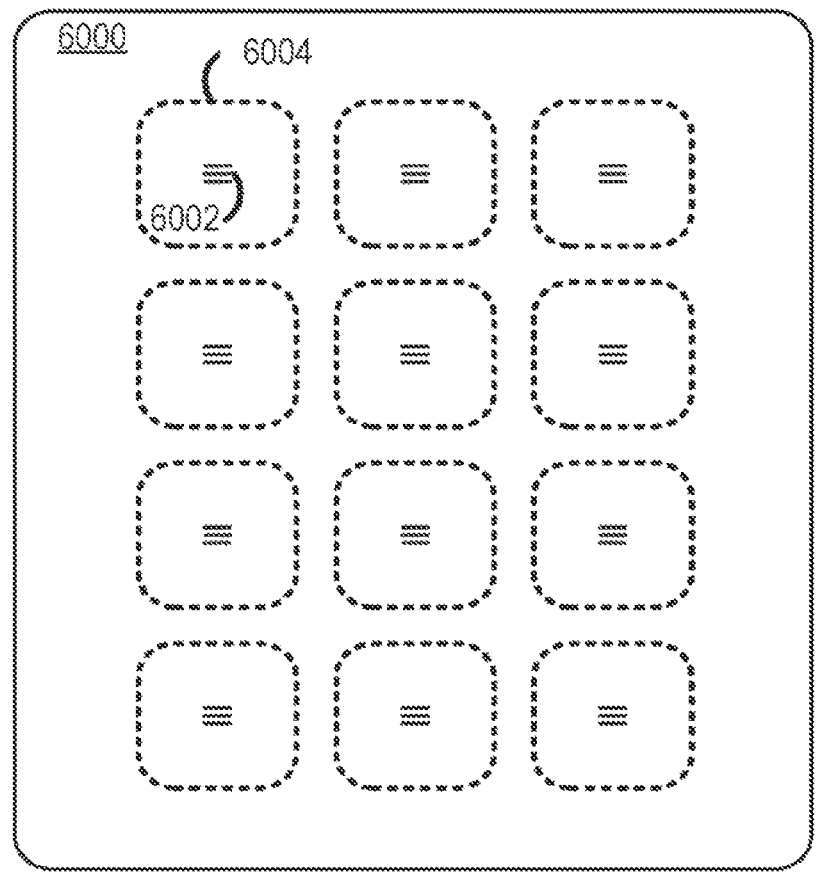

FIG. 60 is a schematic diagram depicting a keypad using an ultrasound input device according to certain aspects of the present disclosure.

Figure 61:
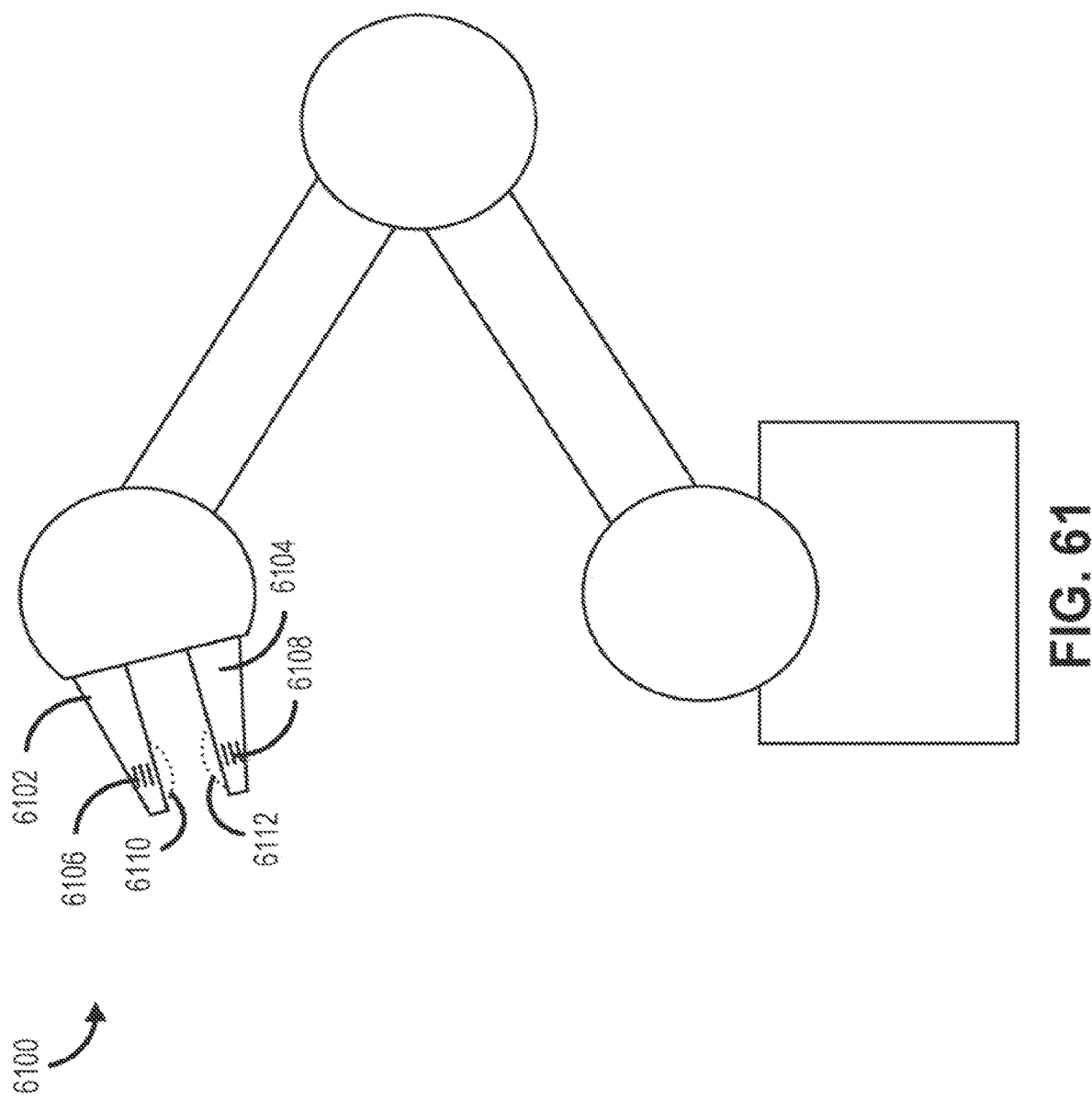

FIG. 61 is a schematic diagram depicting a robotic arm using an ultrasound input device according to certain aspects of the present disclosure.

Figure 62:
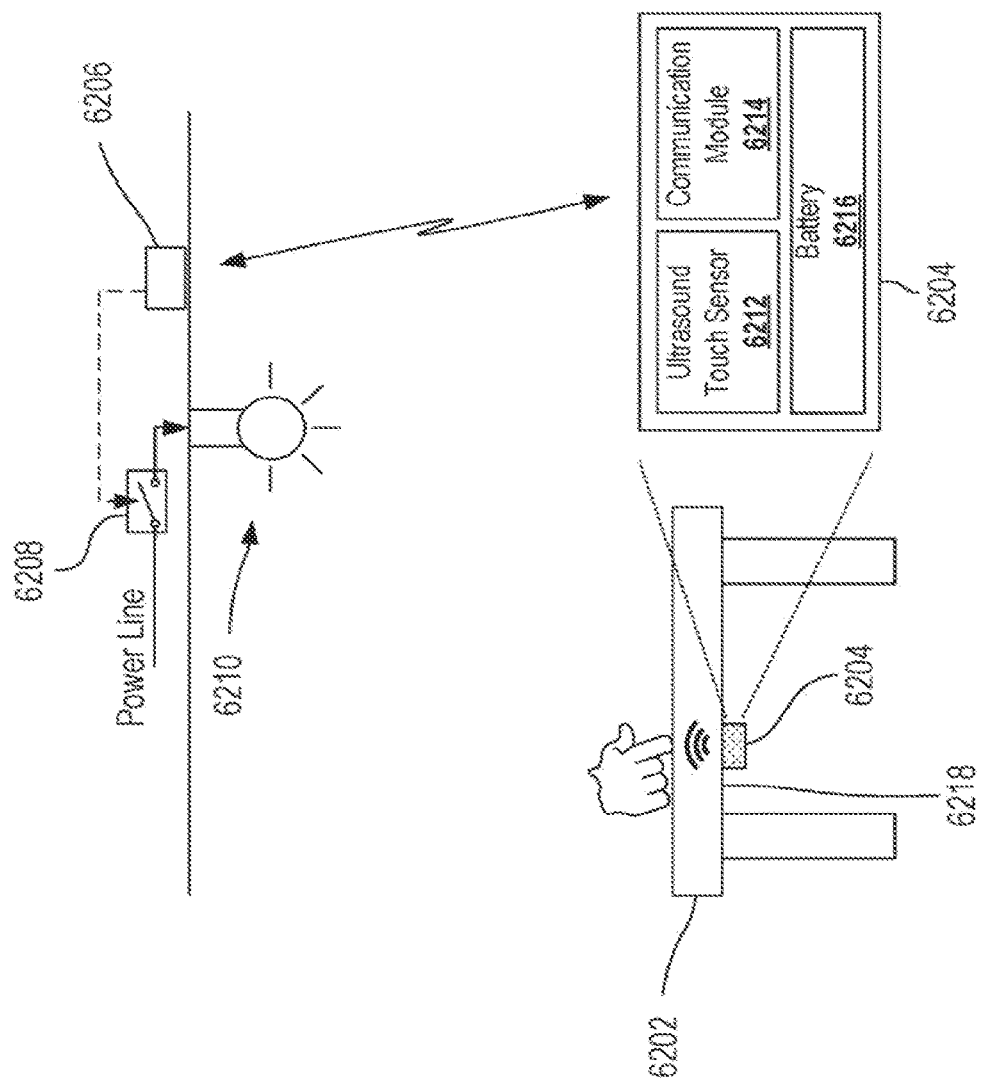

FIG. 62 is a schematic diagram depicting a piece of furniture using an ultrasound input device according to certain aspects of the present disclosure.

FIG. 63 is a set of charts depicting the energy measurement signals of an ultrasound input device demonstrating material detection according to certain aspects of the present disclosure.

Figure 64:
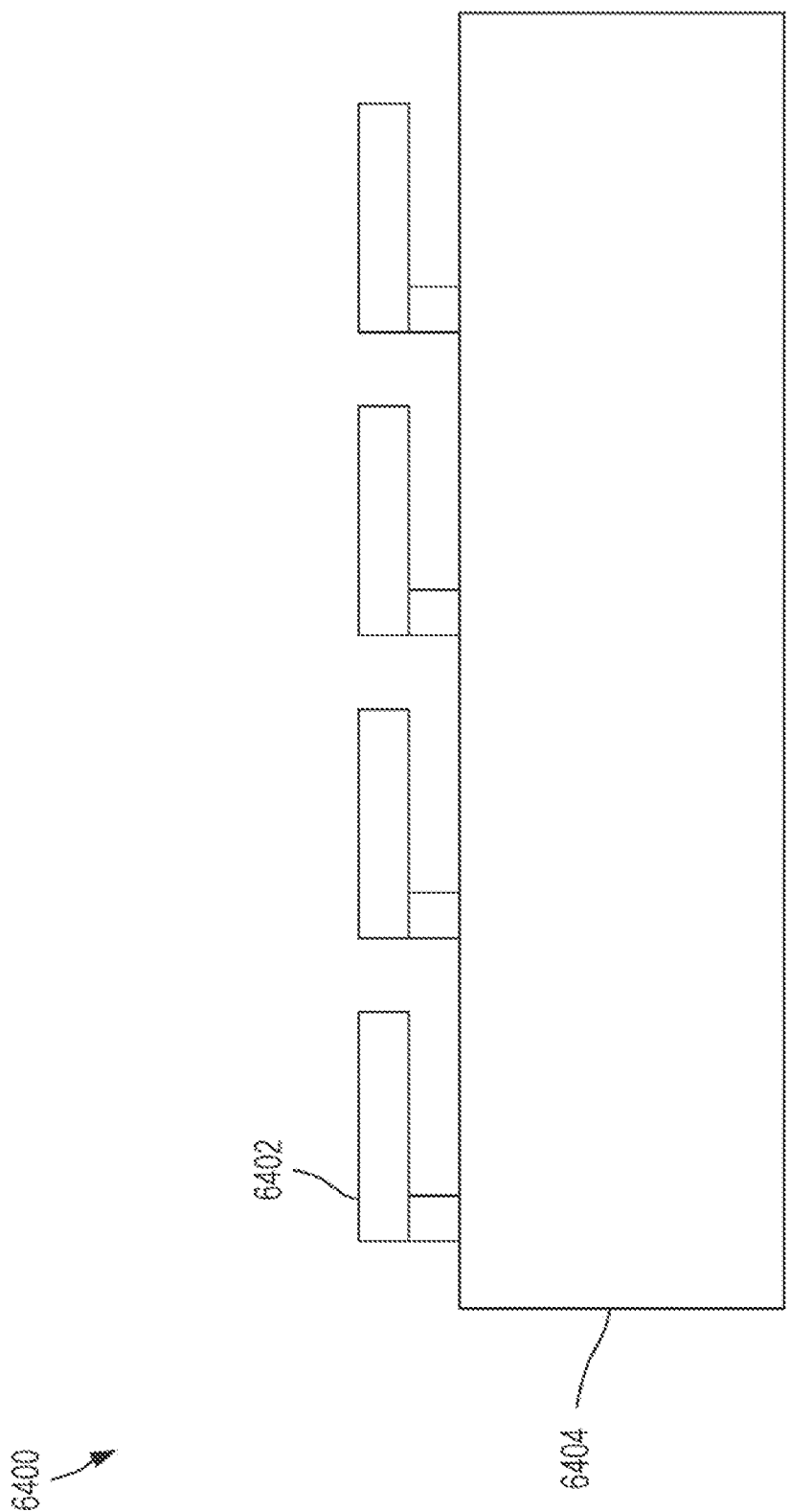

FIG. 64 is a schematic diagram of a piezoelectric resonator array containing piezoelectric cantilevers usable in an ultrasound input device according to certain aspects of the present disclosure.

Figure 65:
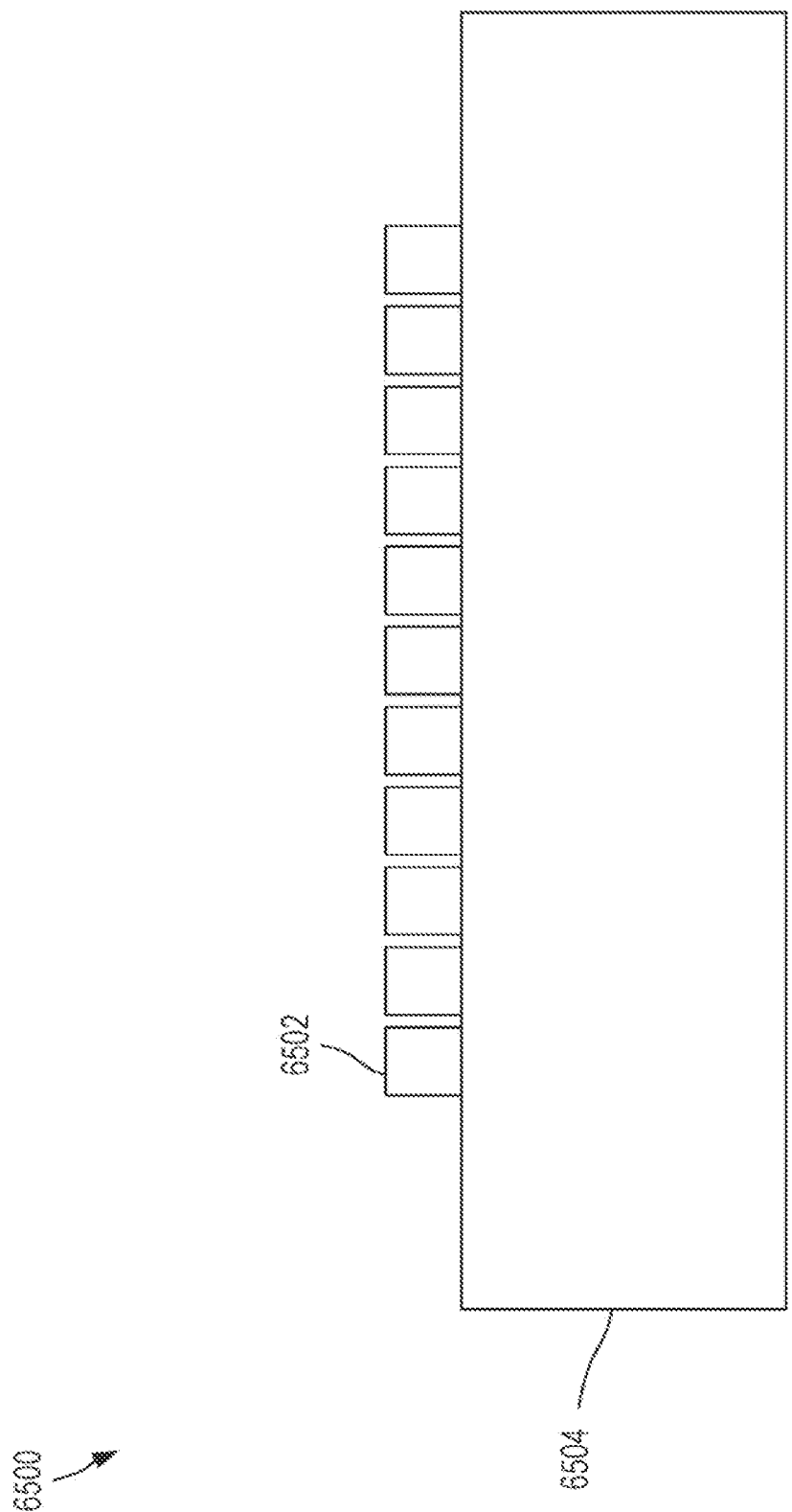

FIG. 65 is a schematic diagram of a piezoelectric resonator array containing piezoelectric pillars usable in an ultrasound input device according to certain aspects of the present disclosure.

DETAILED DESCRIPTION

A touch input solution is provided for improving detection of touch inputs in HMIs. An ultrasound input device can detect the presence of an object on any surface with a sensor positioned on the reverse side of the surface material. The ultrasound input device enables creative designs without disruption of product skin or design material (e.g., material stack). Such an ultrasound input device can be implemented in various devices, e.g., input touch buttons, sliders, wheels, etc. The ultrasound input device can be deployed under surfaces comprising a variety of materials simplifying industrial designs and appearance. Furthermore, a grid of the ultrasound input device buttons can be implemented to create key pad, mouse pad, or touch input on any surface anywhere. An ultrasound input device allows touch input deployment of an HMI on surfaces comprising wood, leather, glass, plastic, metal (e.g., aluminum or steel), ceramic, plastic, a combination of one or more materials, etc.

In some cases, an ultrasound input device can comprise an ultrasound sensor coupled to a processor, such as an application specific integrated circuit (ASIC) to provide a fully integrated system on a chip (SOC) that can receive touch inputs via ultrasonic detection. In some cases, the ultrasound sensor and processor (e.g., ASIC) can be produced in a single die. A fully integrated SOC can provide numerous benefits, such as low costs due to mass production via a wafer-level process, low profile form factors, improved signal to noise ratios, and improved freedom for design of the sensor array.

In some cases, an ultrasound input device can comprise an ultrasounds sensor that comprises a micromachined ultrasonic transducer (MUT), such as a piezoelectric micromachined ultrasonic transducer (pMUT) or capacitive micromachined ultrasonic transducer (cMUT). Numerous benefits can be achieved by using a MUT in an ultrasound input device as disclosed herein, optionally as part of a fully integrated SOC. The use of a MUT can provide an improved energy transmission region since the MUT, due to its unique and predictable flexural mode shape, creates signal propagating normal to the transducer surface (longitudinal waves normal to the surface) more dominantly as compared to other types of waves travelling laterally. Since the predictable flexural mode shape of a MUT is far separated from other modes (e.g., bulk modes) in a large frequency range, it is also more immune to generate or receive other types of acoustic waves, such as shear waves or surface wave that might be travelling laterally or normal to the sensor surface. Thus, a MUT can achieve a more distinct transmission and sensing region on a surface material, such as the region directly perpendicular to the MUT through the surface material. Additionally, the use of MUTs can reduce or minimize the amount of power needed to operate the ultrasound input device. For example, MUTs can be used with low parasitic, low driving voltages, and with low device capacitance around three orders of magnitudes below that of traditional piezoelectric ceramic ultrasound transducers.

An ultrasound input device can detect patterns associated with touch inputs and distinguish between different types of touch inputs. Different types of touch inputs can vary between a finger press, a palm press, a tap, a touch and hold, or other such inputs. Each of the various types of touch inputs can have a recognizable and/or distinguishable pattern. In some cases, feedback from multiple sensors, such as multiple sensors arranged in an array, can be used to determine the type of touch input initiated. For example, a palm resting on an array of ultrasound input devices may register a recognizable pattern across multiple ultrasound input devices, and thus a processor coupled to the multiple ultrasound input devices can make a determination that the touch input is a palm rest and take appropriate action (e.g., reject the palm rest as a touch input or initiate an action based on the palm rest).

An ultrasound input device can detect patterns associated with touch inputs and distinguish between different users initiating the touch input. It has been found that different users of an ultrasound input device will often produce a recognizable and distinguishable signal upon initiating a touch input. For example, the signal measured from a touch input can change based on a user's finger, such as the moisture content of the finger, the size of the ridges and valleys of the fingerprint, and other mechanical properties of the individual finger. Additionally, some users may initiate a touch input in a repeatable fashion which can be used to identify the user. For example, a first user may usually rapidly tap the input device, whereas as second sensor may usually place their finger over the input device and then depress. As another example, different users might create different touch pressures which could also be detected by monitoring the amount of ultrasound signal change. Such factors, such as speed of the touch input and style of the touch input, can be used to facilitate identifying a user.

In some cases, determination of whether or not a touch event has occurred can be made by comparing the energy signals from the ultrasound transducers to a threshold value. In some cases, to improve detection of touch events and rejection of false positives, the threshold value can be dynamically or automatically updated. This adaptive threshold can be updated based on incoming energy signals, as well as any combination of historical threshold data and trigger data (e.g., information about whether or not a touch event has occurred). These inputs can help update a threshold update function, which can be used to filter the energy signal values into a new threshold value. Thus, certain changes to the energy signal which would not normally be indicative of a touch event (e.g., slow changes) can be tracked by the adaptive threshold, whereas changes indicative of a touch event (e.g., rapid changes) may not be tracked by the adaptive threshold, permitting the energy signal to dip below the threshold and thus indicate a touch event.

In some cases, determination of whether or not a touch event has occurred can be made by passing energy signals into a recurrent neural network that has been trained on training data. The recurrent neural network can convert the incoming energy signal into an output that is indicative of whether or not a touch event has occurred.

In some cases, determination of a state of the sensor (e.g., classification of a type of touch event, such as a press, tap, double tap, hold, or other such types) can be made by analyzing trigger data. In some cases, the trigger data can be passed as input into a recurrent neural network that has been trained on state-specific training data. This recurrent neural network can convert the incoming trigger data into an output that is indicative of the state of the sensor.

In some cases, an ultrasound input device can provide an improvement to the aesthetic features and reliability of touch input detection over capacitive and mechanical devices. A button can be implemented on a surface by defining the button area on a touch surface. An ultrasound input device can be embedded/placed behind the surface and thus limits environmental exposure including dust and moist, as well as reducing the manufacturing costs associated with creating special openings on the surface required for other sensors. An ultrasound input device can increase flexibility of button programmability options. For example, a user can define the functionality of the button through a system controller, which can be embedded on a shared printed circuit board (PCB) with the ultrasound input device. In some embodiments, the system controller can monitor user behaviors to improve machine/system preferences and performance. An ultrasound input device mechanically coupled to a surface but positioned away from view, such as underneath or behind an opaque surface, can be used to provide a hidden input not discernable or not easily discoverable to those who do not already know its location. For example, an ultrasound input device can be placed underneath a logo (e.g., on a laptop or another surface or device), behind a wall, or underneath a surface of a piece of furniture.

An ultrasound input device can be low power and/or battery powered, such as to operate for extended periods of time without requiring direct connection to a mains power source. An ultrasound input device can be or be incorporated into an internet of things (IOT) device capable of providing sensor data (e.g., a button press) to other devices on a local or remote network. In some cases, the use of MUTs can permit the ultrasound input device to operate with especially low power requirements. In some cases, an ultrasound input device that is a fully integrated SOC can operate with low power and/or can provide IOT functionality.

I. Device Overview

Embodiments of the invention are directed to an ultrasound input device to detect touch inputs. Specifically, embodiments are directed to an ultrasound input device comprising a transducer coupled to a material layer that provides a surface to receive touch input signals to a system. The ultrasound input device can be implemented using a variety of material layers including wood, leather, glass, plastic, metal (e.g., aluminum, steel, or others), stone, concrete, sheetrock, gypsum, paper, polymers, biological materials (e.g., tissues, such as skin), a combination of one or more materials, etc. The flexibility of material selection enables the use of an ultrasound input device in a variety of applications including front and side buttons of a mobile device; a steering wheel, infotainment unit, center console controls, mirrors, seats, door handles, windows, etc. of a vehicle; internet-of-things devices; medical devices such as bed controls, blood pressure measurement devices; input detection for robotics such as touch sensing for robotic fingers; and hidden input devices such as hidden within furniture or behind walls.

A. Detecting a Touch Input Using Ultrasonic Signals

Figure 1:
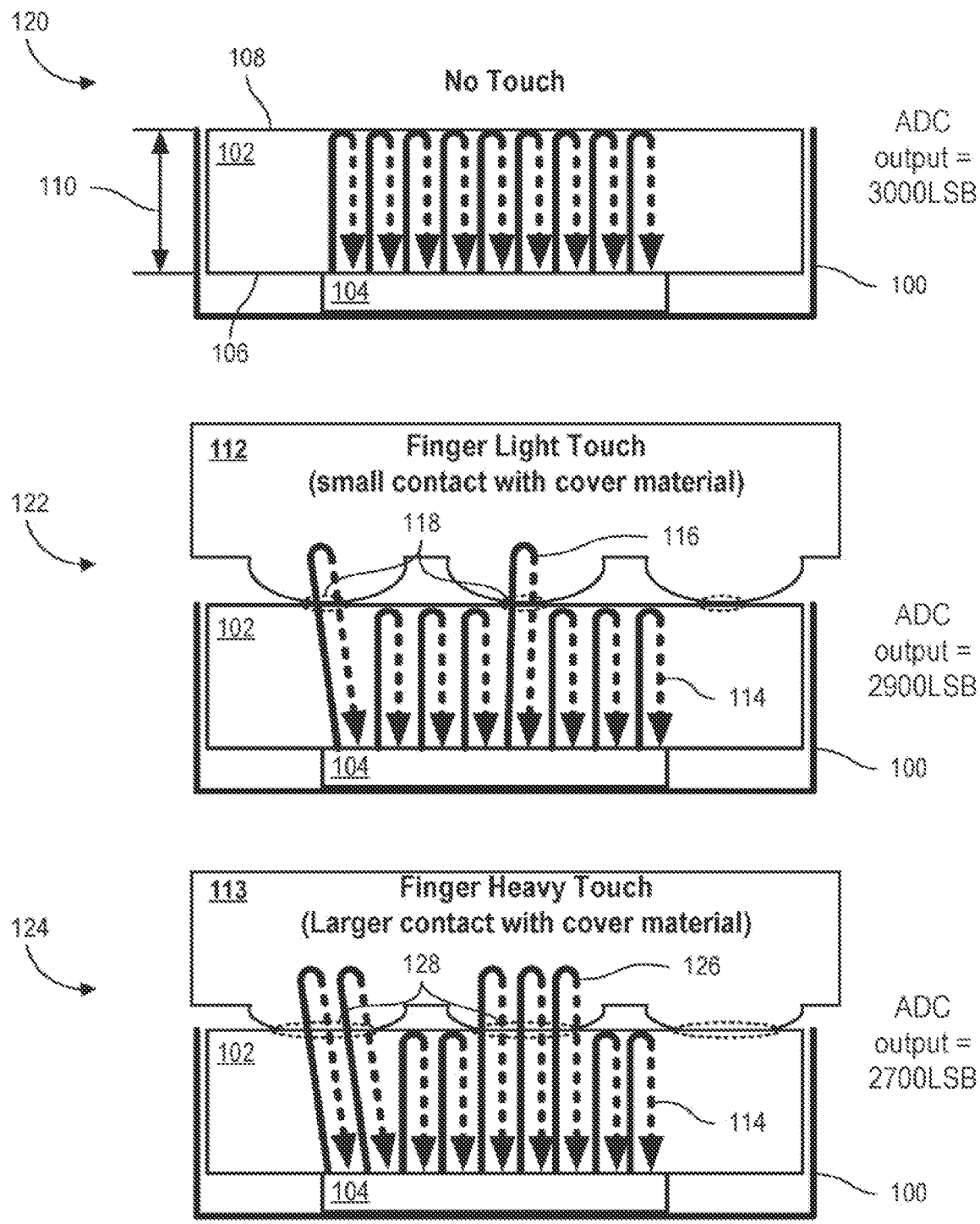
FIG. 1 is a schematic diagram depicting the effect of touch force on the reflected ultrasound signals in an ultrasound input system according to certain aspects of the present disclosure.

FIG. 1 is a schematic diagram depicting the effect of touch on the reflected ultrasound signals in an ultrasound input system according to certain aspects of the present disclosure. The ultrasound input can include a transducer 104 coupled to a material layer 102. The material layer 102 can be known as a stack and can incorporate one or more sublayers of one or more materials. For example, a stack can be a single sheet of glass, a piece of drywall, a laminated set of plastics and glasses, or a plastic steering wheel wrapped in leather, among others. The material layer 102 has a first (interior) surface 106 and a second (exterior) surface 108. The material layer can be characterized by a distance 110 between the first surface 106 and the second surface 108. The material layer 102 can be a cover material of a larger device that integrates an ultrasound input device. In some embodiments, the material layer 102 can form a body or a portion of the body of a device. In these embodiments, the first surface 106 can form an interior surface of the body and the second surface 108 can form the exterior surface of the body. Second surface 108 can be considered exterior as it is exposed to the environment. First surface 106 can be considered interior in that it is not the surface that contact is to be detected or in that it is the surface where the transducer 104 is acoustically coupled to the material layer 102. FIG. 1 shows the ultrasound input device with no touch 120, the ultrasound input device with a light touch 122, and the ultrasound input device with a heavy touch 124.

This touch sensor is triggered based on material acoustic properties of touch surface (material layer 102) and the input object 112. Detection of the light touch 122 is dependent on extent of reflected ultrasonic signals 114 in the material layer 102 versus absorbed ultrasonic signals 116 transmitted through the second surface 108 of the material layer 102 into the input object 112. As used herein, a reflected ultrasonic signal (e.g., reflected ultrasonic signals 114) can refer to a signal that has reflected off the second surface 108 of the material layer 102, and an absorbed ultrasonic signal (e.g., absorbed ultrasonic signals 116) can refer to a signal of which at least a portion of the signal has been absorbed by an input object 112 (e.g., a finger) contacting the second surface 108 of the material layer 102. The contact (e.g., based on pressure) of the 20 input object 112 on the touch surface defines one or more contact areas 118 and an amount of reflection. The material layers 102 can be a single layer or can be comprised of multiple layers of materials with different properties. For example, in some implementations, the material layer 102 can be a uniform and isotropic material. In other implementations, the material layer 102 can be a composite material layer comprised of multiple layers of different materials. Thresholds can be set based on the contact area 118 of touch for triggering the button and impedance difference between input object 112 and material layer 102, as well as geometric and acoustic properties of the whole material stack of the material layer 102.

The size of the contact areas 118 and space between the contact areas 118 can be indicative of the size and spacing of the finger's ridges, as well as the size and spacing of the valleys of the finger's fingerprint. Certain changes in the size and/or spacing between contact areas 118 can be indicative of different fingers contacting the material layer 102. For example, a young individual may have smaller valleys (e.g., a smaller distance between contact areas 118) than an older individual. In some cases, the detected size and/or spacing between contact areas 118 can be used to detect or make an inference as to the user contacting the material layer 102. Such an inference can be used to apply customizations (e.g., have a touch event result in different actions for different users or have different sensing thresholds for different users), test for permissions (e.g., allow an action only if a recognized user is initiating the touch event or the user touches the surface in a certain way, identical to a "passcode"), or perform other rule-based actions using the inference.

The heavy touch 124 can be distinguished from the light touch 122 by determining that fewer reflected signals or fewer non-attenuated signal are received by the transducer 104 due to an increased number of absorbed ultrasonic signals 126. The ultrasound input device 100 and input object 113 (e.g., a finger) will have a larger contact area 128 if the pressure of the touch is increased, e.g., as the contacting surface flattens. As shown in FIG. 1, the larger contact area 128 increases the number of absorbed ultrasonic signals 126 passing through the second surface 108 of the material layer 102 into the input object 113. In the case of a user's finger, the larger contact area 128 can be indicative of a ridge of the user's finger being flattened against the second surface 108 of the material layer 102. In some cases, with the input object 113 is not a finger or is a finger covered by another material, the larger contact area 128 can be a result of textured elements of the input object 113 being flattened against the second surface 108 of the material layer 102.

Figure 2:
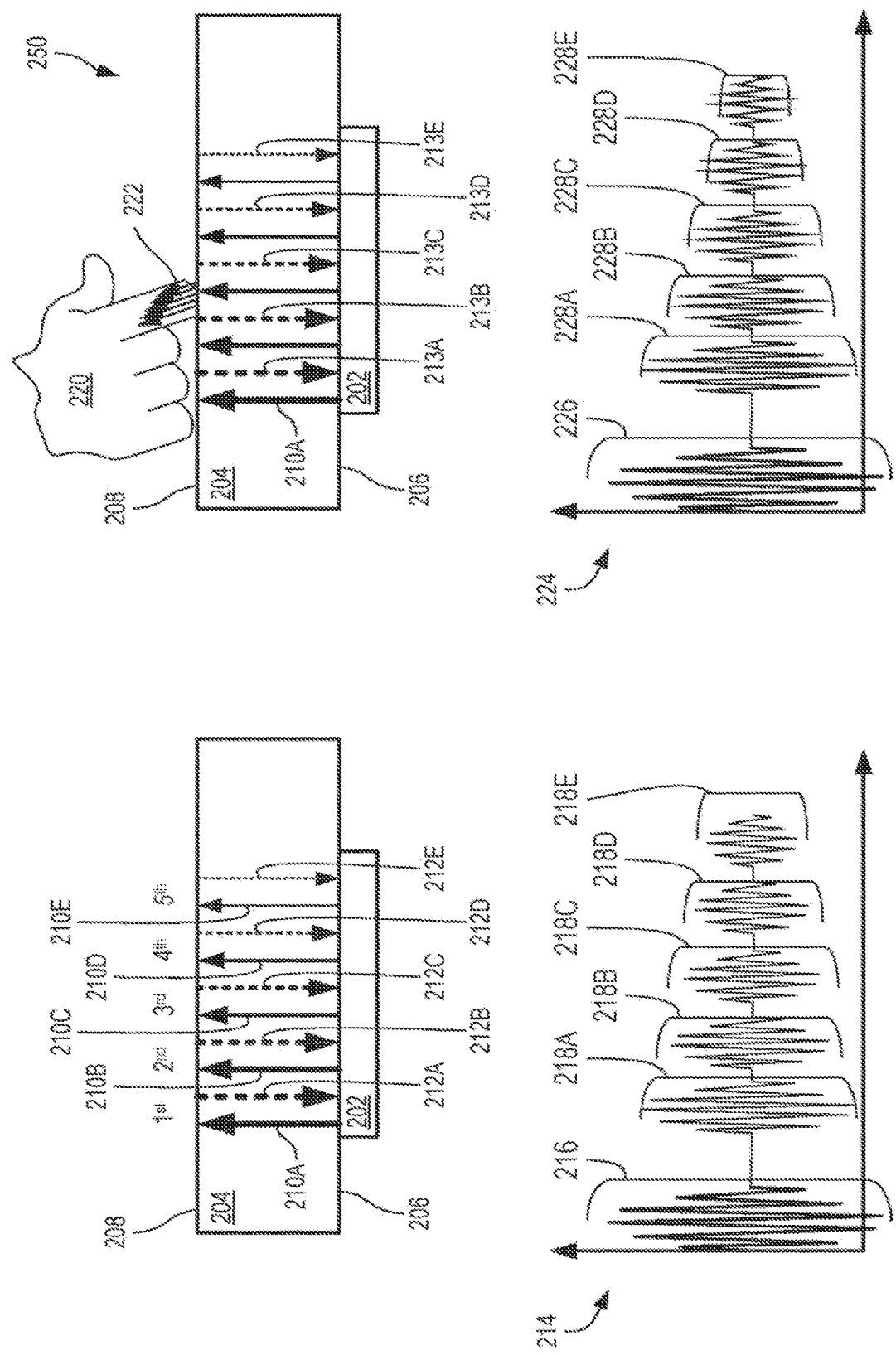
FIG. 2 is a schematic diagram depicting an ultrasound input system in an non-contacted state and a contacted state according to certain aspects of the present disclosure.

FIG. 2 is a schematic diagram depicting an ultrasound input system in a non-contacted state and a contacted state according to certain aspects of the present disclosure. FIG. 2 shows the ultrasound input device with no touch 200 (e.g., a non-contacted state) and with a touch 250 (e.g., a contacted state). The ultrasound input device includes a transducer 202 coupled to the material layer 204. In this embodiment, the material layer 204 is shown as aluminum, but can be any material (e.g., glass, wood, leather, plastic, etc., or a composite material formed of a combination of materials). The transducer 202 is coupled to a first (interior) surface 206 of the material layer 204. A second (exterior) surface 208 of the material layer 204 is in contact with the air or some other environment like liquid acoustic impedance different than human finger.

For the ultrasound input device with no touch 200, the transducer 202 emits an ultrasonic signal 210A directed into the material layer 204 and toward the second surface 208. Air has an acoustic impedance of approximately zero and causes the second surface 208 to reflect a reflected ultrasonic signal 212A with close to 100% of the emitted ultrasonic signal (e.g., at or more than 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.81%, 99.82%, 99.83%, 99.84%, 99.85%, 99.86%, 99.87%, 99.88%, 99.89%, 99.9%, 99.91%, 99.92%, 99.93%, 99.94%, 99.95%, 99.96%, 99.97%, 99.98%, and/or 99.99%.) The reflected ultrasonic signal 212A can itself be reflected off the first surface 206 to generate a reflected-emission signal 210б, which can be reflected off the second surface 208 to result in a second reflected ultrasonic signal 212B. In the case of a composite material stack for 204, the signal reflected from 208 can reflect multiple times internally within the composite stack itself and such echo chain can be sensed by the transducer 202. Analyzing the received echo-chain formed from the reflections between 206 and 208 and/or internal reflections within the multi-layers of 204, in case of a composite material, could be used directly to identify the material stack of 204 and/or the environment (e.g., air). Such information could be used solely to identify the acoustic and/or geometric properties of a stack or used as extra information for sensor calibration and threshold tuning of the detection algorithm. As depicted in FIG. 2, four reflected ultrasonic signals 212A, 212B, 212C, 212D generate four respective reflected-emission signals 210б, 210C, 210D, 210E. Any number of reflected ultrasonic signals 212A, 212B, 212C, 212D, 212E and reflected-emission signals 210б, 210C, 210D, 210E can result from an initial emitted ultrasonic signal 210A until the signals become too attenuated to be reflected and/or detected. Plot 214 shows a first amplitude 216 corresponding to the emitted ultrasonic signal 210A and a set of subsequent amplitudes 218A, 218B, 218C, 218D, 218E corresponding to the reflected ultrasonic signals 212A, 212B, 212C, 212D, 212E. The first subsequent amplitude 218A is smaller than the first amplitude 216 due to losses in the material layer 204. Each of the remaining subsequent amplitudes 218B, 218C, 218D, 218E is smaller than the amplitude of the previous subsequent amplitude 218A, 218B, 218C, 218D due to losses in the material layer 204.

In some cases, the frequency or frequencies selected for use with the ultrasound input device can be selected to achieve a small or minimal attenuation in a non-contacted state, thus achieving a large or maximum number of reflected ultrasonic signals. In some cases, the set of reflected ultrasonic signals 212A, 212B, 212C, 212D, 212E stemming from a single emitted ultrasonic signal 210A can be referred to as a train of reflected signals. For illustrative purposes, the various reflected ultrasonic signals 212A, 212B, 212C, 212D, 212E and reflected-emission signals 210B, 210C, 210D, 210E are depicted spaced apart from left to right in FIG. 2, however it will be understood that these signals are temporally separated and may not necessarily be spatially separated. The echo signals might be analyzed separately and/or combined or integrated with one another as the detection metric.

For the ultrasound input device with a touch 250, an input object 220, in this case a finger, is in contact with the second surface 208 of the material layer 204. Local reflection loss from the area contacted by the object, e.g., finger ridge, depends on how much the touch input medium versus the input object differ in terms of acoustic impedance. For example, reflection loss (dB) can be represented as 20 log 10

$$\left(\text{abs}\left(\frac{Z2-Z1}{Z2+Z1}\right)\right),$$

where Z1 is the impedance of the material layer 204 and Z2 is the impedance of the input object 220. Once an input object 220 is in contact with material layer 204, the emitted ultrasonic signal 210A is divided into two parts. The first part, the echo, is a reflected ultrasonic signal 213A and is reflected back towards the transducer. The second part 222 is the transmitted signal which penetrates into the input object 220. The reflected ultrasonic signal 213A can itself be reflected off the first surface 206 to generate a reflected-emission signal. The reflected-emission signal can itself be divided into two parts, one of which is a second reflected ultrasonic signal 212B and another of which is the second part 222 that penetrates into the input object 220. As depicted in FIG. 2, four reflected ultrasonic signals 213A, 213B, 213C, 213D generate four respective reflected-emission signals. Any number of reflected ultrasonic signals 212A, 212B, 212C, 212D, 212E and reflected-emission signals can result from an initial emitted ultrasonic signal 210A until the signals become too attenuated to be reflected and/or detected.

As shown by plot 224, a first amplitude 226 corresponds to the emitted ultrasonic signal 210A. The first subsequent amplitude 228A corresponding to reflected ultrasonic signal 213A is reduced compared to the no touch ultrasound input device due to the second part 222 penetrating the input object 220. Each of the remaining subsequent amplitudes 228B, 228C, 228D, 228E is smaller than the amplitude of the previous subsequent amplitude 228A, 228B, 228C, 228D due to losses in the material layer 204 and internal multipath reflections in case of a composite material stack for 204. For illustrative purposes, plot 224 depicts the subsequent amplitudes 228A, 228B, 228C, 228D, 228E in solid line overlaid with the corresponding subsequent amplitudes 218A, 218B, 218C, 218D, 218E in dotted lines. The amount of overall attenuation of the subsequent amplitudes 228A, 228B, 228C, 228D, 228E of the ultrasound input device in a contacted state may be greater than that of the subsequent amplitudes 218A, 218B, 218C, 218D, 218E of the ultrasound device in a non-contacted state. Additionally, the amount of attenuation between each of the subsequent amplitudes 228A, 228B, 228C, 228D, 228E of the ultrasound input device in a contacted state may be greater than that of the subsequent amplitudes 218A, 218B, 218C, 218D, 218E of the ultrasound device in a non-contacted state.

Of note, the subsequent amplitudes 228A, 228B, 228C, 228D, 228E from plot 224 that are associated with a touch event attenuate faster than the corresponding subsequent amplitudes 218A, 218B, 218C, 218D, 218E from plot 214 that are associated with no touch event. In other words, the contrast between subsequent amplitudes of a touch event and subsequent amplitudes of a no touch event is greater with each subsequent reflection number n. In some cases, the ratio of a the n-th subsequent amplitude associated with no touch event to the n-th subsequent amplitude associated with a touch event can be $\Gamma^n:(1-\Gamma^n)$ where $\Gamma$ is the percentage of the signal reflected back from the second surface 208. For example, the ratio of subsequent amplitude 218A to subsequent amplitude 228A may be 100:90; the ratio of subsequent amplitude 218B to subsequent amplitude 228B may be 100:81; the ratio of subsequent amplitude 218C to subsequent amplitude 228C may be 100:72; the ratio of subsequent amplitude 218D to subsequent amplitude 228D may be 100:63; and the ratio of subsequent amplitude 218E to subsequent amplitude 228E may be 100:54.

B. Ultrasound Touch Input Device

Figure 3:
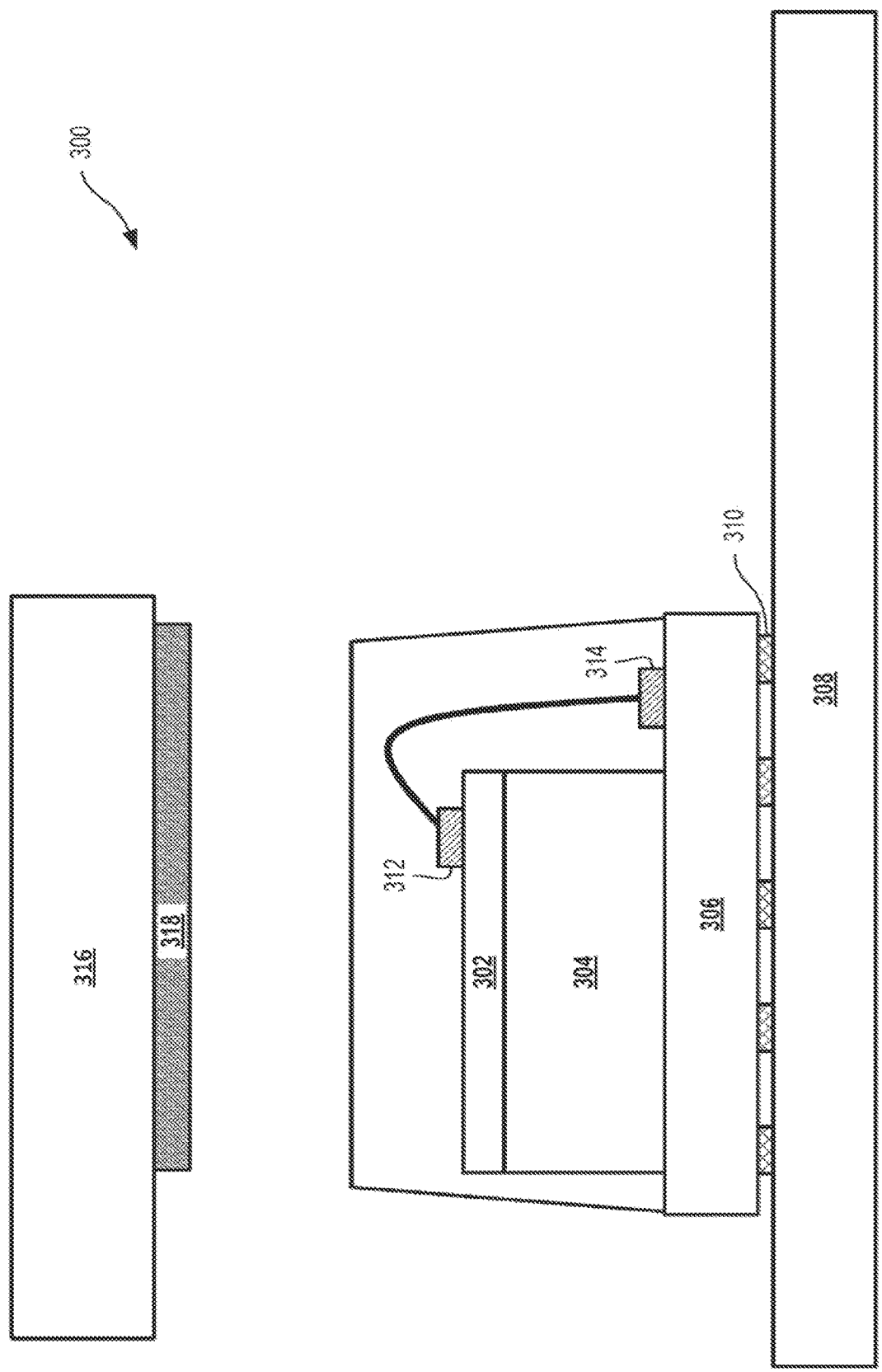
FIG. 3 is a schematic diagram depicting an ultrasound input device according to certain aspects of the present disclosure.

FIG. 3 shows an ultrasound input device according to certain aspects of the present disclosure. Ultrasound input device 300 can be attached to any surface to detect touch inputs. The ultrasound input device 300 can include a sensor 302, such as a piezoelectric micromachined ultrasonic transducer (PMUT). A PMUT transducer is a piezoelectric ultrasonic transducer that comprises a thin membrane coupled to a thin piezoelectric film to induce and/or sense ultrasonic signals. The sensor 302 can be integrated on an application-specific integrated circuit (ASIC), such as CMOS (complementary metal-oxide-semiconductor) ASIC 304 (all-in-one) and formed on a base 306. The ASIC 304 can include electrical circuits and/or modules usable to perform various processes as disclosed herein, such as various analog and/or digital processing as described with reference to at least FIGS. 25-41. For example, ASIC 304 can be used to drive sensor 302, detect reflected ultrasonic signals using sensor 302, and determine amplitudes associated with the reflected ultrasonic signals (e.g., using various analog technologies such as accumulation and integration). In some cases, ASIC 304 can optionally determine a threshold value to which the determined amplitudes can be compared to make a determination about whether or not a touch event has occurred, in which case the ASIC 304 can output a signal associated with the occurrence of the touch event.

In some cases, circuitry of the ASIC 304 can perform certain process in analog, such as signal rectification, integration, mixing, modification, accumulation, and the like. As used herein, analog circuitry can include any circuitry capable of performing an action (e.g., rectification, integration, and the like) on an analog signal without first digitizing the analog signal. In an example, ASIC 304 can include analog circuitry capable of taking a received ultrasonic signal, rectifying the signal, and integrating at least a portion of the rectified signal to provide an integrated signal, such as described with reference to FIG. 26. In another example, ASIC 304 can include analog circuitry capable of taking a received ultrasonic signal, calculating absolute values of the signal, and accumulating the absolute values to provide an accumulated signal, such as described with reference to FIG. 28. In another example, ASIC 304 can include analog circuitry capable of taking a received ultrasonic signal, squaring the signal through self-mixing, and integrating the squared signal to provide an integrated signal, such as described with reference to FIG. 29.

In some cases, a different style of ultrasonic transducer can be used for sensor 302 instead of a PMUT sensor. In some cases, the ultrasonic sensor can be formed using a deposited layer of piezoelectric material (e.g., aluminum nitride, lead zirconate titanate (PZT), or polyvinylidene fluoride (PVDF)). In some cases, the ultrasonic sensor can be a capacitive micromachined ultrasonic transducer (CMUT). In some cases, the ultrasonic sensor can be a resonator array of piezoelectric devices (e.g., piezoelectric cantilevers or piezoelectric pillars).

The base 306 can be bonded 310 to a flexible printed circuit/printed circuit board 308 (FPC/PCB) of a larger integrated device such as a mobile phone. In some embodiments, a contact area 312 on the sensor 302 can be bonded to a base contact 314. As shown, the dimensions of the ultrasound input device 300 can be equal to or less than 1.5 mm×1.5 mm×0.5 mm in size, although other sizes can be used. In some cases, the FPC/PCB 308 to which the base 306 is attached can receive information associated with the amplitude of detected reflected ultrasonic signals and perform some of the functionality disclosed herein, such as determining threshold values and/or determining when a touch event has occurred. However, in some cases, the FPC/PCB 308 simply receives a signal associated with occurrence of a touch event, and thus does not need to perform further analysis of amplitudes of detected reflected ultrasonic signals to perform actions based on a touch event.

The ASIC 304 and the sensor 302 integration enables small form factor that leads placement of buttons or other functionality in many space-limited applications. For example, smartphone side mechanical buttons can easily be replaced with the ultrasound input device 300 under casing. To implement a touch interface of a system or other suitable functionality, the ultrasound input device 300 can be bonded to a surface 316 using an adhesive 318.

Figure 4:
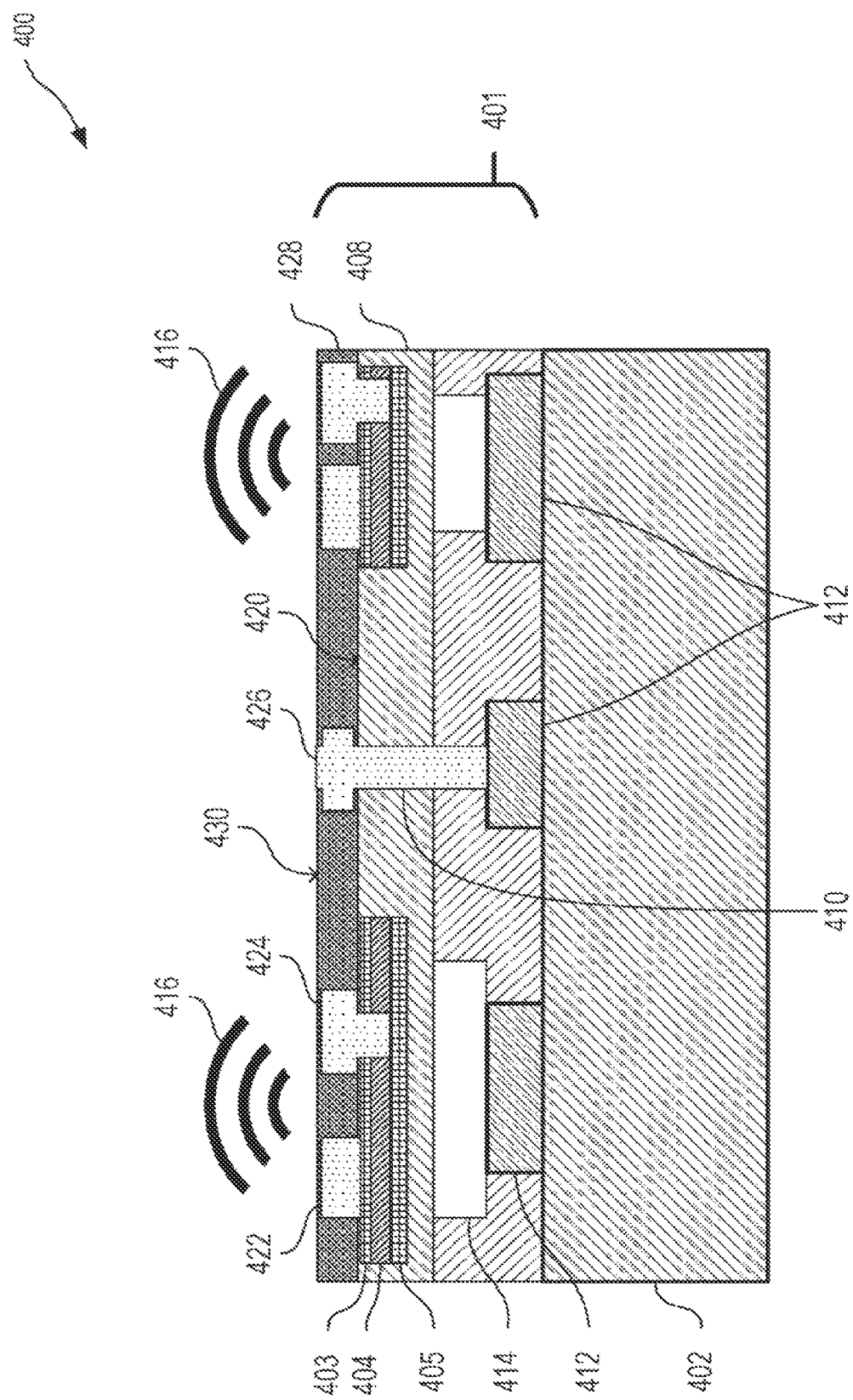
FIG. 4 is a cross-sectional view of two piezoelectric micromachined ultrasonic transducers bonded to a CMOS wafer according to certain aspects of the present disclosure.

FIG. 4 is a cross-sectional view of two piezoelectric micromachined ultrasonic transducers integrated to a CMOS wafer according to certain aspects of the present disclosure. Device 400 shows a cross-sectional view of two PMUTs bonded to a CMOS wafer 402 that can be used in an ultrasound input device. Each PMUT may be formed on a MEMS wafer 401 that is bonded to a CMOS wafer 402. In this way, PMUTs may be coupled to the requisite processing electronics of the CMOS wafer 402. It will be understood that each PMUT may have an active piezoelectric layer 404 along with a first electrode 403 and a second electrode 405. The first electrode 403 and the second electrode 405 can be electrically coupled to the piezoelectric layer 404.

In some embodiments, the PMUTs may include a first contact 422 electrically coupled to the first electrode 403, a second contact 424 electrically coupled to the second electrode 405, and a third electrode 426 electrically coupled to the CMOS wafer 402. Applying alternating voltage through the first electrode 403 and the second electrode 405 can cause movement (e.g., flexural motion) of the piezoelectric layer 404, which can result in generated sound waves. Likewise, received sound waves that induce movement in the piezoelectric layer 404 can be sensed as changing voltages across the first electrode 403 and second electrode 405. One or more vias (vertical interconnect access) 410 may be formed to in the PMUTs. Each of the contacts may be wire bonded to an electronics board. In some embodiments, PMUTs may include a passivation layer 428 formed on a surface 420 and the contacts. The surface 420 or an adhesive coupling surface 430 on the surface of the passivation layer 428 may be coupled to a material layer of an ultrasound input device.

In some embodiments, the passive electrical layer 408 may comprise $SiO_2$ or any other suitable passive layer. The active piezoelectric layer 404 may be approximately 1 μm thick Aluminum Nitride, and the passive elastic layer may be approximately 1 μm thick single-crystal Silicon, although other sizes and materials may be used. In some embodiments, the active piezoelectric layer 404 may be Scandium-doped Aluminum Nitride. Alternatively, the active piezoelectric layer 404 may be another suitable piezoelectric ceramic such as PZT. Both the top and bottom electrodes 406 may comprise Molybdenum. In order to bond the PMUTs to the top metal 412 of CMOS wafer 402, fusion bonding via thru-silicon-via (TSV) as shown at via 410 may be used. This methodology results in significant parasitic reduction which in turn results in improved signal integrity and lower power consumption.

In some embodiments, cavity 414 may be formed with a vacuum or near vacuum to isolate the transducer from the processing electronics in the CMOS wafer 402. The sound generated by the PMUTs will not travel through the near vacuum of cavity 414 minimizing reflection and interference that may be caused by material interfaces with the CMOS wafer 402. The cavity 414 may cause ultrasound 416 to travel away from the PMUTs. Ultrasound 416 may travel through the adhesive coupling surface 430 and into the material layer of the ultrasound input device. The material layer may reflect ultrasound 416 causing a return echo to reflect back to the PMUTs. The return echo travels through the adhesive coupling interface and is received by the PMUTs.

In some embodiments, the CMOS wafer 402 may be an application specific integrated circuit (ASIC) that includes one or more devices necessary to drive the transducer. The drive voltage for an array of PMUTs may be less than 4 volts. In some cases, the drive voltage may be less than 1.8 volts. In some cases, the drive voltage may be at or less than 4, 3.5, 3, 2.5, 2, 1.9, 1.8, 1.7, 1.6, or 1.5 volts. The ASIC can be manufactured to meet size requirements associated with the size of an associated PMUT. In some embodiments, the ASIC may include one or more modules to receive measured signals. The ASIC may be configured to further process the signal. For example, the ASIC may include one or more rectifiers to generate an absolute value signal by taking the absolute value of the received signals, which may be an alternating current. The ASIC may also include an integrator and analog to digital converters (ADCs) to convert the reflected ultrasonic signal to a digital representation of the reflected signal. The integration of ASIC and PMUTs further allows for embedding gain amplifiers and ADC in an ASIC and eliminating the standalone ADC-sensor controller chip. This opens up space on associated circuit boards and reduces touch input sensor implementation cost. In some embodiments, the ASIC may transmit the digital signal to at least one or more of a memory, a processor, and a remote device. In other embodiments, the ASIC may include one or more signal processing modules.

The PMUT arrays can be compatible with CMOS semiconductor processes. In some embodiments, PMUT materials and dimensions can be compliant with Semiconductor Equipment and Materials International (SEMI) standard specifications. Because PMUTs can be compliant with SEMI specifications, the transducer arrays can be used with existing CMOS semiconductor fabrication tools and methods. For example, photolithography may be used to form one or more PMUTs. In contrast, current piezoelectric ultrasound transducer arrays are formed using a die saw that cannot match the precision of photolithography. As a result, PMUTs can be smaller, operate at lower voltages, and have lower parasitics.

C. Integration with Circuit Board

Figure 5:
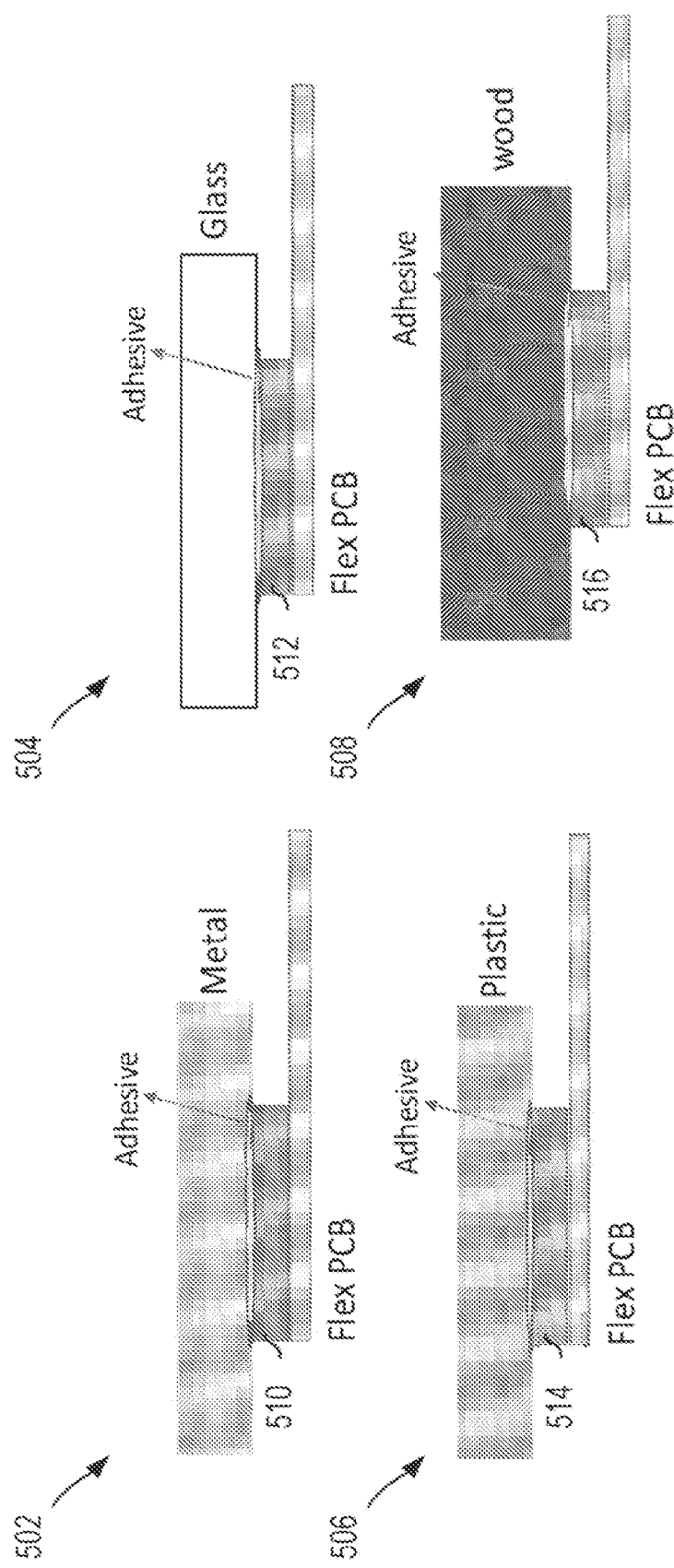
FIG. 5 is a set of schematic diagrams depicting an ultrasound input device coupled to a variety of surfaces according to certain aspects of the present disclosure.

FIG. 5 is a set of schematic diagrams 502, 504, 506, 508 depicting an ultrasound input device 510, 512, 514, 516 coupled to a variety of surfaces according to certain aspects of the present disclosure. Diagram 502 depicts an ultrasound input device 510 coupled to a metal surface via an adhesive. Diagram 504 depicts an ultrasound input device 512 coupled to a glass surface via an adhesive. Diagram 506 depicts an ultrasound input device 514 coupled to a plastic surface via an adhesive. Diagram 508 depicts an ultrasound input device 516 coupled to a wooden surface via an adhesive. Any suitable material can be used as a sensing surface, such as non-porous materials or semi-porous materials. Porous materials may be useable for sensing surfaces, although better results can be achieved with smaller pores, higher density, and more consistent density.

Additionally, an ultrasound input device 510, 512, 514, 516 can be coupled to a flexible PCB, such as on a side opposite where the ultrasound input device 510, 512, 514, 516 is coupled to the sensing surface. The ultrasound input device 510, 512, 514, 516 can act as a mechanical coupler between the sensing surface and the PCB, with the PCB not being elsewhere attached to the sensing surface, although that need not always be the case. In some cases, a flexible PCB can be used.

The use of a PCB can permit additional components to be integrated with the ultrasound input device 510, 512, 514, 516 to extend the functionality of the ultrasound input device 510, 512, 514, 516, such as described with reference to FIG. 6.

Figure 6:
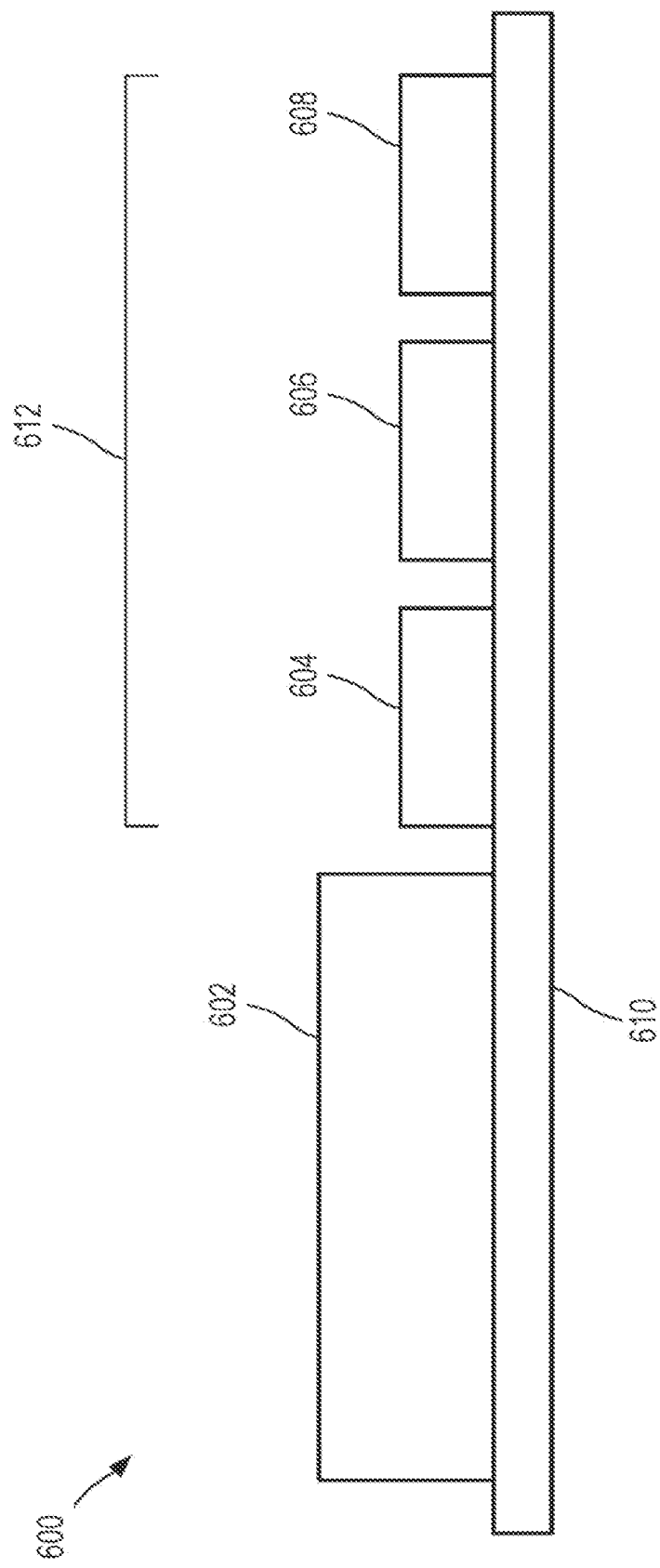
FIG. 6 is a schematic side view diagram depicting an ultrasound input system with shared-board components according to certain aspects of the present disclosure.

FIG. 6 is a schematic side view diagram depicting an ultrasound input system 600 with shared-board components according to certain aspects of the present disclosure. The ultrasound input system 600 can include an ultrasound input device 602 electrically coupled to a circuit board 610, and any number of shared-board components 612. Each shared-board component can be electrically coupled to the circuit board 610. In some cases, the ultrasound input device 602 can be mechanically coupled to the circuit board 610, such as using electrical couplings (e.g., solder points) or other mechanical supports. In some cases, one, some, or all of the shared-board components 612 can be mechanically coupled to the circuit board 610. In some cases, the circuit board can be a printed circuit board, such as a flexible PCB, although that need not always be the case.

The entire ultrasound input system 600 can be contained within a single, shared housing, within multiple housing, or may not be contained within a housing. In some cases, two or more of the shared-board components 612 can be contained within a single housing, with or without the ultrasound input device 602. In some cases, all of the shared-board components 612 can be located on the same side of the circuit board 610 as the ultrasound input device 602, although that need not always be the case. When located on the same side as the ultrasound input device 602, the shared-board components 612 can be selected or designed to have a height that is less than the height of the ultrasound input device 602.

In some cases, an ultrasound input system 600 can comprise a power component 604. The power component 604 can provide power to the ultrasound input device 602 and/or any of the other shared-board components 612. Examples of power components 604 include batteries, transformers (e.g., transformers coupled to a mains line), capacitors (e.g., ultra-capacitors), solar cells, fuel cells, and/or any other suitable source of power.

In some cases, an ultrasound input system 600 can comprise a processor 606. The processor 606 can enable various processing functions to be performed within the ultrasound input system 600 based on signals received from the ultrasound input device 602. Examples of suitable processors 606 include microcontrollers, central processing units, or other suitable devices. The processor 606 can be further coupled to memory to access processing routines, access stored data, and/or store data.

In some cases, an ultrasound input system 600 can comprise a communication component 608. The communication component 608 can interact with the ultrasound input device 602 and/or a processor 606 to send or receive signals to or from an external device. Examples of suitable communication components 608 include wireless radios (e.g., Bluetooth, WiFi, Zigbee, Z-wave, or others), audio devices (e.g., microphones or speakers), visual devices (e.g., cameras, lights, or displays), tactile devices (e.g., haptic feedback devices such as motors and vibrators), or other devices suitable for sending or receiving signals.

In some cases, an ultrasound input system 600 can comprise shared-board components 612 that include a power component 604, a processor 606, and a communication component 608. In some cases, an ultrasound input system 600 can include more or fewer shared-board components, including different types of components.

D. Example System Setup

Figure 7:
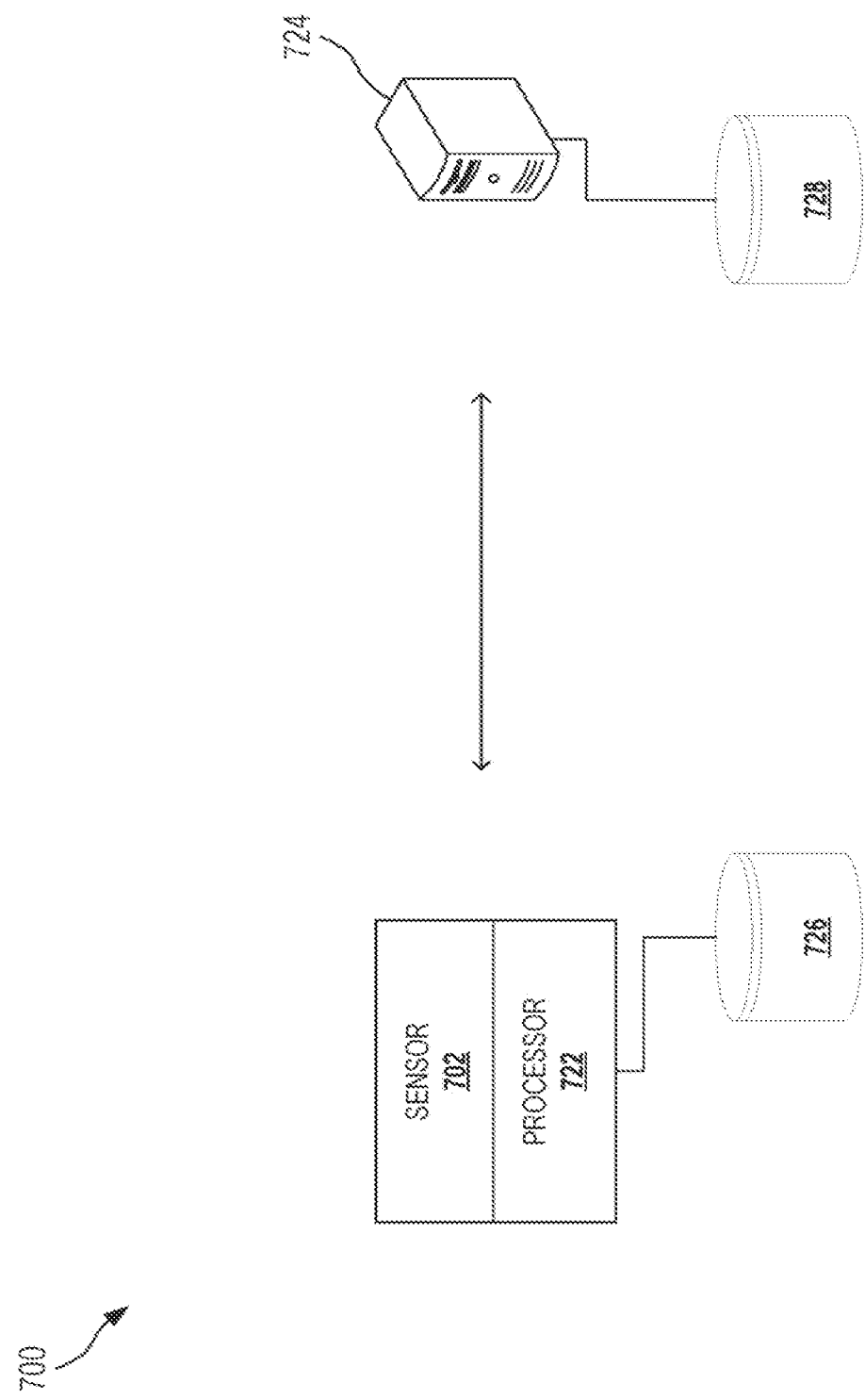
FIG. 7 is a schematic diagram depicting an example ultrasound input system according to certain aspects of the present disclosure.

FIG. 7 is a schematic diagram depicting an example ultrasound input system 700 according to certain aspects of the present disclosure. The ultrasound input system 700 can include an ultrasound sensor 702 and a processor 722. The ultrasound sensor 702 can be the same as transducer 104 of FIG. 1. Processor 722 can be electrically coupled to ultrasound sensor 702 and can be optionally mechanically coupled to the ultrasound sensor 702. In some cases, processor 722 and ultrasound sensor 702 can be integrated into the same package, although that need not always be the case. Processor 722 can perform certain functions as disclosed herein, such as acquiring a signal from the ultrasound sensor 702 and/or detecting touch events. In some cases, an optional computing device 724 can be coupled to processor 722 to exchange information, such as information related to touch events, information related to signals from the ultrasound sensor 702, or information related to how the processor 722 interprets signal information. Data store 726 can be coupled to processor 722 for storing information, such as information related to how the processor 722 interprets signal information. In some cases, optional computing device 724 can be coupled to a data store 728 which can store information, such as information related to how signal information from an ultrasound sensor 702 can be interpreted to determine a touch event. Computing device 724 can be any suitable computing device, such as a desktop computer, a laptop computer, a server, a smartphone, a tablet, or any other suitable computing device. Computing device 724 can be coupled to processor 722 through a wired or wireless connection. Computing device 724 can be coupled to processor 722 through a local or remote connection.

In some cases, processor 722 can be an application specific integrated circuit (ASIC). In some cases, the ultrasound sensor 702 can be a MUT. The processor 722 can be any suitable circuit designed to enable the driving and receiving of the one or more transducers of the sensor 502. The processor 722 can drive transducers to send and receive ultrasonic signals to achieve the touch sensing capabilities described herein. In some cases, the processor 722 can output measured energy levels (e.g., energy signals) associated with the sensor 502, which can later be used to determine if a touch event has occurred. In some cases, the processor 722 can output a touch signal that is indicative of occurrence of a touch event. In such cases, the processor 722 can perform the necessary processing to determine if a touch event has occurred. In some cases, the processor 722 can further perform the necessary processing to determine additional information associated with the touch event, such as whether the touch event was initiated by a bare finger or a gloved finger, whether the touch event was initiated by a first user or second user, or other aspects of the touch event. Such additional information can take the form of inferences and can have varying degrees of confidence, although that need not always be the case. In some case, the processor 722 can have the capability to process the signal and identify the type of pattern the user is inputting (e.g. single-tap, double-tap, hold, etc.). Such capability in the processor 722 could be enabled by hardware processing blocks or could be written in the chip memory as part of the firmware. In some cases, the processor 722 might have the capability to self-calibrate and tune its parameters for signal identification and pattern recognition.

In some cases, processor 722 can send energy signals and/or touch signals to a computing device 724. Computing device 724 can perform the necessary processing to determine if a touch event has occurred and/or additional information associated with a touch event, such as whether the touch event was initiated by a bare finger or a gloved finger, whether the touch event was initiated by a first user or second user, or other aspects of the touch event.

In some cases, data store 726 can store information related to how processor 722 determines whether a touch event has occurred or determines other information associated with a touch event. In some cases, data store 726 can store model information used by processor 722 to process energy signals and determine whether a touch event has occurred. In some cases, model information stored in data store 726 can be provided by and/or updated using computing device 724.

II. Fully Integrated System on a Chip for Ultrasonic Touch Input

Embodiments of the disclosure allow for a fully integrated system on a chip for ultrasonic touch input. For example, an integrated ultrasound input device can include an ultrasound sensor and an application specific integrated circuit (ASIC). An integrated ultrasound input device wafer can be created using various production techniques to allow for a low profile size as well as improved resistance to noise and lower power.

A. Integrated Ultrasound Input Device Overview

Figure 8:
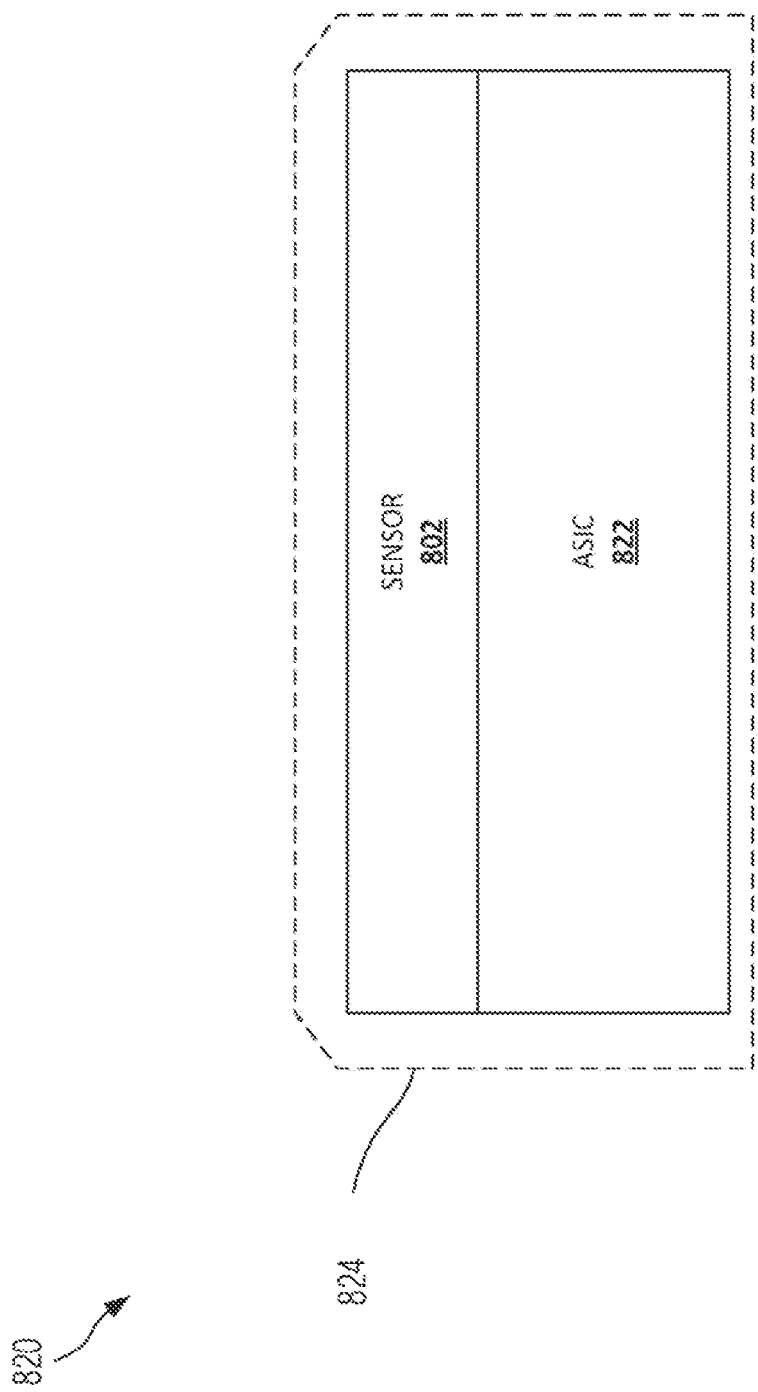
FIG. 8 is a schematic side view diagram depicting an integrated ultrasound input device with an ultrasound sensor and an ASIC according to certain aspects of the present disclosure.

FIG. 8 is a schematic side view diagram depicting an integrated ultrasound input device 820 with an ultrasound sensor 802 and an application specific integrated circuit (ASIC) 822 according to certain aspects of the present disclosure. The ultrasound sensor 802 can be composed of one or more ultrasound transducers disposed in an array. In some cases, the ultrasound transducers are MUTs.

The ASIC 822 can be any suitable circuit designed to enable the driving and receiving of the one or more transducers of the ultrasound sensor 802. The ASIC 822 can drive transducers to send and receive ultrasonic signals to achieve the touch sensing capabilities described herein. In some cases, the ASIC 822 can output measured energy levels associated with the ultrasound sensor 802, which can later be used to determine if a touch event has occurred. In some cases, the ASIC 822 can output a touch signal that is indicative of occurrence of a touch event. In such cases, the ASIC 822 can perform the necessary processing to determine if a touch event has occurred. In some cases, the ASIC 822 can further perform the necessary processing to determine additional information associated with the touch event, such as whether the touch event was initiated by a bare finger or a gloved finger, whether the touch event was initiated by a first user or second user, or other aspects of the touch event. Such additional information can take the form of inferences and can have varying degrees of confidence, although that need not always be the case. In some case, the ASIC 822 can have the capability to process the signal and identify the type of pattern the user is inputting (e.g., single-tap, double tap, hold, etc.). Such capability in the ASIC 822 could be enabled by hardware processing blocks or could be written in the chip memory as part of the firmware. In some cases, the ASIC 822 might have the capability to self-calibrate and tune its parameters for signal identification and pattern recognition.

The integrated ultrasound input device 820 can be fully or partially encapsulated within a housing 824, forming a package. The housing 824 can take the form of any suitable material, such as a solidified resin. In some cases, the housing 824 contains solely the ultrasound sensor 802 and ASIC 822, as well as any electrical contacts necessary to couple the ASIC 822 to an external component. In some cases, the housing 824 can contain additional components, such as additional sensors (e.g., thermal sensor, vibration sensor, or gyroscope). In some cases, the material used for the housing 824 can be selected to perform well as a portion of the stack of the ultrasound input system. For example, a material having maximum energy transmission in the ranges of frequencies associated with the particular ultrasound input device 820 can be used to maximize signal. In some cases, additional materials can be used within the housing 824 or incorporated into the housing 824 itself to achieve a desired response of ultrasound propagation into a stack. For example, a window can be fitted into the housing 824 adjacent the ultrasound sensor 802 to provide a path for transmission of ultrasonic signals to and from the ultrasound sensor 802. This window can be made of an optically transparent, translucent, or opaque material, and can be selected to pass ultrasonic signals therethrough with little or no attenuation. Also, materials could be used in the stack to enhance acoustic matching between layers to boost transmit and/or receive signals.

In some cases, a housing 824 can be applied after the ultrasound sensor 802 and ASIC 822 have been formed into a wafer and cut into individual chips. However, in some cases, a housing 824 can be applied while the ultrasound sensor 802 and ASIC 822 are still part of a wafer containing numerous chips. Any suitable method of chip packaging can be used to encapsulate the ultrasound sensor 802 and ASIC 822.

In some cases, other types of processors or circuits can be used in place of ASIC 822. For example, instead of ASIC 822, a general-purpose programmable processor can be used while still achieving many of the benefits associated with an integrated ultrasound input device 820. In some cases, ASIC 822 can receive power as an input, which can be used to power the ASIC 822 itself and to drive the transducers of the ultrasound sensor 802. In some cases, the a general-purpose programmable processor can be used to communicate between multiple chips with or without internal ASIC in form of master and slave.

In some cases, the package of the integrated ultrasound input device 820 can be approximately 500 microns or smaller in height. In some cases, the ultrasound sensor 802 and ASIC 822 of the integrated ultrasound input device 820 can have a combined height of approximately 150 microns or less.

B. Production Techniques

Figure 9:
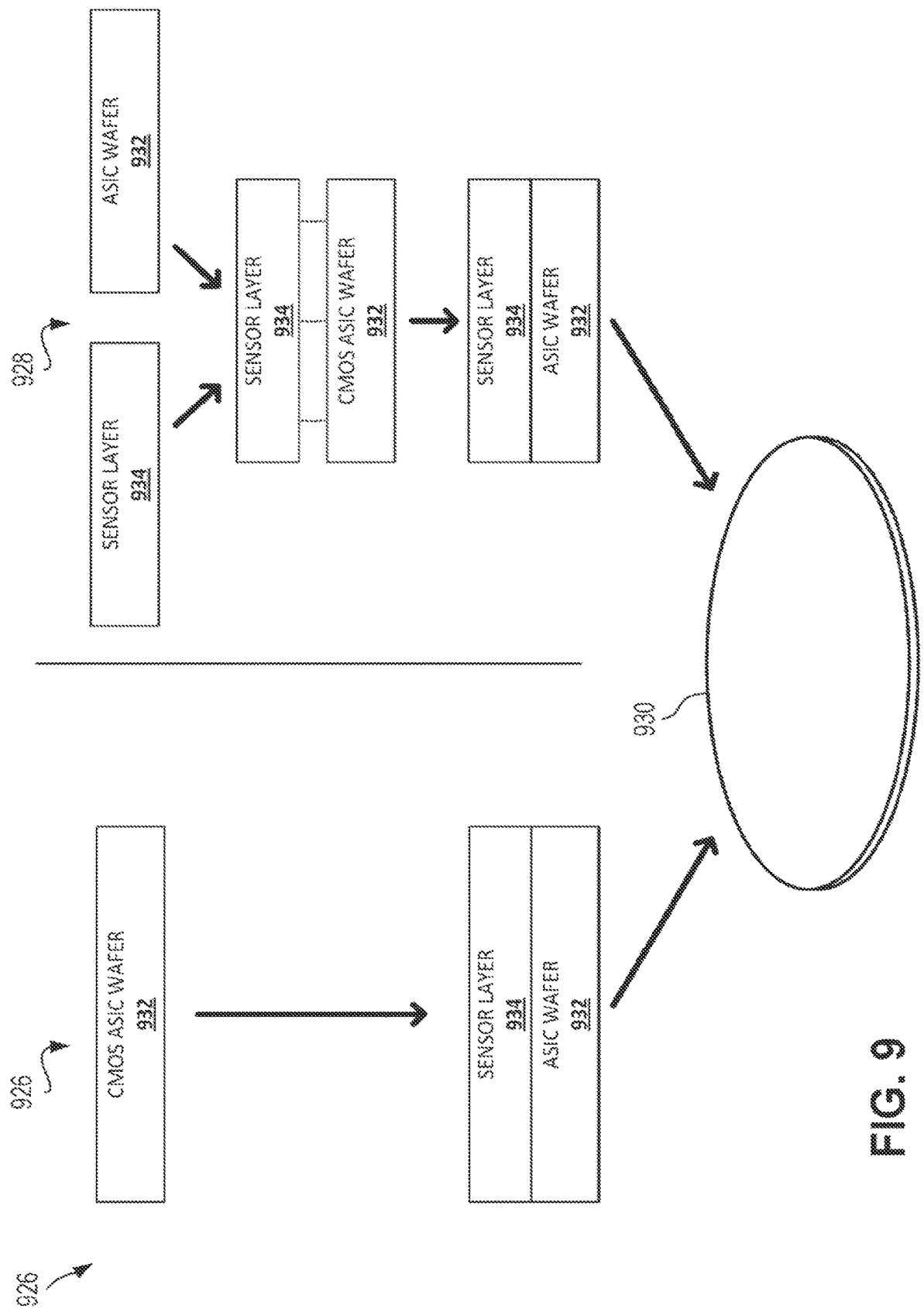
FIG. 9 is a combined set of schematic views depicting two processing routes for generating an integrated ultrasound input device wafer according to certain aspects of the present disclosure.

FIG. 9 is a combined set of schematic views depicting two processing routes 926, 928 for generating an integrated ultrasound input device wafer 930 according to certain aspects of the present disclosure. A first processing route 926 depicts the generation of a wafer 930 using a monolithic technique. A second processing route 928 depicts the generation of a wafer 930 using a wafer bonding technique. Any suitable process can be used to generate a wafer 930 containing a sensor and ASIC as described herein.

Under the first processing route 926, an ASIC wafer 932 is provided and then a sensor layer 934 is created on the ASIC wafer 932, resulting in a monolithic wafer 930 that contains both a sensor and ASIC. This type of wafer-level fabrication can permit generation of a small form factor in an economical fashion.

Under the second processing route 928, a sensor layer 934 is provided and an ASIC wafer is provided 932. The provided sensor layer 934 can then be bonded to the ASIC wafer 932 using any suitable wafer bonding technique, with or without an intermediate layer.

The wafer 930 that results from the first processing route 926, the second processing route 928, or any other suitable processing route can comprise one or more instances of a sensor and ASIC usable to create an integrated ultrasound input device.

Figure 10:
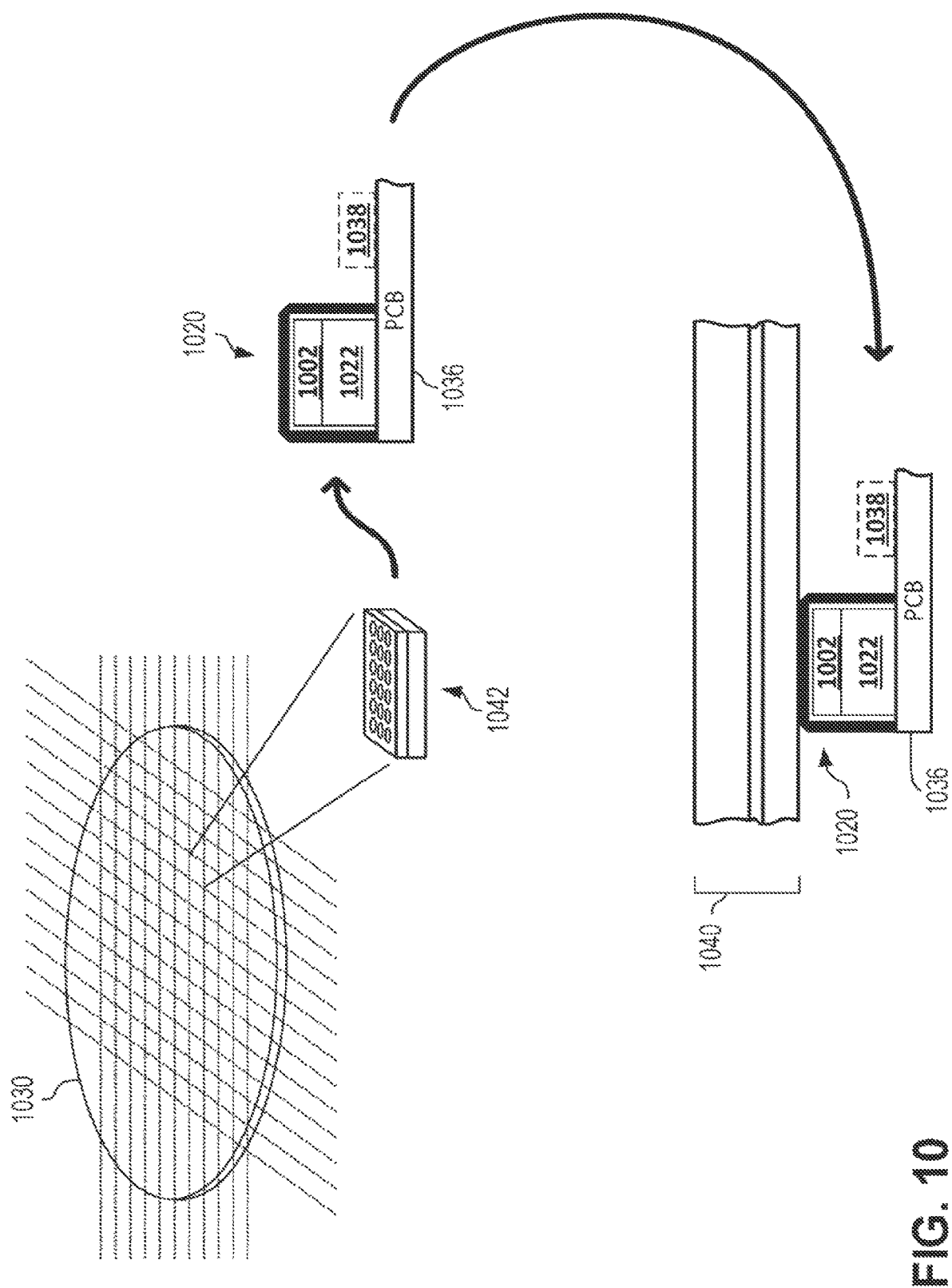
FIG. 10 is a set of schematic views depicting a single integrated ultrasound input device cut from a wafer, PCB-mounted, and stack-mounted according to certain aspects of the present disclosure.

FIG. 10 is a set of schematic views depicting a single integrated ultrasound input device 1020 cut from a wafer 1030, PCB-mounted, and stack-mounted according to certain aspects of the present disclosure. The wafer 1030 can be wafer 1030 of FIG. 10. The wafer 1030 can be cut or diced into numerous pieces (e.g., dies). Each die 1042 can contain a sensor 1002 and ASIC 1022 for a single integrated ultrasound input device 1020. Each die 1042 can be packaged in a housing, if the housing was not previously applied to the wafer 1030, to result in the integrated ultrasound input device 1020.

The ultrasound input device 1020 can be mounted on a printed circuit board (PCB) 1036 or otherwise electrically coupled to any other necessary electronics. For example, in some cases, an ultrasound input device 1020 can be electrically coupled to a battery or other power source. In some cases, an ultrasound input device 1020 can be mounted on a PCB 1036 that contains other electronic components 1038, such as processors and power supplies.

The ultrasound input device 1020 can be mounted to a substrate 1040. The substrate 1040 can be any combination of one or more materials through which ultrasonic signals can pass to the sensor 1002. The housing of the ultrasound input device 1020 can be coupled to the substrate 1040. The combination of materials through which ultrasonic signals pass from the exterior surface of the substrate 1040 to the sensor 1002, which can include the housing of the ultrasound input device 1020, can be known as a stack. The ultrasound input device 1020 can be coupled to the substrate 1040 using any suitable technique, including using adhesives, mechanical couplings, active pressure, or any other suitable technique for acoustically coupling the ultrasound input device 1020 and the substrate 1040.

C. Low Profile Size

Figure 11:
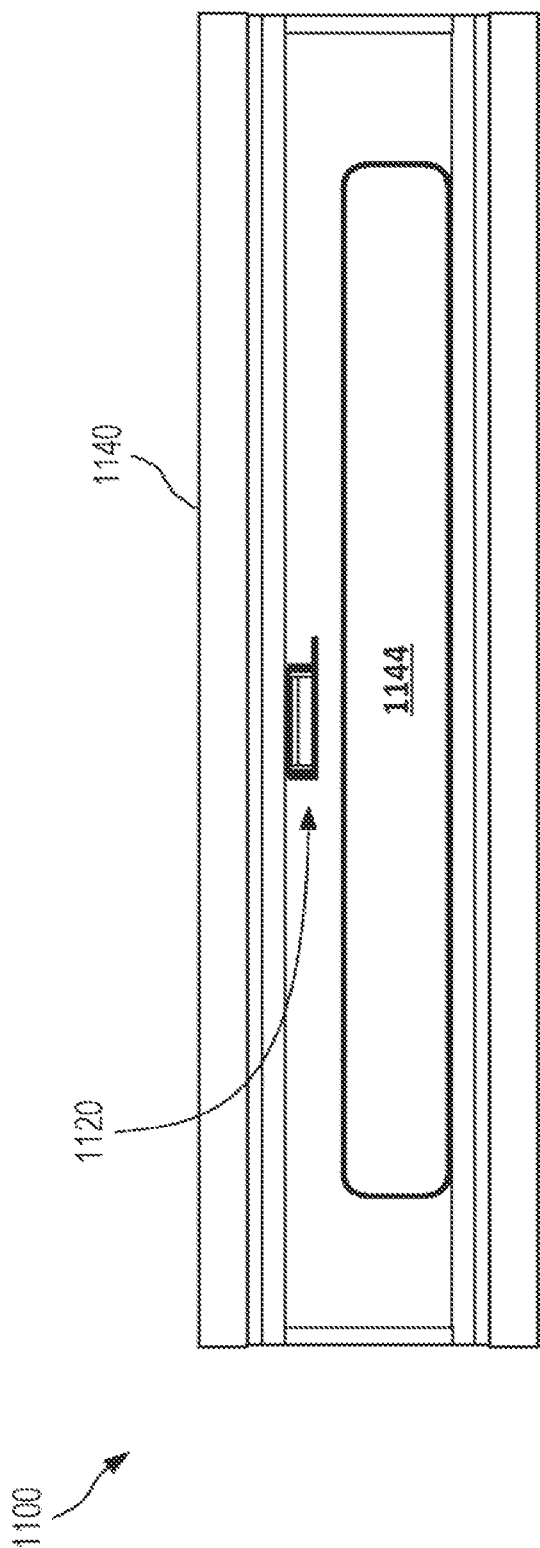
FIG. 11 is a cross-sectional schematic view of a consumer electronic product containing an integrated ultrasound input device according to certain aspects of the present disclosure.

FIG. 11 is a cross-sectional schematic view of a consumer electronic product 1100 containing an integrated ultrasound input device 1120 according to certain aspects of the present disclosure. The consumer electronic product 1100 can be a smartphone or any other suitable device. The integrated ultrasound input device 1120 can be attached to a substrate consisting of one or more layers of a display 1140 or any other part of the consumer electronic device such as the frame or the backside which could be made of metal, plastic, or other materials (1144). The display 1140 can include several layers, including display layers, illumination layers, protective layers, sensing layers, and other suitable layers. Through its coupling with the display 1140, the integrated ultrasound input device 1120 can be used to register touch events associated with the display 1140. In some cases, however, the integrated ultrasound input device 1120 can be coupled to any surface of the consumer electronic product to detect touch events on the opposite side of that surface, such as a back side or side edge of the consumer electronic product.

As described herein, the integrated ultrasound input device 1120 can be formed to have a very small height, such as at or less than 500 microns. Due to the low profile of the integrated ultrasound input device 1120, one or more of such integrated ultrasound input devices can be easily positioned within a consumer electronic product 1100, leaving ample space for other components. For example, the low profile of the integrated ultrasound input device 1120 can occupy only a small amount of the overall height of the consumer electronic product 1100, permitting more space for other components, such as larger batteries 1144 with more capacity, or more open space for airflow. In addition, due to the design and the physics behind the operation of the device as described, the integrated ultrasound input device can be made to operate in a small local region for transmitting and receiving the ultrasound information. Such local operation largely boosts the performance robustness of the device to sources of disturbances, such as touches or holds, induced outside of the operation region.

D. Improved Resistance to Noise and Lower Power

Figure 12:
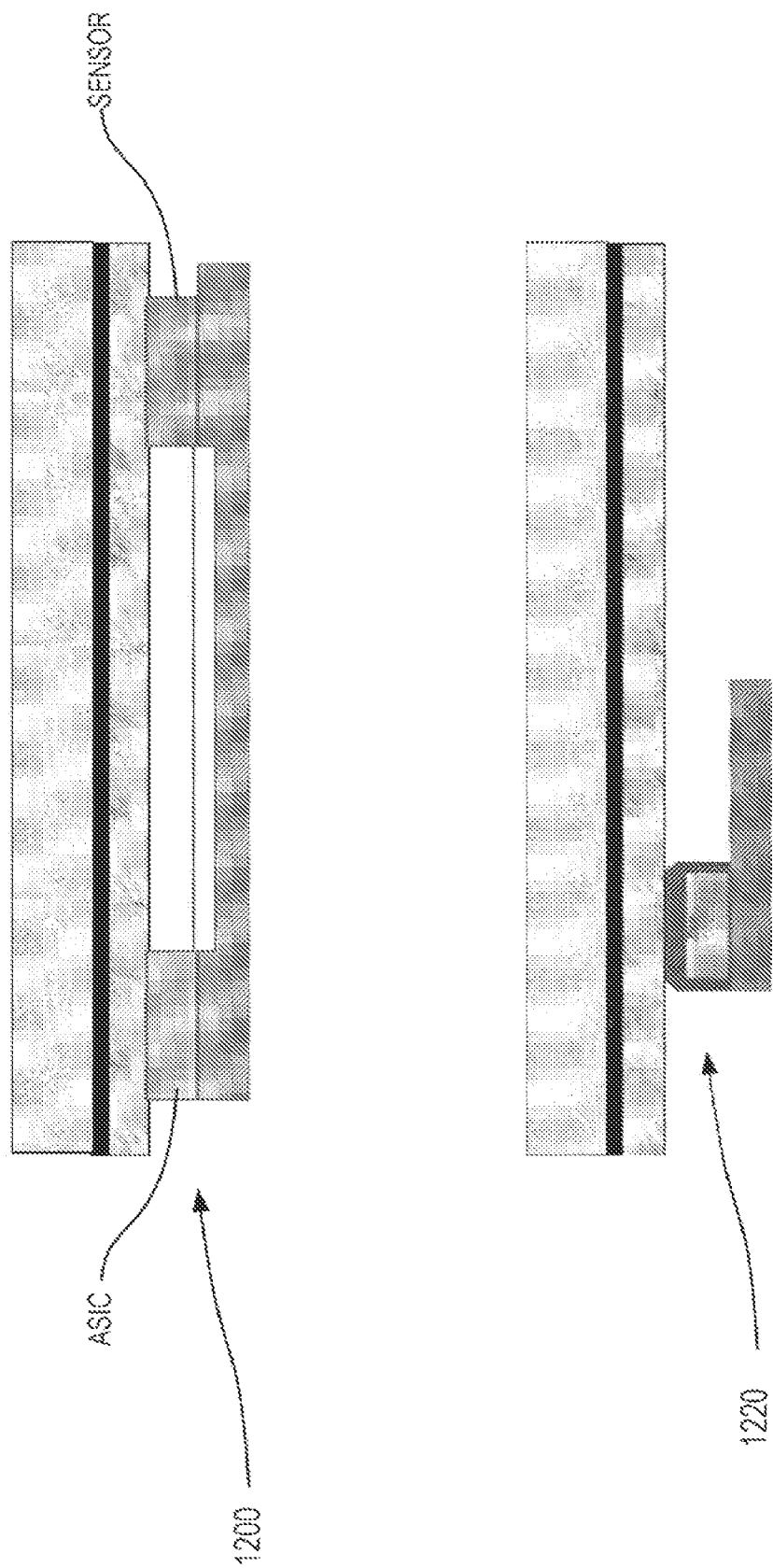
FIG. 12 is a set of cross-sectional schematic diagrams comparing a non-integrated ultrasound input device with an integrated ultrasound input device according to certain aspects of the present disclosure.

FIG. 12 is a set of cross-sectional schematic diagrams comparing a non-integrated ultrasound input device 1200 with an integrated ultrasound input device 1220 according to certain aspects of the present disclosure. The non-integrated ultrasound input device 1200 is much more susceptible to noise due at least in part to the relatively long length of conductor needed to couple the ASIC and sensor. For example, the non-integrated ultrasound input device 1200 can have an exposed electrical trace. Not only is power used to transmit signals along that electrical trace, but the electrical trace can be further susceptible to interference. Therefore, the overall signal to noise ratio for a non-integrated ultrasound input device is relatively low. If a higher signal to noise ratio is desired, the ASIC must provide more power to drive the sensor, in which case the overall system would have relatively higher power consumption.

By contrast, the integrated ultrasound input device 1220 of the present disclosure is an integrated chip packaged in a housing. The integrated ultrasound input device 1220 does not have large exposed traces or conductors between the sensor and the ASIC. Thus, there is little or no risk of interference and little or minimal energy sapped while transmitting signals from the sensor to the ASIC, due at least in part to the minimal conductive traces between the sensor and the ASIC. Therefore, an integrated ultrasound input device 1220 can be capable of operating at improved signal to noise ratios and/or with improved power efficiency than a similar non-integrated ultrasound input device 1200.

III. Ultrasound Sensor Design

Ultrasound input devices can include a plurality of transducers that may be configured, for example, in a sensor array. In some embodiments, the plurality of transducers can allow for the measurement of multiple frequencies. Furthermore, in other embodiments, the plurality of transducers can allow for a separation of transmitting and receiving capabilities. For examples, some transducers can be configured to transmit ultrasound signals, whereas other transducers of the plurality of transducers can be configured to receive ultrasound signals. In yet other embodiments, the plurality of transducers can allow for beamforming.

A. Transducer Array

FIG. 13A is a top view of a sensor array 1302 of an ultrasound input device according to certain aspects of the present disclosure. The sensor array 1302 can comprise one or more transducers 1350 (e.g., a MUT). Generally, a sensor array 1302 can have a plurality of transducers 1350. The sensor array 1302 of FIG. 13A is depicted with 144 different transducers 1350 across the sensor array 1302 that is approximately 1.2 mm square, although other numbers of transducers 1350 and other size arrays can be used. Various electrical traces in the sensor array 1302 can interconnect the different transducers 1350 to an ASIC. Each transducer 1350 can be individually addressable. In some cases, the use of a transducer 1350 for a particular purpose (e.g., as a transmitter or receiver, or with certain particular frequencies) can be set or changed via the ASIC, thus each transducer 1350 can perform any particular function performed by any other transducer 1350 of the sensor array 1302. However, in some cases, one or more transducers 1350 can be specifically selected or configured to more efficiently or effectively perform a particular function. For example, some transducers 1350 can be designed to achieve improved transmission, whereas other transducers 1350 can be designed to achieve improved reception.

Figure 13B:
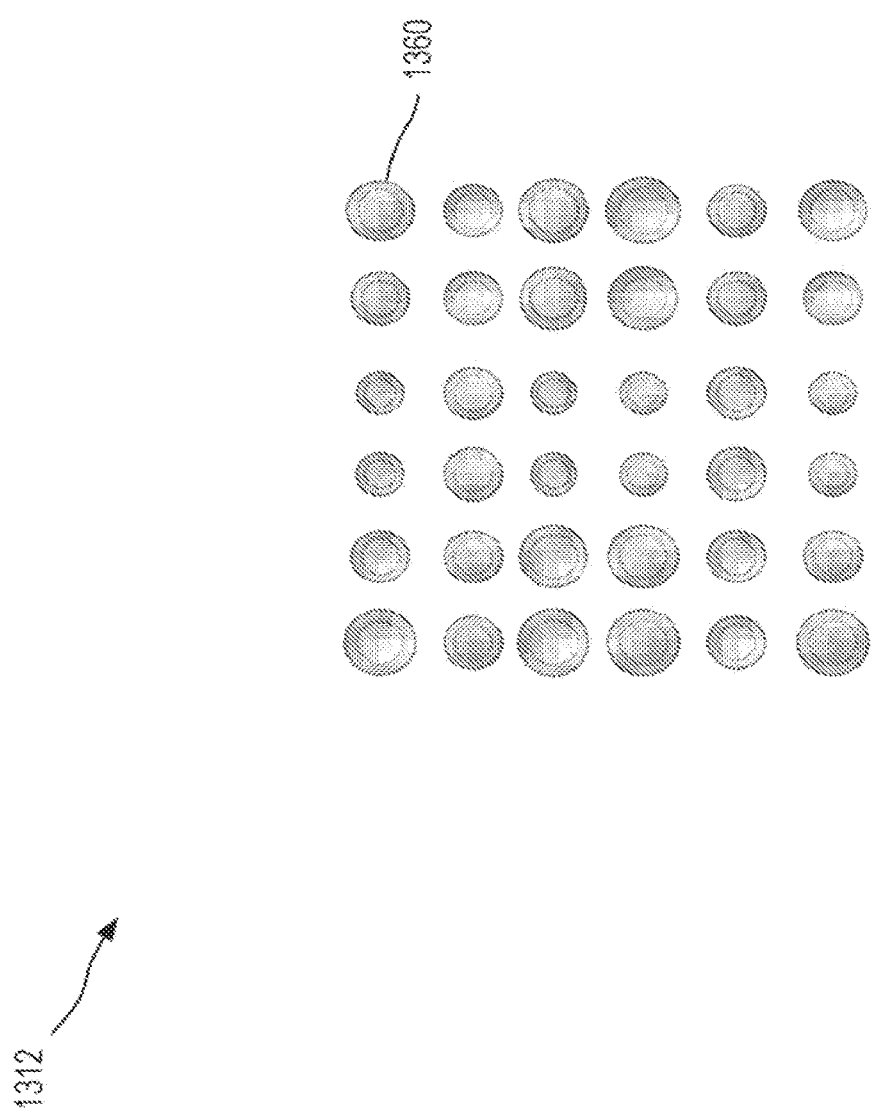
FIG. 13B is a top view of an alternate sensor array of an ultrasound input device according to certain aspects of the present disclosure.

FIG. 13B is a top view of an alternate sensor array 1312 of an ultrasound input device according to certain aspects of the present disclosure. The sensor array 1312 can comprise one or more transducers 1360. The sensor array 1312 depicts a sensor array comprising 36 ultrasonic transducers 1360. Various electric traces in the sensor array 1312 can interconnect the different transducers 1360 to an integrated circuit layer. One or more of the transducers 1360 of the sensor array 1312 may be transmitting ultrasonic transducers. One or more transducers of the transducers 1360 of the sensor array 1312 may be receiving ultrasonic transducers. The transducers 1360 of the sensor array 1312 can transmit and receive at any suitable frequencies, as described herein. The relative sizes of the transducers 1360 can indicate the frequency capable of being emitted/received by the transducer.

Various electrical traces (not shown) in the sensor array 1312 can interconnect the different transducers 1360 to an integrated circuit. The various electrical traces can interconnect the different transducers 1360 in any suitable manner. For example, the electrical traces may connect the transducers 1360 in a horizontal and vertical grid. As another example, the electrical traces may connect the transducers 1360 that are located diagonal from one another.

FIG. 14A is a schematic diagram of the sensor array 1302 of FIG. 13A depicting one example configuration of the various transducers of the sensor array 1302 according to certain aspects of the present disclosure. In this example configuration, out of the 144 different transducers, 60 are set up to operate as low frequency transmitters, 8 are set up to operates as low frequency receivers, 56 are set up to operate as high frequency transmitters, and 20 are set up to operate as high frequency receivers, in a sensor array 1402. The configuration depicted in FIG. 14A can be especially useful for sensing touch events using multiple ultrasonic frequencies to, for example, identify environmental variations versus real touch events betters and/or to improve the operation frequency bandwidth of the device so that the device is more responsive across a broader range of frequencies.

FIG. 14A further illustrates the sensor array 1402 including four corner regions. A corner region of the sensor array 1402 can include a plurality of transducers. For example, the sensor array 1402 includes four rotationally symmetric corner regions comprising mainly (e.g., a majority) low frequency transmitting ultrasonic transducers, which can surround low frequency receiving ultrasonic transducers. The corner region of the sensor array 1402 includes 16 ultrasonic transducers in a 4×4 array. However, it is understood that the corner region of the sensor array 1402 can include up to one fourth of the total number of ultrasonic transducers included in the sensor array 1402. For example, a square sensor array comprising 81 transducers can include four corner regions. Each of the four corner regions can include a 1×1, 2×2, 3×3, or 4×4 grid of transducers. In some cases, the sensor array 1402 can include high frequency transmitting ultrasonic transducers surrounding the low frequency transmitting ultrasonic transducers, e.g., as shown. In some implementations, the high frequency transmitting ultrasonic transducers may not be on a diagonal from the corner regions, and instead a high frequency receiving ultrasonic transducer may exist, e.g., as is shown in FIG. 14A. Further, a center region can include mainly low frequency transmitting ultrasonic transducers. The center region can be surrounded by high frequency transmitting ultrasonic transducers. In some cases, the center region can include transmitting ultrasonic transducers. In other cases, the center region can include receiving ultrasonic transducers. The center region of a sensor array can be of any suitable size, for example, 1×1, 2×2, 3×3, 4×4, 5×5, 6×6, 7×7, etc.

In some cases, a sensor array 1302 can have any number of transducers operating across any number of different frequencies. While the example configuration of FIG. 13A can be useful in some cases, other configurations can be used. In some cases, a single type of sensor array 1302 can be manufactured in bulk and used with ASICs that are of the same or different types. For example, different types of ASICs can be set up to operate the same sensor array 1302 under different configurations (e.g., with more or fewer transmitters or receivers, different frequencies, or more or fewer numbers of different frequencies). In some cases, the same type of ASIC can also be programmed to run under different configurations. In some cases, an integrated version of the transducer and/or ASIC can be used in conjunction with a nonintegrated transducer and/or ASIC to achieve a certain purpose, such as to boost the transmission power.

The sensor arrays depicted in FIG. 13A and in FIG. 14A can include one or more piezoelectric micromachined ultrasonic transducers, one or more capacitive micromachined ultrasonic transducers, one or more integrated bulk piezoelectric transducers, or one or more non-integrated bulk piezoelectric transducers. In some cases, the sensor array can include any suitable combination of the aforementioned transducers. Further, the sensor array can be of any suitable size. For example, the sensor array can include a 2×2, 3×3, 5×5, 9×9, 16×16, etc. array of ultrasonic transducers. For example, the sensor array 1312 depicts a sensor array of 6 ultrasonic transducers by 6 ultrasonic transducers.

FIG. 14B is a schematic diagram of a sensor array depicting eight example configurations of the various transducers of a corner region of the sensor array according to certain aspects of the present disclosure. The sensor arrays depicted in FIG. 14B are 12×12 transducers in size, and the corner regions are 4×4 transducers in size, however, it is understood that embodiments can include sensor arrays and corner regions of any suitable size.

Each of the corner regions of the sensor arrays 1410-1424 can include transmitting ultrasonic transducers 1426 and receiving ultrasonic transducers 1425. The transmitting ultrasonic transducers and the receiving ultrasonic transducers can be arranged as shown in the sensor arrays 1410-1424. Thus, in various combination, the receiving transducers can be diagonal to each other, where the diagonals can be in various locations and of various length. The receiving transducers can be in blocks (e.g., 2×2) in various locations, as well as other shapes, including of odd number of receiving transducers.

The transmitting ultrasonic transducers in, for example, the sensor array 1410 can each transmit at the same frequency. Similarly, the receiving ultrasonic transducers in the sensor array 1410 can each receive the same frequency, which may be the same frequency transmitted from the transmitting ultrasonic transducers. The corner regions do not all have to be the same and can occur in various combination, e.g., a combination can have one type selected from 1410, 1412, 1414, and 1416. The interior regions can have various combination shown in FIG. 14C.

FIG. 14C is a schematic diagram of a sensor array depicting eight example configurations of the various transducers of the sensor array according to certain aspects of the present disclosure. The sensor arrays depicted in FIG. 14C depict transducers that are interior to the corner regions of the sensor array. An interior region can include transducers that are between at least two corner regions. The transducers shown in the sensor array can include transmitting ultrasonic transducers 1446 and receiving ultrasonic transducers 1445. The transmitting ultrasonic transducers and the receiving ultrasonic transducers can be arranged as shown in the sensor arrays 1430-1444. Any of the arrangement in FIG. 14C can be used with any of the corner arrangements in FIG. 14B.

As depicted, a majority can be transmission transducers although they can be in the minority. The receiving transducers may touch each other to form a ring, e.g., as in sensor arrays 1430-1438. As an alternative, the receiving transducers may form disjoint groups, as in sensor arrays 1440-1444. In such disjoint groups, there may be an even or odd number of receiving transducers. Such groups can all be the same or can vary.

FIG. 14D is a schematic diagram of a sensor array depicting eight example configurations of the various transducers of the sensor array according to certain aspects of the present disclosure. The sensor arrays depicted in FIG. 14D depict sensor arrays comprising differing numbers of ultrasonic transducers. For example, the sensor array 1450 includes 36 transducers, whereas the sensor array 1460 includes 64 transducers. Transmitting ultrasonic transducers 1448 and receiving ultrasonic transducers 1447 can be arranged as shown in the sensor arrays 1450-1464.

FIG. 14E is a schematic diagram of a sensor array depicting two example configurations of the various transducers of the sensor array according to certain aspects of the present disclosure. FIG. 14E illustrates two example sensor arrays that are 12×12 ultrasonic transducers in size. For example, the sensor array 1465 and the sensor array 1466 both include 144 transducers. Transmitting ultrasonic transducers 1492 and receiving ultrasonic transducers 1491 can be arranged as shown in the sensor arrays 1465-1466. In some implementations, the center region of the sensor arrays 1465-1466 may not include ultrasonic transducers. The sensor array 1465 can then, for example, comprise 138 ultrasonic transducers. However, it is understood that the center region can be larger or smaller than the size 16 transducers in a square. In some implementations, ultrasonic transducers can form a ring around a center region that does not include ultrasonic transducers. The center region of the sensor array that does not include ultrasonic sensors can be included for routing space.

In some cases, ultrasonic transducers in a sensor array may be in groups. For example, the sensor array 1465 can include 8 groups of ultrasonic transducers, where each group can include 16 ultrasonic transducers included in a square shape. The center region of the sensor array 1465 does not include a group of ultrasonic transducers. Each group of ultrasonic transducers can be disjointed from one. For example, there may be a gap between two or more groups of ultrasonic transducers. The groups can be disjointed horizontally, vertically, diagonally, etc.

FIG. 14F is a schematic diagram of a sensor array depicting example configurations of the various transducers of the sensor array of various sizes according to certain aspects of the present disclosure. FIG. 14F illustrates ten example sensor arrays that are vary in size. For example, the sensor array 1467 includes 16 ultrasonic transducers, the sensor array 1468 includes 25 ultrasonic transducers, the sensor array 1469 includes 36 ultrasonic transducers, the sensor array 1470 includes 49 ultrasonic transducers, the sensor array 1471 includes 64 ultrasonic transducers, the sensor array 1472 includes 81 ultrasonic transducers, the sensor array 1473 includes 100 ultrasonic transducers, the sensor array 1474 includes 131 ultrasonic transducers, the sensor array 1475 includes 144 ultrasonic transducers, and the sensor array 1476 includes 169 ultrasonic transducers. Transmitting ultrasonic transducers 1494 and receiving ultrasonic transducers 1493 can be arranged as shown in the sensor arrays 1467-1476. However, it is understood that the configuration of the transmitting ultrasonic transducers 1494 and the receiving ultrasonic transducers 1493 can be of any suitable arrangement as described herein.

FIG. 14G is a schematic diagram of a sensor array depicting twelve example configurations of the various transducers of the sensor array of a size of 8×8 transducers according to certain aspects of the present disclosure. For example, the sensor arrays 1477-1488 include 81 transducers. Transmitting ultrasonic transducers 1496 and receiving ultrasonic transducers 1495 can be arranged as shown in the sensor arrays 1477-1488.

In some implementations, a sensor array can include any suitable combination of sensor array characteristics (e.g., regions, groups, arrangements, etc.) described herein and described in reference to FIGS. 13A-13B and 14A-14G. For example, a sensory array can include corner regions as depicted in the sensor array 1420 of FIG. 14B as well as interior and center regions as depicted in the sensor array 1472 of FIG. 14F. The arrangement of ultrasonic transducers in a sensor array can be based on an application of the sensor array, a frequency of operation, size limitations, power constraints, etc.

Embodiments provide for a number of advantages. For example, depending on sensor area (physical size) limitations and power constraints, different array sizes can be implemented. The total array size, the configuration of transmitting and receiving ultrasonic transducers (e.g., pMUTs), and the size of ultrasonic transducer can be used to determine the transmitting and receiving acoustic aperture and beam shape. The transmitting and receiving acoustic aperture and beam shape can be altered using at least the aforementioned characteristics for which different stack thicknesses and materials, as well as the use of the sensor array, could be selected to yield the optimum performance given the constraints (e.g., size, power, sampling frequency, supply voltage, process breakdown voltage, and etc.).

B. Multi-Frequency Measurement

FIG. 15 is a set of charts 1502, 1504, 1506 depicting energy measurements from transducers of a single sensor array operating in different frequencies according to certain aspects of the present disclosure. The charts 1502, 1504, 1506 show energy measurements over time for a pair of touch events. Chart 1502 depicts the energy measurements for transducers operating at 100 kHz, chart 1504 depicts the energy measurements for transducers operating at 1 MHz, and chart 1506 depicts the energy measurements for transducers operating at 10 MHz. It is apparent that the measurements taken at these different frequencies have different energy traces, especially with respect to temperature drift.

Since a drop in energy measurement associated with an ultrasonic transducer receiving reflected ultrasound signals is used as a factor in identifying a touch event, it can be desirable to find techniques to reduce any false touch events. As depicted in FIG. 15, the energy measurements across the different frequencies react differently with respect to temperature changes (e.g., the temperature changes that occur when heat passes from a finger to a substrate or from a substrate to air, or other such temperature changes). Therefore, instead of simply relying on identifying a drop in energy measurement to infer a touch event, an ultrasound touch input system can use energy measurements across multiple frequencies or other types of operation procedures, such as different ultrasound beam shapes, number of pulses, and the like to confirm or reject an inference of a touch event. For example, a perceived drop in energy in chart 1502 may not register as a touch event because no concurrent drop in energy is identified in charts 1504 or 1506. However, once all three charts 1502, 1504, 1506 register concurrent drops in energy, there can be an assumption that a touch event has occurred.

FIG. 16 is a chart 1600 depicting temperature behavior of an ultrasonic transducer with respect to operating frequency according to certain aspects of the present disclosure. The chart 1600 contains four lines, each associated with either an air signal or target signal at either a first or second frequency. An air signal can refer to the energy measured when there is no touch event, whereas a target signal can refer to the energy measured when a touch event is occurring. The first and second frequencies can be any suitable, different frequencies. The chart 1600 shows that for all signals, as the temperature increase, the overall signal strength diminishes. The chart 1600 also shows that the behavior of each frequency with respect to temperature differs, which can thus be leveraged to help identify if a touch event has occurred (e.g., identify whether a change in energy measurement is associated with a touch event or just temperature drift).

In an example, first and second measurements can be taken by transducers operating at a first frequency, resulting in the measurements at point 1610 and line 1612. At this time, it can be unclear if the measurements at line 1612 is associated with a touch event (e.g., a move from point 1610 to point 1614) or a temperature change (e.g., a move from point 1610 to point 1616). First and second measurements can also be taken of transducers operating at a second frequency, resulting in the measurements at point 1618 and either line 1620 or line 1622. If the second measurement at the second frequency falls on line 1620, it can be inferred that the drop in energy is associated with the temperature change from point 1618 to point 1626, and therefore not likely associated with a touch event. However, if the second measurement at the second frequency falls on line 1622, it can be inferred that the drop in energy is associated with a touch event, as the energy drops from point 1618 to point

1624. The measurements taken at first and second frequencies can be taken simultaneously, sequentially, or otherwise in close time proximity to one another (e.g., within ones, tens, or hundreds of milliseconds of one another). Thus, by comparing the change in energy measurement over a period of time across multiple frequencies, a determination can be made as to whether or not a touch event has occurred.

While chart 1600 has been described with reference to frequency-dependent energy changes due to changes in temperature, such a technique can be used to identify and leverage frequency-dependent energy changes due to changes in other environmental conditions, such as humidity.

FIG. 17 is a chart 1700 depicting frequency response with respect to stack makeup according to certain aspects of the present disclosure. The chart 1700 shows three lines, each of which correlate to different stacks. Each of the different stacks can be comprised of different materials or different combinations of materials. Due to the inherent differences in each stack, each stack may have a unique response curve associated with the transmission frequency used by the ultrasonic input device. The response curve can be a measure of energy, received signal peak, or any other figure of merit. As depicted in FIG. 17, the frequency that provides the highest response for stack/cover 1 is higher than the frequency that provides the highest response for stack/cover 2, which is itself higher than the frequency that provides the highest response for stack/cover 3.

Thus, a particular frequency and stack material can be matched to provide optimal results. For example, given a known set of frequencies, the material of which the housing of the integrated ultrasound input device is made can be selected to retain the highest possible energy measurements of reflected ultrasonic signals from an initial transmission by the ultrasound input device. As another example, given a known stack or known material (e.g., a particular display from a consumer product manufacturer or a particular type of wood), the ultrasound input device can be set up to operate on frequencies that provide the highest possible energy measurements. In some cases, an ultrasound input device can automatically detect the best frequencies to use based on measuring multiple frequencies in close time proximity to one another.

C. Separated Transmitting and Receiving

FIG. 18 is a schematic diagram depicting a circuit 1800 for receiving and transmitting a signal through an ultrasonic transducer, with the circuit in a transmitting state. The circuit 1800 drives an ultrasonic transducer to both transmit and receive signals, and thus requires high-voltage switching circuitry to separate the high-voltage transmitter from the low-voltage receiver. When transmitting, the high-voltage switch permits the high-voltage transmitter circuitry to drive the transducer, while isolating the low-voltage receiver. To move to a receiving state, the switch must isolate the high-voltage transmitter circuitry and couple the transducer to the low-voltage receiving circuitry.

FIG. 19 is a schematic diagram depicting the circuit 1800 of FIG. 18 for receiving and transmitting a signal through an ultrasonic transducer, with the circuit in a receiving state. When in the receiving state, the high-voltage switch isolates the high-voltage transmitter circuitry and couples the transducer to the low-voltage receiving circuitry. However, the high-voltage switch often has large capacitances that inherently attenuate the signal received at the transducer as it is conducted to the low-voltage receiver. Thus, an incoming voltage of 0.37 millivolts (370 microvolts) can be attenuated to less than 2 microvolts, as an example. This parasitic effect can drastically reduce the available signal, thus decreasing the overall signal to noise ratio.

FIG. 20 is a schematic diagram depicting segregated circuits 2000, 2002 for receiving and transmitting signals through ultrasonic transducers according to certain aspects of the present disclosure. Unlike the circuit 1800 of FIGS. 18-19, the circuits 2000, 2002 of FIG. 20 eliminate the need for a high-voltage switch. Thus, the circuits 2000, 2002 can provide efficient driving of a transducer set up to be a transmitting transducer, while also providing efficient receiving by a transducer set up to be a receiving transducer. Circuit 2000 contains a high-voltage transmitter circuit that directly drives a transducer set up to be a transmitting transducer. Circuit 2002 contains a low-voltage receiver circuit that directly receives signal from a transducer set up to be a receiving transducer.

By separating transmission and receiving transducers, the signal integrity can be improved, the size can be decreased, and the overall cost can be decreased. For example, signal integrity can be improved, and power consumption can be improved by reducing or eliminating the parasitic effect from electrical components (e.g., high-voltage switches) inline between a transducer and its low-voltage receiver circuitry. Overall chip size can also be reduced, because high-voltage devices (e.g., high-voltage switches) tend to be larger in size. Thus, by eliminating these switches, as well as optionally eliminating some of the high-voltage transmitter circuits, the overall chip size and cost can be reduced.

D. Beamforming

FIG. 21 is a set of side view schematic diagrams 2100, 2102, 2104, 2106 depicting beamforming achieved through the use of ultrasonic transducers according to certain aspects of the present disclosure.

Diagram 2100 depicts the beam pattern of a single ultrasonic transducer, such as a standard piezoelectric transducer. The beam is broad and fixed by the sensor size and sensor topology. There is no ability to adjust the beam for the transducer of diagram 2100.

Diagram 2102 depicts a focused beam achieved by activating a particular set of transducers. Using beamforming techniques, the activated transducers can focus a beam to a particular distance, which can improve the pressure sensitivity and accuracy of the ultrasound sensor. For example, a focused beam can be used to provide fine point accuracy of touch events, as well as fine point accuracy for detecting other information associated with a touch event, such as the ridges and valleys of a user's fingerprint.

Diagram 2104 depicts a wide beam achieved by activating a particular set of transducers. Using beamforming techniques, the activated transducers can focus a beam to a close distance, permitting the beam to come to a point and spread out again before reaching a target distance. Such a wide beam can improve overall coverage of the sensor and can be used to obtain more of an average measurement over a greater area. This wide beam can be used to decrease the target location sensitivity, which can be advantageous in situations where a degree of variability is expected or desirable, such as providing large touch-sensitive areas and/or extra touch-sensitive areas on or around buttons.

As depicted in diagrams 2104 and 2106, the beam can be adjusted as needed and a tradeoff can be made between more focused transmission pressure on the target and a larger effective area with less target sensitivity.

Diagram 2106 depicts a multi-receiver configuration of activated transducers. In this configuration, a set of transmitting transducers can send out ultrasound signals that can be reflected and received at two or more sets of receiving transducers. For example, a first set of receiving transducers (e.g., one or more transducers) can be positioned to receive ultrasound signals that have been reflected within a first zone, and a second set of receiving transducers can be positioned to receive ultrasound signals that have been reflected within a second zone. As depicted in diagram 2106, the first zone can be smaller and enclosed within the second zone.

By performing beamforming using an array of ultrasonic transducers, energy can be confined to particular regions of interest, and thus the ultrasonic transducer can be less sensitive to regions outside the region of interest.

IV. Micromachined Ultrasonic Transducers for Touch Input

In some cases, an ultrasound input device can comprise an ultrasound sensor that comprises a micromachined ultrasonic transducer (MUT), such as a piezoelectric micromachined ultrasonic transducer (pMUT) or capacitive micromachined ultrasonic transducer (cMUT). Other types of transducers in addition to pMUT and cMUT can include bulk piezoelectric transducers both integrated (i.e., fabricated directly on CMOS) and non-integrated (i.e., fabricated separately and then assembled with a CMOS chip on a board or directly communicating with a microprocessor/microcontroller or field-programmable gate array (FPGA) or any hardware with inter-integrated circuit (I2C) or serial peripheral interface (SPI) communication capability). Micromachined ultrasonic transducers for touch input, as described herein, can allow for improved energy sensing regions. Further, MUTs can also decrease the overall power consumption of an ultrasound input device.

A. Improved Energy Sensing Region

FIG. 22 is a set of charts 2202, 2204 depicting modes of operation of micromachined ultrasonic transducers according to certain aspects of the present disclosure as compared to standard bulk transducers, depicted as average displacement for different frequencies. The charts 2202, 2204 contain lines depicting average displacement over a frequency range of 0.5 MHz to 5 MHz, and inset axisymmetric cross-sectional visualizations of the transducer's mode shapes.

Chart 2202 depicts modes of operation for a standard bulk transducer (e.g., standard piezoelectric transducer) operating from 0.5 MHz through 5 MHz. The number of peaks in average displacement and overall extent of each of these peaks over the course of this relatively small frequency range is evident of the various combinations of bulk mode, shear mode, flexural mode, surface acoustic mode, and other modes undergone by a bulk transducer. As a result, shear waves and surface acoustic waves in different directions can be generated in addition to the normal longitudinal waves of interest. Thus, sensors that make use of such bulk transducers can have uncontrollable beam patters, detrimental crosstalk, more multipath reflections from different angles from different modes, spurious modes and notches in the frequency spectrum, less clean received signal, more energy wasted on unwanted modes, and other such problems.

By contrast, chart 2204 depicts the uniform and predictable flexural mode shape present in MUTs (e.g., pMUTs) over the same frequency span and used to launch longitudinal acoustic waves in the normal direction towards the exterior surface of stack. As a result, the MUT is capable of achieving much improved performance over a standard bulk transducer.

Because of the nature of an ultrasound input device, it is desirable to detect ultrasound reflections based on longitudinal acoustic waves (e.g., propagating in a direction normal to the sensor). MUTs, when used as an ultrasonic transducer for touch input, perform exceptional well due to their inherent ability to perform flexural mode displacement to generate such longitudinal acoustic waves without inadvertently generating much, if any, lateral or otherwise undesirable waves. Thus, MUTs can be used in beamforming operations, such as those described herein, can be closely packed into sensor arrays, can be used with less filtering equipment, and can obtain higher signal to noise ratios using the same or less power than if standard bulk piezoelectric transducers were used.

FIG. 23 is a set of side view schematic diagrams 2302, 2304, 2306 depicting modes of operation of standard bulk transducers used for ultrasound touch detection. When a standard bulk transducer is used for ultrasound touch detection, driving the transducer to transmit signals can result in the transducer displacing in multiple modes of operation, which can cause errant signals to be transmitted into a receiving medium (e.g., a stack).

Diagram 2302 depicts a longitudinal mode of operation in which the driving of the transducer initiates longitudinal signals in a direction normal to the sensor. However, the same or similar driving of the transducer in diagram 2302 can cause lateral displacement as depicted in diagram 2304. This lateral displacement (e.g., due to the lateral mode of operation) can initiate lateral signals that are carried into the receiving medium in a direction other than normal to the sensor or could result in undesirable, normally-travelling shear waves. As a result, driving a bulk transducer can generate signals as depicted in diagram 2306, with both normal and non-normal signals propagating from the bulk transducer. Since the sensing region (e.g., the region desired for sensing) is generally directly above the stack, the non-normal signals can cause interference with the signal being received from the sensing region. Additionally, bulk transducers can be susceptible to the physical topology of the region of the stack near the sensing region, since differing topologies can initiate different reflections to non-normal signals, which can result in false positives or false negatives.

FIG. 24 is a set of side view schematic diagrams 2402, 2404 depicting lateral signal rejection of micromachined ultrasonic transducers according to certain aspects of the present disclosure. Diagram 2402 is a close-up view of a single transducer of a MUT array. The transducer can consist of several layers, including a piezoelectric layer, which, when energized, can initiate flexural displacement, causing a longitudinal wave to emit in a direction normal to the sensor (e.g., a direction normal to the surface of the MUT).

Diagram 2404 depicts an ultrasound input device using a sensor having MUTs. The ultrasound input device is depicted as being coupled to an aluminum layer and a glass layer, although any other stack configuration can be used. The nature of the MUTs can permit ultrasound signals to be emitted in a direction normal to the sensor, while minimizing or eliminating any signals that would have otherwise propagated in a direction not-normal or substantially not-normal to the sensor had a bulk transducer been used. Thus, the use of MUTs as transducers in an ultrasound input device can help focus the energy into a desired sensing region and reduce susceptibility to false positives or false negatives due to errant reflections.

B. Ease of Driving

In addition to the aforementioned benefits of MUTs when used with ultrasound input devise, MUTs can also decrease the overall power consumption of an ultrasound input device. Since the power necessary to drive the transducer is proportional to its capacitance times its voltage squared, the low levels of capacitance of an array of MUTs (e.g., on the order of picoFarads) result in much lower power consumption than the relatively high levels of capacitance for an equivalent standard bulk transducer (e.g., on the order of nanoFarads, which is three orders of magnitude larger than picoFarads).

V. Ultrasound Signal Processing

Reflected ultrasonic signals can be processed to produce images and determine a range to an object. Embodiments described herein can process reflected ultrasonic signals to determine if an object is in contact with a surface.

A. Detecting Touch Input by Digitizing Reflected Signal

FIG. 25 is a schematic diagram of a flow 2500 for processing ultrasound signals emitted and received by an ultrasound input device according to certain aspects of the present disclosure. The flow 2500 includes emitting and receiving an ultrasonic signal as illustrated in a first plot 2502. The first plot 2502 shows an analog measurement of a first signal 2503 for an emitted ultrasonic signal and a set of subsequent signals 2504A, 2504B, 2504C, 2504D, 2504E for a set of reflected ultrasonic signals associated with an ultrasound input device. The first signal 2503 and the subsequent signals 2504 can be measured using a high-speed ADC 2506 to digitize the signal.

The output of the high-speed ADC 2506 is shown in a second plot 2508. The second plot 2508 includes a first digital representation 2510 of the emitted ultrasonic signal and a subsequent digital representations 2512A, 2512B, 2512C, 2512D, 2512E of the reflected ultrasonic signals associated with the ultrasound input device. The first digital representation 2510 and the subsequent digital representations 2512A, 2512B, 2512C, 2512D, 2512E can be processed by a digital processing module in 2514 embedded in the ultrasound input device and/or a system coupled to the ultrasound input device. The digital processing module 2514 can demodulate the digital representations of the data to extract touch input information. For example, the digital processing module can process one or more of the subsequent digital representations 2512A, 2512B, 2512C, 2512D, 2512E to determine that an amplitude of the second digital representation is below a threshold value that is associated with an object being in contact with the surface of the ultrasound input device.

B. Detecting Touch Input Using Energy Integration

FIG. 26 is a schematic diagram of a flow 2600 for processing ultrasound signals emitted and received by an ultrasound input device using energy integration according to certain aspects of the present disclosure. The flow 2600 includes emitting and receiving an ultrasonic signal as illustrated in a first plot 2602. The first plot 2602 shows an analog measurement of a first signal 2603 for an emitted ultrasonic signal and a set of subsequent signals 2604A, 2604B, 2604C, 2604D, 2604E for a set of reflected ultrasonic signals associated with an ultrasound input device. The flow 2600 can include an ultrasound input device with an analog circuit including a rectifier 2606 to rectify the subsequent signals 2604A, 2604B, 2604C, 2604D, 2604E.

A second plot 2608 shows the first signal 2603 and a set of rectified signals 2610A, 2610B, 2610C, 2610D, 2610E each corresponding to respective ones of the set of reflected ultrasonic signals. The rectified signals 2610A, 2610B, 2610C, 2610D, 2610E can be processed by an analog integrator 2612 to output a direct current (DC) signal 2613, shown in a third plot 2614, which is directly proportional to an amplitude of the reflected ultrasonic signal. The DC signal 2613 can be determined using an energy measurement window 2616. The DC signal 2613 can represent an energy value associated with the energy of the received signal measured during the energy measurement window 2616. The DC signal 2613 can be processed by a low-speed ADC 2618. The DC signal 2613 output by the rectifier 2606 and the integrator 2612 remove the need to generate a high frequency digital output and, as a result, the low-speed ADC can use less power and can be fabricated on a smaller chip area.

FIG. 27 is a schematic diagram of an example of a flow 2700 for processing ultrasound signals emitted and received by an ultrasound input device using energy integration according to certain aspects of the present disclosure. The flow 2700 includes emitting and receiving an ultrasonic signal as illustrated in a first plot 2702. The first plot 2702 shows an analog measurement of a first signal 2703 for an emitted ultrasonic signal and a set of subsequent signals 2704A, 2704B, 2704C, 2704D, 2704E for a set of reflected ultrasonic signals associated with an ultrasound input device. The flow 2700 can include an ultrasound input device with an analog summation or integration circuit 2720 and a summed voltage output 2722.

A second plot 2708 shows the first signal 2703 and a set of energy signals 2710A, 2710B, 2710C, 2710D, 2710E each corresponding to the energy of respective ones of the set of reflected ultrasonic signals. For illustrative purposes, the set of energy signals 2710A, 2710B, 2710C, 2710D, 2710E is depicted in solid line overlaid with the set of subsequent signals 2704A, 2704B, 2704C, 2704D, 2704E from the first plot 2702 shown in dotted line.

A summation or integration circuit 2720 can received the set of energy signals 2710A, 2710B, 2710C, 2710D, 2710E from within an energy measurement window 2716. The summation or integration circuit 2720 can generate a voltage output 2722 that is an analog value representing the summed/integrated energy within the energy measurement window 2716.

In some cases, an optional negative DC charge circuit 2724 can be applied to the summation or integration circuit 2720 to offset information not associated with a touch event. Since touch events are identified based on differences between received signals during a non-contacting state and received signals during a contacting state, there is some amount of information within the set of subsequent signals 2704A, 2704B, 2704C, 2704D, 2704E that is not associated with those differences (e.g., a baseline signal). Removing such baseline signals can result in more effective range to sample during analog-to-digital conversion. Since removing such a baseline signal in analog in the set of subsequent signals 2704A, 2704B, 2704C, 2704D, 2704E would require precise phase alignment, it can be difficult to apply such corrections. However, as depicted in FIG. 27, and optional negative DC charge circuit 2724 applied to the summation or integration circuit 2720 can offset a particular amount of energy associated with the baseline signal or a portion thereof, thus improving the amount of effective range available for analog-to-digital conversion. In such cases, the voltage output 2722 can be proportional to the energy of the signal minus the energy of the negative DC charge circuit 2724.

The voltage output 2722 can be processed by a low-speed ADC 2718. The voltage output 2722 of the summed/integrated energy within the energy measurement window 2716 can remove the need to generate a high frequency digital output and, as a result, the low-speed ADC can use less power and can be fabricated on a smaller chip area.

FIG. 28 is a schematic diagram of a flow 2800 for processing ultrasound signals emitted and received by an ultrasound input device using energy integration via absolute value accumulation according to certain aspects of the present disclosure. Flow 2800 can be one technique for implementing flow 2700 of FIG. 27. The flow 2800 includes emitting and receiving an ultrasonic signal as illustrated in a first plot 2802. The first plot 2802 shows an analog measurement of a first signal for an emitted ultrasonic signal and a set of subsequent signals for a set of reflected ultrasonic signals associated with an ultrasound input device. The first plot 2802 can depict voltage as a function of time (e.g., V(t)). The first plot 2802 can be first plot 2702 of FIG. 27. The flow 2800 can include an ultrasound input device with an analog sampling circuit 2806, and absolute value circuit 2814, an analog accumulator 2824, and a summed voltage output 2828.

The set of subsequent signals from the first plot 2802 can be passed through an analog sampling circuit 2806 to result in a sampled first signal 2810 and a set of sampled subsequent signals 2812A, 2812B, 2812C, 2812D, 2812E as depicted in second plot 2808. First signal can correspond to the initially emitted ultrasonic wave. The second plot 2808 can depict voltage as a function of sample (e.g., V(n) where n is the sample number). The sampled subsequent signals 2812A, 2812B, 2812C, 2812D, 2812E can be passed to an absolute value circuit 2814 that can generate a set of energy signals 2820A, 2820B, 2820C, 2820D, 2820E as depicted in third plot 2816. The third plot 2816 can depict an absolute value of voltage as a function of sample (e.g., |V(n)|). The absolute value circuit 2814 can pass all zero or positive values of the set of sampled subsequent signals 2812A, 2812B, 2812C, 2812D, 2812E and reverse the polarity of all negative values. The sampled first signal 2818 is also shown in the third plot 2816, the sampled first signal 2818 can be similar to the sampled first signal 2810.

A switch-capacitor analog accumulator 2824 can be used to sum the set of energy signals 2820A, 2820B, 2820C, 2820D, 2820E from within the energy measurement window 2822. The switch-capacitor analog accumulator can generate a voltage output 2828 that is an analog value representing the sum of the energy within the energy measurement window 2822. In some cases, an analog integrator can be used instead of an accumulator.

In some cases, an optional negative clocked DC charge circuit 2826 can be applied to the switch-capacitor analog accumulator 2824 to offset information not associated with a touch event. Since the sampling circuit 2806 is clocked according to a sample rate, the optional negative clocked DC charge circuit 2826 can be clocked at the same rate to ensure the biasing voltage is applied at the appropriate intervals corresponding to the samples of the sampled subsequent signals 2812A, 2812B, 2812C, 2812D, 2812E. When an optional negative clocked DC charge circuit 2826 is used, the voltage output 2828 can be proportional to the energy of the signal minus the energy of the negative clocked DC charge circuit 2826.

The voltage output 2828 can be processed by a low-speed ADC 2830. The voltage output 2828 of the summed energy within the energy measurement window 2822 can remove the need to generate a high frequency digital output and, as a result, the low-speed ADC can use less power and can be fabricated on a smaller chip area.

FIG. 29 is a schematic diagram of a flow 2900 for processing ultrasound signals emitted and received by an ultrasound input device using energy integration via self-mixing and integration according to certain aspects of the present disclosure. Flow 2900 can be one technique for implementing flow 2700 of FIG. 27. The flow 2900 includes emitting and receiving an ultrasonic signal as illustrated in a first plot 2902. The first plot 2902 shows an analog measurement of a first signal for an emitted ultrasonic signal and a set of subsequent signals for a set of reflected ultrasonic signals associated with an ultrasonic input device. The first plot 2802 can depict voltage as a function of time (e.g., V(t)). The first plot 2902 can be first plot 2702 of FIG. 27. The flow 2900 can include an ultrasound input device with a self-mixing circuit 2906, an analog integrator circuit 2920, and an integrated voltage output 2922.

The set of subsequent signals from the first plot 2902 can be passed through the self-mixing circuit 2906 to generate a set of squared subsequent signals 2910A, 2910B, 2910C, 2910D, 2910E as depicted in the second plot 2908. The self-mixing circuit 2906 can effectively multiply every analog value by itself over time. As a result, the second plot 2908 can depict squared voltage as a function of time (e.g., $V^2(t)$). Due to the nature of squares, and thus the nature of self-mixing circuit 2906, the set of squared subsequent signals 2910A, 2910B, 2910C, 2910D, 2910E will always be positive.

The set of squared subsequent signals 2910A, 2910B, 2910C, 2910D, 2910E can be passed to an analog integrator circuit 2920. The analog integrator circuit 2920 can integrate the set of squared subsequent signals 2910A, 2910B, 2910C, 2910D, 2910E within the energy measurement window 2916 to generate an integrated voltage output 2922. The integrated voltage output 2922 can be an analog representation of the total energy within the energy measurement window 2916 over time. In some cases, an accumulator can be used instead of an analog integrator circuit 2920.

In some cases, an optional negative bias current circuit 2924 can be applied to the analog integrator circuit 2920 to offset information not associated with a touch event. The negative bias current circuit 2924 can constantly drain charge out of the analog integrator circuit 2920 during integration. When an optional negative bias current circuit 2924 is used, the voltage output 2922 can be proportional to the energy of the signal minus the energy of the negative bias current circuit 2924.

The voltage output 2922 can be processed by a low-speed ADC 2926. The voltage output 2922 of the integrated energy within the energy measurement window 2916 can remove the need to generate a high frequency digital output and, as a result, the low-speed ADC can use less power and can be fabricated on a smaller chip area.

FIG. 30 is a schematic circuit diagram depicting an analog integrator 3000 with a negative bias current according to certain aspects of the present disclosure. The analog integrator 3000 negative bias can be the analog integrator circuit 2920 and optional negative bias current circuit 2924 of FIG. 29.

The analog integrator 3000 can receive an input voltage ($V_{in}$) through a resistor) ($R_{in}$) to obtain an input current ($I_{in}$). A capacitor (C) can be charged by a charging current ($I_f$) to generate the integrated signal, which can feed the voltage output ($V_{out}$). Item (A) is an op-amp. A negative biasing current ($I_{bias}$) can be applied at point X to drain charge out of the analog integrator 3000, thus resulting in a reduced charging current ($I_f$). Therefore, the charging current can be calculated as $I_f = I_{in} - I_{bias}$.

C. Energy Measurement Windowing

FIG. 31 is a schematic diagram of a flow for processing ultrasound signals depicting the reduced effects of time-of-flight changes on touch input detection within an energy measurement window according to certain aspects of the present disclosure. In an ultrasound imaging system or proximity detection system, an accurate time-of-flight is critical to determine the distance of objects in a field of view from an ultrasonic transducer. In contrast with imaging and proximity systems, the distance to the first and second surface of the material layer in the ultrasound input device can be provided and a touch input can be detected without accounting for changes in time-of-flight. FIG. 31 shows a first plot 3102 where a first set of reflected ultrasonic signals 3104 is received starting at a first time 3106 and a second plot 3108 where a second set of reflected ultrasonic signals 3110 is received at a second time 3112. A first signal 3103 can be associated with an emitted ultrasonic signal, which occurs prior to the first time 3106 and the second time 3112 of the first plot 3102 and the second plot 3108, respectively. The first set of reflected ultrasonic signals 3104 is passed through an energy accumulator or integrator circuit 3120 to generate an output voltage 3122 (e.g., $V_{sum1}$) that can be fed into a low-speed ADC 3124 and processed to obtain an output value 3118 (e.g., 3000 LSB where LSB stands for least-significant bit). The second set of reflected ultrasonic signals 3110 is passed through an energy accumulator or integrator circuit 3120 to generate an output voltage 3123 (e.g., $V_{sum2}$) that can be fed into a low-speed ADC 3124 and processed to obtain an output value 3119 (e.g., 3000 LSB where LSB stands for least-significant bit). The output values 3118, 3119 can be representative of the pulse reflection energy during the energy measurement windows 3116 of plots 3102, 3108. Despite the different starting times of the first set of reflected ultrasonic signals 3104 and the second set of reflected ultrasonic signals 3110 (e.g., first time 3106 and second time 3112), the output values 3118, 3119 can be the same or substantially the same since the entire first set of reflected ultrasonic signals 3104 and entire second set reflected ultrasonic signals 3110 each fit within the energy measurement window 3116.

Thus, the ultrasound input device can be insensitive to time-of-flight, at least to a degree (e.g., within the energy measurement window). In some cases, advanced windowing techniques, such as those disclosed herein, can further improve the ultrasound input device's insensitivity to time-of-flight. As a result, the surface of the ultrasound input device (e.g., material layer) need not be entirely flat and/or the alignment of the ultrasound input device against a material (e.g., material layer) need not be exactly at 90° (e.g., the angle between the propagation direction of the ultrasonic transducer and the surface of the material layer). Further, the insensitivity to time-of-flight can permit some insensitivity to varying indexes of refraction through which the ultrasonic signals pass (e.g., a material layer having somewhat inconsistent indices of refraction throughout).

As shown in, for example, FIGS. 26-29 and 31, the energy of the reflected ultrasonic signals (e.g., reflected echoes and standing waves) is summed or integrated over an energy measurement window. This energy is correlated to the condition of a touch input and thus can be used for input touch detection. The energy measurement window 3116 can be sized to include the pulse time of the ultrasonic signal and account for changes in the time-of-flight due to temperature, stack variations (e.g., variations in the materials making up the ultrasound input device), etc. The energy measurement window 3116 can reduce errors due to variations in the time-of-flight. The ultrasonic touch device can determine input touch contact based on a specific threshold.

FIG. 32 is a schematic diagram of an abbreviated flow for processing ultrasound signals depicting the heightened effects of reflected ultrasonic signal time-of-flight changes on touch input detection outside of an energy measurement window. FIG. 32 shows a first plot 3202 where a first set of reflected ultrasonic signals 3204 is received starting at a first time 3206 and a second plot 3208 where a second set of reflected ultrasonic signals 3210 is received at a second time 3212. A first signal 3203 can be associated with an emitted ultrasonic signal, which occurs prior to the first time 3206 and the second time 3212 of the first plot 3202 and the second plot 3208, respectively. The first set of reflected ultrasonic signals 3204 can be processed as disclosed herein to obtain an output value 3218 (e.g., 3000 LSB where LSB stands for least-significant bit). The second set of reflected ultrasonic signals 3210 can be processed as disclosed herein to obtain an output value 3219 (e.g., 2500 LSB where LSB stands for least-significant bit). The output values 3218, 3219 can be representative of the pulse reflection energy during the energy measurement windows 3216 of plots 3202, 3208.

As depicted in FIG. 32, because nearly all of the first set of reflected ultrasonic signals 3204 fits within the energy measurement window 3216, but a smaller portion of the second set of reflected ultrasonic signals 3210 fits within the energy measurement window 3216, output value 3218 is greater than output value 3219. As depicted in FIG. 32, the output values 3218, 3219 differ by 500 LSB. If the reflected ultrasonic signals fall outside of the energy measurement window 3216, some of the measured pulses may be cut off from being measured and thus the ultrasound input device may be susceptible to time-of-flight variations (e.g., variations that would cause a difference in first time 3206 and second time 3212).

FIG. 33 is a schematic diagram of a flow for processing ultrasound signals depicting the minimal effects of reflected ultrasonic signal time-of-flight changes on touch input detection outside of an energy measurement window when window shaping is used according to certain aspects of the present disclosure. FIG. 33 shows a first plot 3302 where a first set of reflected ultrasonic signals 3304 is received starting at a first time 3306 and a second plot 3308 where a second set of reflected ultrasonic signals 3310 is received at a second time 3312. A first signal 3303 can be associated with an emitted ultrasonic signal, which occurs prior to the first time 3306 and the second time 3312 of the first plot 3302 and the second plot 3308, respectively. The first set of reflected ultrasonic signals 3304 can be processed as disclosed herein to obtain an output value 3318 (e.g., 2500 LSB where LSB stands for least-significant bit). The second set of reflected ultrasonic signals 3310 can be processed as disclosed herein to obtain an output value 3319 (e.g., 2450 LSB where LSB stands for least-significant bit). The output values 3318, 3319 can be representative of the pulse reflection energy during the energy measurement windows 3316 of plots 3302, 3308.

Unlike FIG. 32, an energy measurement window envelope 3320 is used in conjunction with the energy measurement window 3316. The energy measurement window envelope 3320 scales portions of the signal within the energy measurement window 3316 such that portions near the edges of the energy measurement window 3316 are given less weight than portions near the center of the energy measurement window 3316. Thus, despite small variations near the ends of the energy measurement window 3316, the resultant output values will be mostly based on the signals measured within the center of the energy measurement window 3316. The energy measurement window envelope 3320 is depicted in FIG. 33 as having a particular flared bell shape, although any suitable shape can be used, including symmetrical and non-symmetrical shapes. The vertical extent of the energy measurement window envelope 3320 as depicted in FIG. 33 can represent any suitable scale, such as 0% to 100%. In some cases, the energy measurement window envelope 3320 can include amplifying signals near the center of the energy measurement window 3316, such as to values above 100% of the original signal at that time.

As depicted in FIG. 33, because of the use of an energy measurement window envelope 3320, the signals (e.g., first set of reflected ultrasonic signals 3304 and second set of reflected ultrasonic signals 3310) are weighted so the portions of the signals nearest the center of the energy measurement window 3316 are given more weight than the portions nearest the edges of the energy measurement window 3316, thus de-emphasizing any portions cut off by the start or end of the energy measurement window 3316. As a result, the output values 3318, 3319 are much closer than output values 3218, 3219 of FIG. 32. As depicted in FIG. 33, the output values 3318, 3319 only differ by 50 LSB. Thus, as a result of an energy measurement window envelope 3320, the ultrasound input device can become less susceptible to time-of-flight variations.

FIG. 34 is a schematic circuit diagram depicting a window shaping circuit 3400 according to certain aspects of the present disclosure. The window shaping circuit 3400 can generate an energy measurement window having an energy measurement window envelope (e.g., energy measurement window 3316 having energy measurement window envelope 3320 of FIG. 33). The window shaping circuit 3400 can operate as a traditional analog accumulator circuit with the addition of an adjustable capacitor 3402. The adjustable capacitor 3402 can take any suitable form, such as a switched ladder of different sized capacitors. The choice of capacitor size for adjustable capacitor 3402 over time can result in an adjustment of gain on the analog accumulator circuit over time. In some cases, the adjustable capacitor 3402 can be driven by a clock 3404 or other source to determine when to chance capacitance. In some cases, the adjustable capacitor 3402 can be used with an analog sampling circuit, such as analog sampling circuit 2806 of FIG. 28, and the adjustable capacitor 3402 can be changed with different sample numbers (e.g., n of V(n)).

FIG. 35 is a schematic diagram depicting a flow 3500 for processing ultrasound signals to detect a touch input using the amplitude of reflected ultrasonic signals according to certain aspects of the present disclosure. FIG. 35 shows an ultrasound input device 3502 with no touch input 3504 and with a touch input 3506. A first plot 3508 associated with the ultrasound input device 3502 with no touch input 3504 shows a transmitted signal 3510 and a first set of reflected signals 3512. The first set of reflected signals 3512 can be processed to generate an output voltage 3530 (e.g., $V_{sum1}$) associated with the first set of reflected signals 3512, which can be provided to a low-speed ADC 3534 and further processed to generate a first output 3536. The first output 3536 can be representative of the energy of the first set of reflected signals 3512 within the energy measurement window envelope 3516. A second plot 3520 shows a transmitted signal 3522 and a second set of reflected signals 3524. The second set of reflected signals 3524 can be processed, as disclosed herein, to generate an output voltage 3532 (e.g., $V_{sum2}$), which can be provided to a low-speed ADC 3534 and further processed to generate a second output 3538. The second output 3538 can be representative of the energy of the second set of reflected signals 3524 within the energy measurement window envelope 3516.

An energy measurement window envelope 3516 (e.g., an envelope similar to energy measurement window envelope 3320 of FIG. 33) can be applied to the first set of reflected signals 3512 and the second set of reflected signals 3524. In some embodiments, the energy measurement window envelope 3516 can be applied to the first set of reflected signals 3512 and the second set of reflected signals 3524 to de-emphasize signals at the edges of the energy measurement window envelope 3516.

The first output 3536 and the second output 3538 can be compared to determine whether a touch input (e.g., touch event) has occurred. For example, if the second output 3538 is lower than the first output 3536 by a predetermined amount and/or if the second output 3538 is lower than a threshold value, the ultrasound input device 3502 can generate a signal indicating a touch input is present on a surface. Since the output voltages 3530, 3532 are indicative of the first output 3536 and second output 3520, respectively, the output voltages 3530, 3532 can be used to determine whether a touch input has occurred. In some embodiments, only a single output, such as the first output 3518, can be compared to a reference value. The reference value can be established at the time of manufacturing and/or be updated based on background characteristics measured by or communicated to the device, such as temperature.

The techniques described with reference to FIG. 35 can be used to generate an output signal from an ultrasound input device 3502, although other techniques can be used. Any technique that can convert the signals associated with the first set of reflected signals 3512 or the second set of reflected signals 3524 to a measurement of total energy can be used.

FIG. 36 is a plot 3600 depicting a simplified example energy signal 3614 according to certain aspects of the present disclosure. As an ultrasound input system processes incoming ultrasonic signals received by the ultrasound transducer, the ultrasound input system can convert the ultrasonic signals into an energy signal 3614. The energy signal 3614 can be representative of the overall energy associated with the incoming ultrasonic signals. For example, as depicted in FIG. 35, the signals depicted in plots 3508 and 3520 can be converted into outputs 3536 and 3538. These outputs can be recorded, plotted, or output over time as energy signal 3614. Output 3536, which is associated with no touch event, may be seen generally as regions where the energy signal is higher overall, whereas output 3538, which is associated with a touch event, may be seen generally as regions where the energy signal is lower overall. It is understood that the continuous output of the processed ultrasonic signals can be used to generate an energy signal that can then be used to determine whether or not a touch event occurred at a certain point in time. The energy signal 3614 of FIG. 36 is simplified for illustrative purposes only.

D. Touch Input Error Prevention

FIG. 37 is a chart 3700 depicting reflected ultrasonic signal measurements made using an ultrasound input device and illustrating techniques to improve touch input detection according to certain aspects of the present disclosure. The sensor readout (e.g., DC signal or other sensor data) determined by the ultrasound input device can be measured continuously or at a specific frequency depending on the application. In some embodiments, the sensor readout can be measured at a frequency of 100 Hz. An individual measurement 3702 can correspond to the energy measurement within an energy measurement window. One or more individual measurements can be used to determine a current state 3706. The current state can be defined by the current individual measurement 3702 or by a best-fit line based on two or more individual measurements. In some embodiments, the best-fit line can be calculated using a least-squares method. A plurality of individual measurements can be used to determine a moving average threshold 3704.

The current state 3706 and the moving average threshold 3704 can be used to detect a touch event. The moving average threshold 3704 can be used to determine a sudden signal drop that can trigger a touch input event. For example, the system can detect a "hand-touch" effect only if a "rapid signal change" 3708 from a current state 3706 is detected. A rapid signal change 3708 can be associated with a sudden signal drop on all or many channels, and can be considered a touch input event. A threshold to detect the rapid signal change 3708 can be the moving average threshold 3704 when no hand-touch event is detected. (Dynamic threshold). In some embodiments, the rapid signal change 3708 can be a pre-programmed static threshold. The rapid signal change 3708 event can trigger a touch input event and cause the ultrasound input device to generate a signal indicating a touch input on a surface of the device. For a rapid signal change 3708 event, multiple measurements 3710 are made to ensure signal did actually drop and does not jump back up, such as to its original value. For example, a hard press by a user may result in a dropping sensor readout, but will still provide a continuous signal. During the multiple measurements 3710, if the signal rapidly returns to a higher value, such as the value previously seen before the suspected touch event, the ultrasound input device can recognize the temporary signal drop as a false touch event and not classify it as a touch event. Multiple measurements 3710 can occur over a very short timeframe (e.g., on the order of tens or hundreds of milliseconds). In some embodiments, a "gradual signal change" can be treated as temperature change but not hand touch event because the moving average will adjust with each individual measurement 3702 at a rate based on the number of measurements used to determine the moving average.

In some cases, a threshold 3704 can be based on a calculation other than a moving average calculation. In some cases, the threshold 3704 is simply some function of past history (e.g., historical measurements), such as a function of the past x number of measurements. In some cases, past measurements can be weighted, such as more recent measurements being weighted higher than measurements taken longer ago. In such cases, the response time of the ultrasound input device can be adjusted based on the weightings of the past x measurements. For example, a threshold can be calculated as a function of historical values according to Threshold=$f(X[n-1], X[n-2], \ldots, X[n-m])$ where $X[n]$ is the n-th sensor readout (or the current sensor readout). In another example, the threshold can be calculated as a function of weighted historical values according to Threshold=$w_1 X[n-1]+w_2 X[n-2], \ldots, w_m X[n-m]$ where $w_n$ is a weighting parameter for the n-th sensor readout. In some cases, weighting parameters can be trained using machine learning, such as described in further detail herein.

In some cases, in addition to or instead of determining a rapid signal change 3708 based on measurements themselves, the determination can be made using a slope of a set of measurements, such as a slope of the current measurement and some number of past measurements.

FIG. 38 is a chart 3800 depicting reflected ultrasonic signal measurements made using an ultrasound input device and illustrating additional techniques to improve touch input detection according to certain aspects of the present disclosure. A portion of chart 3800 is depicted as chart 3700 of FIG. 37. Chart 3800 shows that signal variation over time may occur due to various factors, such as temperature changes, however the ultrasound input device may be able to discern that these variations are not touch events. However, sudden signal drops between consecutive measurements can be indicative of a touch event. Current state 3806 can be similar to current state 3706 of FIG. 37. The moving average threshold 3804 can be similar to threshold 3704 of FIG. 37. This threshold 3804 can be based in part on a moving average of previous measurements of the current state 3806, such as a moving average of previous measurements offset by a given amount. This type of threshold 3804 can be known as a dynamic threshold, although other threshold techniques can be used.

At region 3816, a touch event occurs. When the touch event occurs, the current state 3806 quickly drops. As depicted in the callout portion of chart 3800, various measurements 3802 are shown. Each measurement 3802 can be separated in time based on a measurement frequency. For example, each measurement 3802 can be 0.01 seconds apart (e.g., at 100 Hz), although other frequencies can be used. A sudden drop can be detected between two or more consecutive measurements 3802. When the sudden drop in current state 3806 falls below the threshold 3804, a touch event can be considered to have occurred. Region 3817 depicts another touch event.

At region 3818 and region 3820, gradual changes in temperature of the ultrasonic sensor and surface to which the sensor is coupled can result in gradual changes in current state 3806. Because of the relatively slow changes in the current state 3806, the threshold 3804, which is based on a moving average of the current state 3806, will make changes as well. Since the threshold 3804 is able to compensate for slow changes in the current state 3806, such as those that occur due to temperature changes, these slow changes in current state 3806 do not pass the threshold 3804 and therefore do not trigger touch events. Furthermore, since the threshold 3804 is dynamically updating, the threshold 3804 is able to operate properly at different temperatures. In some cases, changes in current state 3806 due to temperature variation can be even larger than contrast resulting from an actual hand touch, but since these temperature variations are much slower than the changes in current state 3806 due to a touch event, they are not detected as touch events.

VI. Multifrequency Touch Detection

FIG. 39 is a chart depicting a temperature dependence of reflected ultrasonic signals according to certain aspects of the present disclosure. The reflected ultrasonic signals received by an ultrasound input device can include the main signal 3902 and any unwanted signals 3904. The main signal travels a first path through the material layer and is associated with a first time-of-flight (TOF) and any unwanted signals 3904 travel a second path through the material layer and are associated with a second TOF. The speed of sound in a material layer depends on the temperature of the material layer. Due to speed of sound changes as a result of temperature changes, the main signal 3902 and the unwanted signals 3904 travel through different acoustic paths, and the associated first TOF and second TOF change a different amount accordingly. This creates a net TOF difference $\Delta t(T)$ 3906 between the main signal 3902 and the unwanted signal 3904 which change with temperature T. This then translates into a phase delay difference $\Delta \phi(T)$ between the main signal 3902 and the unwanted signal 3904. And thus yields different integrated signal strength difference $\text{Dout}(T)$ as depicted by line 3910.

FIG. 40 is a set of charts depicting TOF temperature dependence of a two frequency method of detecting a touch input according to certain aspects of the present disclosure. The charts can be similar to the charts of FIG. 39. In a multi-frequency ultrasound input device, different frequencies will have different temperature effects resulting in a different TOF for each signal. The multi-frequency ultrasound input device can process a "finger touch" (e.g., touch event) when a signal drop is detected in a threshold number of frequency channels. For example, two different methods can detect whether a finger touched the ultrasound touch input device, and the device can only process the touch event when both of the methods agree finger touch has been detected.

In a multi-frequency ultrasound touch input device, a first signal 4002 at a first frequency and a second signal 4004 at a second frequency have different background and temperature drift characteristics. For example, the first signal 4002 and the second signal 4004 experience the same $\Delta t(T)$ when temperature changes. As a result of the different temperature drift characteristics, the same $\Delta t(T)$ will translate to a different phase delay for each frequency. For example, the first signal 4002 will have a first phase delay of $\Delta \phi \downarrow 1(T)$ 4006 and the second signal 4004 will have a second phase delay $\Delta \phi \downarrow 2(T)$ 4008. The resulting difference in the phase delay can cause two different ADC output value patterns over temperature $Dout \downarrow 1(T)$ and $Dout \downarrow 2(T)$, as depicted by lines 4010, 4012, respectively.

Therefore, signal drop can be measured in multiple frequencies in order to increase touch detection reliability and reduce false trigger detection. A touch input event can be processed if all the frequency channels detect a sudden signal drop. The multiple measurements can occur very fast (<1 ms) to make sure the sudden signal drop is not due to temperature effects.

The multi-frequency ultrasound touch input device can avoid false triggers by reducing noise associated with environmental conditions. The touch input device can immediately execute a rapid pulse-echo test to ensure the touch event is real but not a false trigger due to noise. In some embodiments, the multiple tests can happen within 1 ms.

FIG. 41 is a multi-part chart 4100 depicting reflected ultrasonic signal measurements made across several frequencies using an ultrasound input device and illustrating techniques to improve touch input detection according to certain aspects of the present disclosure. Different frequencies of ultrasonic signals can exhibit different variation due to temperature changes. Thus, by sensing using multiple ultrasonic frequencies, the ultrasound input device can compare a suspected touch event with the data from one or more other frequencies to ensure the suspected touch event is confirmed by the one or more other frequencies. The use of multiple frequencies can reduce error rates.

Line 4106 can represent energy signals associated with a 100 kHz frequency, line 4105 can represent energy signals associated with a 1 MHz frequency, and line 4107 can represent energy signals associated with a 10 MHz frequency. Line 4104 can represent a moving average threshold, such as threshold 3704 from FIG. 37. For illustrative purposes, a moving average threshold is only depicted with respect to the 100 kHz frequency, but respective thresholds can exist for each frequency used (e.g., 1 MHz and 10 MHz). While the frequencies 100 kHz, 1 MHz, and 10 MHz are used with respect to FIG. 41, any other suitable frequencies can be used. While three different frequencies are used with respect to FIG. 41, any number of different frequencies, such as two or greater than three, can be used. A touch event may be registered only if the touch event is detected across all, a majority of, or at least a threshold percentage of different frequencies being used for detection.

In some cases, instead of or in addition to driving an ultrasound input device at different frequencies, the ultrasound input device can drive an ultrasonic array with different phase delays to generate different beam patterns. Since different beam patterns can have different temperature characteristics, different beam patterns can be used similar to different frequencies to reduce error and confirm suspected touch events.

FIG. 42 shows a plan view of a two-frequency PMUT 4200 according to certain aspects of the present disclosure. In some embodiments, a circular PMUT design can be fabricated to achieve multi-frequency transducers. The circular PMUT design can consist of multiple individual channels for transmit and receive per frequency. In some cases, the multiple channels or transducers can be arranged concentrically. For example, the two-frequency PMUT 4200 includes a first transmit/receive pair 4202 associated with a low frequency. The first transmit/receive pair 4202 can include a low frequency transmit ring 4204 and a low frequency receive ring 4206. The two-frequency PMUT 4200 also includes a second transmit/receive pair 4208 associated with a high frequency. The second transmit/receive pair 4208 can include a high frequency transmit ring 4210 and a low frequency receive ring 4212. In various embodiments, a circular PMUT design can include a range of multiple frequencies from 2 to 10. The range of frequencies can be from 1 MHz to 10 MHz. In some embodiments, frequencies less than 1 MHz can be used depending on the material layer and specific application. A second PMUT array can be added for TOF measurement at the 1-3 MHz range. In some cases, the ranges of frequencies used for any array can be from 30 kHz to 50 Mhz.

FIG. 43 is a schematic plan view depicting a multi-frequency ultrasound input device 4300 with a square design according to certain aspects of the present disclosure. The square sensor design can consist of a square grid of multiple individual channels for transmit and receive per frequency. In some cases, one or more receiving channels can be positioned between multiple transmitting channels. In such cases, the position of a receiving channel between multiple transmitting channels can facilitate receiving and detecting reflected signals. In an example, the multi-frequency ultrasound input device 4300 can include various low-frequency transmitters 4302, low-frequency receivers 4304, high-frequency transmitters 4306, and high-frequency receivers 4308. The square design can include nested patterns, such as the cross-shaped nested pattern depicted in FIG. 43. Any other suitable pattern can be used. The various transmitters and receivers can be any suitable frequency, such as between 30 kHz to 50 MHz, 1 MHz to 10 MHz, or any other suitable range. It is understood that the frequencies described in reference to FIG. 43 can be applicable to any suitable sensor array, for example, as described in reference to FIG. 14A-14G.

VII. Feature Extraction

Systems and methods, according to embodiments, can allow for the extraction of features from signals, for example, received by an ultrasound input device. The ultrasound input device can be capable of extracting features such as energy signals as well as physical characteristics.

A. Discernable Energy Signals

FIG. 44 is a set of three charts 4402, 4404, 4406 depicting example signals 4412, 4414, 4416 received by an ultrasound input system attributable to three different users according to certain aspects of the present disclosure. Each of the charts

4402, 4404, 4406 depicts energy measurements over time associated with reflected signals detected by an ultrasound input device.

Signal 4412 of chart 4402 is an example of a dry finger quickly pressing with a relatively small force. The dryness of the finger and the relatively small force show a relatively smaller dip in the energy measurements during the touch event. The speed of the press is seen in the relatively short duration of the dip in the energy measurements.

Signal 4414 of chart 4404 is an example of a wet finger moderately pressing with relatively hard force. The wetness of the finger and the intensity of the press can both lead to a greater dampening effect on the reflected signals, and thus a deeper dip in the energy measurements. The speed of the press is seen in the moderately wide dip in the energy measurements. Further, the more noticeable presence of an initial drop and subsequent drop when the energy measurements first dip is indicative of a small amount of time spent in contact with the surface before the full force of the press is initiated.

Signal 4416 of chart 4406 is an example of a touch event pattern where a user lightly touches the surface before pressing and initiating the full touch event. The initial dip and relatively long delay until the subsequent, full dip in the energy measurements is indicative that the user placed a finger on the surface and waited a short time before pressing the finger down.

While signals 4412, 4414, 4416 can each be used to indicate a desired touch event due to the presence of a sufficient dip in energy measurements, each of the signals 4412, 4414, 4416 contains various features that are discernable. Examples of discernable features include depth of the dip in energy measurements, width of the dip in energy measurements, the presence of an initial dip before a subsequent and deeper dip in energy measurements, the delay between an initial dip and a subsequent and deeper dip in energy measurements, velocity of decrease and/or increase of energy measurements into and out of the dip (e.g., velocity of change in energy signal at the edge of the dip), or any other features of the energy measurements.

By extracting various features from energy measurement signals, it can be possible to distinguish and even recognize different users, enabling additional user-based advanced functionality. For example, after a training session, an ultrasound input system may be able to distinguish a first user and a second user due to the particular ways the users interact with the ultrasound input device, such as the style of touch (e.g., quick tap or place and press), duration of the touch, characteristics of the skin (e.g., natural wetness or dryness of a finger), intensity of the touch (e.g., light press or hard press), or other characteristics discernable from the energy measurement signals. While there characteristics may be discernable from the energy measurement signals, they may not be readily perceivable to a user due to the high speeds at which the energy measurement signals can be taken. Therefore, the difference between a quick tap and a place and press may be easily discernable from the energy measurement signals, but may be non-discernable or not easily discernable from a visual inspection of the touching action.

FIG. 45 is a set of charts depicting energy measurement signals associated with a human finger, a water drop, and placing a device on a desk (e.g., placing an object over a sensor). For a human finger, the energy measurement signal inevitably has slight movements or variations, even for the duration of a touch event, which can be detected and identified to confirm that a human finger is initiating the touch event. For a liquid droplet or water droplet, the energy measurement signal has certain characteristics, such as a steep drop followed by a generally steady signal without much variation, if any. Detection of such characteristics can be used to discriminate between an actual intended touch event and accidental contact by other objects, such as falling water. Placing a device or other object on a sensor (e.g., a desk-mounted sensor) can have an energy measurement signal with certain characteristics, such as a relatively shallow drop followed by a generally steady signal without much variation, if any.

Accordingly, a system as described herein can determine an energy signal associated with a set of reflected ultrasound signals. The system can then extract feature information associated with the energy signal and then determine an inference associated with the object based on the extracted feature information. Determining the inference can comprise using the feature information to determine whether the touch event is associated with a human digit or a water drop. For example, as illustrated in FIG. 27, a water drop (i.e., water droplet) can induce a larger drop in the energy signal determined by the system than a human digit (i.e., finger). The finger can have peaks and valleys (i.e., fingerprint) that decreases the amount of surface area placed on the sensor and thus the amount of ultrasonic signals absorbed by the object.

Thus, a criteria of a magnitude of the energy signal (e.g., corresponding to a steep drop) can be used to distinguish between a finger touch and a water drop. Further, the energy signal is more consistent over time than the human finger. Thus, a criteria of the energy signal being within a specified range over a specified amount of time can be used to distinguish between a water drop and a human finger. Such a measurement can be performed using a variation (e.g., a standard deviation) of the energy signal over time. Accordingly, the feature information can include a magnitude of the energy signal and/or a variation of the energy signal. The determining of the inference can include comparing the magnitude and/or the variation to a respective threshold to determine whether the touch event is associated with a human digit or a water drop.

FIG. 46 is a combination schematic diagram and set of charts depicting how temperature can be leveraged to further identify whether a human finger is initiating a touch event. The energy measurement signal output by the sensor (e.g., the sensor chip and/or substrate) is somewhat dependent on the temperature of the sensor. As the temperature increases, the energy measurement signal tends to decrease.

Generally, a chip will be at room temperature (e.g., at or around 20 or 21° C.), whereas a human finger will be at body temperature (e.g., at or around 30° C.). When living tissue (e.g., a human finger) initiates a touch event, heat will transfer between the tissue (e.g., finger) and the chip. When the finger is warmer, it may cause the chip to slightly increase in temperature. Since the energy measurement signal as a whole is partially dependent on the temperature of the chip and/or substrate, fluctuation in the temperature of the chip and/or substrate can be detected as an underlying steady increase or decrease in the energy measurement signal over time. As depicted in the chart at the bottom left of FIG. 46, when a warm finger is placed on a cooler sensor, the heat transfer will cause the energy measurement signal to take on a generally downward slope. As depicted in the chart at the bottom middle of FIG. 46, when a cool finger is placed on a warmer sensor, the heat transfer will cause the energy measurement signal to take on a generally upward slope (i.e., upward trend). However, as depicted in the chart at the bottom right of FIG. 46, when something other than living tissue (e.g., a finger) is placed on a sensor and that other object has a temperature that is at or near the same temperature of the sensor (e.g., both at room temperature), the lack of heat transfer will cause the energy measurement signal to take on a generally flat slope. Overall, such temperature effects on the energy measurement signal can be used to identify when something that is touching the sensor is at or near body temperature, or at or near other temperatures. In some cases, it may be possible to discern an approximate temperature of the object initiating the touch event through analysis of the general slope of the energy measurement signal.

In some cases, one or more temperatures sensors can be used to measure the temperature of the chip and/or substrate. Knowledge of the temperature of the chip and/or substrate can help inform a determination of whether an object initiating a touch event is a human finger or not.

FIG. 47 is a combination schematic diagram and charts depicting a finger touch and associated temperature information according to certain aspects of the present disclosure. In some cases, the ultrasound input system can include a temperature sensor, such as within, on, or proximate the chip. The temperature sensor can provide a temperature signal (e.g., temperature sensor readout) associated with the temperature of the ultrasound input system. Generally, when no touch event is being initiated, there would be minimal or no change in the temperature signal, as the ultrasound input system would maintain a temperature of at or near the ambient temperature, such as room temperature. However, if a touch event is initiated with a human finger, an expected change in temperature towards body temperature (e.g., rise in temperature from room temperature to body temperature) may occur. As depicted in the bottom left chart of FIG. 47, a human finger touch can be detected or confirmed by identifying a change in the temperature signal towards body temperature (e.g., at or around 30° C.). As depicted in the bottom right chart of FIG. 47, a touch event initiated by an object (e.g., room-temperature object) other than a human finger would not elicit a change in temperature of the ultrasound input system towards body temperature.

B. Discernable Physical Characteristics

FIG. 48 is a combination schematic side view 4802 and signal map 4804 depicting ridges 4806 and valleys 4808 of a fingerprint initiating a touch event on an ultrasound input device 4810 according to certain aspects of the present disclosure. When a user places a finger on a surface associated with an ultrasound input device 4810, the ultrasound input device 4810 may be able to detect a portion of the user's fingerprint. Generally, the ultrasound input device 4810 may sense a region that is smaller than a user's entire fingerprint, although that need not always be the case.

The ultrasound input device 4810 can identify ridges 4806 and valleys 4808 of the user's fingerprint (e.g., of the portion of the user's fingerprint). At ridges 4806, the ultrasound input device 4810 will detect a decrease in energy measurements of reflected signals due to the damping effect of the flesh of the ridge 4806. However, at valleys 4808, the same damping effect does not exist.

Therefore, an ultrasound input device 4810 measuring a finger as depicted in the schematic side view 4802 may generate a signal map 4804 showing ridges 4806 and valleys 4808. As seen in the signal map 4804, darker areas denote dips in energy measurements of reflected signals and lighter areas denote signals closer to a baseline energy measurement. While the entire fingerprint cannot be discerned from the field of view of the ultrasound input device 4810, a number of ridges 4806 and valleys 4808 can be discerned. By measuring the widths of ridges 4806 and valleys 4808, as well as inter-valley distances and inter-ridge distances (e.g., inter-ridge distance 4812), the ultrasound input device 4810 may be able to discern one finger from another finger. In an example case, a finger of an adult may show wider ridges 4806 and valleys 4808 than that of a youth. Thus, in a household with an adult and a child, the ultrasound input device 4810 may be able to discern between the two users based on discernable physical characteristics of the user's finger, such as fingerprint characteristics. In some cases, the presence of a repeating line pattern (e.g., a pattern of ridges 4806 and valleys 4808) can be used to confirm or make a determination as to whether or not the object initiating the touch event is a human finger.

In some cases, discernable physical characteristics, like fingerprints, can be used along with discernable energy signals to further identify users.

FIG. 49 is a schematic diagram depicting example reflected signals 4924, 4925 received by an ultrasound input system 4902 attributable to the same user initiating touch events with a glove 4908 and without a glove 4906 according to certain aspects of the present disclosure. A first plot 4910 associated with the ultrasound input device 3502 with touch input from a user not wearing a glove 4906 shows a transmitted signal 4922 and a first set of reflected signals 4924. The first set of reflected signals 4924 show a characteristic dampening of the reflected signals associated with a touch event. A second plot 4920 associated with the ultrasound input device 3502 with touch input from a user wearing a glove 4908 shows a transmitted signal 4922 and a second set of reflected signals 4925. The second set of reflected signals 4925 show a characteristic dampening of the reflected signals associated with a touch event that is somewhat similar to the first set of reflected signals 4925, but may have additional dampening due to the presence of the glove 4912. The first set of reflected signals 4924 can be processed to generate a first output voltage 4932. Similarly, the second set of reflected signals 4925 can be processed to generate a second output voltage 4933.

Thus, an ultrasound input system 4902 can distinguish between a gloved hand and a non-gloved hand. In some cases, certain actions may be available or not available depending on whether or not the user is wearing a glove. For example, in a medical office, certain functions associated with an ultrasound input system may be unavailable unless the user is wearing a glove to ensure proper protection is in place.

C. Extracting and Using Features

FIG. 50 is a flowchart depicting a process 5000 for extracting features from a signal of an ultrasound input system according to certain aspects of the present disclosure. The method illustrated in FIG. 50 will be described in the context of a system comprising an ultrasound input device and one or more data processor determining an energy signal from a touch event. It is understood, however, that the invention can be applied to other circumstances.

At optional block 5002, a baseline signal can be received by an ultrasound input system. The baseline signal can be energy measurements associated with no touch event (e.g., when no user is touching the surface coupled to the ultrasound input device). Removing such baseline signals can result in more effective range to sample during analog-to-digital conversion, for example, as described herein in reference to at least FIG. 27. For example, the ultrasound input system can emit a first signal. Any suitable number of reflected ultrasonic signals and reflected-emission signals can then be measured by the ultrasound input system. The signal can be determined not to be associated with a touch event (e.g., a finger touching an external surface) based on the characteristics of the received signals. For example, the received signals can indicate a baseline signal associated an air signal. Further example details of a baseline signal are described herein.

At block 5004, the system can transmit an emitted signal using an ultrasound input device. The ultrasound input device can be coupled to a material layer having an external surface located opposite the material layer from the ultrasound input device. The emitted signal can pass through the material layer towards the external surface. Any number of reflected ultrasonic signals and reflected-emission signals can result from an initial emitted ultrasonic signal until the signals become too attenuated to be reflected and/or detected, as described in detail herein.

At block 5006, a signal associated with a touch event is received. For example, the system can receive a set of reflected ultrasound signals associated with the emitted signal. The received signal can be a measurement of energy associated with reflected ultrasonic waves. The signal received at block 5004 can depend on how the touch event is initiated (e.g., timing of the touch, style of touch, amount of force of the touch, physical characteristics of the object initiating the touch).

At block 5008, the one or more data processors of the system can determine an energy signal associated with a set of reflected ultrasound signals associated with the touch event between an object and an external surface of a material layer coupled to the ultrasound input device.

As an example, in reference to FIG. 27, the flow 2700 includes emitting and receiving an ultrasonic signal as illustrated in a first plot 2702. The first plot 2702 shows an analog measurement of a first signal 2703 for an emitted ultrasonic signal and a set of subsequent signals 2704A, 2704B, 2704C, 2704D, 2704E for a set of reflected ultrasonic signals associated with an ultrasound input device. The flow 2700 can include an ultrasound input device with an analog summation or integration circuit 2720 and a summed voltage output 2722.

A second plot 2708 shows the first signal 2703 and a set of energy signals 2710A, 2710B, 2710C, 2710D, 2710E each corresponding to the energy of respective ones of the set of reflected ultrasonic signals. For illustrative purposes, the set of energy signals 2710A, 2710B, 2710C, 2710D, 2710E is depicted in solid line overlaid with the set of subsequent signals 2704A, 2704B, 2704C, 2704D, 2704E from the first plot 2702 shown in dotted line.

At block 5010, after determining the energy signal associated with the set of reflected ultrasound signals, features can be extracted from the signal associated with the touch event. Extracted features can be any suitable characteristic of the signal that can be discernable and/or able to inform an inference. The one or more data processor can be configured to extract feature information associated with the energy signal in any suitable manner.

In some embodiments, extracting the feature information can include identifying a pattern in the energy signal associated with a dip in energy measurements that is associated with the touch event. For example, when an individual places their finger upon the system, specifically the external surface, the individual's finger can absorb at least a portion of an emitted ultrasonic signal, thus causing a dip in the energy measurement.

The pattern can be identified in any suitable manner described herein. For example, in some embodiments, identifying the pattern in the energy signal can include identifying a depth of the dip, a duration of the dip, a presence of a subsequent dip after the dip, a delay between the dip and another dip, and/or a rate of change in the energy signal at an edge of the dip (e.g., during finger land or removal). In other embodiments, identifying the pattern can include identifying a change in the energy signal attributable to a temperature shift in the material layer, as described in detail herein.

In some cases, extracting features (i.e., feature information) at block 5010 can comprise comparing the signal to stored historical signal(s), such as to determine if the received signal at block 5010 matches a stored signal associated with a particular user. In some cases, extracting features at block 5010 can comprise identifying a pattern in the received signal, such as to identify that the received signal is attributable to a sharp tap or a place and press action. In some cases, extracting features at block 5010 can comprise measuring characteristics of the received signal. Any discernable characteristic of the received signal can be measured and used to make a determination or inference regarding the source of the touch event.

At block 5012, an inference can be determined based on the extracted feature information. The one or more data processor can be configured to determine an inference associated with an object based on the extracted feature information in any suitable manner.

For example, in some embodiments, determining the inference can include estimating a relative temperature of the object based on an identified change in the energy signal attributable to the temperature shift in the material layer. For example, an individual that touches the external surface of the material layer can have a body temperature that is higher than the ambient temperature and/or the temperature of the material layer. The determined energy signal can be influenced by temperature, as described herein, and thus allow for the one or more data processor to determine an inference of a temperature measurement and/or temperature shift (e.g., as measured by a temperature sensor as described below).

In other embodiments, the one or more data processors can determine the inference by comparing the identified pattern with stored data. The stored data can be associated with prior touch events of the external surface. For example, the prior touch events of the external surface may have been performed by an individual. The current touch event can be compared to the prior touch events to determine if the current touch event is also performed by the individual, as described herein.

In yet other embodiments, the one or more data processors can determine the inference by using the feature information to determine that the touch event is associated with a human digit, a bare human digit, a wet human digit, a dry human digit, and/or a gloved human digit. For example, as described herein, the determined energy signal can be affected by one or more than one characteristic(s) of the individual's digit(s) placed on the external surface of the material layer. The one or more data processors can also determine the inference by using the feature information to determine a style of touch (e.g., tap, double tap, place and press, etc.) of the touch event, a touch intensity associated with the touch event, and/or a physical characteristic of the object.

In some embodiments, determining the inference can include identifying that the object is associated with one out of a plurality of users based on associating the touch event with the style of touch of the touch event, the touch intensity associated with the touch event, and/or the physical characteristic of the object. The physical characteristic of the object can include a measurement associated with a portion of a fingerprint contacting the external surface.

In some embodiments, the one or more data processors can determine an additional signal associated with an additional sensor (e.g., a temperature sensor of FIG. 29) associated with the ultrasound input device. The one or more data processors can then determine the inference further using the additional signal. The additional sensor can include any suitable additional sensor associated with the ultrasound input device. For example, the additional sensor can include a temperature sensor, a pressure sensor, a charge-coupled device, etc.

For example, the system can include a temperature sensor. The temperature sensor can record temperature of, for example, the external surface of the system over time. Since the human fingertip has a certain physical size and temperature range, when a human touches the external surface the one or more data processors can determine that the touch event is caused by a human finger. As an illustrative example, the temperature sensor can record the temperature of at least one portion of the external surface at a predetermine interval (e.g., 1 ms, 0.1 s, 1 s, etc.). The temperature sensor can record the ambient temperature (e.g., 70° F.). When a user touches the external surface during a touch event, the system can record an energy signal which can include, for example, a dip in energy. During the touch event, the temperature sensor can continue to measure the temperature of the external surface. The human finger in contact with the external surface can increase the temperature of the external surface, thus leading the temperature sensor to record an increase in temperature. For example, the human finger can be approximately 98° F. The temperature sensor can record a temperature between the ambient temperature of 70° F. and the temperature of the human finger of 98° F., since the finger will heat up the external surface and the temperature sensor.

The temperature measured by the temperature sensor can be an additional signal associated with an additional sensor (e.g., the temperature sensor) associated with the ultrasound input device. The one or more data processors can determining an inference using the additional signal along with the energy signal. For example, the one or more data processors can determine that the dip of the energy signal as well as the rise in temperature from an ambient temperature to a higher temperature between the ambient temperature and an average human temperature indicates that the touch event is indicative of a human finger touching the external surface. In some cases, the one or more data processors can determine whether or not a signal change is a result of a human touch or from another object (e.g., table, pocket fabric, pen/stylus, etc.) coming into contact with the external surface using the temperature data from the temperature sensor. For example, the temperature sensor may not measure as large of an increase in temperature when touched with a table, pocket fabric, pen/stylus, etc. as when touched by a human finger.

In some cases, the temperature sensor may be a known (i.e., predetermined) distance from the finger. For example, the temperature sensor may be on the opposite side of the external surface from the finger. In this case, during processing of the additional signal associated with an additional sensor (e.g., temperature sensor), a heat transfer problem with known boundary conditions and initial values can be solved to determine what the temperature is at the external surface.

In some embodiments, the additional sensor can include a pressure sensor and/or a strain gauge. For example, a typical touch from a human finger can impose a certain force and strain on the external surface which can be propagated to the additional sensor. The pressure sensor and/or the strain gauge can measure the force and/or strain imparted into the system by the finger. The one or more data processors can determine that the force and/or strain measured by the pressure sensor and/or the strain gauge indicates a force and/or stain typical of a touch of a finger. The one or more data processors can also determine whether or not the energy signal is indicative of a touch of a finger. If both the additional signal, from the pressure sensor and/or the strain gauge, as well as the energy signal indicate a touch of a finger, then the one or more data processors can determine that the touch event was a touch of the finger.

In some cases, the additional sensor can include the strain gauge. The strain gauge can detect the deflection of the surface associated with the touch event and can output an electrical signal. The stronger the touch event (e.g., more force exerted on the external surface by the object such as a finger), the more deflection imparted onto the strain gauge. Thus, the strain gauge can output a larger electrical signal.

At block 5014, the one or more data processors can generate an output signal associated with the determined inference. The output signal can include any suitable output generated based on the determined inference. In some embodiments, the output signal can indicate a particular action that can be performed by the one or more data processors and/or an external devices.

In some embodiments, the one or more data processors can perform an action based on the extracted feature(s). The action can include any suitable process that can occur based on the output signal. In an example, if the extracted features are used to identify a particular use, the action performed can be to authenticate or authorize the user to access a resource. In another example, if multiple users have preset customizations for a particular ultrasound input system, the extracted feature information can be used to determine which user is interacting with the ultrasound input system and therefore perform the customized actions for that particular user. In some cases, performing actions can include permitting or denying access to a resource, such as denying access to a room or a tool when the extracted features indicate that a user is not wearing gloves when gloves are required.

VIII. Machine Learning Decision Algorithm

FIG. 51 is a chart 5100 depicting a machine learning decision algorithm used to improve touch detection according to certain aspects of the present disclosure. As described with reference to FIG. 37, weighting parameters can be used to drive various decisions regarding when a touch event is detected or not detected. In some cases, a machine learning approach can take into account sensor output values and slopes between a sensor value and a previous sensor value to generate inferences that a touch event has occurred or not occurred. The machine learning approach can use a decision function (f), such as:

$$f = w_0 X[n] + w_1 X[n-1] + w_2 X[n-2] + \ldots + w_m X[n-m] - w_{s0} S[n] + W_{s1} S[n-1] + \ldots + w_{sm} S[n-m]$$

where $w_n$ and $w_{sm}$ are weighting parameters, $X[n]$ is the current sensor output, $X[n-1]$ is the previous sensor output, $X[n-m]$ is the m-th previous sensor output, $S[n]$ is the slope of the current sensor output (e.g., as compared to an immediately prior sensor output), $S[n-1]$ is the slope of the previous sensor output, and $S[n-m]$ is the slope of the m-th previous sensor output. In some cases, other parameters can be used in the decision function.

The weighting parameters of the decision function can be trained over a corpus of data to generate a decision boundary between inputs that are considered touch events and inputs that are not considered touch events, as depicted in chart 5100. Thus, for any given sensor outputs and slopes of sensor outputs, a point on chart 5100 can be identified, and if that point falls above the decision boundary, those sensor outputs and slopes of sensor outputs can be considered indicative of a touch event.

IX. Intelligent Touch Event Detection

Systems and methods, according to embodiments, can allow for a touch event detection framework. Embodiments allow for an adaptive threshold for touch event detection. An adaptive threshold scheme can involve identifying touch events from energy signals of a sensor using a continuously adapting threshold. Embodiments also allow for a recurrent neural network for touch event detection and/or a recurrent neural network for state classification.

A. General Touch Event Detection Framework

FIG. 52 is a flowchart depicting a process 5200 for detecting touch events according to certain aspects of the present disclosure. Process 5200 can be performed by any suitable device, including processor 722 and/or computing device 724 of FIG. 7. In some cases, data from multiple sensors can be used for any of blocks 5202, 5204, 5206.

At block 5202, energy signal data is accessed. Energy signal data is signal data from an ultrasonic sensor indicative of the amount of energy sensed by the ultrasonic sensor during a time period, such as the energy signal 3614 depicted in and described with reference to FIG. 36 Any suitable time period can be used.

At block 5204, a touch event can be identified based on the energy signal. Identifying a touch event can include determining whether or not a touch event has occurred based on an energy signal. In some cases, identifying a touch event at block 5204 can include outputting a touch signal. The touch signal can be indicative of whether or not an associated energy signal is inferred to be associated with a touch event.

At optional block 5206, state classification can be identified from touch event data (e.g., touch signal from block 5204). In some cases, state classification can be identified from the touch event data and associated energy signal data. A state classification can be a classification associated with a touch event. Any suitable classification can be determined, such as the type of touch event that has occurred. Examples of suitable state classifications related to the type of touch event that has occurred include single tap, double tap, triple tap, n-tuple tap, hold (e.g., touch and hold), tap and hold (e.g., tap then touch and hold), press (e.g., longer than a tap), double press, press and hold (e.g., press then touch and hold), hold and press (e.g., touch and hold for a duration then press), and grip (e.g., holding with more surface area or other characteristics). A state classification can be determined, the state classification can be associated with the touch event based on trigger values. Examples of suitable state classifications related to other information associated with a touch event can include whether or not the user is wearing a glove, whether or not the user appears to be older or younger (e.g., based on distance between fingerprint ridges), whether or not the user appears to be a pre-identified user, or other such classifications.

As an example, another classification can include hydration and/or perspiration of the user's finger and/or body. The system can detect the hydration and/or perspiration of the user, for example, by determining a lower ultrasound signal absorption than typical ultrasound signal absorption by the user. As a user's finger is dryer, the finger will absorb fewer ultrasound signals. Thus, different levels of thresholds for an amplitude and a variation over time can be used. For example, a wet finger may induce a more uniform drop in energy signal than a dry finger. Thus, a criteria of a magnitude of the energy signal (e.g., corresponding to a steep drop) can be used to distinguish between a dry finger and a wet finger. Further, the energy signal can be more consistent over time with a wet finger than a dry finger due to the additional water present in the wet finger. Thus, a criteria of the energy signal being within a specified range over a specified amount of time can be used to distinguish between a wet finger and the dry finger. Such a measurement can be performed using a variation (e.g., a standard deviation) of the energy signal over time. Accordingly, the feature information can include a magnitude of the energy signal and/or a variation of the energy signal. The determining of the inference can include comparing the magnitude and/or the variation to a respective threshold to determine whether the touch event is associated with a wet finger or a dry finger.

In some cases, depending on the orientation and placement of the sensor, any number of classifications can be used. In some cases, state classifications can be trained such that identification of state classifications at block 5206 can make reference to training data or a model generated using training data.

B. Adaptive Threshold for Touch Event Detection

FIG. 53 is a schematic diagram depicting an adaptive threshold scheme 5300 for identifying touch events according to certain aspects of the present disclosure. The adaptive threshold scheme 5300 can be performed partially or entirely on a processor coupled to an ultrasound sensor, such as processor 722 of FIG. 7. The method as described in FIG. 53 can be performed by an application specific integrated circuit (ASIC), a field-programmable gate array (FPGA), or any other suitable device and/or controller described herein. This scheme 5300 does not require machine training, however one-time tuning for every new cover material to which the sensor is coupled can improve detection. The adaptive threshold scheme 5300 can operate off of discrete time periods or frames, such that at any time, the scheme 5300 may be analyzing current data from a current observation and historical data from any number of past observations.

The adaptive threshold scheme 5300 involves identifying touch events from the energy signals of a sensor using a continuously adapting threshold. The threshold is a continuously tracked version of the energy signal that has been filtered through an adaptive threshold update function, whose filter parameters are adaptively updated based on the energy signal, the historical threshold values, and optionally trigger data (e.g., whether or not a touch event is or was recently occurring). Whenever the energy signal exceeds the adaptive threshold (i.e., is less than the adaptive threshold, is greater than the adaptive threshold, is less than or equal to the adaptive threshold, or is greater than or equal to the adaptive threshold), a sensor trigger (e.g., touch event) can be identified. Optionally, the scheme 5300 can analyze the current and past trigger history (e.g., touch event signal over a certain number of latest observations) to identify the current state classification, such as to determine whether the touch event is a tap, press, hold, or other action. For example, analyzing the touch event signal (e.g., trigger history) can show how many times the energy signal fell below the threshold within a certain timeframe, how far the energy signal fell, for how long the energy signal was below the threshold, and other such characteristics, which can be used by the scheme to make a determination as to the current state of the sensor.

Sensor data 5302 can include current and historical sensor data that is or is based on the energy signals (e.g., energy data) from a sensor, such as the ultrasound sensor 702 of FIG. 7. The sensor data 5302 can be provided to an adaptive threshold update function 5304, which can use the data to generate threshold data 5306. The adaptive threshold update function 5304 can make use of only the current sensor data or both current and historical sensor data, as well as any additional parameters, as appropriate. The adaptive threshold update function 5304 acts as a sort of lowpass filter, allowing slow changes in the energy signal to have a substantial effect on the adaptive threshold, whereas faster changes in the energy signal have a minimal or negligible effect on the adaptive threshold. Thus, factors causing slow changes in the energy signal, such as temperature changes in the room, can be compensated for automatically in the adaptive threshold, whereas factors causing rapid changes in the energy signal, such as finger presses, will be correctly detected as passing the threshold value.

The threshold data 5306 can represent threshold values beyond (e.g., below) which an energy signal should be considered to have triggered a touch event. A condition analyzer 5308 can compare sensor data 5302 (e.g., energy data) and the threshold data 5306 to determine if a trigger event (e.g., touch event) has occurred. For example, when a current energy signal from the sensor data 5302 drops below a current threshold value in the threshold data 5306, it can be assumed that a touch event has occurred. In some cases, condition analyzer 5308 can further provide feedback to the adaptive threshold update function 5304 to update the parameters of the adaptive threshold update function 5304. For example, the speed, extent, or number of times the energy signal drops below the threshold value can be used to manipulate how the adaptive threshold update function 5304 generates the threshold data 5306 from the sensor data 5302. If a trigger event (e.g., touch event) is detected, the condition analyzer 5308 can output one or more trigger values in trigger data 5310. The trigger data 5310 can include current and historical trigger data indicative of whether or not a trigger event (e.g., touch event) has occurred. For example, the threshold data can be updated based on the energy data, the trigger data, and the threshold data, wherein updating the threshold data comprises generating a subsequent threshold value.

In some cases, trigger data 5310 can be used by the condition analyzer 5308 to further inform its decision about whether or not a trigger event has occurred. For example, historical trigger data can be used by the condition analyzer 5308 to confirm or refute a possible trigger event. In some cases, however, trigger data 5310 can be used by the condition analyzer 5308 to provide updated parameters to the adaptive threshold update function 5304, such that the adaptive threshold update function 5304 is further updated based on current and/or historical trigger data.

In some cases, trigger data 5310 can be passed along to a trigger analyzer 5312 to determine a sensor state 5314. The trigger analyzer 5312 can take information from the trigger data 5310 to make a determination as to whether or not a recent trigger event was a touch, tap, or other such classification of trigger event. The trigger analyzer 5312 can then output its determination as a sensor state 5314. The sensor state 5314 can be indicative of not only a trigger event, but also a classification of state associated with the trigger event. For example, while trigger data 5310 may take the form of a representation of whether or not a trigger has occurred (e.g., a binary signal), the sensor state 5314 may take the form of a representation of what state the sensor is in. Example sensor states include held, tapped, pressed, double-tapped, and the like. The classification of the sensor state can be selected from a predetermined list, each with different patterns of energy signals.

As used herein, various signals can be considered to include a number of data points including a current data point (e.g., most recent data point) and any number of previous data points. As used herein, the term historical data can be inclusive of a current data point and past data points. Data points can be expressed as analog or digital signals.

FIG. 54 is an example plot 5400 depicting an energy signal 5402 and adaptive threshold 5404 associated with identifying touch events according to certain aspects of the present disclosure. The energy signal 5402 can be sensor data 5302 from any suitable sensor, as described with reference to FIG. 53, such as the ultrasound sensor 702 of FIG. 7. The adaptive threshold 5404 can be threshold data 5306 generated from the energy signal 5402, such as described with reference to FIG. 53.

As depicted in FIG. 54, gradual changes in the intensity of the energy signal 5402 over the entire course of the plot 5400 are reflected in the adaptive threshold 5404. Specifically, the average intensities of the energy signal 5402, as seen in relatively constant segments when no fast spikes are occurring, steadily decreases over time, which is then reflected in the adaptive threshold 5404 itself steadily decreasing over time. However, rapid changes associated with touch events, depicted as quick negative spikes in the energy signal 5402, are not fully reflected in the adaptive threshold 5404, permitting the energy signal 5402 to drop below the adaptive threshold 5404. Whenever the energy signal 5402 drops below the adaptive threshold 5404, the system can register a touch event. Depending on various attributes of the detected touch event(s), such as frequency, intensity, duration, and other such attributes as disclosed herein, a determination can be made as to the classification of the touch event (e.g., state of the sensor), such as whether the sensor is being tapped, pressed, held, double-tapped, or otherwise manipulated.

C. Recurrent Neural Network for Touch Event Detection

FIG. 55 is a schematic diagram depicting a general recurrent neural network 5500 according to certain aspects of the present disclosure. A recurrent neural network 5500 is a type of data analysis technique that operates to translate input data 5502 into output data 5508. A recurrent neural network 5500 can be used for one or both of identifying touch events from an energy signal (e.g., as seen in block 5204 of FIG. 52) and identifying state classification from a touch event and/or an energy signal (e.g., as seen in block 5206 of FIG. 52). For example, input data 5502 can be an energy signal or energy data from any suitable sensor, such as the ultrasound sensor 702 of FIG. 7 and the output data can be a trigger signal or a state classification signal. For example, the ultrasound sensor can provide the energy data to the recurrent neural network to generate output data indicative of an occurrence of a touch event.

A recurrent neural network 5500 can pass input data 5502 through any number of nodes across any number of layers until the output data 5508 is generated. In some cases, output data (e.g., output data 5508) can comprise state classification information associated with a touch event. One or more hidden layers 5504, 5506 can be located between the input data 5502 and the output data 5508. Within each hidden layer 5504, 5506, nodes 5510 can process incoming data into outgoing data. In a node 5510, any number of inputs can be received and processed (e.g., summed and passed through a function) to generate an output. In example node 5514, three inputs (e.g., weighted versions of other layers, such as $w_{k,1}{}^i$; $w_{k,2}{}^i$; $w_{k,m((i-1))}{}^i$) are received and summed and passed through a function to generate a single output (e.g., $a_k{}^i$). In other words, in some cases, the output of a node can be a decision function of a linear combination of the previous layer's outputs, optionally with additional feedback as described below with reference to tapped delay lines. In other cases, the inputs to the node 5514 can be linearly combined, then passed to another function $f$. The function $f$ can be an activation function, which may be linear or non-linear. For example, the activation function can include a sigmoid function, a tangent hyperbolic function, a rectified linear unit (ReLU) function, an identify function, and/or any suitable activation function. The activation function can bound the output into a probabilistic form between any suitable bounds (e.g., 0 to 1, −1 to 1, −0.5 to 0.5, etc.). The output from a node 5510 can then be passed to one, some, or all nodes in a subsequent layer, or if at the final layer, can be passed to the output and used to generate the output data 5508 along with the other outputs from that same layer (e.g., through summation or other function).

As depicted in FIG. 55, the recurrent neural network 5500 can also make use of tapped delay lines 5512. Each tapped delay line 5512 can function to provide, as inputs for one, some, or all nodes 5510 of a particular layer (e.g., layer 5504), which can receive current or delayed outputs from that or later layers (e.g., layer 5506 or output 5508) via the tapped delay line 5512. In some cases, a tapped delay line 5512 can also provide, as inputs for each node 5510 of a particular layer), delayed versions of the input data 5502. Example tapped delay line 5516 depicts a vector of inputs (e.g., $a^j$) from layer j 5506 being passed through a delay and output as an input to the various noes of layer i 5504 (e.g., $wd^{i,j}$). In this fashion, outputs (e.g., historical outputs) from subsequent layers can inform earlier layers in the recurrent neural network 5500. Tapped delay lines 5512 can include data from any suitable length of time. For example, a tapped delay line 5512 can provide data from the past single frame or from a number of frames.

The recurrent neural network 5500 in FIG. 55 is depicted with a single input (e.g., input data 5502), a hidden layer i 5504 containing m(i) different nodes, a hidden layer j 5506 containing m(j) different nodes, a single output (e.g., output data 5508). In some cases, a recurrent neural network 5500 as used according to certain aspects of the present disclosure can include any suitable number of inputs, layers, nodes, and outputs. The recurrent neural network 5500 can be trained in advance through supervised machine learning by providing the system with labeled sensor data, permitting the functions of each node (e.g., the weighting values of each node) to be updated until the recurrent neural network 5500 performs as desired.

In some cases, the recurrent neural network can be trained using historical energy data associated with a plurality of historical touch events. The historical energy data can include previous energy data recorded and stored in an appropriate memory and/or database. The plurality of historical touch events can include data regarding previous touch events. For example, historical energy data can include a dip in energy which can be associated with a historical touch event (e.g., "0" indicating no touch, "1" indicating touch). The historical touch events can comprise one or more of each of a set of state classifications. For example, the touch event of "1" can be associated with a state classification of "tap."

In some embodiments, the set of state classifications can be selected by user input out of a plurality of available state classifications. The plurality of available state classifications can include, for example, a list of state classifications available for the user to select. For example, the plurality of available state classifications can include tap, double tap, press, and hold, in some cases. In other cases, the plurality of available state classifications can include tap, press, double press, and grip. The plurality of available state classifications can include any suitable combination of state classifications.

In other embodiments, the plurality of historical touch events can further comprise a plurality of non-touch events. The non-touch events can facilitate training an additional recurrent neural network to reject false positive events. Non-touch events can include, for example, a touch event indicating no touch. For example, a non-touch event can be associated with a dip in an energy signal, but may be associated with an event of a water drop touching the external surface rather than by a finger, as described herein. In some cases, the user can be prompted to touch the external surface against other objects (e.g., pen, fabric, etc.) that the user wants classified as non-touch events. In this way, the user can provide non-touch event data associated with situations where the user does not want the device to determine a touch event. In some cases, the device can provide output data from the recurrent neural network to an additional recurrent neural network to generate state classification information associated with the touch event.

FIG. 56 is a schematic diagram depicting an example recurrent neural network 5600 for identifying trigger events according to certain aspects of the present disclosure. The recurrent neural network 5600 can be especially useful for efficiently and accurately detecting trigger events from ultrasonic energy signals.

At input 5602, sensor data can be provided to the recurrent neural network 5600 in the form of energy signals from an ultrasonic sensor, such as the ultrasound sensor 702 of FIG. 7. This energy signal is passed on two nodes 5610, 5612 of hidden layer 1 5604, as well as to a tapped delay line 5618, which provides one or more delayed signals to nodes 5610, 5612 of hidden layer 1 5604 based on the energy signal from input 5602. For example, the tapped delay line 5618 may be set to provide the last three or four frames worth of energy signals to the hidden layer 1 5604. Additionally, nodes 5610, 5612 of hidden layer 1 5604 can take as additional input the outputs of tapped delay line 5620, which can be configured to output a set number of past frames of the output 5608 of the recurrent neural network 5600. For example, tapped delay line 5620 can be configured to provide, as input to hidden layer 1 5604, the immediately previous frame of data that was output via output 5608 of the recurrent neural network 5600. The outputs from nodes 5610, 5612 of hidden layer 1 5604 can then be passed as inputs to nodes 5614, 5616 of hidden layer 2 5606. Then, the outputs of the nodes 5614, 5616 of hidden layer 2 5606 can be passed to the output 5608 (e.g., combined and output) as trigger data.

In some cases, a strong combination of efficiency and accuracy for identifying trigger data from ultrasound energy signals can be to use a recurrent neural network 5600 with a first layer receiving some combination of sensor data, past sensor data, and past trigger data; and a second layer receiving the outputs of the first layer. The outputs from this second layer can be used to generate the trigger data output.

The recurrent neural network 5600 can be trained in advance and/or by a user. Training of the recurrent neural network 5600 can include providing energy signals that are appropriately labelled as being a touch event or not. This training data can be provided by a supplemental input device (e.g., physical button or electrical contact) that records touch events simultaneously as an ultrasonic sensor detects the energy signals associated with the touch events; or by otherwise associating recorded energy signals with a touch event, such as by instructing a user to initiate a touch event at a certain time or in a certain rhythm. Once the training data has been obtained, the recurrent neural network can be programmed or trained through supervised machine learning, permitting the functions of each node (e.g., the weighting values of each node) to be updated until the recurrent neural network 5600 performs as desired (e.g., accurately identifies the trigger events). In some cases, the recurrent neural network 5600 can be re-trained each time the ultrasonic sensor is coupled to a new material stack.

Due to the nature of recurrent neural networks in general, the output 5608 can take the form of a number. Inferring appropriate trigger data from the number can include applying a threshold value to the actual output 5608 of the recurrent neural network 5600. For example, if the recurrent neural network 5600 outputs a number that is between 0 and 1.0, a threshold could be set between the two numbers, above which the output can be considered as a triggered event (e.g., a touch event) and at or below which the output can be considered as not a triggered event (e.g., no touch event), or vice versa. In this example, a threshold could be set at 0.5, thus an output of 0.55 can be considered as a touch event. In some cases, a recurrent neural network 5600 can have its sensitivity adjusted without retraining the entire neural network simply by adjusting this threshold. Thus, to reduce the likelihood of false triggers (e.g., decrease the sensitivity), the threshold can be moved from 0.5 to 0.6. Thus, the same output of 0.55 would not be considered as not a touch event.

In some cases, an unsupervised machine learning model can analyze data that has not yet been labelled. The unsupervised machine learning model can include any suitable type of unsupervised machine learning model, for example, clustering (e.g., k-means, hierarchical clustering, etc.), anomaly detection, etc. For example, the unsupervised machine learning model can receive, as input, a plurality of trigger values. The plurality of trigger values can be measured by the device while in use by a user. For example, the user can perform any suitable number of touch events which may be recorded. At this point, the plurality of trigger values from the touch events may not yet be labelled as, for example, tap, hold, press, etc. The plurality of trigger values can include at least 0s and 1s indicating a detected touch at a particular time. A data item comprising consecutive trigger values can be used to determine a state.

The unsupervised machine learning model can group (e.g., using a clustering method) the plurality of trigger values or data items created thereof. As an illustrative example, the unsupervised machine learning model can group data items similar to (0, 0, 0, 1, 1, 1, 0, 0, 0) into a first cluster. The unsupervised machine learning model can group data items similar to (0, 0, 1, 1, 0, 0, 1, 1, 0, 0) into a second cluster. The unsupervised machine learning model can create any suitable number of clusters based on the plurality of trigger data.

A user can be prompted to provide supervised data (e.g., to provide desired touch events). In some embodiments, the recurrent neural network 5600 can further determine classifications of the clusters determined from the unsupervised machine learning model based on the supervised data as part of training the recurrent neural network 5600. For example, the cluster with data items similar to (0, 0, 0, 1, 1, 1, 0, 0, 0) can be labeled as "tap," whereas the cluster with data items similar to (0, 0, 1, 1, 0, 0, 1, 1, 0, 0) can be labeled as "double tap."

D. Recurrent Neural Network for State Classification

FIG. 57 is a schematic diagram depicting an example environment 5700 using a set of recurrent neural networks 5706, 5708 for touch detection and state classification according to certain aspects of the present disclosure. Environment 5700 shows a user interface 5702 that can be presented on a computing device, such as computing device 724 of FIG. 7, for generating information related to how an ultrasound sensor (e.g., ultrasound sensor 702 of FIG. 7) can interpret energy signals. The user interface 5702 permits a user to select those states which are to be detected and identified. Then, the recurrent neural networks 5706, 5708 can be trained to identify the selected states. However, it is understood that the recurrent neural networks 5706, 5708 is not limited to identifying the selected states. For example, the recurrent neural networks 5706, 5708 can be trained to identify trigger output based on the trigger data.

In some cases, a single recurrent neural network can be used to generate an output indicative of state based on receiving energy signals as an input. However, as depicted in FIG. 57, a first recurrent neural network 5706 can receive energy signals as an input 5704 and output a trigger signal, which can then be passed as input to a second recurrent neural network 5708, which can then output a state signal as an output 5710. In FIG. 57, the output 5710 is depicted as a plot of a hypothetical feature space. In this hypothetical feature space, the different possible states are differentiable based on their location within this hypothetical feature space. The hypothetical feature space may be depicted as two dimensional, although it may in fact be based on any number of dimensions, including one dimension or more than two dimensions. The output 5710 of the environment 5700 can be indicative of a particular state of the ultrasonic sensor, such as being tapped, touched, pressed, double-tapped, or any other suitable state.

The environment 5700 depicted in FIG. 57 shows a single input and depicts four possible energy patterns that may be put into the input. However, in some cases, a single environment 5700 can make use of multiple sensors to provide multiple energy signals to the recurrent neural network(s).

When the recurrent neural network(s) of an environment 5700 are trained, model information can be stored. In some cases, the model information can be stored locally at the sensor (e.g., on a data store associated with the processor driving the ultrasonic transducer), although this need not always be the case. In some cases, model information can be stored remotely (e.g., on a computing device separate from the sensor) or can be split, such as with model information for determining whether at trigger event has occurred being stored locally at the sensor and model information for determining the state of the sensor based on a trigger signal being stored remotely. Model information can be any information usable to generate, and optionally interpret, an output from an input energy signal. For example, model information can include information about the structure and weightings found in any recurrent neural network(s) of the environment 5700.

During an example training session, a user may select a set of states to train into the model information. As depicted in FIG. 57, the selected states include single tap, double tap, and hold. Upon being prompted to do so, a user can engage in each of the actions associated with each state, thus generating energy signals as input data. Since the user is prompted to engage in the particular actions, the environment 5700 can associate the detected energy signal as being associated with the particular state (e.g., single tap or double tap). As depicted in FIG. 57, information associated with a single tap is shown in green, double tap in blue, hold in yellow, and false events in red. False events could be generated, for example, by prompting the user to touch the surrounding of the sensor, instead of touching the sensor right on top, to make the algorithm more immune to such unwanted false inputs and therefore make it more responsive to local inputs tight above the sensor. Training data can be collected once or repeatedly, from one or more users, until the recurrent neural network(s) have been sufficiently trained.

In some cases, the training could be either offline (e.g., performed on a set of test sensors and optimum network parameters written for all the sensor for that specific application) or could prompt the user to do perform a training session at initialization of the system by the user (e.g., this may be similar to fingerprint enrollment on phones). The method could also be a combination of both stated methods. For example, the method can include both offline training and some optimization during users' usage. In further cases, the data (e.g., energy data, state data, trigger data, etc.) can be shared on the cloud, or over other suitable communication channel, to strengthen a training data database in order to improve network model, training, and optimization.

In some cases, recurrent neural networks can be especially useful for time sequence data and can be easier to optimize for different material stacks and different environmental conditions. In some cases, an environment with multiple recurrent neural networks can permit different types of useful information to be output from the sensor (e.g., from a processor driving an ultrasonic transducer). For example, the sensor can output the energy signal, a trigger signal, and state information, each from different points in environment 5700. Thus, the same sensor can be mass produced and quickly used in various different ways. While some customers may prefer to make use of a trigger signal, others may wish to make use of state information. Thus, the same mass-produced sensor can satisfy the desires of different customers. In addition, if there are multiple sensors installed in one unit, the host/customer can also decide how to combine the information from the sensor network at action trigger and/or even at training as a bundled event, an example of such could be a slide bar or a mouse pad. In general, in case of having multiple sensors installed in one unit, information from multiple sensors can be used to enhance the algorithms' performance and boost its robustness.

X. Applications

FIG. 58 is a schematic diagram depicting an electronic device with an ultrasound input device according to certain aspects of the present disclosure. The electronic device 5800 can include a case 5802, a screen 5804, one or more front facing buttons 5806, a pair of ultrasound input devices 5808, and an individual ultrasound input device 5810. The electronic device 5800 can include a processor, memory, and a network interface. In some embodiments, the ultrasound input devices can be coupled to the processor of the electronic device 5800.

In some embodiments, the pair of ultrasound input devices 5808 can define an input touch area 5812 to detect user inputs. For example, a user can contact the input touch area 5812 to adjust the volume, the brightness, etc. of the electronic device. In some embodiments, an array of ultrasound input devices can be positioned under the screen or other places such as the side or the back of the electronic device to detect touch inputs and replace or augment a capacitive touch or force touch capability or mechanical buttons of the electronic device. The individual ultrasound input device 5810 can define an input touch area 5814 to detect user inputs. The input touch area 5814 can be configured to control the device power, screen on/off, etc.

In some embodiments, an ultrasound input device can be used to detect a touch input at each of the one or more front facing buttons 5806. The ultrasound input device can replace the capacitive sensing used to detect a touch input on a fingerprint sensor. The ultrasound input device offers a low power solution to detect the touch input on the fingerprint sensor. In some embodiments, one or more ultrasound input devices can be positioned under a logo 5822 on the back 5820 of the case 5802 to detect user input. They also could be placed under the side of the electronic device to replace the commonly used side mechanical buttons used, for example, for power or volume.

FIG. 59 is a schematic depiction of a steering wheel 5902 with an ultrasound input device 5904 according to certain aspects of the present disclosure. The ultrasound input device 5904 can be used to form a touch input area on the steering wheel 5902 to detect a touch input. The flexibility of the ultrasound input device 5904 facilitates detection of a touch input through a variety of materials used to manufacture a steering wheel such as plastic, leather, wood, etc. The cross section 5906 of the steering wheel 5902 shows the ultrasound input device coupled to a surface 5908 to form a touch input area 5910. The touch input area can be combined with a plurality of touch input areas for a applications such as cruise control, infotainment input control, cellular communications controls, volume, and driver detection systems. For example, the ultrasound input device 5904 can be used in a driver detection system to determine if a driver's hands are in contact with the steering wheel.

FIG. 60 is a schematic depiction of a keypad 6000 using an ultrasound input device according to certain aspects of the present disclosure. The shape and materials that can be used to design a touch area with underlying ultrasound input devices are limited only be the creativity of the designer. For example, a 12-key standard telephone keypad is shown in FIG. 60. The keypad 6000 can include 12 ultrasound input devices 6002 to form a touch area 6004 for each key. As another example, the keypad 6000 can include 23 or fewer ultrasound input devices 6002.

FIG. 61 is a schematic diagram depicting a robotic arm using an ultrasound input device according to certain aspects of the present disclosure. The robotic arm 6100 can include a first finger 6102 and a second finger 6104. The ultrasound input device can be implemented as a robot finger input device. The first finger 6102 and the second finger 6104 can include a first ultrasound input device 6106 and a second ultrasound input device 6108 respectively. The first ultrasound input device 6106 can form a contact area 6110 on the surface of the first finger 6102 and the second ultrasound input device 6108 can form a second contact area 6112 on the second finger. The ultrasound input devices improve the detection capability of the robot arm because they can be integrated into fingers comprising any material. Further, the ultrasound input devices can detect a touch input without requiring a cutout and/or a different material being integrated into the finger.

In some cases, the ultrasound input device can identify the type of material being touched by analyzing the energy measurement signals. In some cases, the ultrasound input device can identify the elasticity of the object being grasped. For example, a less elastic object will generally absorb less ultrasonic waves than a more elastic object, thus resulting in a generally higher energy measurement signal. In some cases, a determination about the elasticity of the object can be used to adjust the behavior of the robot arm, such as to adjust the force with which the robot arm grasps the object. In some cases, the ultrasound input device may be capable of detecting texture or other mechanical properties of an object based on analyzing the energy measurement signals associated with the object. In some cases, analysis of energy measurement signals from an ultrasound input device can be combined with other inputs, such as machine vision, to confirm or make determinations about an object with which the robot arm is to interact or is interacting.

FIG. 62 is a schematic diagram depicting a piece of furniture 6202 using an ultrasound input device 6204 according to certain aspects of the present disclosure. The ultrasound input device 6204 can be coupled to the furniture 6202 in any suitable fashion. A user touching the furniture 6202 at or adjacent to the location of the ultrasound input device 6204 can be detected by the ultrasound input device 6204 (e.g., via ultrasound touch sensor 6212). Upon detecting touch, the ultrasound input device 6204 can perform any preprogrammed functions. For example, a communication module 6214 of the ultrasound input device 6204 can send a signal (e.g., a wireless signal) to a control module 6206 spaced apart from the ultrasound input device 6204 and/or the furniture 6202. The control module 6206 can control another device, such as a power switch 6208 coupled to a light bulb 6210. Thus, upon pressing a location on the furniture 6202 that is at or adjacent to the location of the ultrasound input device 6204, the light bulb 6210 can be turned on, be turned off, or otherwise be controlled. The device being controlled (e.g., light bulb 6210) can be in the same environment as the ultrasound input device 6204, although that need not always be the case. In some cases, the device being controlled can be in an adjacent environment or even a distant environment.

In some embodiments, a piece of furniture or IoT could be equipped with one or more of these ultrasound input devices which could operate individually or in the form of a network of sensors communicating with one another to perform multiple tasks. The sensors could also communicate with other sensors on other devices as well, through the IoT device itself or through sensors' general-purpose programmable processor, to exchange information.

The ultrasound input device 6204 according to certain aspects of the present disclosure operate on very low power, such as from an internal battery 6216. This battery-powered, low power operation can permit use of the ultrasound input device 6204 in otherwise inaccessible or inconvenient locations. For example, a light switch can be incorporated into a table or desk, or a television remote can be incorporated into an armrest of a chair.

In some cases, an ultrasound input device 6204 can be positioned on a hidden surface 6218 so as to hide the ultrasound input device 6204 from sight during normal operation. A hidden surface 6218 can be an underside of a table (e.g., furniture 6202), the inside of a piece of furniture, the inside of a wall, or any other suitable location hidden from view. Thus, the hidden ultrasound input device can be actuated only by those knowing its location, which would otherwise be hidden from view.

FIG. 63 is a set of charts depicting the energy measurement signals of an ultrasound input device demonstrating material detection according to certain aspects of the present disclosure. The characteristics of an energy measurement signal, such as shape, duration, slopes, or other characteristics, can be leveraged to make a determination as to the material interacting with the ultrasound input device. For example, a bare human finger may elicit a different energy measurement signal than a human finger wearing a plastic glove. The top chart depicts an example of an energy measurement signal from a bare human finger contacting an ultrasound input device, with a characteristic rapid drop and relatively quick increase back to a baseline signal as the finger is removed. The bottom chart, however, depicts an example of an energy measurement signal from a human finger wearing a plastic glove. When a plastic glove is worn, the energy measurement signal has different characteristics than when no plastic glove is worn. For example, the energy measurement signal when a plastic glove is worn has a discernably slower increase back to the baseline signal after the finger is removed. This relatively slower increase is in part due to the slight stickiness between the interaction of the plastic glove and the substrate of the ultrasound input device. While the human finger may be pulling away more quickly, the plastic glove around the finger will tend to remain on the substrate for a short duration longer, which can be discernable in the resultant energy measurement signal. This type of comparison can be used to make determinations as to the material initiating a touch event.

XI. Additional Piezoelectric Array Designs

FIG. 64 is a schematic diagram of a piezoelectric resonator array 6400 containing piezoelectric cantilevers 6402 usable in an ultrasound input device according to certain aspects of the present disclosure. The piezoelectric resonator array 6400 can contain a set of piezoelectric cantilevers 6402 on a base 6404. A piezoelectric resonator array 6400, when acoustically coupled to a material layer (e.g., material layer 102 of FIG. 1) can operate with a particular acoustic resonance. When a touch event is occurring, the touch event can cause the piezoelectric resonator array 6400 to resonate differently. This change in acoustic resonance due to the touch event can be detected and used as a sensor signal in an ultrasound input device, such as instead of a PMUT. Additionally, the piezoelectric cantilevers 6402 can be driven to flex and thus induce emitted signals.

FIG. 65 is a schematic diagram of a piezoelectric resonator array 6500 containing piezoelectric pillars 6502 usable in an ultrasound input device according to certain aspects of the present disclosure. The piezoelectric resonator array 6500 can contain a set of piezoelectric pillars 6502 on a base 6504. A piezoelectric resonator array 6500, when acoustically coupled to a material layer (e.g., material layer 102 of FIG. 1) can operate with a particular acoustic resonance. When a touch event is occurring, the touch event can cause the piezoelectric resonator array 6500 to resonate differently. This change in acoustic resonance due to the touch event can be detected and used as a sensor signal in an ultrasound input device, such as instead of a PMUT. Additionally, the piezoelectric pillars 6502 can be driven to flex and thus induce emitted signals. The piezoelectric pillars 6502 can be arranged in any suitable pattern, such as a hexagonal grid.

Aspects of embodiments can be implemented in the form of control logic using hardware circuitry (e.g., an application specific integrated circuit or field programmable gate array)

and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

As used below, any reference to a series of examples is to be understood as a reference to each of those examples disjunctively (e.g., "Examples 1-4" is to be understood as "Examples 1, 2, 3, or 4").

Example 1 is a method, comprising: receiving energy data associated with an ultrasound input device coupled to a material layer, wherein the energy data comprises a current energy value and past energy values associated with reflected ultrasound signals received at the ultrasound input device in response to the ultrasound input device transmitting emitted signals through the material layer towards an external surface of the material layer; comparing the energy data with threshold data to generate a current trigger value for trigger data, wherein the trigger data is indicative of an occurrence of a touch event when the current energy value exceeds a current threshold value of the threshold data; and updating the threshold data based on the energy data, the trigger data, and the threshold data, wherein updating the threshold data comprises generating a subsequent threshold value.

Example 2 is the method of example(s) 1, further comprising: receiving a subsequent value associated with the energy data; and comparing the subsequent value associated with the energy data to the a subsequent threshold signal to generate a subsequent trigger value associated with the trigger data.

Example 3 is the method of example(s) 1 or 2, wherein updating the threshold data is based on the current energy value and a preset number of past energy values, and wherein the subsequent threshold value is greater than the current threshold value when the energy data has an upward trend.

Example 4 is the method of example(s) 1-3, wherein the trigger data comprises a the current trigger value and past trigger values, wherein updating the threshold data is based on the current trigger value and a preset number of the past trigger values.

Example 5 is the method of example(s) 1-4, wherein updating the threshold data comprises determining a speed of change in value of the energy data over a duration and generating the subsequent threshold value based on the determined speed.

Example 6 is the method of example(s) 1-5, wherein updating the threshold data comprises determining an extent of change in value of the energy data over a duration and generating the subsequent threshold value based on the determined extent.

Example 7 is the method of example(s) 1-6, wherein updating the threshold data comprises determining a number of touch events indicated by the trigger data for a duration and generating the subsequent threshold value based on the number of touch events indicated by the trigger data for the duration.

Example 8 is the method of example(s) 1-7, wherein comparing the energy data with the threshold data to generate the current trigger value further comprises using past trigger values of the trigger data to confirm that the touch event has occurred.

Example 9 is the method of example(s) 1-8, wherein updating the threshold data based on the energy data, the trigger data, and the threshold data comprises applying an adaptive threshold update function, wherein the adaptive threshold update function is configured to permit slower changes in the energy data to have more effect on the threshold data than faster changes in the energy data.

Example 10 is the method of example(s) 1-9, further comprising: analyzing the trigger data to determine a sensor state and generating an output based on the sensor state.

Example 11 is a method, comprising: receiving energy data associated with an ultrasound input device coupled to a material layer, wherein the energy data comprises a current energy value and past energy values associated with reflected ultrasound signals received at the ultrasound input device in response to the ultrasound input device transmitting emitted signals through the material layer towards an external surface of the material layer; and providing the energy data to a recurrent neural network to generate output data indicative of an occurrence of a touch event at the external surface of the material layer.

Example 12 is the method of example(s) 11, wherein the recurrent neural network is could be is trained using historical energy data associated with a plurality of historical touch events.

Example 13 is the method of example(s) 12, wherein the plurality of historical touch events comprises one or more of each of a set of state classifications.

Example 14 is the method of example(s) 13, wherein the set of state classifications is selected by user input out of a plurality of available state classifications.

Example 15 is the method of example(s) 13, wherein the plurality of historical touch events further comprises a plurality of non-touch events to facilitate training an additional recurrent neural network to reject false positive events.

Example 16 is the method of example(s) 11-15, wherein the output data comprises state classification information associated with the touch event.

Example 17 is the method of example(s) 11-15, further comprising: providing the output data from the recurrent neural network to an additional recurrent neural network to generate state classification information associated with the touch event.

Example 18 is the method of example(s) 17, wherein the additional recurrent neural network is trained using historical energy data associated with a plurality of historical touch events at the external surface, and wherein the plurality of historical touch events comprises one or more of each of a set of state classifications.

Example 19 is the method of example(s) 18, wherein the set of state classifications is selected by user input out of a plurality of available state classifications.

Example 20 is the method of example(s) 18, wherein the plurality of historical touch events further comprises a plurality of non-touch events to facilitate training the additional recurrent neural network to reject false positive events.

Example 21 is the method of example(s) 11-20, wherein the recurrent neural network comprises a first hidden layer and a second hidden layer, wherein a tapped delay line of the output data is provided as an input to the first hidden layer, and wherein outputs from the first hidden layer are provided as inputs to the second hidden layer. The number of the hidden layers and the tapped delay lines could alter based on the application, required level of accuracy, complexity of the states, and restrictions on the memory.

Example 22 is the method of example(s) 11-20, wherein providing the energy data to the recurrent neural network comprises providing current energy data and a preset number of past energy values to the recurrent neural network.

We claim:

1. A method performed by a touch sensor chip comprising an ultrasound sensor layer including an array of ultrasonic transducers and an integrated circuit layer coupled to the ultrasound sensor layer, wherein the array of ultrasonic transducers comprises a transmitting set of ultrasonic transducers configured for transmitting ultrasound signals and a receiving set of ultrasonic transducers configured for receiving ultrasound reflections associated with transmitted ultrasound signals, wherein the transmitting set of ultrasonic transducers are separate from the receiving set of ultrasonic transducers, the method comprising:
generating a first driving signal in the integrated circuit layer coupled to a first transmitting ultrasonic transducer in the array of ultrasonic transducers coupled to the integrated circuit layer;
generating a second driving signal in the integrated circuit layer coupled to a second transmitting ultrasonic transducer in the array of ultrasonic transducers;
generating a first emitted ultrasound signal, by the first transmitting ultrasonic transducer, in response to the first driving signal, wherein generating the first emitted ultrasound signal comprises transmitting the first emitted ultrasound signal through a material layer in a longitudinal direction that is normal to an exterior surface of the material layer;
generating a second emitted ultrasound signal, by the second transmitting ultrasonic transducer, in response to the second driving signal, wherein generating the second emitted ultrasound signal comprises transmitting the second emitted ultrasound signal through the material layer in the longitudinal direction, the second emitted ultrasound signal being at a second frequency that is different from a first frequency of the first emitted ultrasound signal;
receiving a first set of reflection signals at a first receiving ultrasonic transducer in the array of ultrasonic transducers, wherein the first set of reflection signals comprise one or more ultrasound signals associated with the first emitted ultrasound signal;
receiving a second set of reflection signals at a second receiving ultrasonic transducer in the array of ultrasonic transducers, wherein the second set of reflection signals comprise one or more ultrasound signals associated with the second emitted ultrasound signal;
measuring a first energy signal associated with the first received set of reflection signals;
measuring a second energy signal associated with the second received set of reflection signals; and
determining that a touch event has occurred at the exterior surface of the material layer and distinguishing the touch event from temperature-induced drift based on the measured first energy signal and measured second energy signal.

2. The method of claim 1, wherein measuring the first energy signal comprises:
   generating a non-negative analog signal associated with the first received set of reflection signals using analog circuitry of the integrated circuit layer; and
   generating the first energy signal by converting the non-negative analog signal into a digital signal.

3. The method of claim 1, wherein the array of ultrasonic transducers is located within the ultrasound sensor layer that is coupled to the integrated circuit layer comprising the integrated circuit layer, and wherein the ultrasound sensor layer and the integrated circuit layer are enclosed within a housing couplable to the material layer.

4. The method of claim 3, wherein the ultrasound sensor layer is formed and wafer bonded to the integrated circuit layer during fabrication.

5. The method of claim 3, wherein the ultrasound sensor layer is fabricated directly onto the integrated circuit layer during fabrication.

6. The method of claim 1, wherein the array of ultrasonic transducers comprise a plurality of transmitting ultrasonic transducers and a plurality of receiving ultrasonic transducers, and wherein the plurality of transmitting ultrasonic transducers are arranged to surround the plurality of receiving ultrasonic transducers.

7. The method of claim 1, wherein the integrated circuit layer comprises ultrasound transmitting circuitry and ultrasound receiving circuitry, wherein the ultrasound transmitting circuitry is electrically coupled to the transmitting ultrasonic transducer and not electrically coupled to the receiving ultrasonic transducer, and wherein the ultrasound receiving circuitry is electrically coupled to the receiving ultrasonic transducer and not electrically coupled to the transmitting ultrasonic transducer.

8. The method of claim 1, further comprising:
   generating one or more additional driving signals in the integrated circuit layer; and
   driving one or more additional transmitting ultrasonic transducers using the one or more additional driving signals to generate one or more additional emitted ultrasound signals, wherein the one or more additional emitted ultrasound signals and the first emitted ultrasound signal are designed to interact to achieve a desired pattern of constructive interference to facilitate beamforming, wherein the first set of reflection signals comprise one or more ultrasound signals associated with the first emitted ultrasound signal and the one or more additional emitted ultrasound signals.

9. The method of claim 8, wherein the first receiving ultrasonic transducer is surrounded by the first transmitting ultrasonic transducer and the one or more additional transmitting ultrasonic transducers, and wherein the desired pattern of constructive interference is adjustable to change a surface area of a sensitive region on the exterior surface of the material layer that is responsive to touch.

10. The method of claim 1, wherein the array of ultrasonic transducers comprises one or more piezoelectric micromachined ultrasonic transducers, one or more integrated bulk piezoelectric transducers, or one or more non-integrated bulk piezoelectric transducers.

11. The method of claim 10, wherein transmitting the first emitted ultrasound signal through the material layer includes transmitting the first emitted ultrasound signal within 20% of the normal to the exterior surface of the material layer.

* * * * *